Figure 2A:
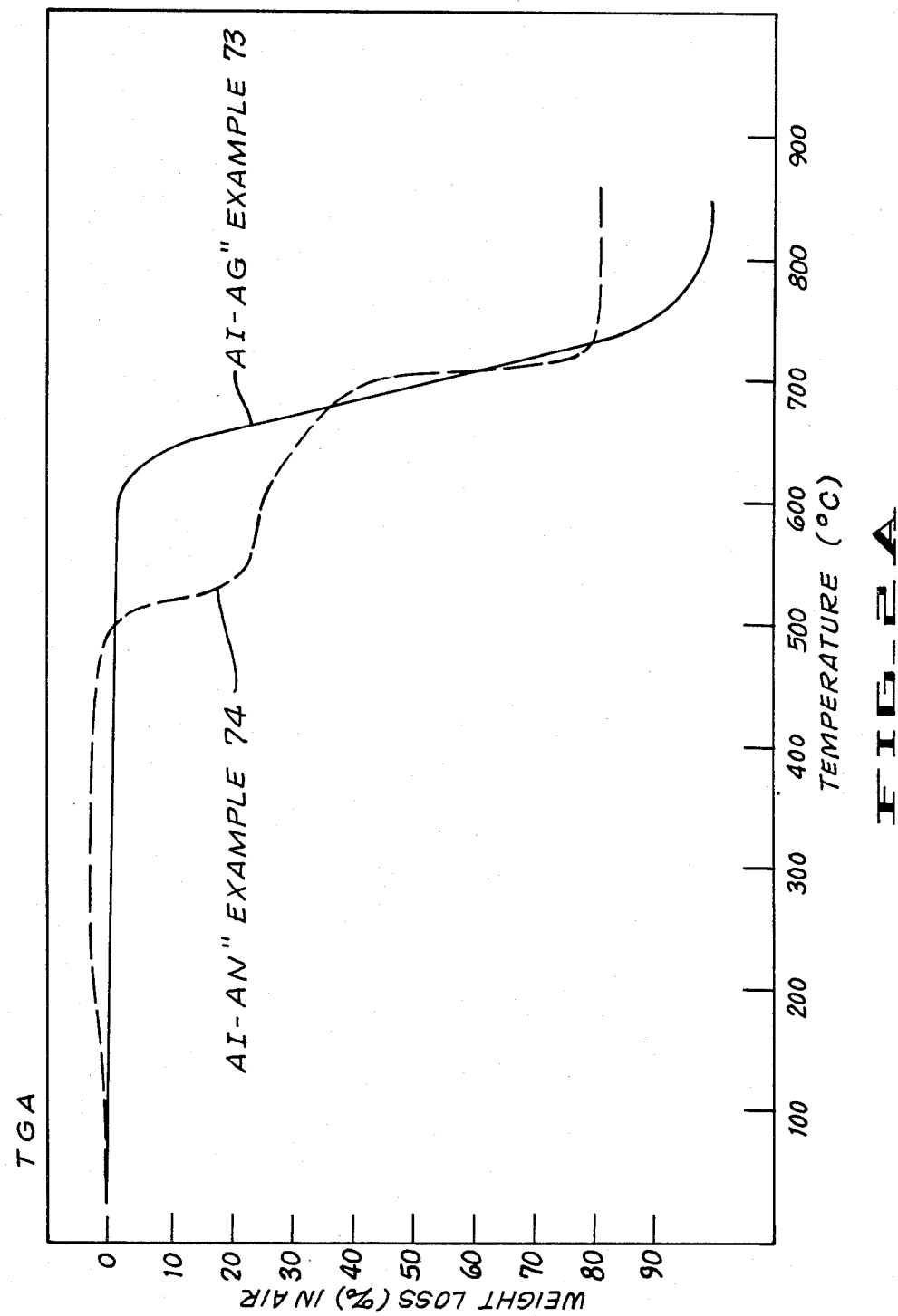

United States Patent [19]

Wolfe et al.

[11] Patent Number: 4,533,693

[45] Date of Patent: Aug. 6, 1985

[54] LIQUID CRYSTALLINE POLYMER COMPOSITIONS, PROCESS, AND PRODUCTS

[75] Inventors: James F. Wolfe, Redwood City, Calif.; Paul D. Sybert; Joanne R. Sybert, both of Cohoes, N.Y.

[73] Assignee: SRI International, Menlo Park, Calif.

[21] Appl. No.: 616,469

[22] PCT Filed: Sep. 15, 1983

[86] PCT No.: PCT/US83/01437

§ 371 Date: Sep. 15, 1983

§ 102(e) Date: Sep. 15, 1983

[87] PCT Pub. No.: WO84/01162

PCT Pub. Date: Mar. 29, 1984

Related U.S. Application Data

[63] Continuation-in-part of Ser. No. 433,831, filed as PCT 82/01285 Sep. 17, 1982, published as WO 84/01160 Mar. 29, 1984, § 102(e) date Sep. 17, 1982.

[51] Int. Cl.³ .............................................. C08K 3/32
[52] U.S. Cl. ..................................... 524/417; 524/706; 528/176; 528/183; 528/184; 528/185; 528/186; 528/188; 528/327; 528/330; 528/331; 528/337; 528/341; 528/342; 528/346; 528/347; 528/348; 528/352; 528/353; 528/364
[58] Field of Search ............... 524/417, 706; 528/176, 183, 184, 185, 186, 188, 327, 330, 331, 337, 341, 342, 346, 347, 348, 352, 353, 364

[56] References Cited

U.S. PATENT DOCUMENTS

| | | |
|---|---|---|
| 3,342,720 | 1/1969 | Rudier et al. |
| 3,691,136 | 9/1972 | Serres, Jr. et al. |
| 3,804,791 | 4/1974 | Morgan |
| 3,873,497 | 3/1975 | Jackson |
| 4,051,108 | 9/1977 | Helminiak et al. |
| 4,225,700 | 9/1980 | Wolfe et al. |
| 4,233,434 | 11/1980 | Kraus et al. |
| 4,263,245 | 4/1981 | Tan |
| 4,342,862 | 8/1982 | Jackson, Jr. et al. |
| 4,351,917 | 9/1982 | Caludann et al. |
| 4,351,918 | 9/1982 | Charbonneau et al. |
| 4,355,132 | 10/1982 | East et al. |
| 4,423,202 | 12/1983 | Choe |

FOREIGN PATENT DOCUMENTS

| | | |
|---|---|---|
| 42-19270 | 9/1967 | Japan |
| 54-119941 | 9/1977 | Japan |
| 53-128350 | 9/1978 | Japan |
| 54-101339 | 9/1979 | Japan |
| 54-133361 | 10/1979 | Japan |
| 54-133359 | 10/1979 | Japan |
| 54-128357 | 10/1979 | Japan |
| 54-133358 | 10/1979 | Japan |
| 54-13360 | 10/1979 | Japan |
| 56-9722 | 1/1981 | Japan |

OTHER PUBLICATIONS

Hwang, W-F. et al, "Structure Study and Spherulite Formation of Poly-2,5(6) Benzimidazole, Amer. Physics Soc. Bull., vol. 26, No. 3, p. 430, JX12, 1981.

Hwang, W-F. and D. R. Wiff, "Molecular Composites of Rigid Rod Poly-P-Phenylenebenzobisthiazole (PPBT) in Thermoplastic Matrices," A. Chem. Soc. Abstracts, No. 197, Mar. 1983.

(List continued on next page.)

Primary Examiner—Joseph L. Schofer
Assistant Examiner—N. Sarofim
Attorney, Agent, or Firm—John Y. Chen

[57] ABSTRACT

Novel compositions comprising a high concentration of one or more extended chain homopolymer, copolymer, or block polymer and certain polyphosphoric acids are prepared. Such compositions are optically anisotropic (liquid crystalline), capable of exhibiting excellent cohesive strength, and are especially suited to the production of high molecular weight ordered polymer fibers by dry-jet wet spinning. These liquid crystalline compositions are capable of being drawn through long air gap distances and spun at exceptionally high spin draw ratios. Fibers, films and other articles formed from these liquid crystalline compositions exhibit exceptionally high physical and heat resistant properties.

346 Claims, 15 Drawing Figures

OTHER PUBLICATIONS

Hwang, W-F. et al, "Composites on a Molecular Level: Phase Relationships, Processing, and Properties," J. Macromol. Sci.-Phys., B22(2), pp. 231–257, 1983.

Wereta, A., Jr. et al, "Polybenzimidazole Structure--Property Relationships," AFML Rpt., Soc. Plastics Engrs. J., vol. 21, 1975, pp. 618–620.

Wellman et al, "Rodlike Polymer Reinforcement of an Amorphous Polymer Matrix, AB-PBI/PBT," A. Chem. Soc., vol. 43, 1980, pp. 783–787.

Hwang, W-F. et al, "Solution Processing and Properties of Molecular Composite Fibers and Films," Poly. Eng. and Sci., mid–Oct., 1983, vol. 23, No. 14, pp. 784–788.

Wereta, A. Jr. et al, "Morphological and Physical Property Effects for Solvent Cast Films of Poly-2,5(6) Benzimidazole," Poly. Eng. and Sci., Feb. 1978, vol. 18, No. 3, pp. 204–209.

Hwang, W-F. and C. Verschoore, "Phase Relationships of Rigid Rod Polymer/Flexible Coil Polymer/Solvent Ternary Systems," Poly. Eng. and Sci., mid-Oct., 1983, vol. 23, No. 14, pp. 789–791.

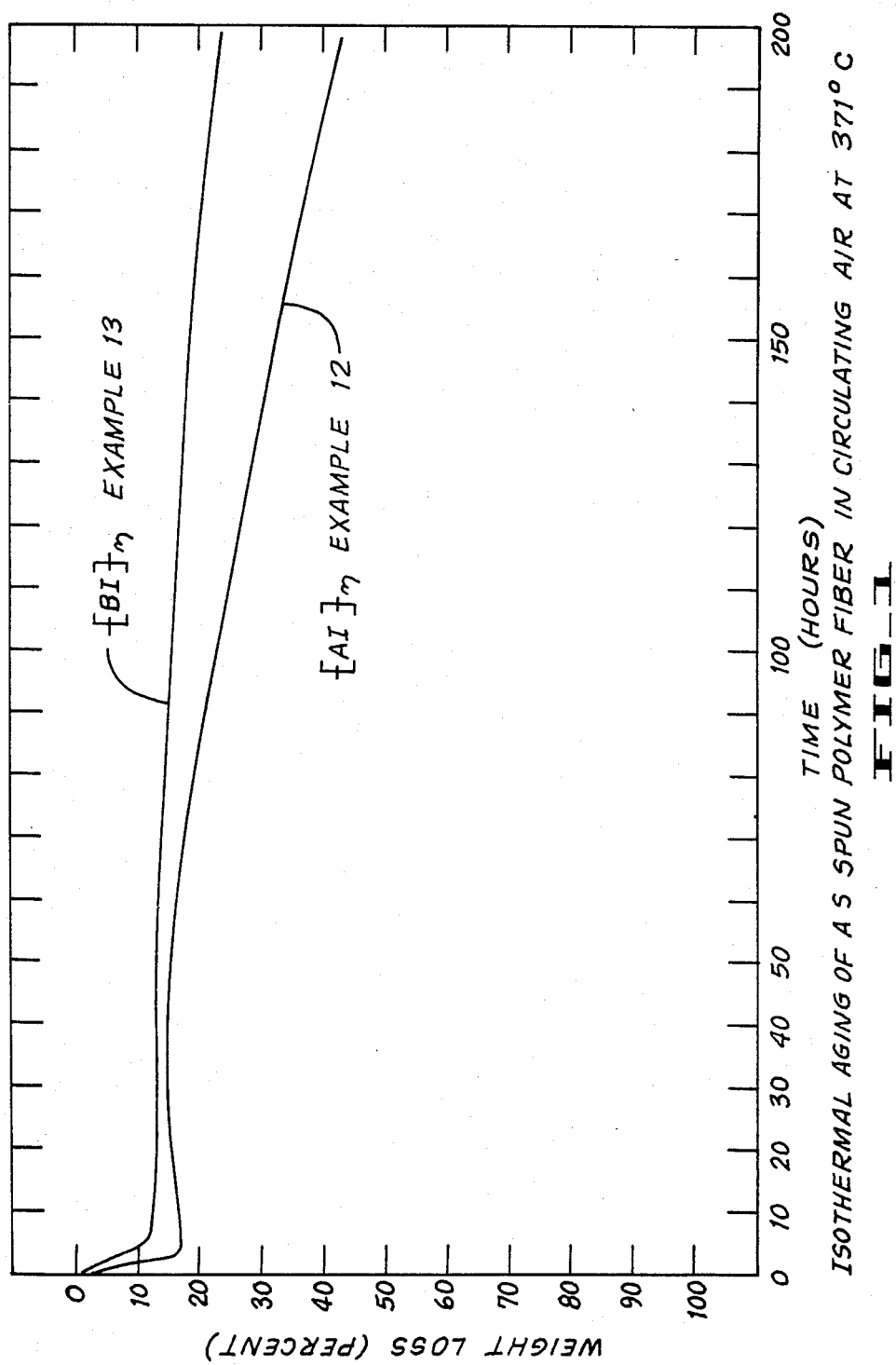

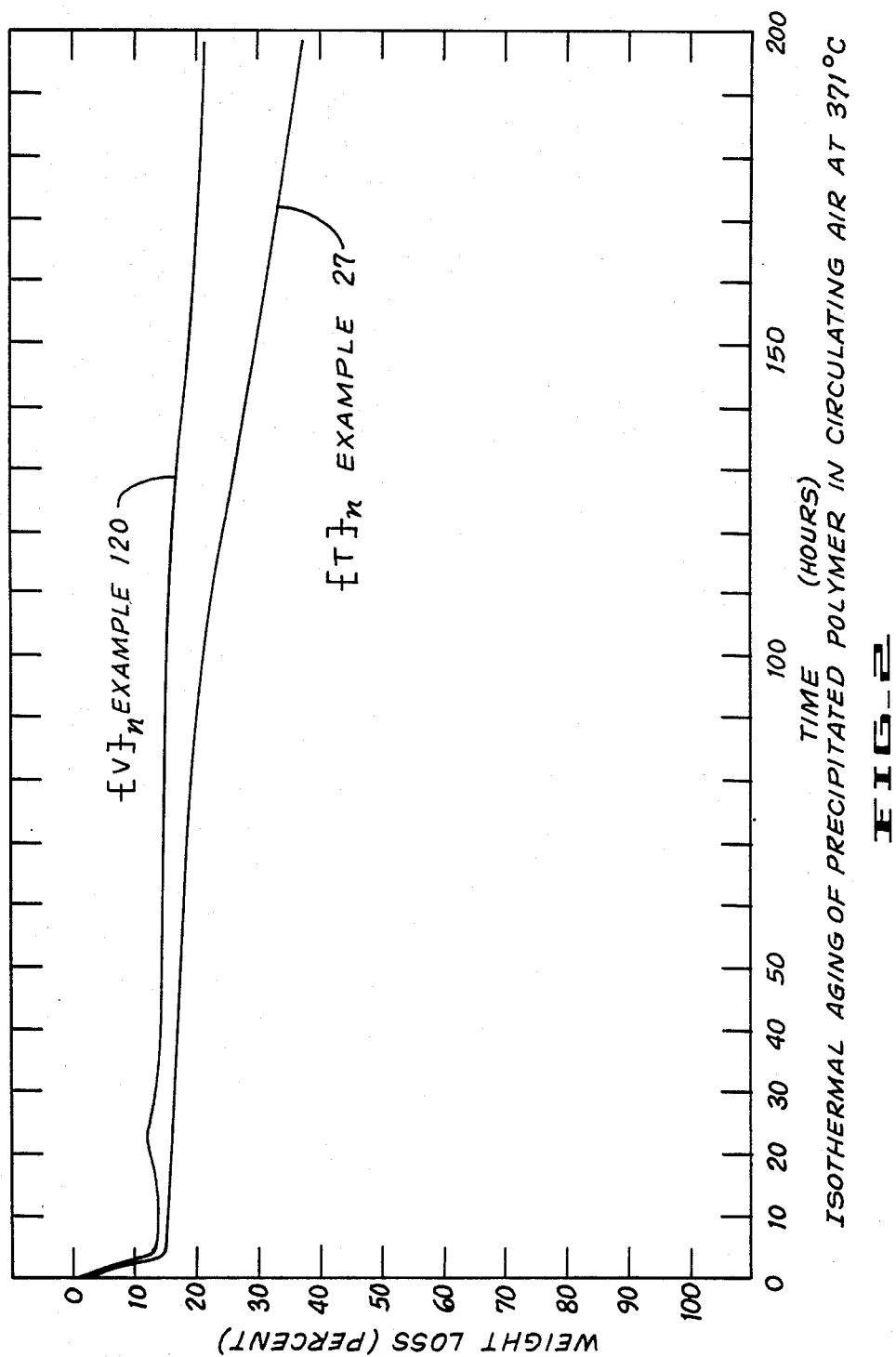

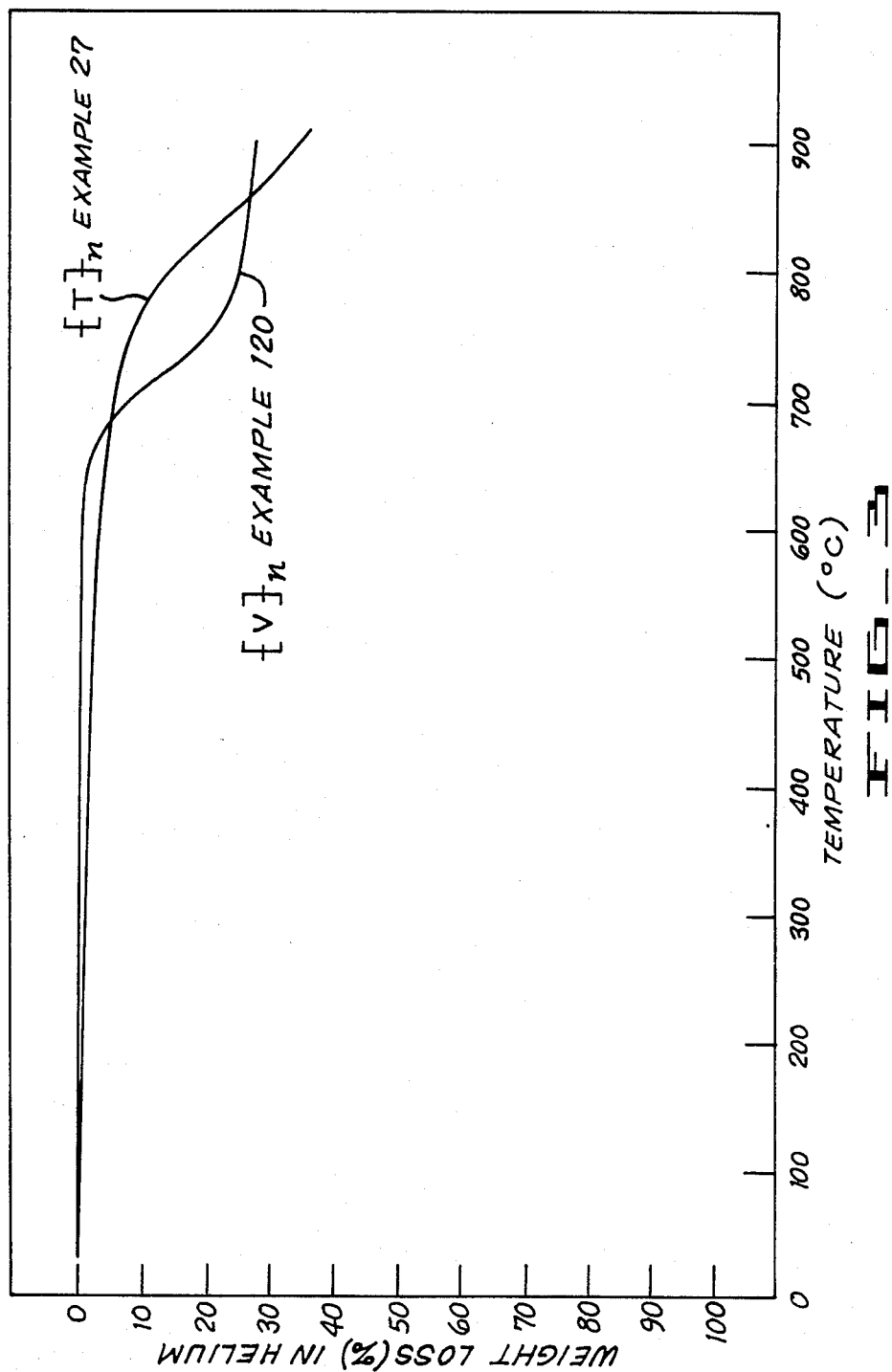

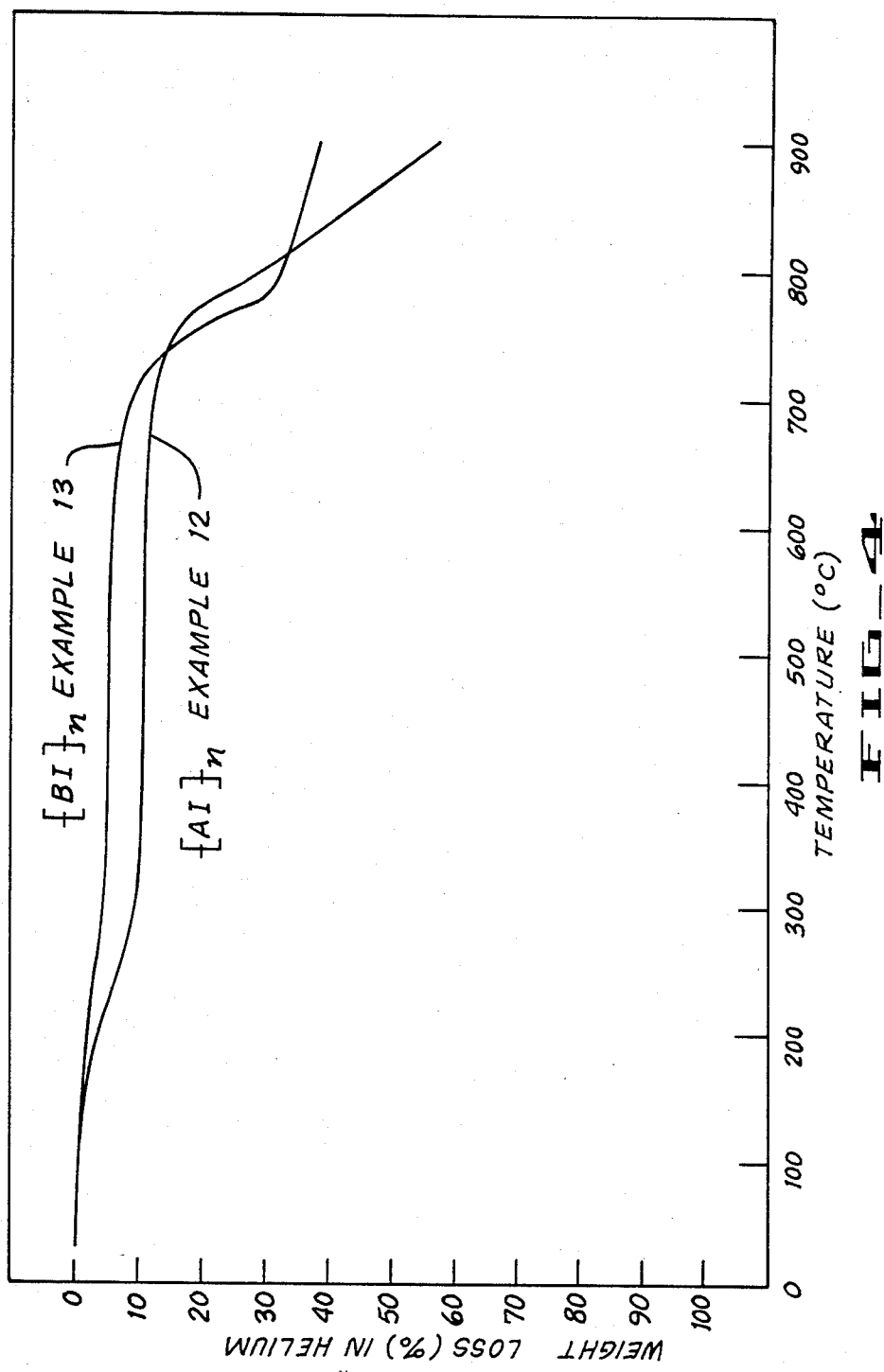

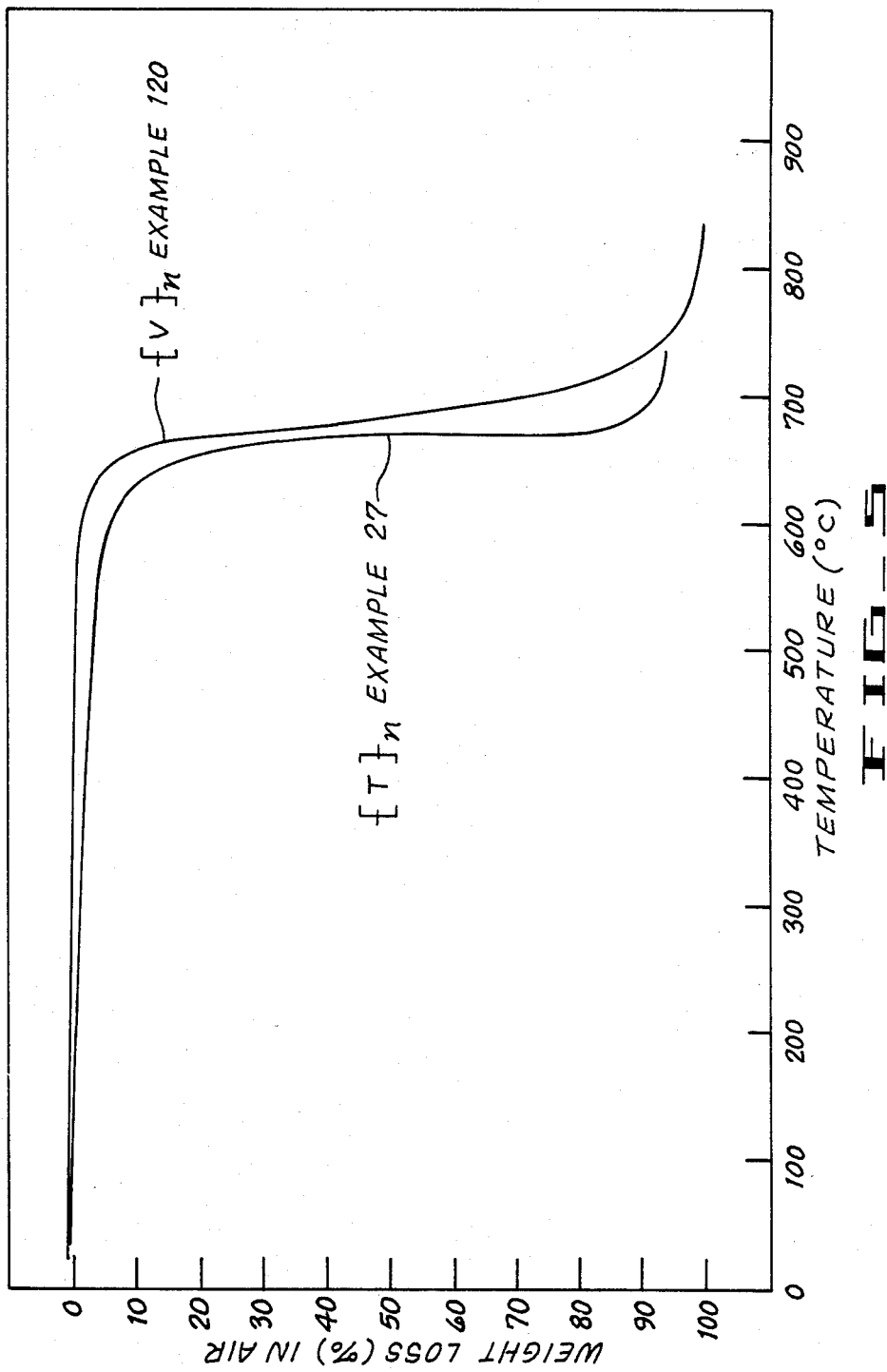

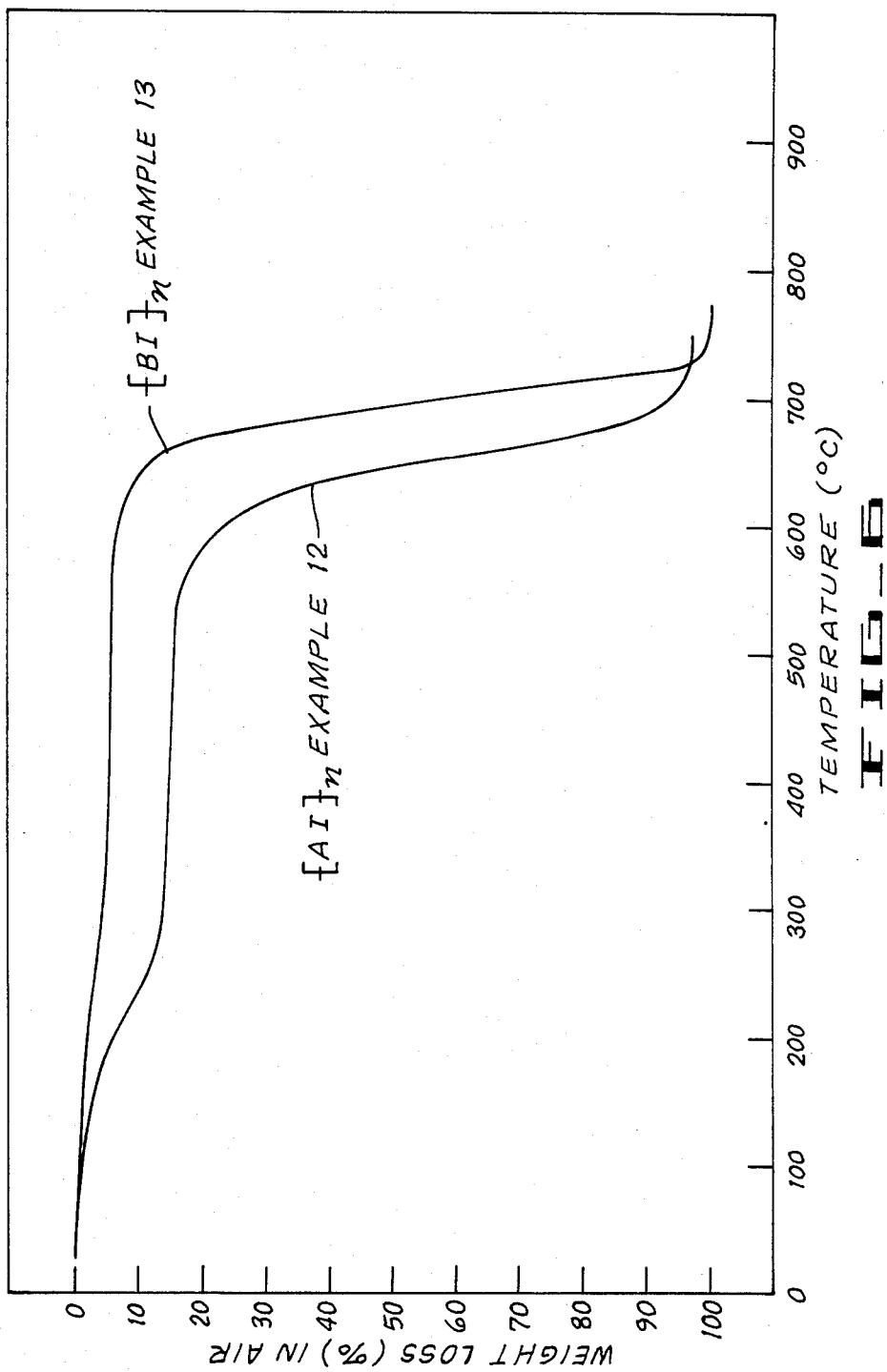

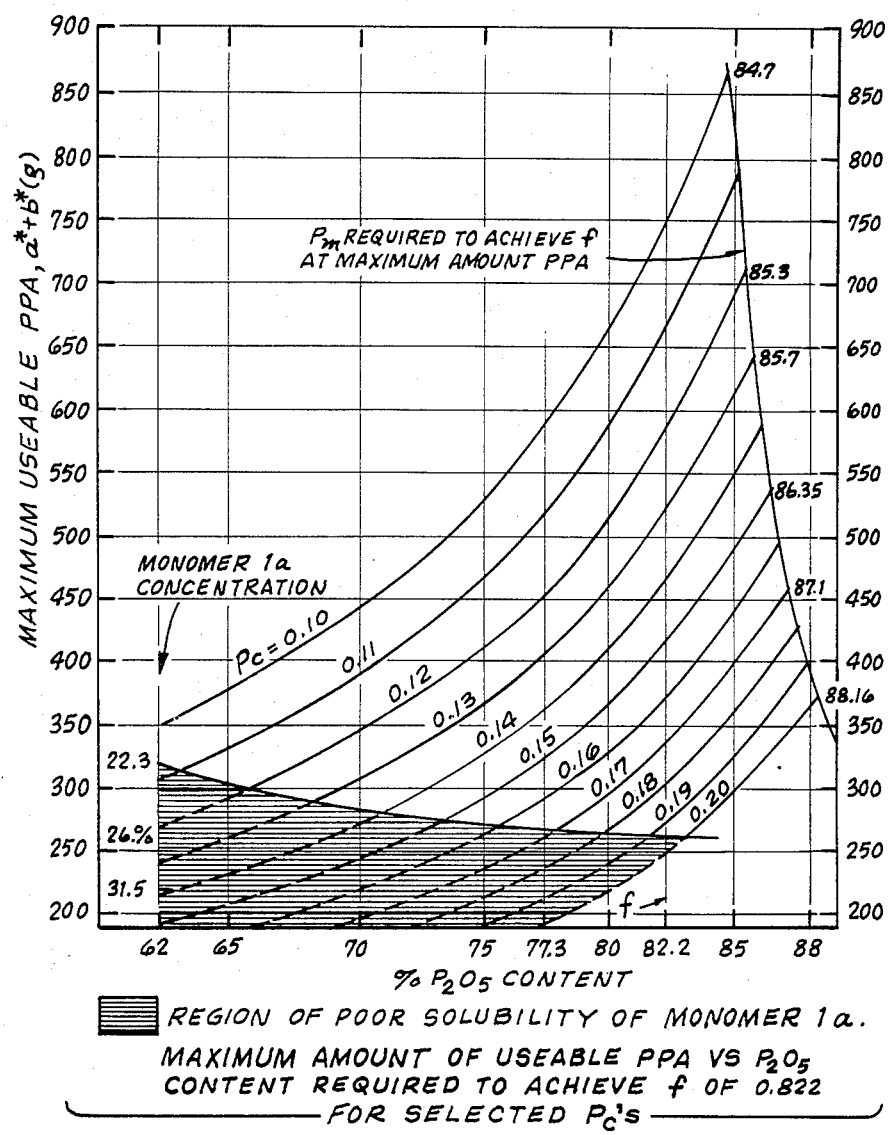
FIG_7

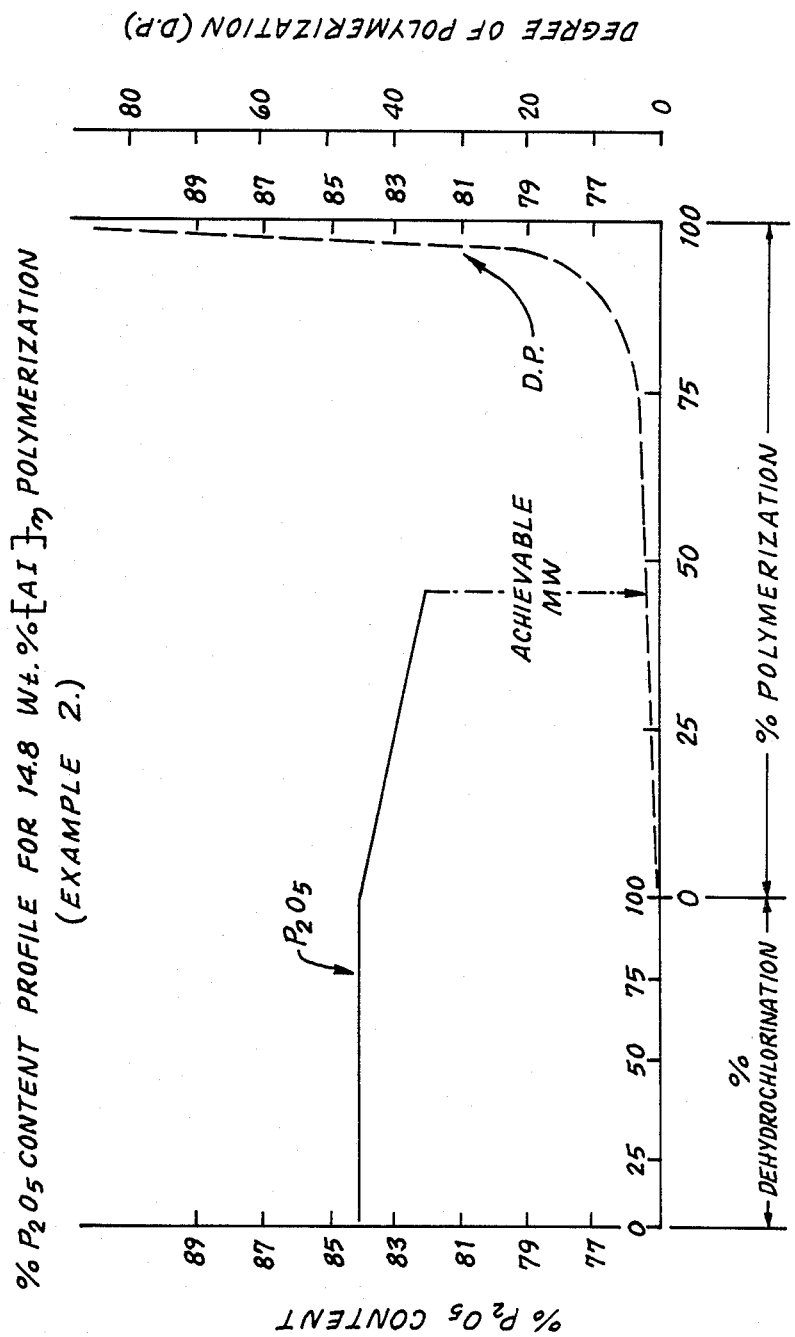

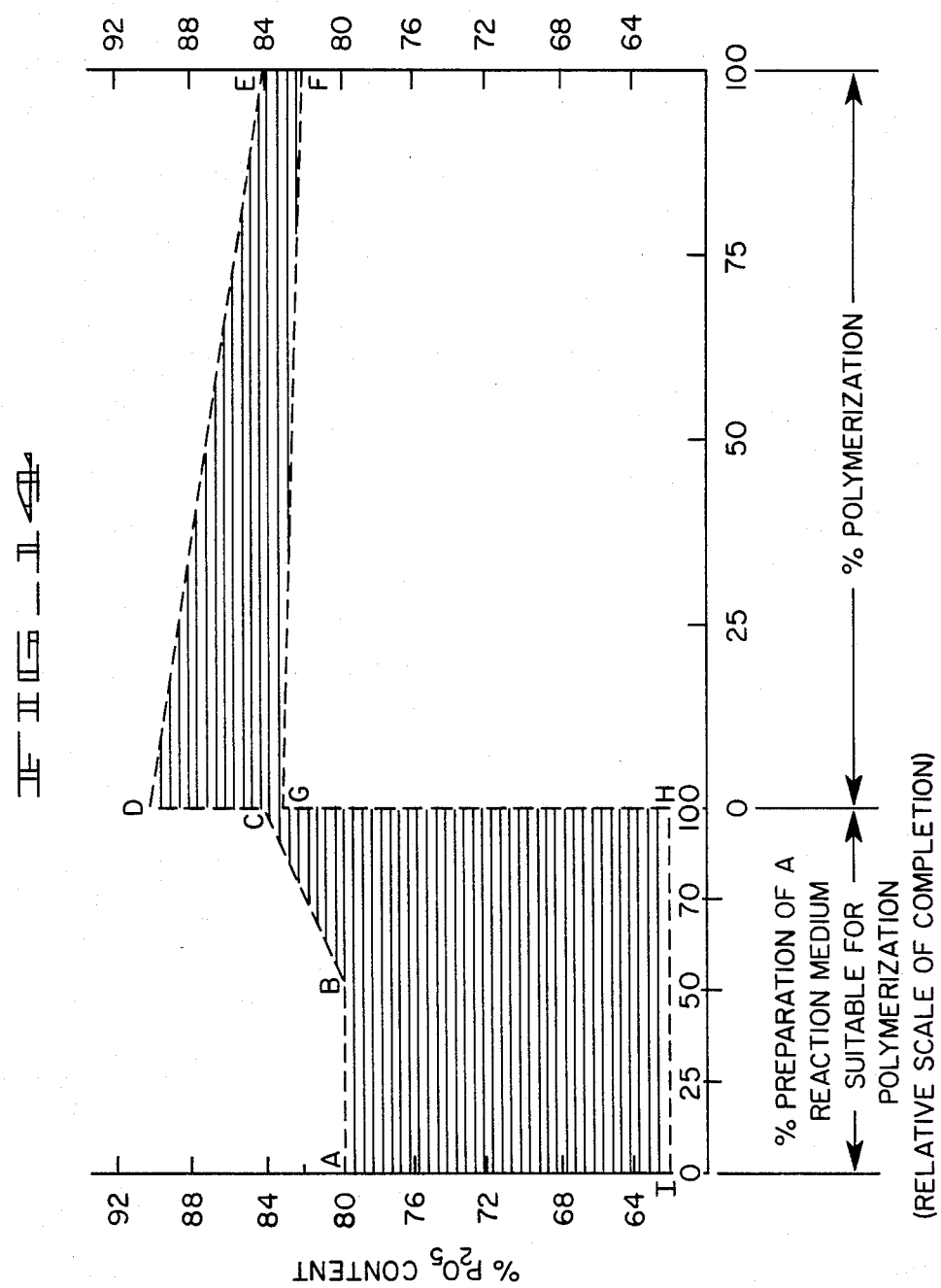

LIQUID CRYSTALLINE POLYMER COMPOSITIONS, PROCESS, AND PRODUCTS

BACKGROUND OF INVENTION

1. Origin of Invention

This invention was made with Government support under U.S. Department of Defense contract Nos. F33615-81-K-5070, F49620-81-K-0003, and/or F33615-82-C-5079 awarded by the United States Air Force. The Government has certain rights in this invention.

This application is a continuation-in-part of Ser. No. 06/433,831, filed as PCT US 82/01285, Sept. 17, 1982, published as WO 84/01160 Mar. 29, 1984 § 102(e) date Sept. 17, 1982 Pat. No. 4,533,492.

2. Technical Field of Invention

The present invention relates broadly to novel anisotropic (liquid-crystalline) extended chain polymerpolyphosphoric acid compositions, to the production of high molecular weight extended chain polymers by polycondensation of selected monomers in certain polyphosphoric acids, and especially to the production of highly concentrated polymer compositions from which industrially useful polymeric articles such as fibers and films are readily produced.

Among some of the most serious difficulties encountered in the production of thermally stable articles such as fibers and films from extended chain polymers are described in the Background Art below.

3. Reference to Related Applications

Reference is made to another United States patent application filed concurrently with the present application, both being assigned to SRI International and having as one of their inventors, James F. Wolfe. Said other application is entitled: "Liquid Crystalline Poly(2,6-benzothiazole) Compositions, Process, and Products" and is herein incorporated by reference.

4. Background Art

In general, the class of aromatic heterocyclic extended chain polymers are well known for their outstanding thermal, physical, and chemical properties. Unfortunately, these polymers are essentially non-melting and have proven very difficult to economically process into articles. In order to fashion such polymers into desired articles of commerce, for example fibers, films, fibrids, and the like, it is necessary that they be in solution or dope form. Although such polymers can be dissolved in various acidic solvents, such as sulfuric acid, methanesulfonic acid, chlorosulfonic acid, polyphosphoric acid, and the like, difficulty is often experienced in preparing and using the polymer-acid compositions or dopes because of poor polymer-acid solubility.

Normally, a precipitated or dried particulate form of the polymer is dissolved in a strong acidic solvent by mixing the (isolated) polymer particles at elevated temperatures and/or under high pressures for a period from several hours to several days. If the polymer is insoluble in the particular solvent, other solvents or various solvent mixtures are employed. Usually, heating and cooling cycles are applied and repeated to obtain a useful dope.

The resulting dopes often contain undissolved polymer and must be filtered before further processing into articles.

Although spinning dopes of polybenzobisoxazole, polybenzimidazole and polybenzobisthiazole in sulfuric acid and/or methanesulfonic acid and/or chlorosulfonic acid with polymer concentrations above about 10 percent are known in the art, the intrinsic viscosity of these polymers is for the most part below 5dL/g and oftentimes less than 3dL/g. The cohesive strength of such dopes is inherently weak and economically less desirable for use in dry-jet wet spinning. In the case of polybenzobisoxazole, numerous attempts of dry-jet wet spinning an approximately 10% polybenzobisoxazole/methane sulfonic acid-dope into fibers were not successful (E. W. Choe, et al., in *Macromolecules* 1981, 14, pp. 920–924).

In the case of polybenzimidazole, prior art dopes of this polymer lack adequate strength to maintain filament integrity while dropping through the air-gap. In order to overcome this problem U.S. Pat. No. 4,263,245 teaches dissolving a high concentration (up to 30%) of this polymer into suitable solvents such as concentrated sulfuric acid. At such high polymer concentrations lithium chloride is required to prevent the polybenzimidazole from phasing out of solution.

In the case of polybenzobisthiazole, U.S. Pat. No. 4,225,700 teaches the formation of a liquid crystalline composition of this polymer at concentrations near 10% in methane sulfonic acid and chlorosulfonic acid and at about 6% in polyphosphoric acid. Concentrations of polybenzobisthiazole in polyphosphoric acid above about 10% by weight are difficult, if indeed possible to achieve. One difficulty encountered is that the solution of the 2,5-diamino-1,4-benzenedithiol monomer in polyphosphoric acid with the $P_2O_5$ content described in U.S. Pat. No. 4,225,700 is very viscous and dehydrohalogenation is difficult. Also considerable foaming results. Although solutions of precipitated polymer in solvents such as methane sulfonic acid and chlorosulfonic acid can be prepared, high concentrations of polymer are difficult or impossible to achieve. S. R. Allen, et al., in *Macromolecules* 1981, 14, pp. 1135–1139 describes attempts at spinning polybenzobisthiazole directly from the polymerization medium (polyphosphoric acid) containing 5–6% polymer.

Insofar as polybenzobisthiazole is concerned it is possible to obtain compositions near to 10% of the polymer in polyphosphoric acid with intrinsic viscosity equal to 26dL/g (J. F. Wolfe, et al., *Macromolecules* 1981, 14, pp. 915–920). Attempts to increase the intrinsic viscosity of the polymer can only be achieved at a major sacrifice (decrease) in polymer concentration. Liquid crystalline compositions of 10% polybenzobisthiazole in polyphosphoric acid are heretofore unknown in the art. Liquid crystalline compositions of polybenzobisthiazole having intrinsic viscosities greater than about 30.3dL/g in polyphosphoric acid are heretofore unknown in the art.

In practical terms this means that such polymerpolyphosphoric acid compositions are severely limited in their potential usefulness for the production of highly ordered high molecular weight polymeric articles.

In general, liquid crystalline extended chain polymer compositions (with the exception of polybenzobisthiazole as mentioned above) in polyphosphoric acid are heretofore unknown in the art; and moreover, liquid crystalline extended chain copolymer and block polymer compositions are heretofore unknown in the art.

DISCLOSURE OF INVENTION

1. Objects of Invention

Accordingly, it is an object of the present invention to provide compositions substantially free of one or more of the disadvantages of prior art compositions.

Another object is to provide a process for preparing liquid crystalline extended chain polymer compositions.

A further object is to provide liquid crystalline extended chain polymer compositions having excellent cohesive strength.

Another object is to provide liquid crystalline extended chain polymer compositions having excellent spin stretchability.

Another object is to provide liquid crystalline extended chain polymer compositions capable of being drawn through long air gap distances.

Yet another object is to provide liquid crystalline extended chain polymer compositions capable of being drawn at high spin draw ratios.

A further object of the invention is to prepare a liquid crystalline spinning composition having a high extended chain polymer content.

A still further object is to provide liquid crystalline extended chain homopolymer compositions.

Another object is to provide liquid crystalline extended chain copolymer compositions.

Yet another object is to provide liquid crystalline extended chain block polymer compositions.

Another object of the invention is to provide a method of preparing a liquid crystalline polymer composition having a high polymer content of an extended chain homopolymer.

Another object of the invention is to provide a method of preparing a liquid crystalline polymer composition having a high polymer content of an extended chain copolymer.

Another object of the invention is to provide a method of preparing a liquid crystalline polymer composition having a high polymer content of an extended chain block polymer.

Another object of the invention is to provide a method of preparing liquid crystalline extended chain polymer compositions from selected monomers.

Another object is to provide a process for preparing liquid crystalline high molecular weight extended chain polymer compositions.

A further object of the invention is to provide a method for synthesizing high molecular weight extended chain homopolymers.

A further object of the invention is to provide a method for synthesizing high molecular weight extended chain copolymers.

A further object of the invention is to provide a method for synthesizing high molecular weight extended chain block polymers.

A still further object is to provide a method whereby the dehydrohalogenation of certain hydrohalide monomers may be carried out more easily and rapidly.

Yet another object is to provide a method whereby a substantially higher concentration of monomeric reactants can be employed which results in liquid crystalline extended chain polymer compositions of considerably higher polymer concentration than has been possible heretofore.

Another object is to alleviate the foaming problem referred to above.

Another object is to provide articles prepared from liquid crystalline extended chain polymer compositions.

A further object of the invention is to prepare articles such as fibers and films from a liquid crystalline polymer composition comprising selected extended chain homopolymers.

A further object of the invention is to prepare articles such as fibers and films from a liquid crystalline polymer composition comprising selected extended chain copolymers.

A further object of the invention is to prepare articles such as fibers and films from a liquid crystalline polymer composition comprising selected extended chain block polymers.

Another object of the invention is to provide a process for the continuous production of extended chain homopolymer, copolymer, and block polymer articles such as fibers and films starting with selected monomers.

The above and other objects of the invention will be apparent from the ensuing description and the appended claims.

2. Statement of Invention

In accordance with our discovery, the present invention broadly encompasses novel polymer compositions which are useful as dopes in the production of high strength shaped articles comprising blends of certain polyphosphoric acids, as described hereinafter, and a high concentration of one or more high molecular weight extended chain polymers having one or more mesogenic group or groups. The extended chain polymers can be homopolymers, copolymers, or block polymers, as exemplified hereinafter. The extended chain polymer is present in the blend at a sufficient concentration so as to be capable of exhibiting an anisotropic polymer phase alone or in combination with one or more different polymers with or without mesogenic group or groups. The blends according to the invention are polycondensation products obtained by reaction of selected monomers in an appropriate solution of phosphoric acid, as described hereinafter. These blends exhibit special properties which make them very useful as dopes in the production of fibers, films, fibrids, and the like. In addition to being anisotropic (liquid-crystalline), the blends have a novel combination of properties including unexpectedly high spin-stretchability and excellent cohesive strength, as well as having the capability of being drawn through short, as well as extremely long, air-gap distances, and spun at low, as well as exceptionally high, draw ratios. It is believed that these properties can be attributed to the combination of high polymer concentration, high polymer molecular weight, and a high phosphorus pentoxide content comprising the blends of the present invention.

Our discovery further broadly encompasses a process for preparing novel extended chain polymer compositions which are useful as dopes in the production of fibers and films. This process comprises:

(a) mixing at least one of a selected first monomer (as described hereinafter) with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a first mixture of the first monomer in the preliminary solvent, (c) adding at least one of a selected second monomer (as described hereinafter) in the resulting mixture of step (b) to provide a first mixture of the first and second monomer in the preliminary solvent, (d) then increasing the phosphorus pentoxide content of the mixture resulting from step (b) or (c) to provide a first or a first and second monomer reaction medium of greater phosphorus pentoxide content suitable for polymerization, (e) causing polymerization of the first or the first and second monomer at a temperature sufficient to effect reaction at a rate to form a first homo-oligomeric product or a first cooligomeric product having a preselected intrinsic viscosity, or (f) causing polymerization of the first or the first and second monomer at a temperature sufficient to effect reaction at a rate to form a first homopolymeric product or a first copolymeric product, (g) mixing a selected amount of the first homo-oligomeric product with a selected amount of at least one of a selected second homo-oligomeric product so as to form a first poly-oligomeric product, the second homo-oligomeric product being formed by like steps (a) and (b) followed by:

(1g) adding at least one of a selected second monomer in the resulting mixture of step (b) to provide a mixture of a first and second monomer in the preliminary solvent, (2g) then increasing the phosphorus pentoxide content of the mixture resulting from step (b) or (1g) to provide a first or a first and second monomer reaction medium of greater phosphorus pentoxide content suitable for polymerization, (3g) causing polymerization of the first or first and second monomer at a temperature sufficient to effect reaction at a rate to form the second homo-oligomeric product having a preselected intrinsic viscosity, with the overall proviso that at least one of the selected monomers of step (a) or (1g) which forms the second homo-oligomeric product be different from at least one of the selected monomers of step (a) or (c) which forms the first homo-oligomeric product, or (h) mixing a selected amount of the first homo-oligomeric product with a selected amount of a second mixture of at least one of a selected first monomers or a first and second monomer in the preliminary solvent so as to form a monomer-oligomer mixture, and then increasing the phosphorus pentoxide content of the monomer-oligomer mixture to provide a monomer-oligomer reaction medium of greater phosphorus pentoxide content suitable for polymerization, the first monomer of the second mixture being formed by like steps (a) and (b) and the first and second monomer of the second mixture being formed by like steps (a), (b) and (c), with the overall proviso that at least one of the selected monomers of step (a) or (c) which forms the first or first and second monomer of the second mixture, be different from at least one of the selected monomers of step (a) or (c) which forms the first homo-oligomeric product.

(i) causing polymerization of the polyoligomeric product resulting from step (g) or the monomer-oligomer resulting from step (h) at a temperature sufficient to effect reaction at a rate to form a first block-oligomeric product having a preselected intrinsic viscosity or a first block-polymeric product.

(j) spinning, drawing, extruding, or casting an article from said first homo-oligomeric product, said first co-oligomeric product, said first homopolymeric product, said first copolymeric product, said first poly-oligomeric product, said second homo-oligomeric product, said first block-oligomeric product, said first block-polymeric product, or mixtures thereof.

2.a FIGURES

The invention will be more fully explained with reference to the Figures wherein:

FIG. 1. graphically illustrates the weight stability of as spun polymer fibers of $-\text{[BI]}_n$ (Example 13) and $-\text{[AI]}_n$ (Example 12) with time during isothermal aging in circulating air at 371° C;

FIG. 2. graphically illustrates the weight stability of precipitated polymers of $-\text{[V]}hd\ n$ (Example 120) and $-\text{[T]}_n$ (Example 27) with time during isothermal aging in circulating air at 371° C.

Figure 9:
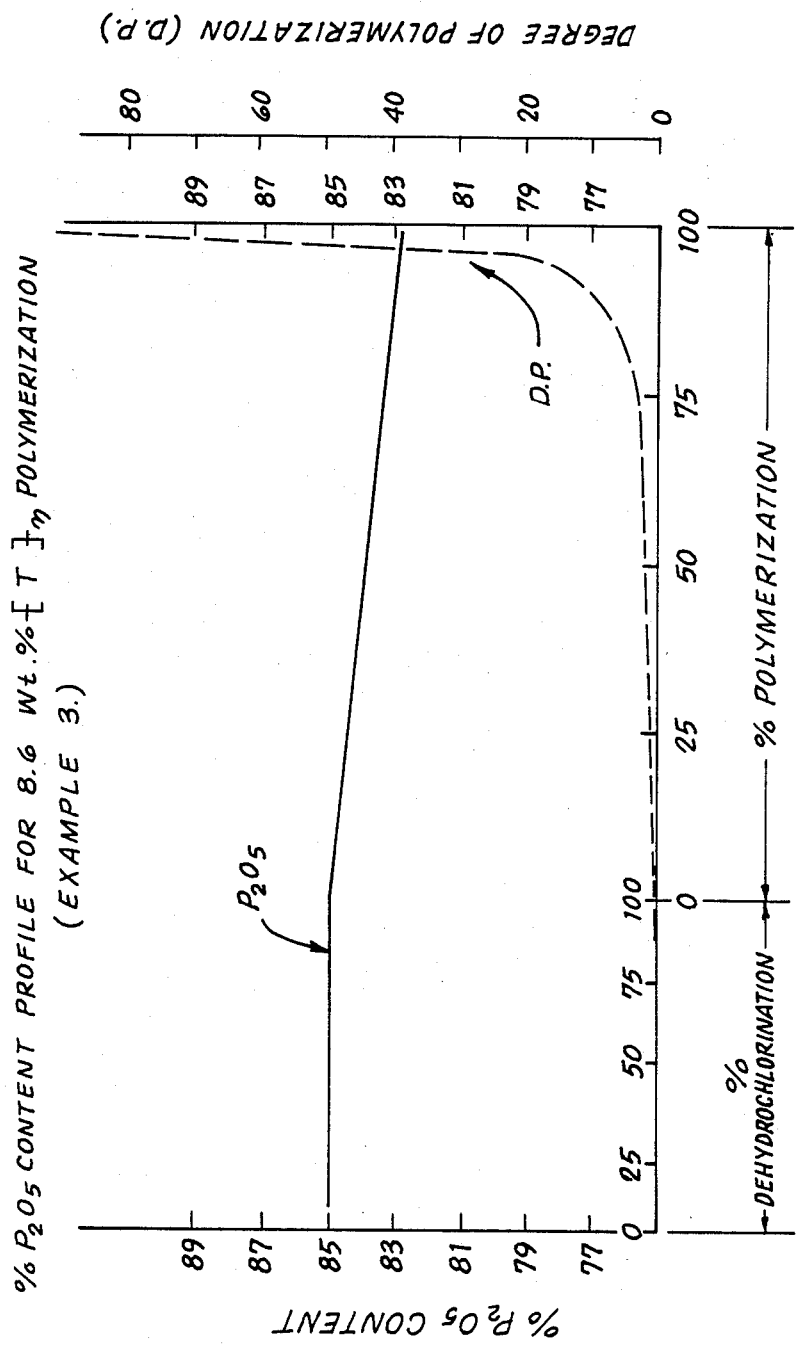
Figure 10:
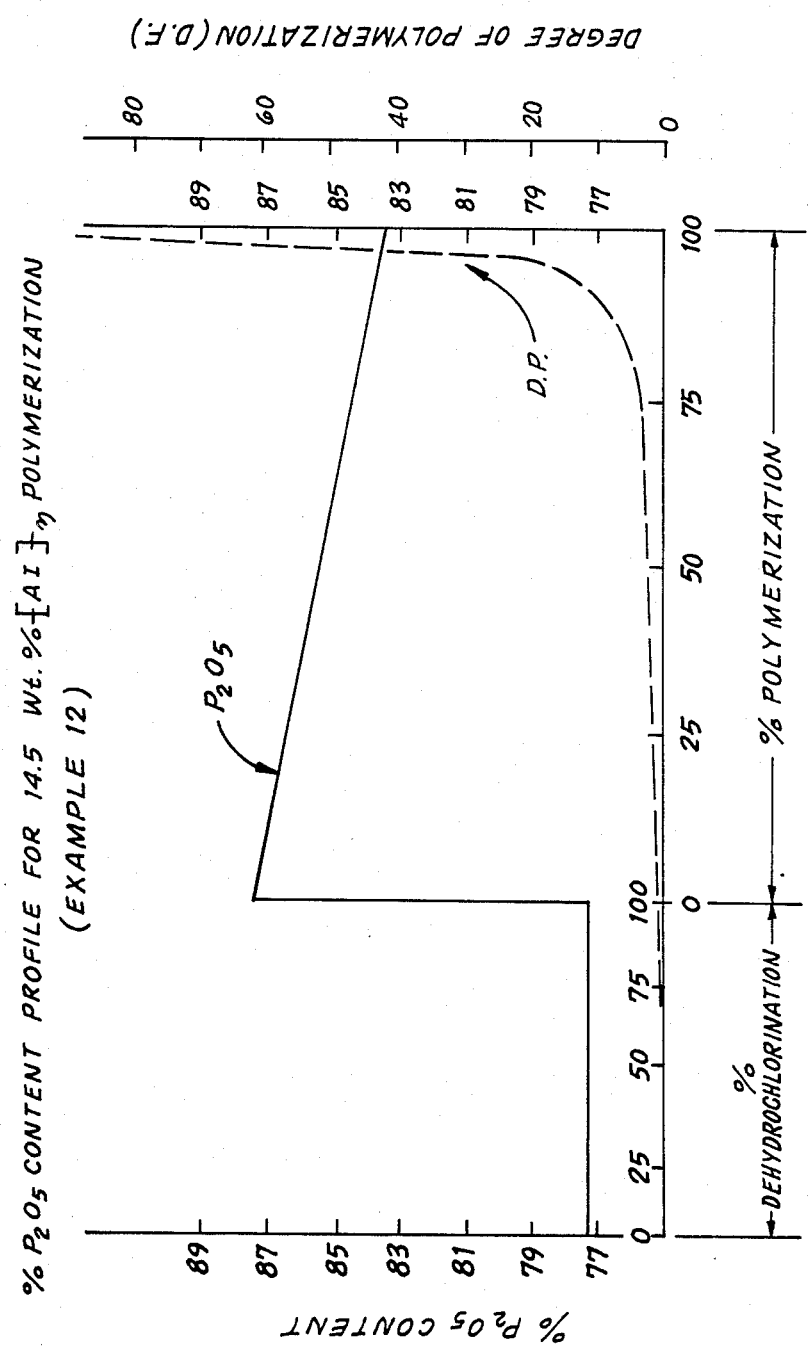
Figure 11:
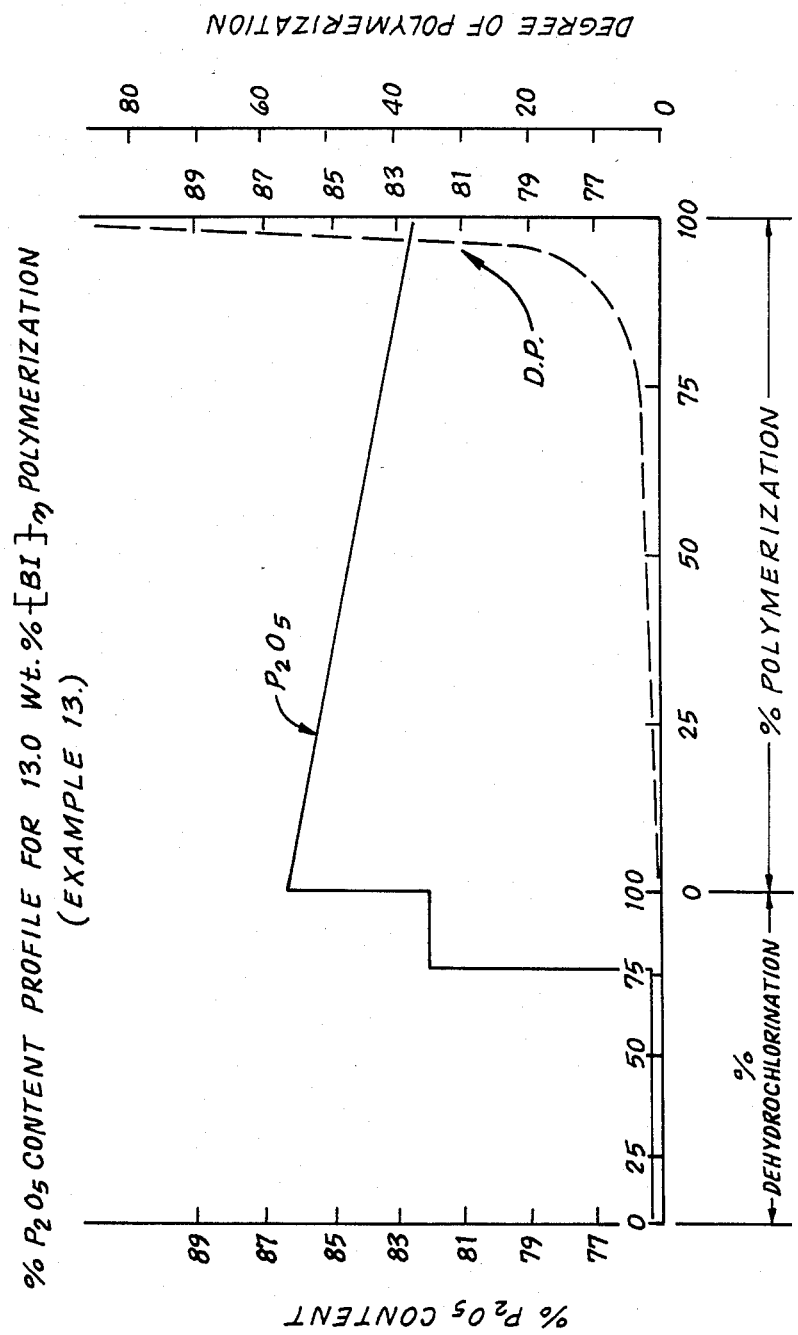
Figure 12:
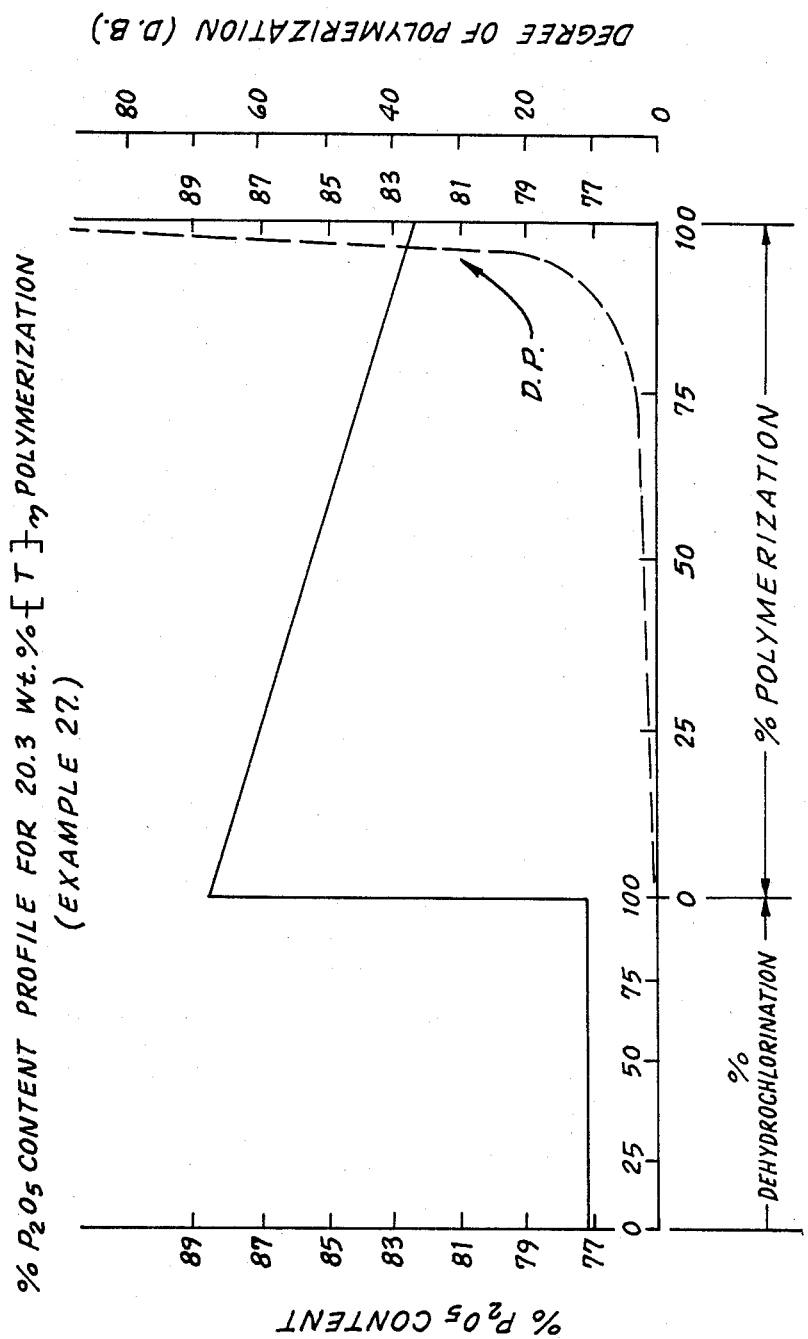
Figure 13:
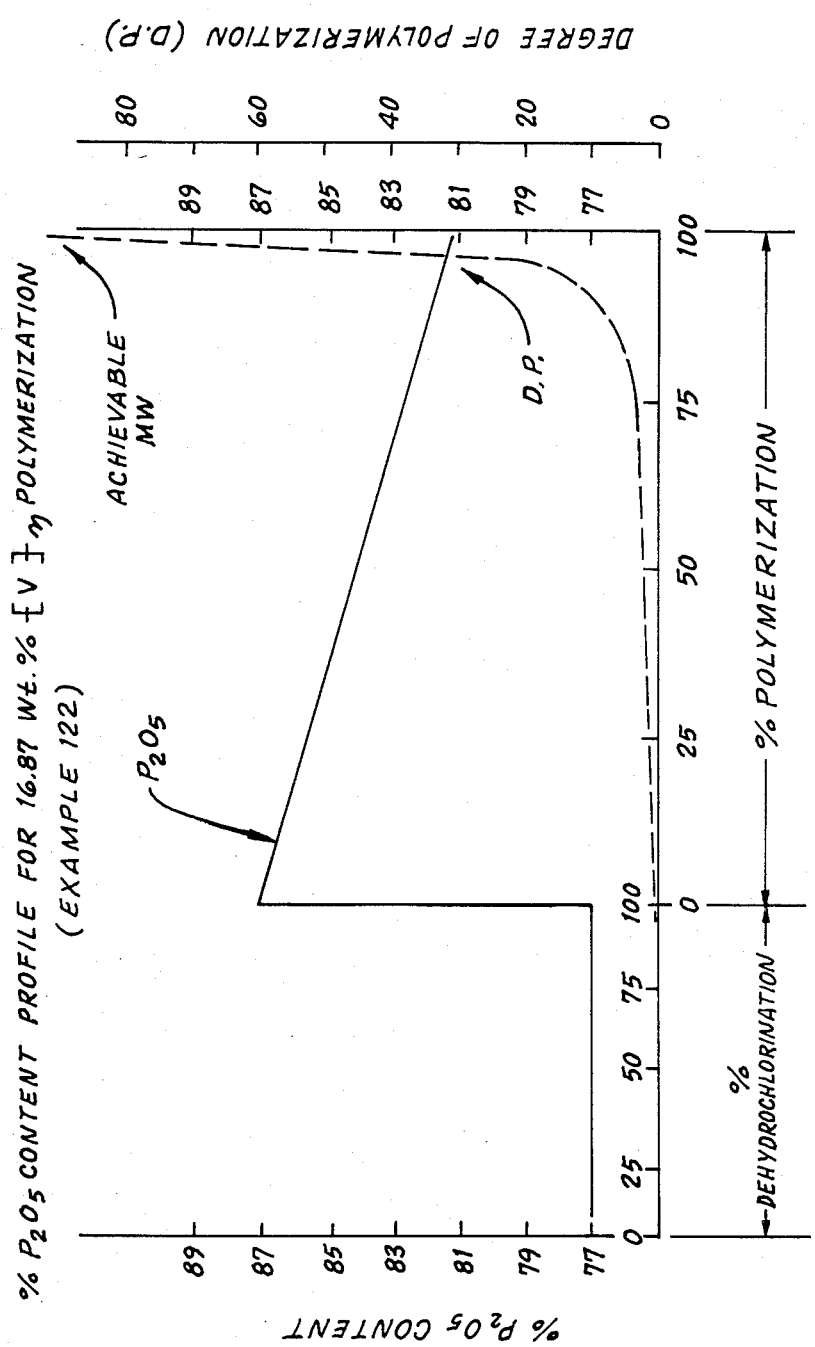

FIG. 2a. graphically illustrates the weight stability by TGA of block copolymers AI—AN″ (Example 74) and AI—AG″ (Example 73) with temperature in air at a heating rate of 5° C. per minute;

FIG. 3. graphically illustrates the weight stability by TGA of polymers $-\text{[T]}_n$ (Example 27) and $-\text{[V]}_n$ (Example 120) with temperature in helium at a heating rate of 5° C. per minute;

FIG. 4. graphically illustrates the weight stability by TGA of polymers $-\text{[BI]}_n$ (Example 13) and $-\text{[AI]}_n$ (Example 12) with temperature in helium at a heating rate of 5° C. per minute;

FIG. 5. graphically illustrates the weight stability by TGA of polymers $-\text{[T]}_n$ (Example 27) and $-\text{[V]}_n$ (Example 120) with temperature in air at a heating rate of 5° C. per minute;

FIG. 6. graphically illustrates the weight stability by TGA of polymers $-\text{[BI]}_n$ (Example 13) and $-\text{[AI]}_n$ (Example 12) with temperature in air at a heating rate of 5° C. per minute;

FIG. 7. graphically illustrates the relationship of amount of useable PPA and % $P_2O_5$ content required to achieve f of 0.822 for selected polymer concentrations $P_c$ (plot of equation a*) showing a region (shaded dash area) of poor solubility for monomer 1a;

FIG. 8. graphically illustrates the % P₂O₅ content profile for a 14.8 wt % $-\!\!\!\{AI\}_n\!\!\!-$ polymerization (Example 2) showing the limits of achievable molecular weight when starting with a high P₂O₅ content preliminary solvent;

FIG. 9. graphically illustrates the % P₂O₅ content profile for a 8.6 wt % $-\!\!\!\{T\}_n\!\!\!-$ polymerization (Example 3) showing the limits of achievable degree of polymerization when starting with a high P₂O₅ content preliminary solvent;

FIG. 10. graphically illustrates a typical % P₂O₅ content profile for a 14.5 wt % $-\!\!\!\{AI\}_n\!\!\!-$ polymerization (Example 12) showing the advantages of the invention when starting with a low P₂O₅ content preliminary solvent followed by an increase of P₂O₅ content at the start of polymerization;

FIG. 11. graphically illustrates a typical % P₂O₅ content profile for a 13.0 wt % $-\!\!\!\{BI\}_n\!\!\!-$ polymerization (Example 13) showing the advantages of the invention when starting with a low P₂O₅ content preliminary solvent and step-wise addition of P₂O₅ followed by an increase of P₂O₅ content at the start of polymerization;

FIG. 12. graphically illustrates a typical % P₂O₅ content profile for a 20.3 wt % $-\!\!\!\{T\}_n\!\!\!-$ polymerization (Example 27) showing the advantages of the invention when starting with a low P₂O₅ content preliminary solvent followed by an increase of P₂O₅ content at the start of polymerization;

FIG. 13. graphically illustrates a typical % P₂O₅ content profile for a 16.87 wt % $-\!\!\!\{V\}_n\!\!\!-$ polymerization (Example 122) showing the advantages of the invention when starting with a low P₂O₅ content preliminary solvent followed by an increase of P₂O₅ content at the start of polymerization;

FIG. 14. is a % P₂O₅ profile diagram giving the profile area bounded at ABCDEFGHI of % P₂O₅ for achieving the advantages of this invention.

3. Mode(s) for Carrying Out the Invention

The extended chain polymers of the compositions of the present invention are a class of polymers that can obtain a substantial degree of shape anisotropy in the liquid state due to restricted rotation of bonds in the polymer backbone and/or appropriate catenation geometry of rigid backbone segments. The degree of shape anisotropy is generally defined by the axial ratio, $\rho/d$, where $\rho$ is the persistence length of the chain and $d$ is the diameter of the chain. For extended chain polymers, $\rho$ may be substantially the same as or greater than the contour length l of the polymer. In the case of a rigid rod polymer, $\rho$ is essentially infinite and the axial ratio is $l/d$.

By the method of the present invention, it is possible to prepare liquid crystalline compositions of extended chain homopolymers, copolymers, or block polymers containing 15 percent or more of polymer. As will appear, the invention is applicable to the preparation of liquid crystalline extended chain polymer compositions of lower polymer concentration but there are special advantages to preparing compositions of high concentration.

Extended chain polymer-polyphosphoric acid compositions of such higher polymer concentration are advantageous. For example, if the polymer is one, such as polybenzobisthiazole, polybenzobisoxazole, and polybenzobisimidazole, capable of forming liquid crystalline compositions at low concentration (e.g., 5–10%), that is, if the critical concentration necessary for formation of the anisotropic phase is low, compositions of even higher polymer concentration can be spun to produce a better quality, higher strength fiber. We believe this results, in part at least, from a more fully anisotropic composition and improved composition integrity. These improvements allow greater drawing in the airgap, improve the coagulation characteristics, which leads to fewer flaws, and increase polymer throughput when a liquid crystalline composition is spun by a dry-jet-wet spinning technique into a polyphosphoric acid-solvent/polymer-nonsolvent such as methanol, water, or dilute aqueous acid(s).

If the polymer is one, such as poly (2,6-benzothiazole) that is less rodlike in structure than polybenzobisthiazole or polybenzobisoxazole and thus possesses a critical concentration for anisotropic phase formation greater than 10% and in the region of concentrations of this invention, extruding of these heretofore unattainable solutions produces a dramatic increase in strength and modulus because of the ordering of the polymer during this fabrication.

These advantages result in a more highly ordered, lower-defect fiber than results from spinning a less concentrated composition of polymers.

Another advantage of preparation of these polymers in the anisotropic phase is a considerable increase in the molecular weight of the polymer obtained.

Preliminarily it is helpful to describe the chemistry of phosphoric acids and strong phosphoric acids or polyphosphoric acids as follows:

As used herein the term "phosphoric acid(s)" means commercial phosphoric acid(s) containing 85–86% H₃PO₄.

The strong phosphoric acids, or polyphosphoric acids referred to as ppa (polyphosphoric acid) are members of a continuous series of amorphous condensed phosphoric acid mixtures given by the formula

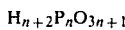

or

where the value of n depends on the molar ratio of water to phosphorus pentoxide present.

Characterization and methods of forming various polyphosphoric acids and examples of such strong acids useful in accordance with the practice of the present invention can be found in the following papers: A. L. Huhti and P. A. Gartaganis "The Composition of the Strong Phosphoric Acids," Can. J. Chem., Vol. 34, 1956 pp. 785–797; and J. E. Such, "Linear Polyphosphoric Acids", Mellar's Comprehensive Treatise on Inorganic and Theoretical Chemistry, Vol. VIII, Supplement III, pp. 726–753, Wiley 1971. The subject matter of these articles are specifically incorporated herein by reference.

In its most general definition, polyphosphoric acid composition can range from distributions where the average value of n is less than unity, giving rise to a mobile liquid, to high values of n, where the polyphosphoric acid is a glass at normal temperatures. Because the species of polyphosphoric acid are in a mobile equilibrium, a given equilibrium composition can be prepared in many ways. For instance, the same distribution or polyphosphoric acid composition could be prepared by either starting with concentrated orthophosphoric acid ($H_3PO_4$, n=1) and driving off water or by starting with phosphorus pentoxide ($P_2O_5$) and adding an appropriate amount of water.

All polyphosphoric acid compositions can be described as a ratio of $P_2O_5$ and water by reducing the various species present (on paper) to $P_2O_5$ and water. We will then use the convention that polyphosphoric acid composition will be expressed in terms of a $P_2O_5$ content (as a percentage) defined as $P_2O_5$ content $$= \frac{\text{weight of } P_2O_5}{\text{Weight of } P_2O_5 + \text{weight of } H_2O} \times 100.$$

Thus, the $P_2O_5$ content of pure orthophosphoric acid could be derived by reducing one mole of $H_3PO_4$ to 0.5 moles $P_2O_5$ +1.5 moles $H_2O$. Converting to weights gives the $P_2O_5$ content as $$\frac{0.5(142)}{0.5(142) + 1.5(18.01)} \times 100 = 72.4\%.$$

Similarly, the $P_2O_5$ content of commercial polyphosphoric acid can be derived in the following way. Polyphosphoric acid is available commercially in two grades, 105% and 115%. These percentages refer to $H_3PO_4$ content, which means that 100 g of the two grades contain 105 and 115 grams of $H_3PO_4$. The $P_2O_5$ content of 115% polyphosphoric acid can then be calculated knowing the $P_2O_5$ content of 100% $H_3PO_4$.

$$\frac{115(0.724)}{100} \times 100 = 83.3\%$$

Freshly prepared polyphosphoric acid as described by Wolfe and Loo U.S. Pat. 4,225,700 employed 1.52×g of $P_2O_5$ to X grams of 85.6% $H_3PO_4$, thus the $P_2O_5$ content of that mixture is $$\frac{(1.52X) + (0.856)(0.724)X}{2.52X} \times 100 = 84.9\%.$$

Thus, polyphosphoric acid compositions, by our definition, equivalent to these three examples could be prepared in principle by starting with $P_2O_5$ and adding 27.6, 16.7, and 15.1% by weight of water.

Homopolymeric Compositions and their preparation

In accordance with one aspect of the invention, there is provided a liquid-crystalline composition useful in the preparation of fibers and films comprising a polycondensation product consisting essentially of a blend of certain polyphosphoric acids and a high concentration of at least one high molecular weight extended chain homopolymer having the general formulas:

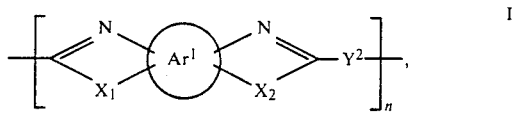

wherein $Ar^1$ represents an aromatic moiety and is XX as defined below, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or represents a bivalent organic radical and is XXI as defined below, n being a positive integer;

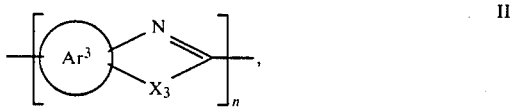

wherein $Ar^3$ represents an aromatic moiety and is XXII as defined below, $X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, n being a positive integer;

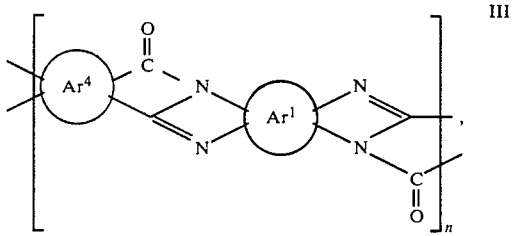

wherein $Ar^1$ represents an aromatic moiety and is XX as defined below, and $Ar^4$ represents an aromatic moiety and is XXIII as defined below, the nitrogen atoms being bonded to aromatic carbon atoms of $Ar^1$ and the carbon atoms being bonded to aromatic carbon atoms of $Ar^4$, n being a positive integer;

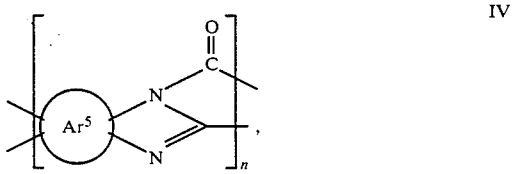

wherein $Ar^5$ represents an aromatic moiety and is XXIV as defined below, the nitrogen atoms being bonded to $Ar^5$, n being a positive integer;

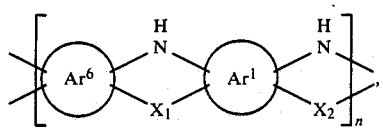 V wherein Ar⁶ represents an aromatic moiety and is XXV as defined below, Ar¹ represents a different aromatic moiety and is XX as defined below, $X_1$ and $X_2$ are the same or different and are sulfur, oxygen, or NR (R being hydrogen or an organic group), the NH groups and $X_1$ and $X_2$ being bonded to aromatic carbon atoms of Ar⁶ and Ar¹, NH and $X_1$ or $X_2$ of each hetero ring are disposed ortho to one another, n being a positive integer;

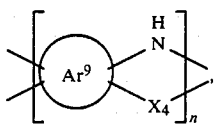 VI wherein Ar⁹ represents an aromatic moiety and is XXVI as defined below, $X_4$ is sulfur, oxygen, or NR (R being hydrogen or an organic group), the NH groups and $X_4$ being bonded to aromatic carbon atoms of Ar⁹, n being a positive integer;

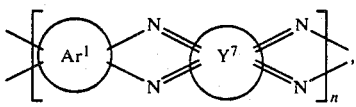 VII wherein Ar¹ represents an aromatic moiety and is XXVII as defined below, Y⁷ represents an aromatic moiety and is XXVIII as defined below, the nitrogen atoms being bonded to aromatic carbon atoms of Ar¹ and bonded to adjacent carbon atoms of Y⁷, n being a positive integer;

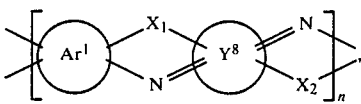 VIII wherein Ar¹ represents an aromtic moiety and is XX as defined below, Y⁸ is XXIX as defined below, $X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹ and adjacent carbon atoms of Y⁸, N and $X_1$ or $X_2$ of each hetero ring are disposed ortho to one another, n being a positive integer.

The aromatic moieties Ar¹, Ar³, Ar⁴, Ar⁵, Ar⁶, Ar⁹, and Y², Y⁷, and Y⁸ of the extended chain polymer formulas above are defined as follows:

XX is 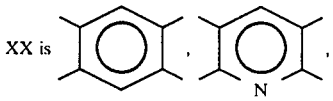

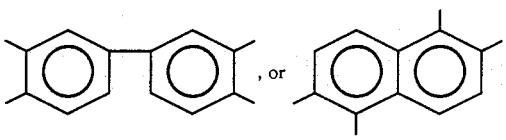, or

XXI is 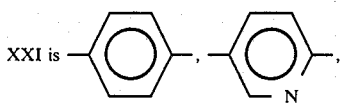

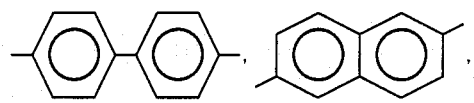,

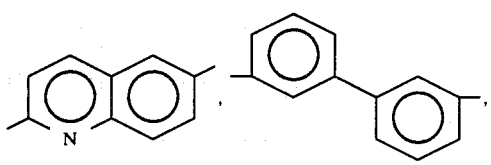,

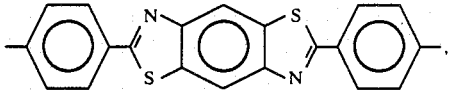,

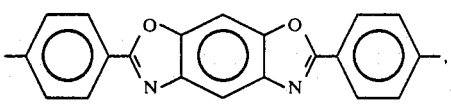,

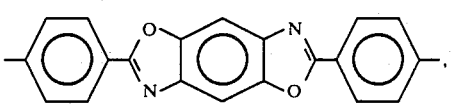,

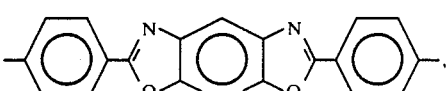,

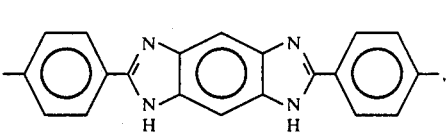,

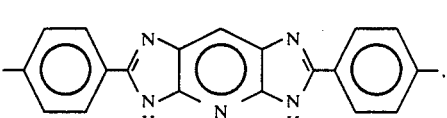,

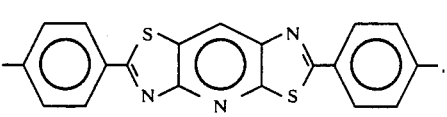,

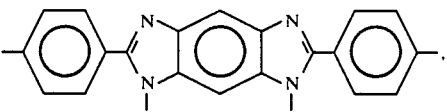,

-continued
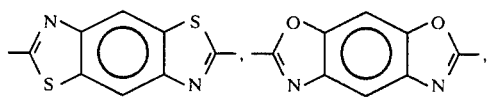
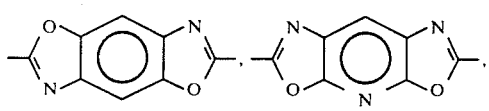
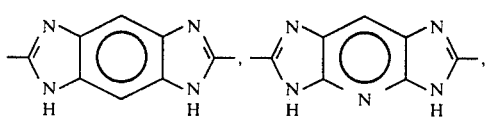
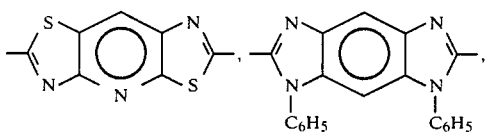
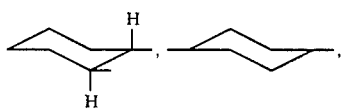
XXII is 
XXIII is 
XXIV is ;
XXV is 
XXVI is ;
-continued
XXVII is ,
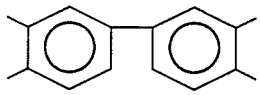;
XXVIII is 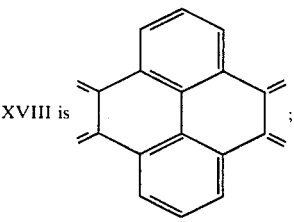;
XXIX is 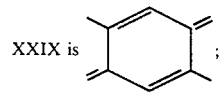;
XXX is ,
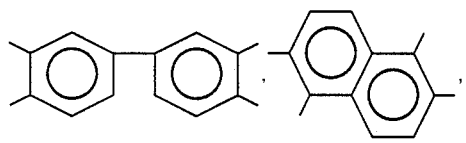,
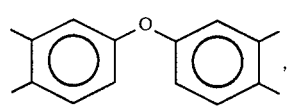,
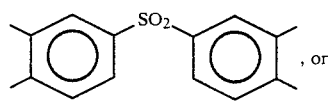, or
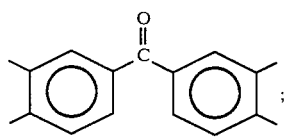;
XXXI is ,
,
, ,

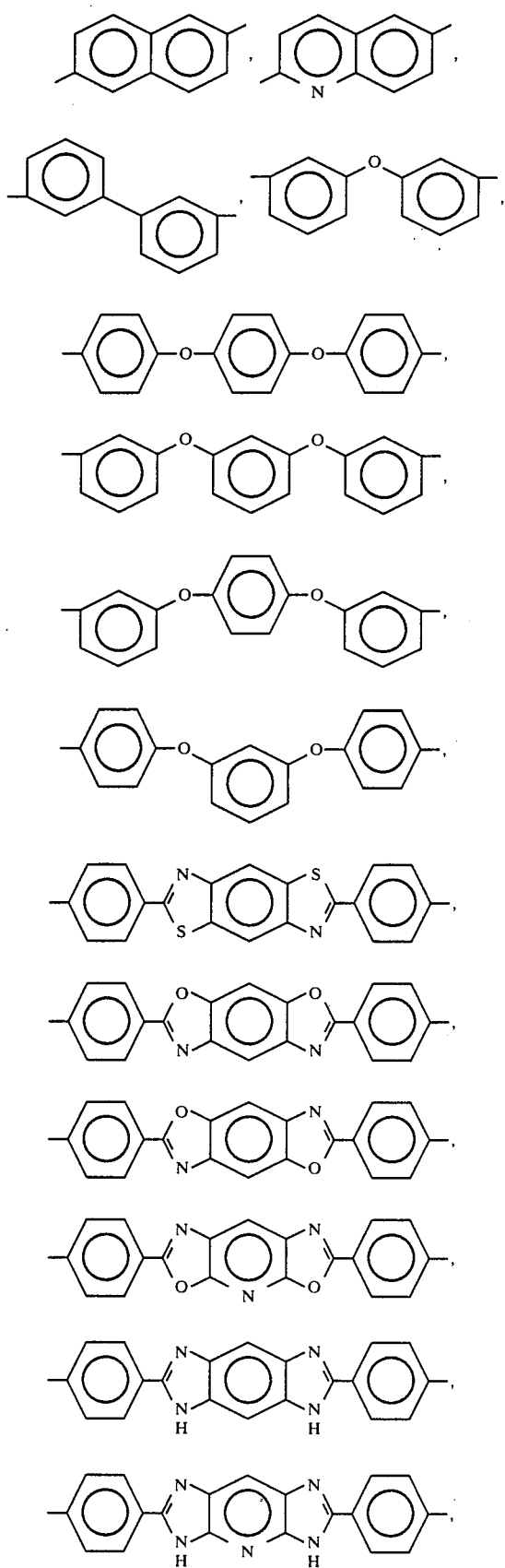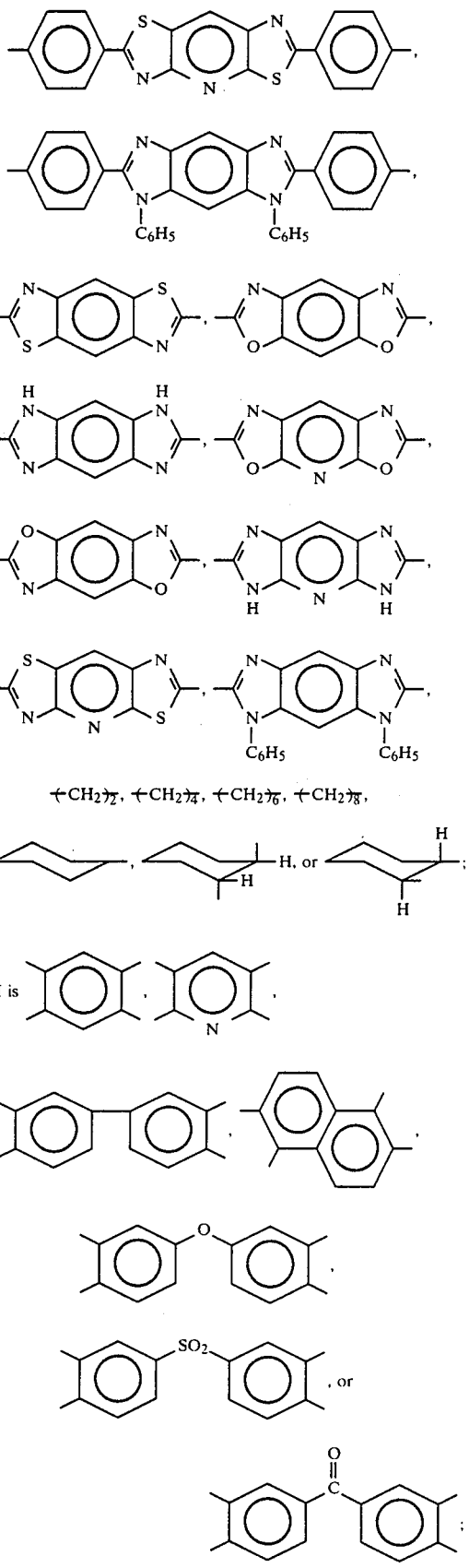

Any monomeric material or mixture of monomeric materials having the ability to react in polyphosphoric acid to form the extended chain polymers (i.e., the above formulas I-VIII homopolymers, and the various formulas IX-XIX copolymers and block polymers herein defined in the specification) of this invention can be utilized.

In general, suitable monomeric materials selected for use in forming liquid-crystalline extended chain polymer compositions of the present invention are of nine types as described below. Type 1, 2, 4, 6, 7, and 8 are homo-bifunctional monomers. Type 3, 5, and 9 are hetero-bifunctional monomers.

Type 1 monomers have the general formula

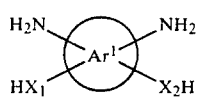   1 wherein $Ar^1$ is an aromatic moiety; $X_1$ and $X_2$ are the same or different atoms or groups selected from the class O, S, and NR; R is hydrogen or an organic group attached to N; the R's on the two nitrogen atoms where both $X_1$ and $X_2$ are NR may be the same or different; $NH_2$, $X_1H$ and $X_2H$ are bonded to aromatic carbon atoms of $Ar^1$; the groups on the left side of $Ar^1$ are ortho with respect to one another and the groups on the right side of $Ar^1$ are ortho with respect to one another.

The two sets of $NH_2$ and XH are positioned on $Ar^1$ such that they do not both interact partially with the appropriate condensing moiety of another monomer. Monomer 1 is typically isolated as a hydrohalide salt of the monomer.

In general, $Ar^1$ may be any aromatic moiety (carbocyclic or heterocyclic) and it may be a single ring such as

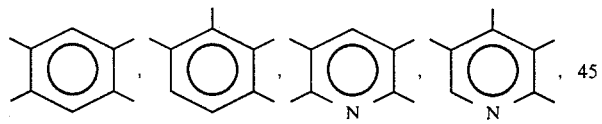

or it may comprise a plurality of aromatic rings connected by valence bonds or by linking atoms or groups such as

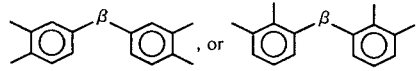

where $\beta$ is a valence bond (as in diphenyl) or a divalent atom (—O— or —S—) or group such as —NR—(R=H or an organic group), —$(CH_2)_n$— (n=1 or a higher integer). Specific examples of $Ar^1$ are as follows:

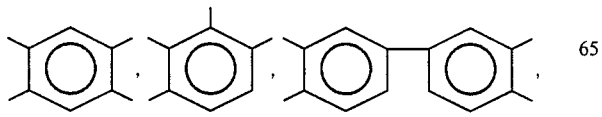

-continued

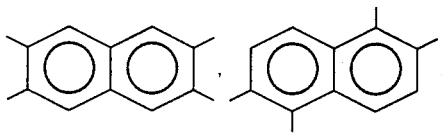

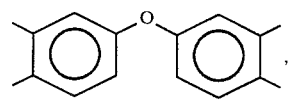

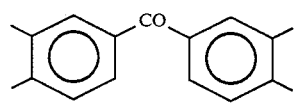

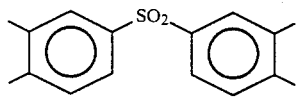

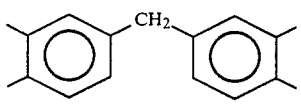

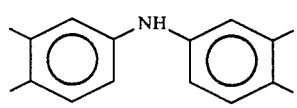

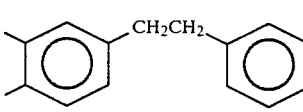

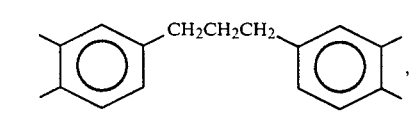

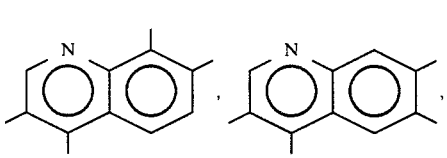

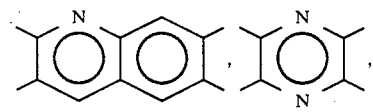

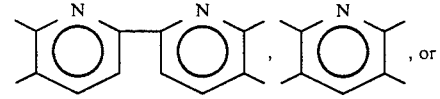, or

-continued

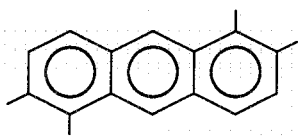

The aromatic ring or rings of $Ar^1$, such as those described above and others, may bear one or more substituent. These substituents, which may be organic or inorganic may be or may contain hetero atoms, may be any atom or group which is compatible with the reactant, the solvent, the polycondensation reaction and the resulting oligomer or polymer. Substituents which are chemically reactive with types 2 thru 9 monomers (see below), with the solvent (PPA) or with the oligomeric or polymeric products are to be avoided. Also, substituents which offer steric hindrance to the polycondensation are to be avoided.

Among permissible hydrocarbon substituents are alkyl (e.g., $C_1$ to $C_{10}$ straight chain and branched chain alkyl, benzyl, etc.), phenyl chloro substituted alkyl, phenyl and benzyl. Among permissible hetero substituents are chloro, bromo, nitro, alkoxy, aryloxy, $SO_3H$, and —OR, SR, and —$NR_1R_2$ ($R_1$ and $R_2$ being organic groups).

Formula 1 monomers useful in preparing the extended chain polymers and novel liquid-crystalline compositions of the instant invention may also further be classified into three groups: Class 1 (1,1), Class 2 (1,2), and Class 3 (1,3). The first number of the number pairs denotes the monomer type and the second number of the pairs denotes the monomer class.

The preferred (1,1) monomers are those wherein $Ar^1$ is a six-membered aromatic ring with the four valence positions being on carbon atoms having a 1, 2, 4, 5 relationship to each other, such as 1, 2, 4, 5-benzene or 2, 3, 5, 6-pyridine; R is H or a monovalent aromatic radical, such as phenyl, or a monovalent heteroaromatic radical, such as 2-pyridyl, or a monovalent aliphatic radical, such as methyl. Monomers (1,1) which when reacted with a diacid or a diacid derivative give two substantially collinear bonds are most preferred.

Specific examples of (1,1) monomers preferred for use in the invention include those monomers (shown as hydrohalides) in Table 1 below.

TABLE 1

Monomers of Type 1, Class 1

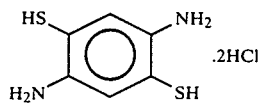

1a
2,5-diamino-1,4-benzenedithiol dihydrochloride
obtained according to Wolfe, et. al.,
Macromolecules, Vol. 14, Page 915 (1981).

TABLE 1-continued

Monomers of Type 1, Class 1

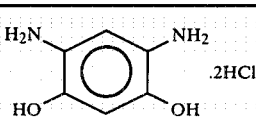

1b
4,6-diamino-1,3-benzenediol dihydrochloride
obtained from 4,6-dinitro-1,3-benzenediol
according to Wolfe, et al., Macromolecules, Vol.
14, Page 909 (1981).

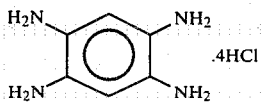

1c
1,2,4,5-tetraaminobenzene tetrahydrochloride
obtained from Aldrich Chemical Co. and purified
by recrystallization from dilute HCl by heating,
adding charcoal, filtering, and adding
concentrated HCl.

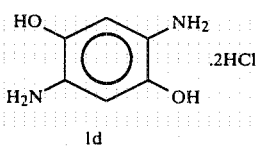

1d
2,5-diamino-1,4-benzenediol dihydrochloride
prepared according to Wolf, et. al., J. Polymer
Sci., Part A-1, Vol. 6, page 1503 (1968).

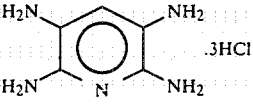

1e
2,3,5,6-tetraaminopyridine trihydrochloride
prepared by the dinitration of 2,6-diamino
pyridine, followed by hydrolysis and reduction by
the method of A. H. Gerber, J. Polymer Sci.,
Polymer Chemistry Ed., Vol. 11, page 1703(1973).

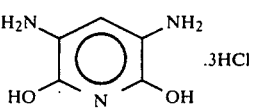

1f
3,5-diamino-2,6-pyridinediol trihydrochloride
prepared by dinitration of 2,6-dimethoxy pyridine
according to C. D. Johnson, et al., J. Chem. Soc.
(B), 1967, page 1204, followed by reduction and
dealkylation.

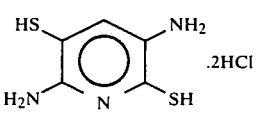

1g
3,6-diamino-2,5-pyridinedithiol dihydrochloride
prepared from commercially available 2,5-
diamino-pyridine by methods analogous to the
preparation of 1a.

TABLE 1-continued

Monomers of Type 1, Class 1

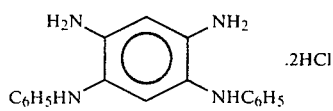

1h
N¹,N⁵—diphenyl-1,2,4,5-tetraaminobenzene dihydrochloride
prepared starting from m-dichlorobenzene
according to H. Vogel and C. S. Marvel, J.
Polym. Sci., A, Vol. 1, page 1531 (1963) and
purified from toluene before use.

The preferred (1.2) monomers are those wherein $Ar^1$ is two six-membered aromatic rings attached by a covalent carbon-carbon bond each with valences on carbon atoms in the 3 to 4 positions, such as 3,3',4,4'-biphenyl or 4,4', 5,5'-(2,2'-bipyridyl), or $Ar^1$ is two fused six-membered rings with valence positions being on carbon atoms and having a 1,2,5,6 relationship to each other, such as 1,2,5,6-naphthalene.

The four functional groups attached to the valence positions of $Ar^1$ by covalent bonds comprise two amino groups and the groups —$X_1H$ and —$X_2H$ such that one amino group is ortho to —$X_1H$ and the other amino group is ortho to —$X_2H$ and $X_1H$ is attached to either the 3 or 4 position in the first case or the 1 or 2 position in the second case and —$X_2H$ is attached to either the 3' or 4' position in the first case and the 5 or 6 position in the second case. $X_1$ and $X_2$ are defined as above.

Specific examples of (1,2) monomers preferred for use in the invention include those monomers (shown as hydrohalides) in Table 2 below.

TABLE 2

Monomers of Type 1, Class 2

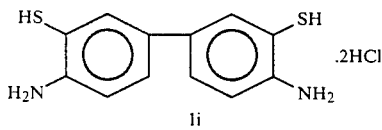

1i
3,3'-dimercaptobenzidine dihydrochloride
prepared by the method of Houben-Weyl, Methoden
der Organischen Chemie, E. Miller, Ed., Vol IX, page 39 (1955).

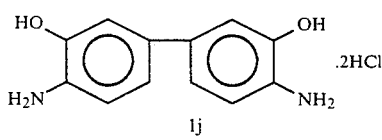

1j
3,3'-dihydroxybenzidine dihydrochloride
prepared by the method of C. G. Vogt and F.
Marschall, U.S. Pat. No. 2,497,248 (1950) from
o-dianisidine and aluminum chloride.

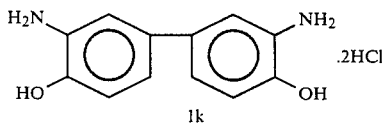

1k
3,3'-diamino-4,4'-dihydroxybiphenyl dihydrochloride
prepared by the method of Y. Imai, I. Taoka, K.
Uno, and Y. Iwakura, Makromol. Chem, 83, page 167 (1965).

TABLE 2-continued

Monomers of Type 1, Class 2

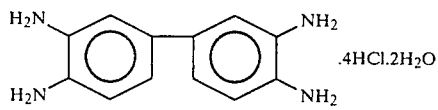

1l
3,3'-diaminobenzidine tetrahydrochloride dihydrate
prepared according to (same ref. as for 1h) and
the tetrahydrochloride recrystallized from dilute
HCl containing stannous chloride by adding
concentrated HCl.

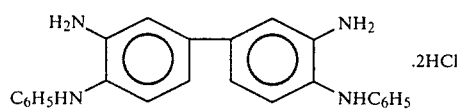

1m
3,3'-diamino-4,4'-dianilinobiphenyl dihydrochloride
prepared from dinitration of 4,4'-
dichlorobiphenyl, displacement of the chloro
groups by aniline, and reduction.

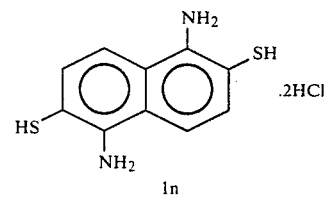

1n
1,5-diamino-2,6-naphthalenedithiol dihydrochloride
by methods analogous to Monomers 1a and 1i.

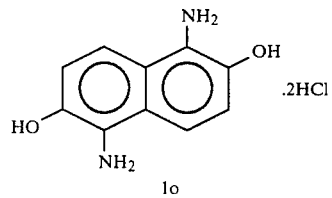

1o
1,5-diamino-2,6-naphthalenediol dihydrochloride
prepared from 2,6-dichloro-1,5-dinitro-naphthalene.

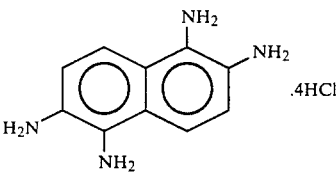

1p
1,2,5,6-tetraminonaphthalene tetrahydrochloride
prepared by the amination of 2,6-dichloro-1,5-
dinitro-naphthalene followed by catalytic
reduction according to K. Imai, N. Kurihara, L.
Mathias, J. Wittmann, W. B. Alston, and J. K.
Stille, Macromolecules, 6, 158 (1973).

The preferred (1,3) monomers are those wherein $Ar^1$ is any aromatic moiety with two sets of ortho-valences at carbon atoms, such as

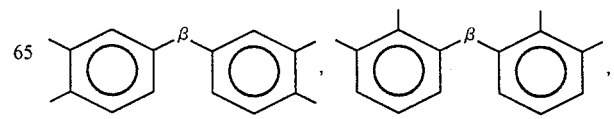

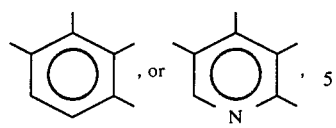, 5 wherein β is a bivalent aromatic or heteroaromatic moiety, O, S, SO₂, C=O, —CH₂CH₂—, etc.

The four functional groups attached to the valence positions of Ar¹ are divided into two sets (NH₂ and X₁H) and (NH₂ and X₂H) with the functional groups within each set being positioned ortho to each other and the two sets positioned on Ar¹ such that they cannot simultaneously react with the same functional group of another monomer. X₁ and X₂ are defined as above.

Specific examples of (1,3) monomers preferred for use in the invention include those monomers (shown as hydrohalides or as monomers) in Table 3 below.

TABLE 3
Monomers of Type 1, Class 3

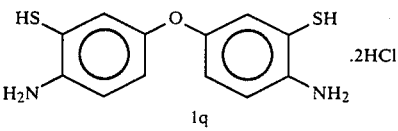

1q
3,3'-dimercapto-4,4'-diaminodiphenyl ether dihydrochloride prepared according to the method of V. V. Korshak, E. S. Krongauz, A. P. Travnikova, A. L. Rasanov, and A. D. Katsarava, Dokl, Akad. Nauk. SSSR, 196, 106 (1971).

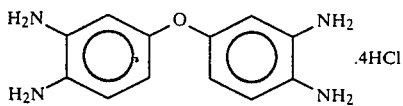

1r
3,3',4,4'-tetraaminodiphenyl ether tetrahydrochloride obtained commercially from Pfaltz & Bauer.

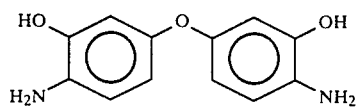

1s
3,3'-dihydroxy-4,4'-diaminodiphenyl ether is prepared according to the method of S. U. Kantor and J. Sonnenberg, U.S. Pat. No. 3,306,876 (1967).

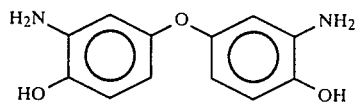

1t
3,3'-diamino-4,4'-dihydroxydiphenyl ether prepared according to the method of A. S. Lindsey, S. E. Hunt, and G. K. L. Gibson, U.K. Patent No. 1,181,531 (1970).

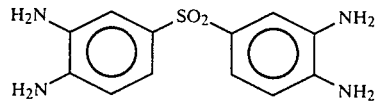

1u
3,3',4,4'-tetraaminodiphenyl sulfone prepared from commercially available 4,4'-diaminodiphenyl sulfone by acetylation, dinitration, hydrolysis, and reduction.

TABLE 3-continued
Monomers of Type 1, Class 3

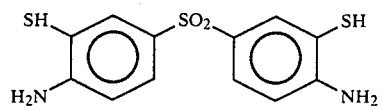

1v
3,3'-dimercapto-4,4'-diaminodiphenyl sulfone prepared from commercially available 4,4'-diaminodiphenyl sulfone by methods analogous to the preparation of 1a and 1i.

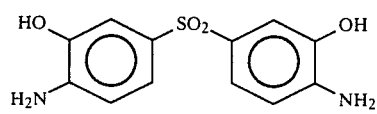

1w
3,3'-dihydroxy-4,4'-diaminodiphenyl sulfone prepared according to the method of G. I. Braz. I. Y. Kardash, and V. S. Yakubovich, Polym. Sci. USSR., 8, page 2013 (1967).

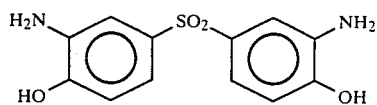

1x
3,3'-diamino-4,4'-dihydroxydiphenyl sulfone prepared from commercially available 4,4'-dihydroxydiphenyl sulfone by acetylation, dinitration, hydrolysis and reduction.

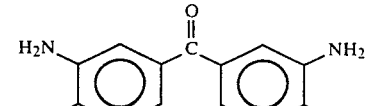

1y
3,3',4,4'-tetraaminobenzophenone available commercially from Polysciences, Inc.

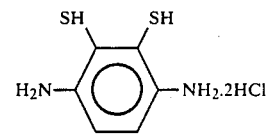

1z
3,6-diamino-1,2-benzenedithiol dihydrochloride prepared by isolation of 2,7-diaminobenzo[1,2-d;6,5-d']bisthiazole from the scheme to prepare 1a followed by hydrolysis.

Type 2 monomers has the general formula $$Z_1-Y^2-Z_2 \qquad 2$$

wherein $Y^2$ is a bivalent organic group and $Z_1$ and $Z_2$ are electron-deficient carbon groups and may be the same or different groups selected from the following class:

| | | | |
|---|---|---|---|
| —COOH | —CSSH | —COBr | —CSI |
| —CSOH | —COCl | —CSBr | —CONHR₁ |
| —COSH | —CSCl | —COI | —CSNHR₁ |
| | | | —CN |

($R_1 =$ H or an organic group bonded to N by a carbon atom)

The only requirement of $Z_1$ and $Z_2$ is that they react with the X₁H and X₂H and with the two hydrogen atoms of the primary amino groups of Type 1 monomers to form suitable leaving entities, such as water, hydrogen sulfide, hydrogen halide, ammonia, etc.

The bivalent group $Y^2$ may be an aromatic group, an acyclic aliphatic group, or a cycloaliphatic group, and such groups may be substituted by hydrocarbon groups (aliphatic or aromatic) and by hetero atoms and groups. In general any of groups described above as substituents of the aromatic ring or rings of $Ar^1$ may be used subject to the same restrictions.

Formula 2 monomers useful in preparing the extended chain polymers and novel liquid-crystalline compositions of the instant invention may also further be classified into three groups: Class 1 (2,1), Class 2 (2,2), and Class 3 (2,3). The first number of the number pairs denotes the monomer type and the second number of the pairs denotes the monomer class.

The preferred (2,1) monomers are those wherein $Y^2$ is nil, or $Y^2$ comprise at least two carbon atoms to which are attached $Z_1$ and $Z_2$ such that the two exocyclic bonds between $Y^2$ and $Z_1$ and between $Y^2$ and $Z_2$ have a rigid and fixed relationship to each other and are substantially collinear, or $Y^2$ may also be a cycloaliphatic group that has at least two carbon atoms to which are attached $Z_1$ and $Z_2$ such that the two bonds between $Y^2$ and $Z_1$ and between $Y^2$ and $Z_2$ have a highly preferred relationship to each other that is substantially collinear. Carboxylic acid derivatives of 2j-2q and 2z (as herein described below) such as COOH that decarboxylate at temperatures below that required for polycondensation with Type 1 monomers are less preferred.

Specific examples of (2,1) monomers preferred for use in the invention include those monomers in Table 4 below.

TABLE 4
Monomers of Type 2, Class 1

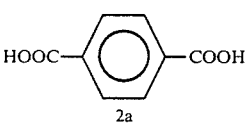

2a
terephthalic acid
obtained from Amoco Chemicals Co. and micronized and dried before use.

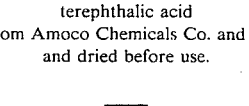

2b
terephthaloyl chloride
obtained from Aldrich and sublimed immediately before use.

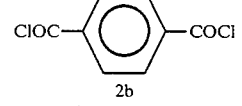

2c
1,4-benzenedicarboxamide
prepared from 2b or obtained commercially from Pfaltz and Bauer.

TABLE 4-continued
Monomers of Type 2, Class 1

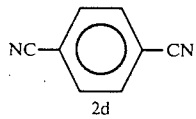

2d
terephthalonitrile
obtained from Pfaltz and Bauer.

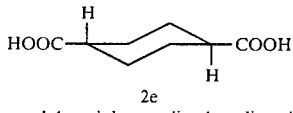

2e
trans-1,4-cyclohexanedicarboxylic acid
obtained from Aldrich and recrystallized from water.

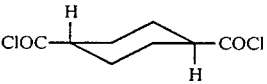

2f
trans-1,4-cyclohexanedicarboxylic acid chloride
prepared from 2e.

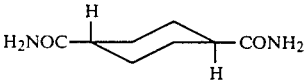

2g
trans-1,4-cyclohexanedicarboxamide
prepared from 2f.

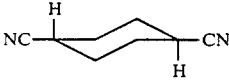

2h
trans-1,4-dicyanocyclohexane
prepared from 2g.

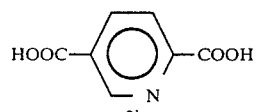

2i
2,5-pyridinedicarboxylic acid
obtained from Aldrich Chemical Co.

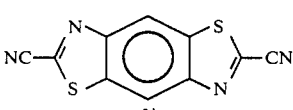

2j
2,6-benzo[1,2-d:4,5-d']bisthiazoledinitrile
prepared by diazotization of 2,6-diaminobenzobisthiazole (see reference for 1a) followed by treatment with cuprous cyanide.

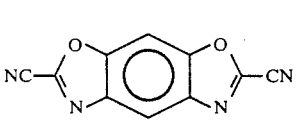

2k
2,6-benzo[1,2,-d:5,4-d']bisoxazoledinitrile
prepared from the condensation of compound 1b with urea followed by diazotization as for compound 2j.

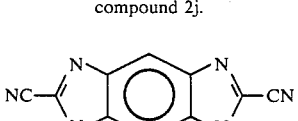

2l
2,6-benzobisimidazoledinitrile

TABLE 4-continued

Monomers of Type 2, Class 1 prepared as for 2k using compound 1c.

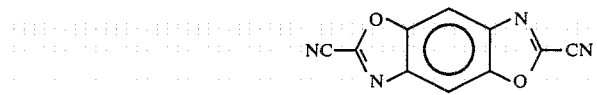

2m
2,6-benzo[1,2-d:4,5-d']bisoxazoledinitrile
prepared as described for 2k using compound 1d.

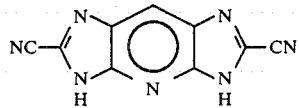

2n
2,6-pyridobisimidazoledinitrile
prepared as for 2k using compound 1e.

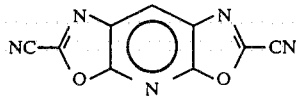

2o
2,6-pyrido[2,3-d:6,5-d']bisoxazoledinitrile
prepared as for 2k using compound 1f.

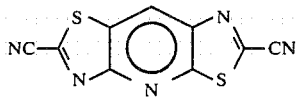

2p
2,6-pyrido[2,3-d:5,6-d']bisthiazoledinitrile
prepared as for 2j, using 2,6-diaminopyridobisthiazole as prepared in the synthesis of 1g.

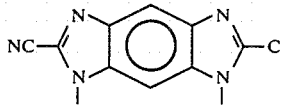

2q
1,7-diphenyl-2,6-benzobisimidazoledinitrile
prepared as for 2k using compound 1h.

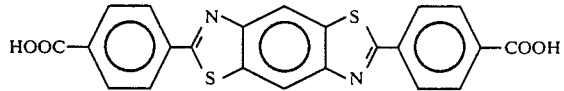

2r
2,6-bis(4-carboxyphenyl)benzo[1,2-d:4,5-d']bisthiazole
prepared by the condensation of compound 1a with p-toluic acid followed by oxidation.

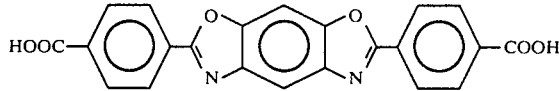

2s
2,6-bis(4-carboxyphenyl)benzo[1,2-d:5,4-d']bisoxazole
prepared by the condensation of 1b with p-toluic acid followed by oxidation.

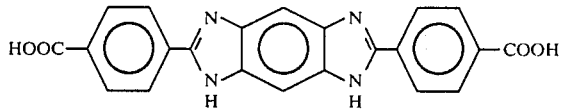

2t
2,6-bis(4-carboxyphenyl)benzobisimidazole
prepared by a method similar to 2s using 1c.

TABLE 4-continued

Monomers of Type 2, Class 1

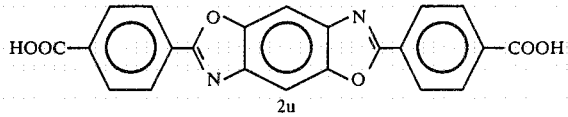

2u
2,6-bis(4-carboxyphenyl)benzo[1,2-d:4,5-d']bisoxazole
prepared by method similar to 2s using 1d.

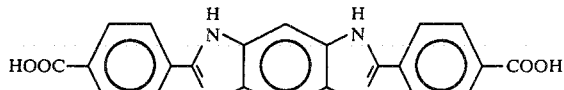

2v
2,6-bis(4-carboxyphenyl)pyridobisimidazole
prepared by a method similar to 2s using 1e.

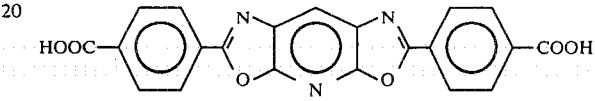

2w
2,6-bis(4-carboxyphenyl)pyrido[2,3-d:6,5-d']bisoxazole
prepared by a method similar to 2s using 1f.

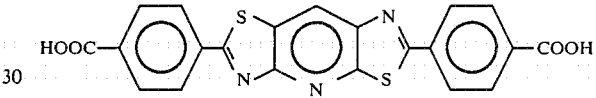

2x
2,6-bis(4-carboxyphenyl)pyrido[2,3-d:5,6-d']bisthiazole
prepared by a method similar to 2s using 1g.

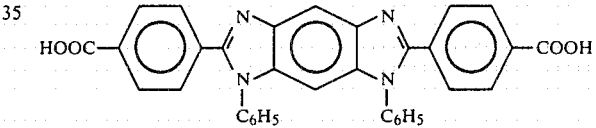

2y
1,7-diphenyl-2,6-bis(4-carboxyphenyl)benzobisimidazole
prepared by a method similar to 2s using 1h.

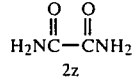

2z
oxamide
obtained from Aldrich Chemical Co.

The preferred (2,2) monomers are those wherein $Y^2$ comprise two six-membered rings attached by a covalent carbon-carbon bond each with valences on the 4-position or each with valences on the 3-position, such as 4,4'-biphenyl or 3,3'-biphenyl, or $Y^2$ comprise two fused six-membered rings with valence positions being on carbon atoms and having a 1,5 relationship to each other, such as 2,6-naphthalene or 2,6-quinoline, or $Y^2$ is a cycloaliphatic divalent moiety with valences on carbon atoms and in a 1,2-trans configuration, or $Y^2$ is a variety of condensed aromatic and heteroaromatic ring systems attached only by carbon-carbon bonds and having 2 valences, $Z_1$ and $Z_2$ are the same as defined above.

Specific examples of (2,2) monomers preferred for use in the invention include those monomers in Table 5 below.

TABLE 5
Monomers of Type 2, Class 2

2aa
4,4'-biphenyldicarboxylic acid
obtained from Aldrich Chemical Co.

2bb
4,4'-biphenyldicarboxylic acid chloride
prepared from 2aa.

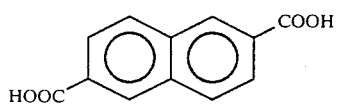

2cc
2,6-naphthalenedicarboxylic acid
prepared according to the method of B. Raecke and
H. Schirp. Org. Syn. Coll. Vol. V. page 813
(1973) from commercially available 1,8-
naphthalenedicarboxylic anhydride.

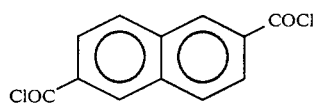

2dd
2,6-naphthalenedicarboxylic acid chloride
prepared from 2cc by treatment with thionyl chloride.

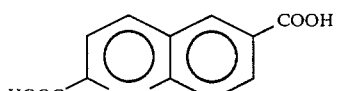

2ee
2,6-quinolinedicarboxylic acid
prepared from commercially available (Aldrich)
2,6-dimethyl quinoline by oxidation.

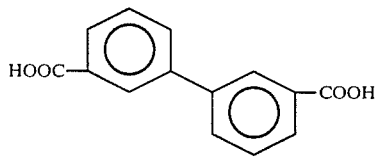

2ff
3,3'-biphenyldicarboxylic acid
prepared from o-nitrobenzoic acid by the method
of M. Kurihara and N. Yoda. J. Macromol. Sci.
Chem A1(6), page 1069 (1967).

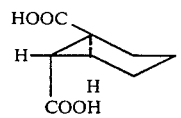

2gg
trans-1,2-cyclohexanedicarboxylic acid
was obtained from Aldrich Chemical Co. and
recrystallized from methanol before use.

TABLE 5-continued
Monomers of Type 2, Class 2

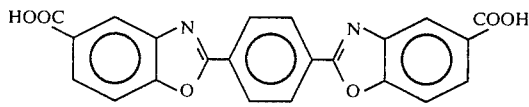

2hh
1,4-bis(5-carboxybenzoxazole-2-yl)benzene
prepared by the method of J. Preston, W. De
Winter and W. L. Hofferbert, J. Heterocyclic
Chem. 5, page 269 (1968).

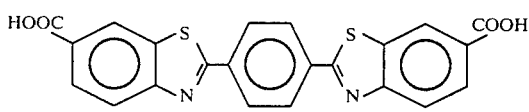

2ii
1,4-bis(6-carboxybenzothiazole)-2-yl)benzene
prepared by methods analogous to 2hh.

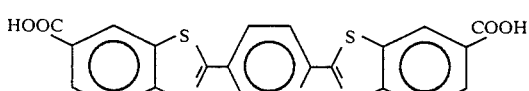

2jj
2,5-bis(6-carboxybenzothiazole-2-yl)pyridine.
prepared by methods analogous to 2hh.

The preferred (2,3) monomers are those wherein $Y^2$ may be any anionic, heteroaromatic and aliphatic divalent species not previously described.

Specific examples of (2,3) monomers preferred for use in the invention include those monomers in Table 6 below.

TABLE 6
Monomers of Type 2, Class 3

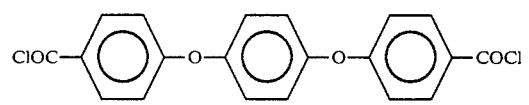

2kk
4,4'(p-phenylenedioxy)dibenzoyl chloride
prepared according to the method of R. C. Evers,
F. E. Arnold, and T. E. Helminiak Macromolecules,
14, page 925 (1981).

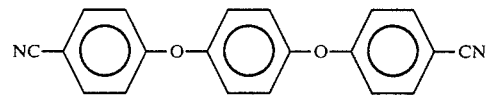

2ll
4,4'(p-phenylenedioxy)dibenzonitrile
prepared according to method of T. Takekoshi, J.
G. Wirth, Dr. Heath, J. E. Kochanowski, J. S.
Manello, and M. J. Weber, Polym. Prepr., J. Am.
Chem. Soc., 20(1), page 179 (1979).

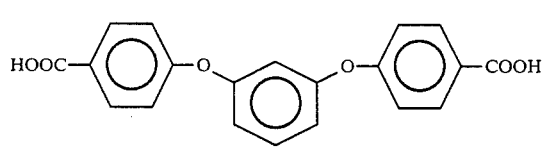

2mm
4,4'-(m-phenylenedioxy)dibenzoic acid
prepared according to method of T. Takekoshi, J.

TABLE 6-continued
Monomers of Type 2, Class 3

G. Wirth, Dr. Heath, J. E. Kochanowski, J. S. Manello, and M. J. Weber, Polym. Prepr., J. Am. Chem. Soc., 20(1), page 179 (1979).

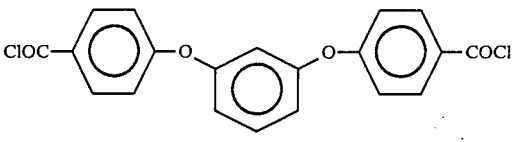

2nn
4,4'-(m-phenylenedioxy)dibenzoyl chloride
from 2mm according to method of R. C. Evers, F. E. Arnold, and T. E. Helminiak, Macromolecules, 14, page 925 (1981).

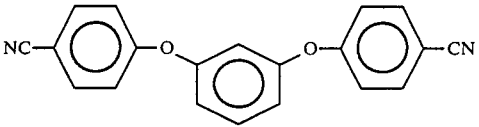

2oo
4,4'-(m-phenylenedioxy)dibenzonitrile
prepared according to the method of R. C. Evers, F. E. Arnold, and T. E. Helminiak Macromolecules, 14, page 925 (1981).

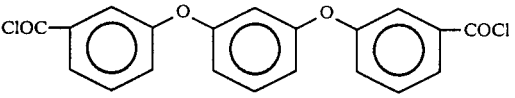

2pp
3,3'-(m-phenylenedioxy)dibenzoyl chloride
according to the method of R. C. Evers, F. E. Arnold, and T. E. Helminiak Maromolecules, 14, page 925 (1981).

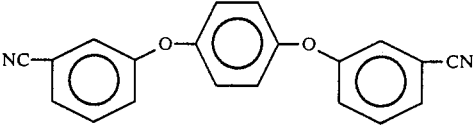

2qq
3,3'-(p-phenylenedioxy)dibenzonitrile
prepared according to the method of R. C. Evers, F. E. Arnold, and T. E. Helminiak Macromolecules, 14, page 925 (1981).

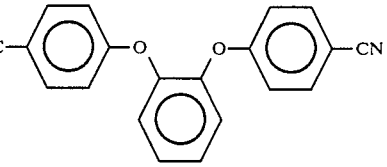

2rr
4,4'-(o-phenylenedioxy)dibenzonitrile
prepared according to the method of R. C. Evers, F. E. Arnold, and T. E. Helminiak Macromolecules, 14, page 925 (1981).

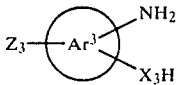

2ss
isophthalic acid obtained from Pfaltz and Bauer and recrystallized from 90% ethanol.

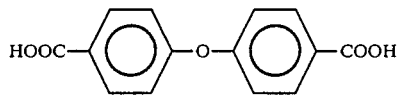

2tt
4,4'-dicarboxydiphenyl ether
obtained from Polysciences, Inc.

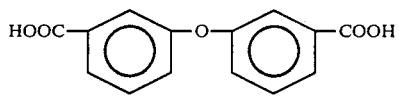

2uu
3,3'-dicarboxydiphenyl ether
prepared from a coupling of m-cresol and m-bromotoluene followed by oxidation by the method of M. Tomita, J. Pharm. Soc., Japan, 57, page 391 (1937).

$HOOC(CH_2)_2COOH$

2vv
succinic acid obtained from Aldrich Chemical Co.

$HOOC(CH_2)_3COOH$

2ww
glutaric acid obtained from Aldrich Chemical Co.

$HOOC(CH_2)_4COOH$

2xx
adipic acid obtained from Aldrich Chemical Co.

$HOOC(CH_2)_5COOH$

2yy
pimelic acid obtained from Aldrich Chemical Co.

$HOOC(CH_2)_8COOH$

2zz
sebacic acid obtained from Aldrich Chemical Co.

Type 3 monomers has the general formula

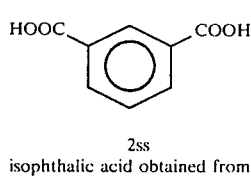

wherein $Ar^3$ is a trivalent aromatic or heteroaromatic moiety, and $X_3$ is O, S, or N-R (R=H or an organic group).

Formula 3 monomers useful in preparing the extended chain polymers and novel liquid-crystalline compositions of the instant invention may also further be classified into two groups: Class 1 (3,1) and Class 2 (3,2). The first number of the number pairs denotes the monomer type and the second number of the pairs denotes the monomer class.

The preferred (3,1) monomers are those wherein $Z_3$ is the same as defined for $Z_1$, $Ar^3$ is a trivalent aromatic or heteroaromatic moiety with the three valence positions being on carbon atoms and having the relationship that the valence bond between $Z_3$ and $Ar^3$ is nearly collinear with the same valence bond in subsequently condensed monomers, and $X_3$ is defined as for $X_1$ in Table 1. $X_3$ and $NH_2$ are positioned ortho to each other on $Ar^3$.

Specific examples of (3,1) monomers preferred for use in the invention include the monomer in Table 7 below.

TABLE 7

Monomers of Type 3, Class 1

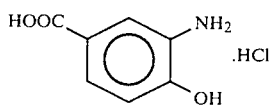

3k
2-(4-carboxyphenyl)-5,6-diaminobenzimidazole
dihydrochloride
prepared according to R. F. Kovar, and F. E. Arnold, J. Polym. Sci. Polym. Chem. Ed., 14, page 2807 (1976).

The preferred (3,2) monomers are those wherein $Z_3$, $Ar^3$, and $X_3$ are defined as above. The bonds that are formed in homopolymerization of (3,2) monomers are defined in their spatial relationship having an angle of catenation of about 150° to about 180°.

Specific examples of (3,2) monomers preferred for use in the invention include those monomers (shown as hydrohalides or as monomers) in Table 8 below.

TABLE 8

Monomers of Type 3, Class 2

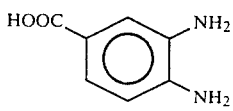

3a
3-mercapto-4-aminobenzoic acid hydrochloride
prepared according to Wolfe, AFOSR Final Technical Report, Dec. 15, 1980.

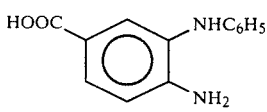

3b
3-mercapto-4-aminobenzoic acid
prepared as described in Example 5.

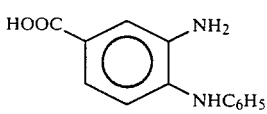

3c
3-hydroxy-4-aminobenzoic acid hydrochloride
prepared as described by Y. Imai, K. Uno, and Y. Iwakura, Makromol. Chem., 83, 179 (1965).

TABLE 8-continued

Monomers of Type 3, Class 2

3d
3-amino-4-hydroxybenzoic acid hydrochloride
prepared as described by K. Auwers and H. Rohrig. Chem. Ber., 30, 992 (1897).

3e
3,4-diaminobenzoic acid
obtained from Aldrich Chemical Co. and recrystallized from deoxygenated water before use.

3f
$N^3$—phenyl-3,4-diaminobenzoic acid
prepared from p-aminobenzoic acid by chlorination, oxidation to 3-chloro-4-nitrobenzoic acid, followed by anilation and reduction.

3g
$N^4$—phenyl-3,4-diaminobenzoic acid
prepared by nitration of commercially available (Aldrich) p-chlorobenzoic acid, followed by anilation and reduction.

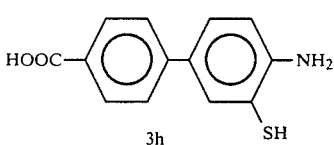

3h
4-carboxy-3'-mercapto-4'-aminobiphenyl
prepared by nitration of commercially available 4-carboxybiphenyl (ICN/K and K) and reduction to 4-amino-4'-carboxybiphenyl, followed by placement of the o-mercapto group by methods analogous to those described for 3a.

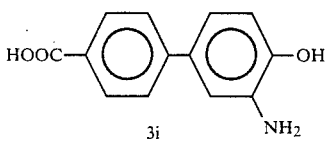

3i
4-carboxy-3'-amino-4'-hydroxybiphenyl
prepared by the nitration of commercially available (ICN/K and K) 4-carboxybiphenyl, conversion to 4-carboxy-p-phenol by reduction and diazotization, followed by acetylation, nitration, hydrolysis, and reduction.

TABLE 8-continued
Monomers of Type 3, Class 2

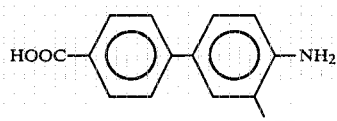

3j
4-carboxy-3',4'-diaminobiphenyl
prepared by acetylation of 4-amino-4'-
carboxylbiphenyl (see preparation of 3h) followed
by nitration, hydrolysis, and reduction.

Type 4 monomers have the general formula

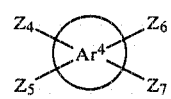

wherein $Z_4$, $Z_5$, $Z_6$, and $Z_7$ are the same or different and are chosen from the list of carboxylic acid derivatives given for $Z_1$ in Table 4. $Z_4$ and $Z_5$, or $Z_6$ and $Z_7$, or both sets can also be carboxylic acid anhydride groups. $Ar^4$ is an aromatic or aromatic heterocyclic moiety having four valence positions at carbon atoms. $Ar^4$ can be a six-member ring with the valence positions having 1, 2, 4, 5 relationship, or $Ar^4$ can be two condensed six-member rings, such as naphthalene. $Z_4$ and $Z_5$ as one set and $Z_6$ and $Z_7$ as another set must either be ortho-positioned within each set or bear a 1, 4, 5, 8 relationship to each other. An (imaginary) line perpendicular to the bond between the valence carbons attached to $Z_4$ and $Z_5$ must be collinear with the corresponding (imaginary) line for $Z_6$ and $Z_7$.

Formula 4 monomers useful in preparing the extended chain polymers and novel liquid-crystalline compositions of the instant invention are classified as Class 1 (4,1). The first number of the number pairs denotes the monomer type and the second number of the pairs denotes the monomer class.

Specific examples of (4,1) monomers preferred for use in the invention include those monomers in Table 9 below.

TABLE 9
Monomers of Type 4, Class 1

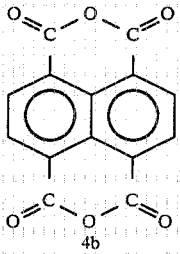

4a
pyromellitic dianhydride
obtained from Aldrich Chemical Co. and sublimed
or recrystallized (acetic anhydride) before use.

TABLE 9-continued
Monomers of Type 4, Class 1

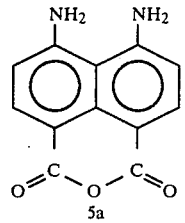

4b
1,4,5,8-naphthalenetetracarboxylic dianhydride
obtained from Aldrich Chemical Co.

Type 5 monomers has the general formula

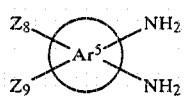

wherein $Z_8$ and $Z_9$ are defined as for $Z_4$ and $Z_5$ in Table 9. $Ar^5$ is defined as in Table 9, the two amino groups are ortho to each other, and $Z_8$, $Z_9$, and the two amino groups are positioned such that two imaginary lines drawn perpendicular to the bonds between their valence carbons are collinear.

Formula 5 monomers useful in preparing the extended chain polymers and novel liquid-crystalline compositions of the instant invention are classified as Class 1 (5,1). The number pair (5,1) has the same significance as above.

Specific examples of (5,1) monomers preferred for use in the invention include the monomer in Table 10 below.

TABLE 10
Monomers of Type 5, Class 1

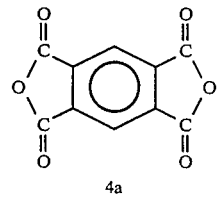

5a
4,5-diaminonaphthalene-1,8-dicarboxylic anhydride
prepared from the dinitroderivative by chemical
reduction according to I. Honda and M. Okazaki,
J. Soc. Org. Synthetic Chem. (Japan), 7, page 25(1950).

Type 6 monomer has the general formula

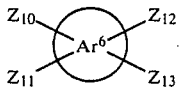

wherein $Ar^6$ represents an aromatic moiety and is a tetrahydroxy fused ring system, $Z_{10}$, $Z_{11}$, $Z_{12}$, $Z_{16}$ are the same HO atoms bonded to carbon atoms of $Ar^6$.

In general, $Ar^6$ may comprise a single or a plurality of aromatic rings in the center of a completely conjugated fused ring system. The center aromatic ring or rings of the completely conjugated fused ring system can be any of those described above, and others.

Formula 6 monomers useful in preparing the extended chain polymers and novel liquid-crystalline compositions of the instant invention may also be further classified into two groups: Class 1 (6,1), and Class 2 (6,2). The number pairs have the same significance as above.

The preferred (6,1) monomers are those wherein $Ar^6$ comprise a single center aromatic ring in the center of the fused ring system.

The preferred (6,2) monomers are those wherein $Ar^6$ comprise at least two center aromatic rings in the center of the fused ring system.

Specific examples of (6,1) and (6,2) preferred for use in the invention include those monomers in Tables 11 and 12 respectively.

TABLE 11
Monomers of Type 6, Class 1

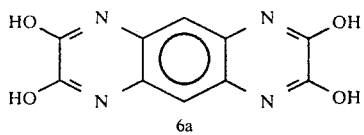

6a
2,3,7,8-tetrahydroxy-1,4,6,9-tetraazaanthracene
prepared from condensation of 1,2,4,5-
tetraaminobenzene with oxalic acid according to
H. Tadamus, F. DeSchryver, W. DeWinter, and C.
S. Marvel, J. Polym. Sci. A-1,4, page 2831(1966).

TABLE 12
Monomers of Type 6, Class 2

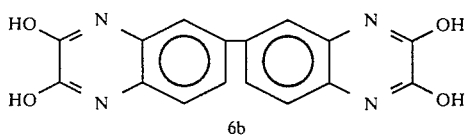

6b
2,2',3,3'-tetrahydroxy-6,6'-biquinoxaline
prepared from condensation of 3,3'-diaminobenzidine
with oxalic acid according to method of
H. Tadamus, et al., J. Polym. Sci. A-1,4, page 2831(1966).

Type 7 monomer has the general formula

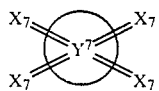

wherein $Y^7$ represents an aromatic or heteroaromatic moiety and is a fused ring carbon group, and $X_7$'s are double bonded to carbon of $Y^7$.

Formula 7 monomers useful in preparing the extended chain polymers and novel liquid-crystalline compositions of the instant invention can be classified as Class 1 (7,1). The number pair (7,1) has the same significance as above.

A specific example of (7,1) preferred for use in the present invention is 7a in Table 13 below.

TABLE 13
Monomers of Type 7, Class 1

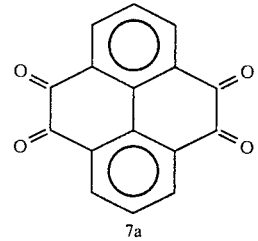

7a
1,2,6,7-tetraketopyrene
M. Corell, and H. Streck, Ann. 531, page 6(1937).

Type 8 monomer has the general formula

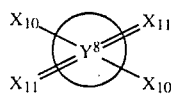

wherein $Y^8$ is a single carbon cyclic moiety, $X_{10}$ and $X_{11}$ are HO and O atoms respectively, bonded to carbon atoms of $Y^8$.

Formula 8 monomers useful in preparing the extended chain polymers and novel liquid-crystalline compositions of the instant invention can be classified as Class 1 (8,1). The number pair (8,1) has the same significance as above.

A specific example of (8,1) preferred for use in the present invention is 8a in Table 14 below.

TABLE 14
Monomers of Type 8, Class 1

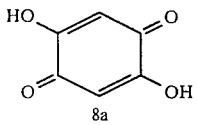

8a
2,5-dihydroxy-1,4-benzoquinone
obtained from Aldrich Chemical Co.

Type 9 monomers has the general formula

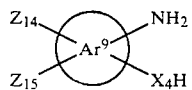

wherein $Ar^9$ represents an aromatic moiety and is a partially fused ring system, $Z_{14}$ and $Z_{15}$ are OH atoms, $X_4$ are selected from the class O, S, and NR; R is H or an organic group attached to N; $NH_2$, $X_4H$, $Z_{14}$, and $Z_{15}$ are bonded to carbon atoms of $Ar^9$; $NH_2$ and $X_4H$ are positioned ortho; $Z_{14}$ and $Z_{15}$ are positioned ortho.

Formula 9 monomers useful in preparing the extended chain polymers and novel liquid-crystalline compositions of the pesent invention can be classified as Class 1 (9,1). The number pair (9,1) has the same significance as above.

A specific example of (9,1) preferred for use in the present invention is 9a in Table 15 below.

TABLE 15
Monomers of Type 9, Class 1

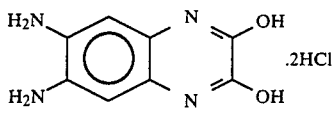

9a 2,3-dihydroxy-6,7-diaminoquinoxaline dihydrochloride prepared from 1,2-diamino-4,5-dinitrobenzene by condensation with oxalic acid followed by reduction according to R. F. Kovar and F. E. Arnold, J. Polym. Sci., Polym. Chem. Ed., 14, page 2807(1976).

All of the above-cited patents and/or publications of Tables 1–15 are specifically incorporated herein by reference.

In accordance with the practice of the present invention, the synthesis of the aforementioned formulas I–VIII homopolymers may be illustrated by the following general reaction system:

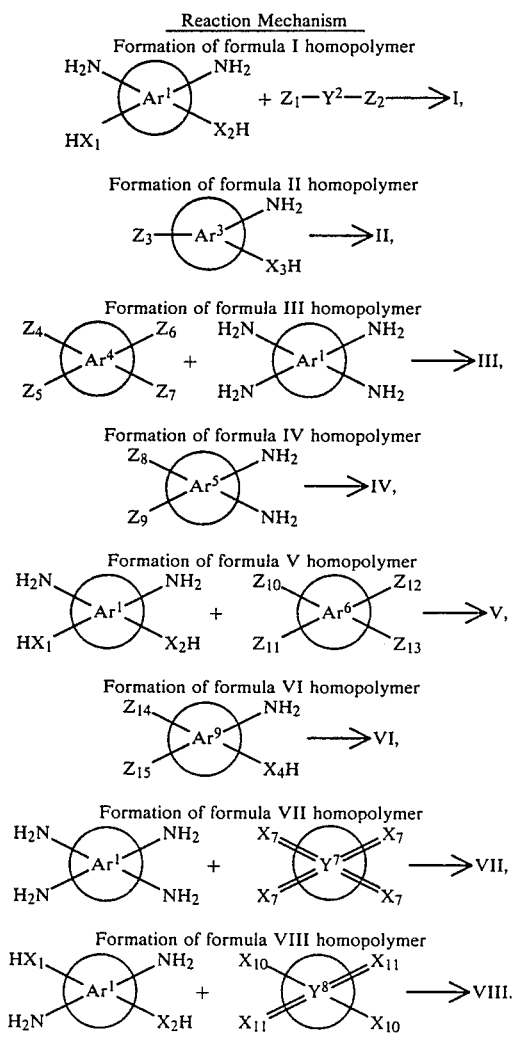

Representative examples of suitable homopolymers forming liquid crystalline homopolymer compositions in accordance with the practice of the present invention (provided they fall within the above-defined general formulas I–VIII) include the following polymers. For the sake of convenience, polymer formulas are hereinbelow shown in simplified representation. As an example, $-[AI]_n$ is

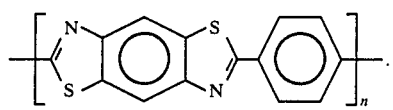

The structures representing $-[AI]-$ are defined in the Appendix $-[A]-$ has the structure

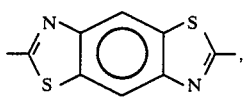

and $-[I]-$ has the structure

Their sequential combination is therefore

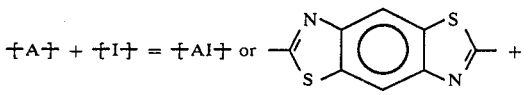

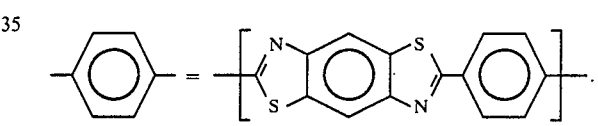

All simplified polymer formula representations appearing in the specification may be readily interpreted by reference to the Appendix.

$-[AH]_n$, $-[AIBI]_n$, $-[BI]_n$, and $-[T]_n$,
$-[AIDI]_n$, $-[AIEI]_n$, $-[AIFI]_n$, $-[AILI]_n$, $-[AIMI]_n$, $-[AINI]_n$,
$-[ATIT']_n$, $-[ATKT']_n$, $-[BIDI]_n$, $-[BIEI]_n$, $-[BIFI]_n$, $-[BILI]_n$, $-[BIMI]_n$, $-[BINI]_n$, $-[BTIT']_n$, $-[BTKT']_n$, $-[EILI]_n$, $-[FILI]_n$, $-[LI]_n$, $-[TI]_n$, $-[UI]_n$, and $-[VI]_n$,
$-[A]_n$, $-[AB]_n$, $-[AC]_n$, $-[AE]_n$, $-[AF]_n$, $-[AICI]_n$, $-[AIOI]_n$,
$-[AIQI]_n$, $-[AJ]_n$, $-[AL]_n$, $-[AM]_n$, $-[AN]_n$, $-[AQ]_n$, $-[AVIV']_n$,
$-[B]_n$, $-[BC]_n$, $-[BD]_n$, $-[BE]_n$, $-[BF]_n$, $-[BICI]_n$, $-[BIOI]_n$,
$-[BIQI]_n$, $-[BJ]_n$, $-[BL]_n$, $-[BM]_n$, $-[BN]_n$, $-[BQ]_n$, $-[BVIV']_n$,
$-[B'A'B'Z]_n$, $-[B'A'F'Z]_n$, $-[B'H']_n$* (* denotes oxygens always meta on B') $-[B'I']_n$, $-[B'P']_n$,
$-[B'Q']_n$, $-[B'S']_n$* $-[C]_n$, $-[CE]_n$, $-[CF]_n$, $-[CI]_n$, $-[CIEI]_n$,
$-[CIFI]_n$, $-[CILI]_n$, $-[CIMI]_n$, $-[CINI]_n$, $-[CIOI]_n$, $-[CJ]_n$,
$-[CL]_n$, $-[CM]_n$, $-[CN]_n$, $-[CTIT']_n$, $-[CTKT']_n$, $-[C'A'B'Z]_n$,
$-[C'A'F'Z]_n$, $-[D'A'B'Z]_n$, $-[D'A'F'Z]_n$, $-[E]_n$, $-[EF]_n$, $-\text{[EI]}_n$, $-\text{[EIFI]}_n$, $-\text{[EIMI]}_n$, $-\text{[EINI]}_n$, $-\text{[EIOI]}_n$, $-\text{[EIQI]}_n$,
$-\text{[EJ]}_n$, $-\text{[EL]}_n$, $-\text{[EM]}_n$, $-\text{[EN]}_n$, $-\text{[ETIT']}_n$, $-\text{[ETKT']}_n$,
$-\text{[E'A'B'Z]}_n$, $-\text{[E'A'F'Z]}_n$, $-\text{[F]}_n$, $-\text{[FI]}_n$, $-\text{[FIMI]}_n$, $-\text{[FINI]}_n$, $-\text{[FIOI]}_n$, $-\text{[FJ]}_n$, $-\text{[FL]}_n$, $-\text{[FM]}_n$, $-\text{[FN]}_n$, $-\text{[F'A']}_n$,
$-\text{[L]}_n$, $-\text{[LJ]}_n$, $-\text{[LTIT']}_n$, $-\text{[LTKT']}_n$, $-\text{[M]}_n$, $-\text{[MI]}_n$, $-\text{[MTIT']}_n$,
$-\text{[MTKT']}_n$, $-\text{[N]}_n$, $-\text{[NI]}_n$, $-\text{[NTIT']}_n$, $-\text{[NTKT']}_n$, $-\text{[QH]}_n$,
$-\text{[QJ]}_n$, $-\text{[RH]}_n$, $-\text{[RJ]}_n$, and $-\text{[UI]}_n$,
$-\text{[AD]}_n$, $-\text{[AG]}_n$, $-\text{[AH]}_n$, $-\text{[AIGI]}_n$, $-\text{[AIHI]}_n$, $-\text{[AIPI]}_n$,
$-\text{[AIRI]}_n$, $-\text{[AISI]}_n$, $-\text{[AK]}_n$, $-\text{[AO]}_n$, $-\text{[AP]}_n$, $-\text{[AR]}_n$, $-\text{[AS]}_n$, $-\text{[BG]}_n$,
$-\text{[BIGH]}_n$, $-\text{[BH]}_n$, $-\text{[BIHH]}_n$, $-\text{[BIPI]}_n$, $-\text{[BIRI]}_n$, $-\text{[BISH]}_n$,
$-\text{[BK]}_n$, $-\text{[BO]}_n$, $-\text{[BP]}_n$, $-\text{[BR]}_n$, $-\text{[BS]}_n$, $-\text{[B'G']}_n$,
$-\text{[B'H']}_n$ ( denotes oxygen always para on B'),
$-\text{[B'J']}_n$, $-\text{[B'K']}_n$* (* denotes oxygens always meta on B'),
$-\text{[B'K']}_n$**, $-\text{[B'L']}_n$, $-\text{[B'M']}_n$, $-\text{[B'N']}_n$, $-\text{[B'O']}_n$,
$-\text{[B'R']}_n$, $-\text{[B'S']}_n$**, $-\text{[B'U']}_n$, $-\text{[CD]}_n$, $-\text{[CG]}_n$, $-\text{[CH]}_n$,
$-\text{[CIDI]}_n$, $-\text{[CIGI]}_n$, $-\text{[CIHI]}_n$, $-\text{[CIPI]}_n$, $-\text{[CIQI]}_n$, $-\text{[CIRI]}_n$,
$-\text{[CISI]}_n$, $-\text{[CK]}_n$, $-\text{[CO]}_n$, $-\text{[CP]}_n$, $-\text{[CQ]}_n$, $-\text{[CR]}_n$, $-\text{[CS]}_n$,
$-\text{[CVIV']}_n$, $-\text{[C'G']}_n$, $-\text{[C'H']}_n$, $-\text{[C'I']}_n$, $-\text{[C'J']}_n$, $-\text{[C'K']}_n$,
$-\text{[C'L']}_n$, $-\text{[C'O']}_n$, $-\text{[C'Q']}_n$, $-\text{[C'R']}_n$, $-\text{[C'S']}_n$,
$-\text{[D]}_n$, $-\text{[DE]}_n$, $-\text{[DF]}_n$, $-\text{[DG]}_n$, $-\text{[DH]}_n$, $-\text{[DI]}_n$, $-\text{[DIEI]}_n$,
$-\text{[DIFI]}_n$, $-\text{[DIGI]}_n$, $-\text{[DIHI]}_n$, $-\text{[DILI]}_n$, $-\text{[DIMI]}_n$, $-\text{[DINI]}_n$,
$-\text{[DIOI]}_n$, $-\text{[DIPI]}_n$, $-\text{[DIQI]}_n$, $-\text{[DIRI]}_n$, $-\text{[DISI]}_n$,
$-\text{[DJ]}_n$, $-\text{[DK]}_n$, $-\text{[DL]}_n$, $-\text{[DM]}_n$, $-\text{[DN]}_n$, $-\text{[DO]}_n$, $-\text{[DP]}_n$,
$-\text{[DQ]}_n$, $-\text{[DR]}_n$, $-\text{[DS]}_n$, $-\text{[DTIT']}_n$, $-\text{[DTKT']}_n$, $-\text{[DVIV']}_n$,
$-\text{[D'G']}_n$, $-\text{[D'H']}_n$* (* denotes oxygen always in 3,3'-positions on D'), $-\text{[D'H']}_n$ ( denotes oxygen always in 4,4'-positions on D'),
$-\text{[D'I']}_n$, $-\text{[D'J']}_n$, $-\text{[D'K']}_n$*, $-\text{[D'K']}_n$**,
$-\text{[D'L']}_n$, $-\text{[D'M']}_n$, $-\text{[D'N']}_n$, $-\text{[D'O']}_n$, $-\text{[D'Q']}_n$, $-\text{[D'R']}_n$,
$-\text{[D'S']}_n$*, $-\text{[D'S']}_n$**, $-\text{[D'U']}_n$, $-\text{[EG]}_n$, $-\text{[EH]}_n$, $-\text{[EIGI]}_n$,
$-\text{[EIHI]}_n$, $-\text{[EIPI]}_n$, $-\text{[EIRI]}_n$, $-\text{[EISI]}_n$, $-\text{[EK]}_n$, $-\text{[EO]}_n$,
$-\text{[EP]}_n$, $-\text{[EQ]}_n$, $-\text{[ER]}_n$, $-\text{[ES]}_n$, $-\text{[EVIV']}_n$, $-\text{[E'G']}_n$,
$-\text{[E'H']}_n$, $-\text{[E'I']}_n$, $-\text{[E'J']}_n$, $-\text{[E'K']}_n$, $-\text{[E'L']}_n$, $-\text{[E'O']}_n$,
$-\text{[E'Q']}_n$, $-\text{[E'R']}_n$, $-\text{[E'S']}_n$, $-\text{[FG]}_n$, $-\text{[FR]}_n$,
$-\text{[FIGI]}_n$, $-\text{[FIHI]}_n$, $-\text{[FIPI]}_n$, $-\text{[FIQI]}_n$, $-\text{[FIRI]}_n$, $-\text{[FISI]}_n$,
$-\text{[FK]}_n$, $-\text{[FO]}_n$, $-\text{[FP]}_n$, $-\text{[FQ]}_n$, $-\text{[FR]}_n$, $-\text{[FS]}_n$, $-\text{[FTIT']}_n$,
$-\text{[FTKT']}_n$, $-\text{[FVIV']}_n$, $-\text{[G]}_n$, $-\text{[GH]}_n$, $-\text{[GI]}_n$, $-\text{[GIHH]}_n$,
$-\text{[GILI]}_n$, $-\text{[GIMI]}_n$, $-\text{[GINI]}_n$, $-\text{[GIOI]}_n$, $-\text{[GIPI]}_n$, $-\text{[GIQI]}_n$,
$-\text{[GIRI]}_n$, $-\text{[GISI]}_n$, $-\text{[GJ]}_n$, $-\text{[GK]}_n$, $-\text{[GL]}_n$, $-\text{[GM]}_n$, $-\text{[GN]}_n$,
$-\text{[GO]}_n$, $-\text{[GP]}_n$, $-\text{[GQ]}_n$, $-\text{[GR]}_n$, $-\text{[GS]}_n$, $-\text{[GTIT']}_n$,
$-\text{[GTKT']}_n$, $-\text{[GVIV']}_n$, $-\text{[H]}_n$, $-\text{[HI]}_n$, $-\text{[HILI]}_n$, $-\text{[HIMI]}_n$, $-\text{[HINI]}_n$, $-\text{[HIOI]}_n$, $-\text{[HIPI]}_n$, $-\text{[HIQI]}_n$, $-\text{[HIRI]}_n$,
$-\text{[HISI]}_n$, $-\text{[HJ]}_n$, $-\text{[HK]}_n$, $-\text{[HL]}_n$, $-\text{[HM]}_n$, $-\text{[HN]}_n$, $-\text{[HO]}_n$,
$-\text{[HP]}_n$, $-\text{[HQ]}_n$, $-\text{[HR]}_n$, $-\text{[HS]}_n$, $-\text{[HTIT']}_n$, $-\text{[HTKT']}_n$, $-\text{[HVIV']}_n$, $-\text{[LK]}_n$, $-\text{[LVIV']}_n$,
$-\text{[MJ]}_n$, $-\text{[MK]}_n$, $-\text{[MVIV']}_n$, $-\text{[NJ]}_n$, $-\text{[NK]}_n$,
$-\text{[NVIV']}_n$, $-\text{[OH]}_n$, $-\text{[OJ]}_n$, $-\text{[OK]}_n$, $-\text{[OTIT']}_n$,
$-\text{[OTKT']}_n$, $-\text{[OVIV']}_n$, $-\text{[PI]}_n$, $-\text{[PJ]}_n$, $-\text{[PK]}_n$,
$-\text{[PTIT']}_n$, $-\text{[PTKT']}_n$, $-\text{[PVIV']}_n$, $-\text{[QI]}_n$, $-\text{[QK]}_n$,
$-\text{[QTIT']}_n$, $-\text{[QTKT']}_n$, $-\text{[QVIV']}_n$, $-\text{[RI]}_n$, $-\text{[RK]}_n$,
$-\text{[RTIT']}_n$, $-\text{[RTKT']}_n$, $-\text{[RVIV']}_n$, $-\text{[SI]}_n$, $-\text{[SJ]}_n$,
$-\text{[SK]}_n$, $-\text{[STIT']}_n$, $-\text{[STKT']}_n$, $-\text{[SVIV']}_n$, $-\text{[W]}_n$,
$-\text{[X]}_n$, and $-\text{[Y]}_n$.

The most preferred extended chain homopolymers in accordance with the practice of the present invention include
$-\text{[AI]}_n$, $-\text{[AIBI]}_n$, $-\text{[BI]}_n$, and $-\text{[T]}_n$.

The especially preferred extended chain homopolymers in accordance with the practice of the present invention include
$-\text{[AIDI]}_n$, $-\text{[AIEI]}_n$, $-\text{[AIFI]}_n$, $-\text{[AILI]}_n$, $-\text{[AIMI]}_n$, $-\text{[AINI]}_n$,
$-\text{[ATIT']}_n$, $-\text{[ATKT']}_n$, $-\text{[BIDI]}_n$, $-\text{[BIEI]}_n$, $-\text{[BIFI]}_n$,
$-\text{[BILI]}_n$, $-\text{[BIMI]}_n$, $-\text{[BINI]}_n$, $-\text{[BTIT']}_n$, $-\text{[BTKT']}_n$,
$-\text{[EILI]}_n$, $-\text{[FILI]}_n$, $-\text{[LI]}_n$, $-\text{[TI]}_n$, $-\text{[UI]}_n$, and $-\text{[VI]}_n$.

The preferred extended chain homopolymers in accordance with the practice of the present invention include
$-\text{[A]}_n$, $-\text{[AB]}_n$, $-\text{[AC]}_n$, $-\text{[AE]}_n$, $-\text{[AF]}_n$, $-\text{[AICI]}_n$, $-\text{[AIOI]}_n$,
$-\text{[AIQI]}_n$, $-\text{[AJ]}_n$, $-\text{[AL]}_n$, $-\text{[AM]}_n$, $-\text{[AN]}_n$, $-\text{[AQ]}_n$, $-\text{[AVIV']}_n$,
$-\text{[B]}_n$, $-\text{[BC]}_n$, $-\text{[BD]}_n$, $-\text{[BE]}_n$, $-\text{[BF]}_n$, $-\text{[BICI]}_n$, $-\text{[BIOI]}_n$,
$-\text{[BIQI]}_n$, $-\text{[BJ]}_n$, $-\text{[BL]}_n$, $-\text{[BM]}_n$, $-\text{[BN]}_n$, $-\text{[BQ]}_n$, $-\text{[BVIV']}_n$,
$-\text{[B'A'B'Z]}_n$, $-\text{[B'A'F'Z]}_n$, $-\text{[B'H']}_n$* (* denotes oxygens always meta on B') $-\text{[B'I']}_n$, $-\text{[B'P']}_n$,
$-\text{[B'Q']}_n$, $-\text{[B'S']}_n$*, $-\text{[CI]}_n$, $-\text{[CE]}_n$, $-\text{[CF]}_n$, $-\text{[CI]}_n$, $-\text{[CIEI]}_n$,
$-\text{[CIFI]}_n$, $-\text{[CILI]}_n$, $-\text{[CIMI]}_n$, $-\text{[CINI]}_n$, $-\text{[CIOI]}_n$, $-\text{[CJ]}_n$,
$-\text{[CL]}_n$, $-\text{[CM]}_n$, $-\text{[CN]}_n$, $-\text{[CTIT']}_n$, $-\text{[CTKT']}_n$, $-\text{[C'A'B'Z]}_n$,
$-\text{[C'A'F'Z]}_n$, $-\text{[D'A'B'Z]}_n$, $-\text{[D'A'F'Z]}_n$, $-\text{[E]}_n$, $-\text{[EF]}_n$,
$-\text{[EI]}_n$, $-\text{[EIFI]}_n$, $-\text{[EIMI]}_n$, $-\text{[EINI]}_n$, $-\text{[EIOI]}_n$, $-\text{[EIQI]}_n$,
$-\text{[EJ]}_n$, $-\text{[EL]}_n$, $-\text{[EM]}_n$, $-\text{[EN]}_n$, $-\text{[ETIT']}_n$, $-\text{[ETKT']}_n$,
$-\text{[E'A'B'Z]}_n$, $-\text{[E'A'F'Z]}_n$, $-\text{[F]}_n$, $-\text{[FI]}_n$, $-\text{[FIMI]}_n$,
$-\text{[FINI]}_n$, $-\text{[FIOI]}_n$, $-\text{[FJ]}_n$, $-\text{[FL]}_n$, $-\text{[FM]}_n$, $-\text{[FN]}_n$, $-\text{[F'A']}_n$,
$-\text{[L]}_n$, $-\text{[LJ]}_n$, $-\text{[LTIT']}_n$, $-\text{[LTKT']}_n$, $-\text{[M]}_n$, $-\text{[MI]}_n$, $-\text{[MTIT']}_n$,
$-\text{[MTKT']}_n$, $-\text{[N]}_n$, $-\text{[NI]}_n$, $-\text{[NTIT']}_n$, $-\text{[NTKT']}_n$, $-\text{[QI]}_n$,
$-\text{[QJ]}_n$, $-\text{[RH]}_n$, $-\text{[RJ]}_n$, and $-\text{[UI]}_n$.

It is helpful to define three $P_2O_5$ contents, operative at different stages of polymerization, that must be controlled in order to optimize the synthesis procedure of the present invention. We will define the initial $P_2O_5$ content $m_o$ as the $P_2O_5$ content of the polyphosphoric acid operative during dehydrohalgenation (in step b above and as explained more fully hereinafter). The initial P$_2$O$_5$ content in accordance with the practice of the instant invention should be below about 83.3%, and may range from between about 83.3% to about 63%; preferably below about 82%, more preferably below about 80%, and most preferably below about 76%.

The intermediate P$_2$O$_5$ content is operative at the initiation of polycondensation and is calculated so as to give the third (or final) P$_2$O$_5$ content f that accounts for polyphosphoric acid hydrolysis by 100% of the theoretical water of polycondensation. The final P$_2$O$_5$ content, f, must be above some minimum value if the solution is to maintain its effectiveness as a reaction medium at the late stages of polymerization. The final P$_2$O$_5$ content should be between about 82% to about 86%, preferably between about 82% to about 84%, and most preferably between about 82% to about 83%.

The various important general process steps for preparing liquid crystalline polymer compositions of the present invention may include one or more of the following stages which are considered to be within the process parameters described above. These stages are:

Stage One—One or more of a selected first monomers selected from the group consisting of (aminogroup-containing) monomers 1, 3, 5, or 9 is added to a specified initial weight in grams (given by a*) of a polyphosphoric acid with a P$_2$O$_5$ content m$_o$ according to the empirical equation $$a^* = \{[1-f]([P_y/P_c] - P_y) - [n_o(18.02)/M_w]P_y\}(1-m_o)^{-1}$$

where P$_y$ is the weight in grams of the theoretical yield of polymer, P$_c$ is the weight fraction of polymer in the total weight of the final liquid crystalline polymer composition (and is chosen to be above the critical concentration of the polymer necessary for liquid crystalline phase formation in the resulting polymer-polyphosphoric acid composition), n$_o$ is an integer giving the number of moles of condensation by-product per mole of polymer repeating unit, the number 18.02 is the molecular weight of the condensation by-product, M$_w$ is molecular weight of the polymer repeating unit, and f is the final P$_2$O$_5$ content that must be above a minimum value as defined by this invention.

Stage Two—Once the first monomer(s) are combined with polyphosphoric acid, and protecting groups, if present, released, (optionally, depending on the particular polymer and reaction mechanism chosen) a stoichiometric amount of one or more of a selected second monomers selected from the group consisting of 2, 4, 6, 7 or 8 is next added and the chosen value of f is achieved by adding b* (an intermediate weight in grams of P$_2$O$_5$) to the mixture according to the equation.

$$b^* = [P_y/P_c] - P_y - [\{n_o(18.02)/M_w\}]P_y - a^*$$

Stage Three—The resulting mixture (containing the first monomer(s) and/or the second monomer(s)) is then heated to a temperature suitable for polycondensation. The reaction temperature may range from about 100° C. to about 210° C., preferably about 110° C. to about 200° C. more preferably about 160° C. to about 190° C., and most preferably about 185° C.

The P$_2$O$_5$ content, m$_o$, should be low enough to:
(1) achieve efficient dehydrohalogenation and/or
(2) achieve sufficient monomer loading to achieve desired P$_c$ without foaming problem or unusually high bulk viscosity. f should be high enough to:
(2a) maintain a polyphosphoric acid composition that is an effective reaction medium at late stages of polycondensation.
(2b) provide an effective phosphorylating medium as described in N. Yoda and M. Kurihara, "New Polymers of Aromatic Heterocycles by Polyphosphoric Acid Solution Methods", J. Polymer Science, Macromolecular Reviews, Volume 5, (1971), p. 159 at initial stage of polymerization. The subject matter of the paper by Yoda and et. al., is specifically incorporated herein by reference.
(2c) provide an effective solvent for the polymer at the end of polycondensation.

For purpose of illustration, a plot of equation a* is presented in FIG. 7 showing regions (shaded dash area) of poor monomer 1a solubility. In the case of polymer $\{-AI\}_n$, the family of P$_c$ curves can be utilized as follows:

1. choose a $\{-AI\}_n$ polymer concentration, P$_c$, as an example 0.16;
2. select a point on the curve P$_c$=0.16 above the shaded dash area indicating poor monomer 1a solubility;
3. from that point selected, the weight in grams of PPA (a*) of the corresponding P$_2$O$_5$ content (m$_o$) that should be added to 92.06 g of monomer 1a can be determined;
4. after dehydrochlorination is complete, the amount of monomer 2a to be added is 62.38 g; and
5. if the final P$_2$O$_5$ content (f) has been chosen to be 82.2%, then the amount of P$_2$O$_5$ to be added (b*) is the difference between the amount of PPA used in step 3 above and the weight of PPA at the end of the curve for P$_c$=0.16.

The choice of the optimal m$_o$ is depentent on the desired polymer concentration and the solubility limits of the first monomer. The region of poor solubility for monomer 1a is shown in FIG. 7. Other monomers exhibit different solubility limits. Solubility rankings of some representative monomers are listed below.
monomers with solubilities greater than 1a;
  1f, 1g, 3a, 3b, 3c, and 3d;
monomers with solubilities comparable to 1a:
  1d, and 3e;
monomers with solubilities less than 1a:
  1b, 1c; 1e, 1i, 1k, 3f, 3g, 3h, 3i, and 3j;
and monomers with solubilities much less than 1a:
  1h, 1l, 1m, 1n, 1o, 1p, 5a, and 9a.

Accordingly, it is possible to dehydrohalogenate the selected hydrohalide (monomers) more rapidly; the foaming problem is alleviated or eliminated; the solution in PPA of lesser P$_2$O$_5$ content than that of U.S. Pat. No. 4,225,700 is much less viscous and dehydrohalogenation can be carried out much more readily. Further, a solution of selected monomers in PPA of considerably higher concentration is possible and a reaction product containing a much higher concentration of polymer is possible.

The above-mentioned formulas I, III, V, VII, and VIII homopolymer compositions may be prepared in accordance with the above process parameters by:

(a) mixing a selected first monomer (for example, a selected first monomer selected from the group consisting of (1,1), (1,2), or (1,3) with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) adding a selected second monomer (for example, a second monomer selected from the group consisting of (2,1), (2,2), (2,3), (4,1), (6,1), (6,2), (7,1) or (8,1)) in the resulting mixture of step (b) to provide a mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization.

(e) causing polymerization of the first and second monomer at a temperature sufficient to effect radiation at a rate to form a first homooligomeric product having a preselected intrinsic viscosity or a first homopolymeric product.

Formulas II, IV, and VI homopolymer compositions may be prepared by:

(a) mixing a selected first monomer (for example, a selected first monomer selected from the group consisting of (3,1), (3,2), (5,1), or (9,1) with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent.

(c) then increasing the phosphorus pentoxide content of the mixture resulting from step (b) to provide a first monomer reaction medium of greater phosphorus pentoxide content suitable for polymerization, (d) causing polymerization of the first monomer at a temperature sufficient to effect reaction at a rate to form a first homooligomeric product having a preselected intrinsic viscosity or a first homopolymeric product.

Copolymeric Compositions and their preparation

In accordance with a further aspect of the invention, there is provided a liquid-crystalline composition useful in the preparation of fibers and films comprising a polycondensation product consisting essentially of a blend of certain polyphosphoric acids and a high concentration of at least one high molecular weight extended chain copolymer having the general formulas:

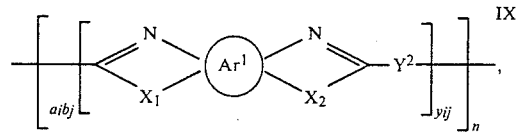

wherein $Ar^1$ represents an aromatic moiety and is XXX as defined above, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another, and $Y^2$ is nil or represents a bivalent organic radical and is XXXI as defined above, $a_ib_i$ represents the molar proportions of the respective different recurring units present in said copolymer, $y_{ij}$ represents an average number of the respective different sequential recurring units present in said copolymer, n being a positive integer;

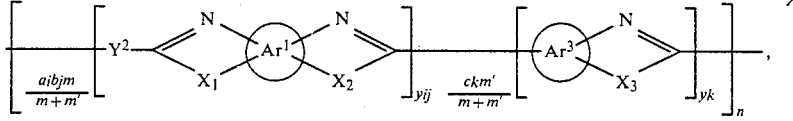

wherein $Ar^1$ represents an aromatic moiety and is XXX as defined above, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ represents a bivalent organic radical and is XXXI as defined above, $a_ib_im/m+m'$ represents the molar proportions of the respective different recurring units present in said copolymer, $y_{ij}$ represents an average number of the respective different sequential recurring units present in said copolymer, $Ar^3$ represents a different aromatic moiety and is XXII as defined above, the nitrogen atom and $X_3$ being bonded to aromatic carbon atoms of $Ar^3$, $c_km'/m+m'$ represents the molar proportions of the respective different recurring units present in said copolymer, $y_k$ represents an average number of the respective different sequential recurring units present in said copolymer, n being a positive integer;

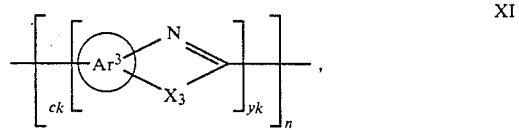

wherein $Ar^3$ represents an aromatic moiety and is XXII as defined above, $X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, $c_k$ represents the molar proportions of the respective different recurring units present in said copolymer, $y_k$ represents an average number of the respective different sequential recurring units present in said copolymer, n being a positive integer;

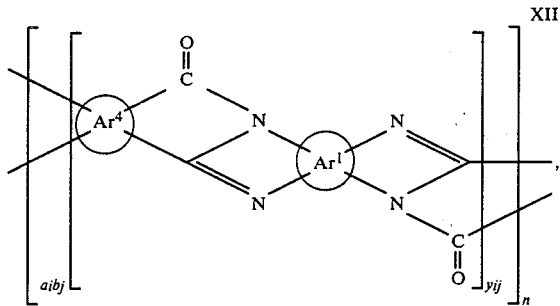

wherein $Ar^1$ represents an aromatic moiety and is XXXII as defined above, $Ar^4$ represents a different aromatic moiety and is XXIII as defined above, the nitrogen atoms being bonded to $Ar^1$ and the carbon atoms being bonded to $Ar^4$, $a_ib_j$ represents the molar proportions of the respective different recurring units present in said copolymer, $y_{ij}$ represents an average number of the respective different sequential recurring units present in said copolymer, n being a positive integer;

tions of the respective different recurring units present in said copolymer, $y_{ij}$ represents an average number of the respective different sequential recurring units present in said copolymer, n being a positive integer;

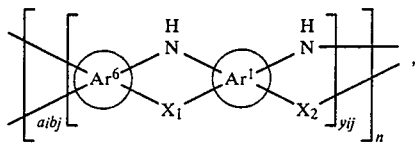

wherein $Ar^1$ represents an aromatic moiety and is XXX as defined above, $Ar^6$ represents a different aromatic moiety and is XXV as defined above, $X_1$ and $X_2$ are the same or different and are sulfur, oxygen, or NR (R being hydrogen or an organic group), the NH groups and $X_4$ and $X_1$ being bonded to aromatic carbon atoms of $Ar^6$ and $Ar^1$, NH and $X_1$ or $X_2$ of each hereto ring are disposed ortho to one another, $a_ib_j$ represents the molar proportions of the respective different recurring units present in said copolymer, $y_{ij}$ represents an average number of the respective different sequential recurring units present in said copolymer, n being a positive integer;

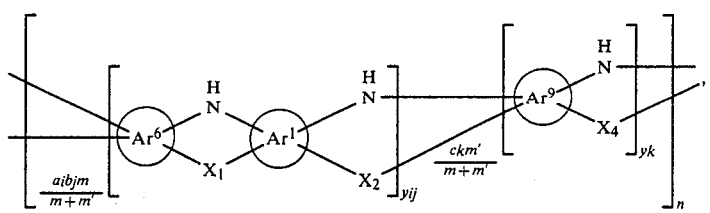

number of the respective different sequential recurring units present in said copolymer, n being a positive integer;

wherein $Ar^1$ represents an aromatic moiety and is XXX as defined above, $Ar^6$ represents a different aromatic moiety and is XXV as defined above, $X_1$ and $X_2$ are the

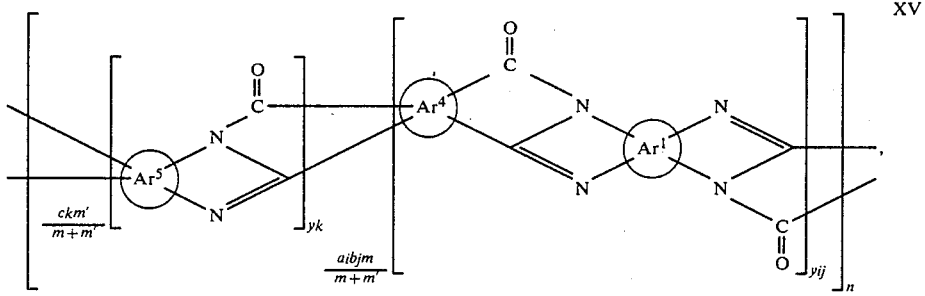

wherein $Ar^4$ represents a different aromatic moiety and is XXIII as defined above, $Ar^1$ represents an aromatic moiety and is XXXII as defined above, and $Ar^5$ represents an aromatic moiety different from $Ar^4$ and $Ar^1$ and is XXIV as defined above, the carbon atoms being bonded to $Ar^4$ and $Ar^5$ and the nitrogen atoms being bonded to $Ar^1$ and $Ar^5$, n being a positive integer; $c_km'/m+m'$ represents the molar proportions of the respective different recurring units present in said copolymer, $y_k$ represents an average number of the respective different sequential recurring units present in said copolymer, $a_ib_jm/m+m'$ represents the molar proporsame or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hereto ring are disposed ortho to one another, $a_ib_jm/m+m'$ represents the molar proportions of the respective different recurring units present in said copolymer, $y_{ij}$ represents an average number of the respective different sequential recurring units present in said copolymer, $Ar^9$ represents an aromatic moiety different from $Ar^6$ and $Ar^1$ and is XXVI as defined above, $X_4$ is sulfur, oxygen, or NR (R being hydrogen or an organic group), the NH groups and $X_4$ being bonded to aromatic carbon atoms of $Ar^6$ and $Ar^9$, $c_k m'/m + m'$ represents the molar proportions of the respective different recurring units present in said copolymer, $y_k$ represents an average number of the respective different sequential recurring units present in said copolymer, n being a positive integer; or

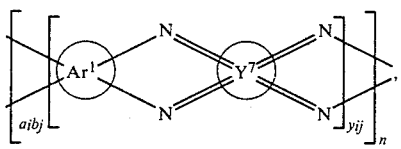   XVIII wherein $Ar^1$ represents an aromatic moiety and is XXXII as defined above, $Y^7$ represents an aromatic or heteroaromatic moiety and is XXVIII as defined above, the nitrogen atoms being bonded to aromatic carbon atoms of $Ar^1$ and bonded to adjacent carbon atoms of $Y^7$, $a_i b_j$ represents the molar proportions of the respective different recurring units present in said copolymer, $y_{ij}$ represents an average number of the respective different sequential recurring units present in said copolymer, n being a positive integer.

In accordance with the practice of the present invention, the synthesis of the aforementioned formulas IX--XVIII copolymers may be illustrated by the following general reaction system:

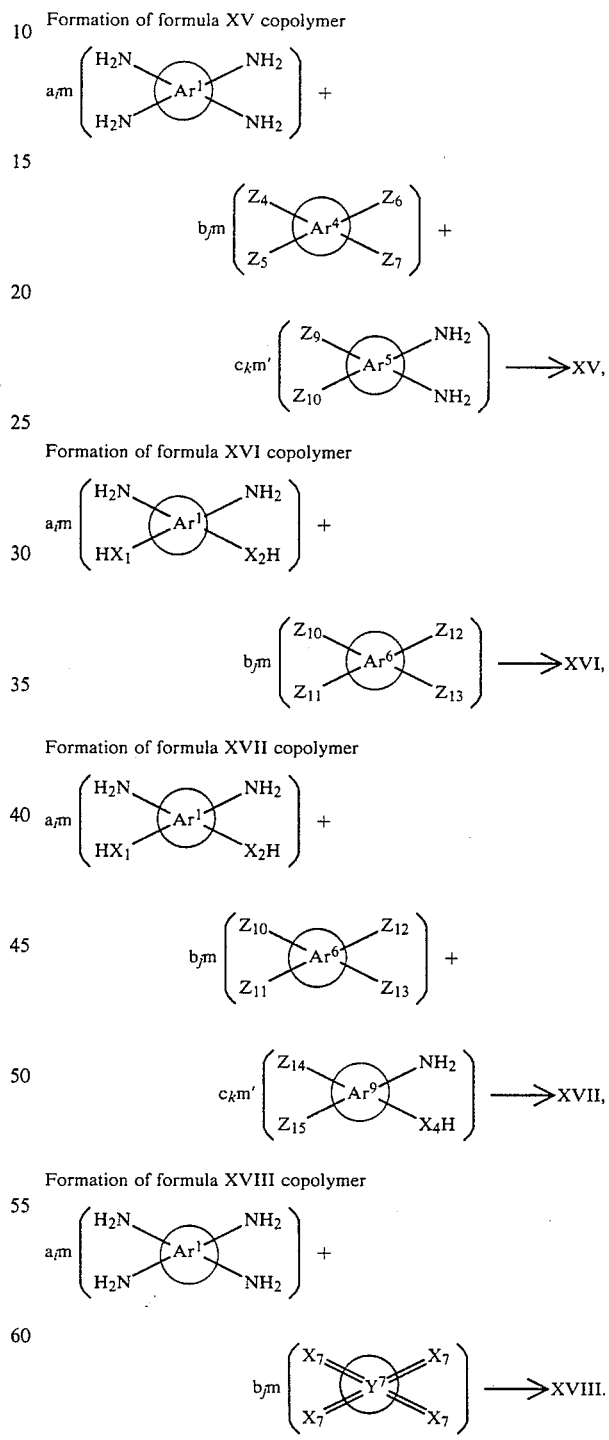

The above-mentioned formulas IX, X, XII, XV, XVI, XVII, and XVIII copolymer compositions may be prepared in accordance with the above process parameters by:

(a) mixing at least two of a selected first monomers (for example, two or more of a monomer selected from the group consisting of (1,1), (1,2), (1,3), (3,1), (3,2), (5,1), or (9,1)) with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) adding at least one of a selected second monomers (for example, one or more of a monomer selected from the group consisting of (2,1), (2,2), (2,3), (4,1), (6,1), (6,2), (7,1) or (8,1)) in the resulting mixture of step (b) to provide a mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization, (e) causing polymerization of the first and second monomer at a temperature sufficient to effect reaction at a rate to form a first co-oligomeric product having a preselected intrinsic viscosity or a first copolymeric product.

Similarly formulas IX, XII, XVIII, and copolymer compositions may be prepared by:

(a) mixing at least one of a selected first monomers (for example, one or more of a monomer selected from the group consisting of (1,1), (1,2), (1,3), (3,1), (3,2), (5,1), or (9,1)) with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) adding at least two of a selected second monomers (for example, one or more of a monomer selected from the group consisting of (2,1), (2,2), (2,3), (4,1), (6,1), (6,2), (7,1) or (8,1)) in the resulting mixture of step (b) to provide a mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization, (e) causing polymerization of the first and second monomer at a temperature sufficient to effect reaction at a rate to form a first cooligomeric product having a preselected intrinsic viscosity or a first copolymeric product.

Preferred formulas IX, X, XI, XII, XV, XVI, XVII, and XVIII, and copolymers forming liquid crystalline copolymer compositions of the instant invention are those wherein $a_i$ is the mole fraction of the ith monomer selected from Type 1, $b_j$ is the mole fraction of the jth monomer selected from Types 2, 4, 6, 7, or 8, $c_k$ is the mole fraction of the kth monomer selected from Types 3, 5, or 9, m and m' are appropriate molar quantities based on desired yiled, $a_i b_j$ and $a_i b_j m/m+m'$ are the molar proportions of the recurring units resulting from the condensation of the ith monomer of Type 1 and the jth monomer of Type 2, 4, 6, 7, or 8, $c_k$ and $c_k m'/m+m'$ are the molar proportions of the recurring unit resulting from the condensation of the kth monomer of Type 3, 5, or 9, $y_{ij}$ is the average block length (i.e., the average number of sequential recurring units unbroken by a different recurring unit) of the recurring unit formed from the ith monomer of Type 1 and the jth monomer of Type 2, 4, 6, 7, or 8, $y_k$ is the average block length of the recurring unit formed by self-condensation of the kth monomer of Type 3, 5, or 9, and n is the average overall length of the copolymer (i.e., the average total number of recurring units independent of structure). The number of recurring units in the copolymer may be the product of the highest i and the highest j or may be the product of the highest i and the highest j plus the highest k. i, j and k can be as high as is practical, but may have certain minimal values if copolymers, rather than homopolymers, are to be obtained.

Selected molar quantities ($a_1m$, $a_2m$, ... $a_im$) of monomers of Type 1 may be mixed with a phosphoric acid having a phosphorus pentoxide content of from about 63% to about 78%, preferably greater than about 68%, most preferably about 78%, and the protecting groups, such as hydrogen halide, if present, may be substantially removed by heating, and applying reduced pressure if desired. The quantity of the phosphoric acid is most desirably determined in accordance with equation a* above, making the necessary calculations for addition of monomers of possibly different molecular weights and different proportions. A stoichiometric quantity (i.e., $b_1m+b_2m+...b_jm=m$) of monomer selected from Type 2, 4, 6, 7, or 8 may then be added to the resulting solution. The phosphorus pentoxide content of the resulting mixture may then be raised in accordance with equation b* above, so as to raise the final phosphorus pentoxide content of the substantially copolymerized mixture to a value preferably within the range between about 81% to about 84% and most preferably between about 82% to about 83.5%. The resulting mixture may then be heated to a temperature preferably about 100° C. to about 210° C., most preferably to about 170° C. to about 185° C. within a practical time period, from less than about one hour to greater than about 5 hours, preferably within about 1 to about 3 hours. The temperature may be maintained for a sufficient time, which may range from less than about 1 hour to about 48 hours or more, most preferably between from about 1 to about 23 hours, to achieve the desired n value. The practice of the present invention as it relates to the production of novel liquid-crystalline compositions comprising copolymers with the general formulas IX, XII, XVI, and XVIII is illustrated for those compositions including general formula IX wherein the selected monomers of Type 1 are further classified as being of Types (1,1), (1,2), or (1,3) and the selected monomers of Type 2 are of Types (2,1), (2,2), or (2,3).

General formula IX copolymers prepared from Type (1,1), and Type (2,1) monomers have the advantage that the critical concentration necessary for liquid-crystalline behavior is low. For the copolymers listed below, their critical concentration may be as low as about 5 weight percent in polyphosphoric acid at substantially moderate n values, thus allowing a broad range of operable concentrations.

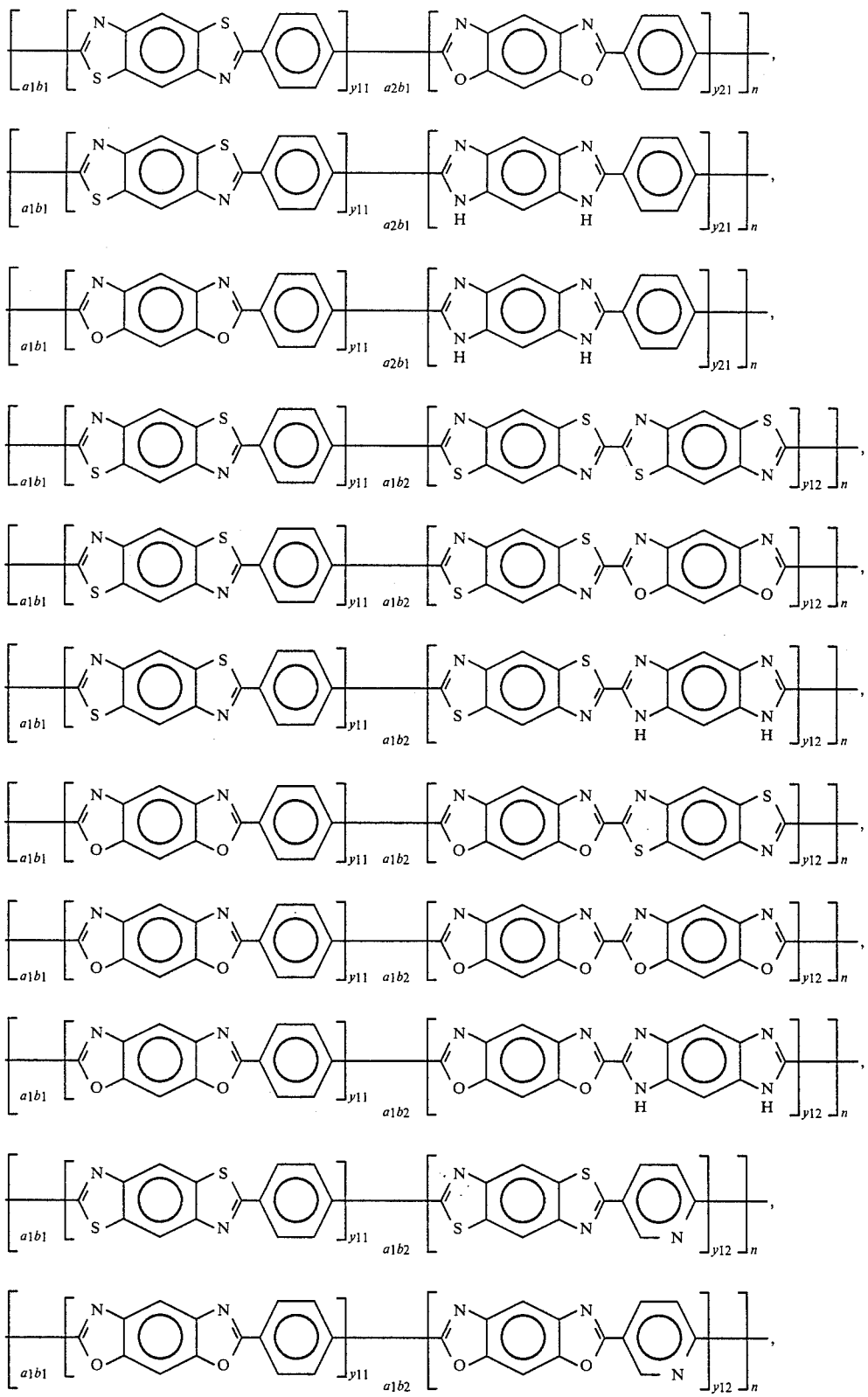

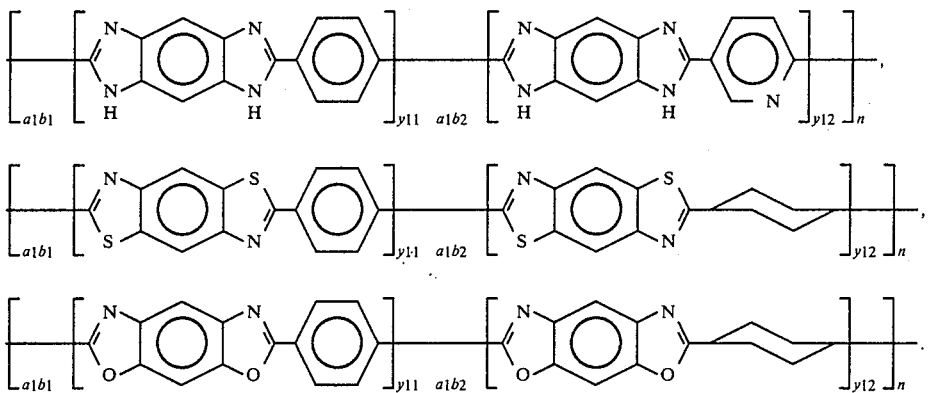

Since the recurring units of the copolymers are of essentially comparable mesogenicity, a broad range of copolymer compositions may be achieved; for instance, $a_1b_1$ can range from nearly zero to nearly one while $a_1b_2$ or $a_2b_1$ (because it is equal to $1-a_1b_1$) ranges from nearly one to nearly zero, respectively. The average block lengths $y_{11}$ and $y_{12}$ or $y_{21}$ are governed by the method of monomer addition described above and the molar quantities selected. Thus, for monomer pairs of essentially equal reactivity, $y_{11}$, which equals $1/1-a_1b_1$, may range from nearly one to very high values. In a like manner, $y_{12}$ or $y_{21}$ can range from very high values to nearly one. Monomer purity, control of stoichiometry, and exclusion of side reactions caused by oxidizing impurities must be sufficient to obtain an overall copolymer length, n, greater than about 50 in order to obtain the desired polymeric properties of useful mechanical strength, modulus, etc. The practice of the invention as it relates to copolymers derived from Class 1 monomers is further illustrated in Examples 49–51 and 54–66 below.

General formula IX copolymers may be prepared from type (1,1) (2,1) and (2,2) monomers and from type (1,1), (1,2) and (2,1) monomers. These monomers are classified as Class 2 owing either to a moderately reduced mesogenic character of the recurring unit derived from them or to their tendency to reduce the solubility range of the resulting polymer, which in turn is usually owing to an overall reduction of the heteroatom/hydrocarbon ratio of the resulting polymer. Both of these conditions dictate that incorporation of Class 2 monomers into copolymers of the present invention should be carefully selected. The degree of this selectivity is illustrated by the following copolymers prepared in accordance with the practice of the invention.

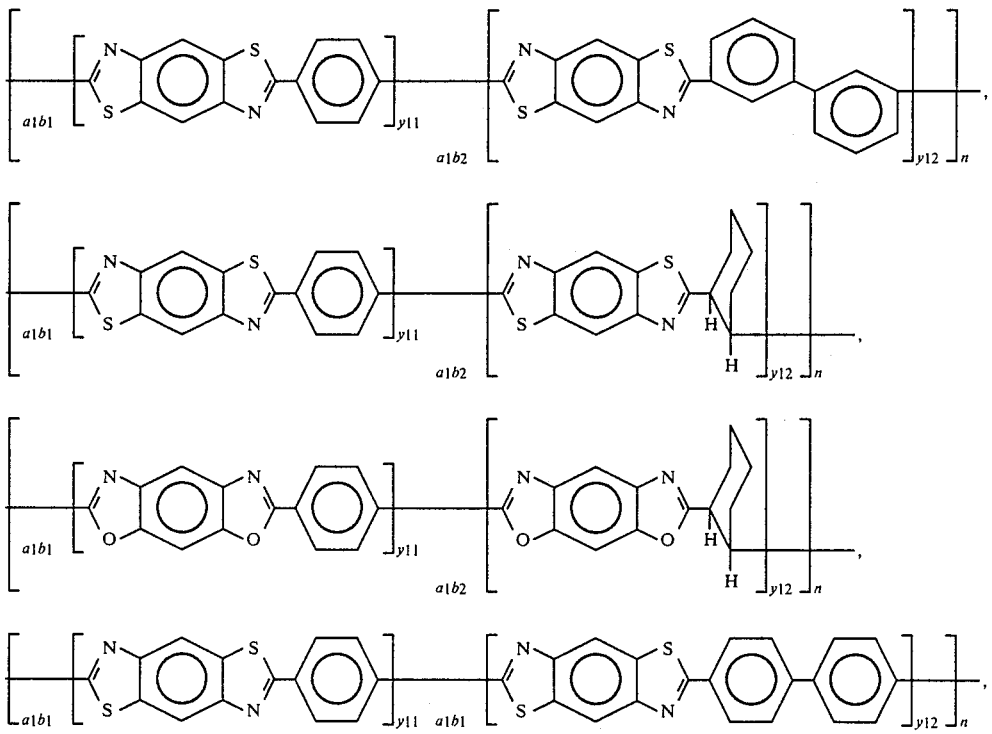

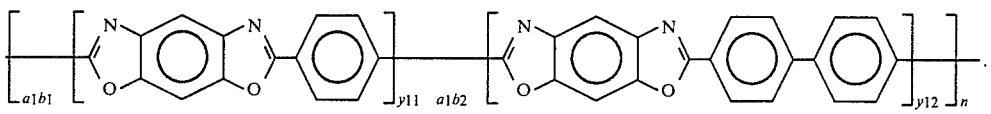

The immediately preceding list of copolymers is derived from monomer compositions containing monomers imparting reduced solubility to the copolymer. The preferred values of $a_1b_1$ (i.e., the mole fraction of the more soluble recurring unit) are those greater than about 0.8, leading to values of $y_{11}$ greater than about 5 and $y_{12}$ values of nearly one. Monomer purity, control of stoichiometry, exclusion of oxidizing impurities, and selection of the molar quantity of the less soluble monomer to maintain copolymer solubility must be sufficient to achieve an average n value of greater than about 50. Increased proportion of a less soluble monomer may be achieved by selecting comonomers that impart improved solubility to the copolymer. In general, monomers of Type 1 wherein X is S impart greater solubility than those in whic X is O or N. The practice of the invention as it relates to copolymers of partially reduced solubility is further illustrated in Examples 52, 53, 70, 71, and 72 below.

The following list of copolymers is derived from incorporation of monomers of moderately reduced mesogenicity and the practice of the invention is illustrated for them.

and about 22 weight percent. If the molar proportion of the more highly mesogenic recurring unit (i.e., $a_1b_1$) is selected to have values of greater than about 0.6, preferably greater than about 0.75, then the range of operable concentrations is increased to include concentrations of the copolymer in greater than about 8 weight percent, preferably above about 10 weight percent. Values of n greater than about 50 are preferable as stated above.

General formula IX copolymer compositions may be prepared from Class 3 monomers.

Monomers characterized as belonging to Class 3 lead to polymer recurring units that have little or no mesogenic character. Their incorporation into copolymers prepared as above are within the scope of the present invention but are less preferred because the random incorporation of a significant molar proportion of these nonmesogenic units leads to insufficient block length of the mesogenic recurring unit or units to impart liquid-crystalline behavior. Incorporation of less than about 3 molar percent of Class 3 monomers is preferred. Increased incorporation of Class 3 polymers are highly preferred by use of a block polymer procedure described below. A less preferred embodiment of the pres-

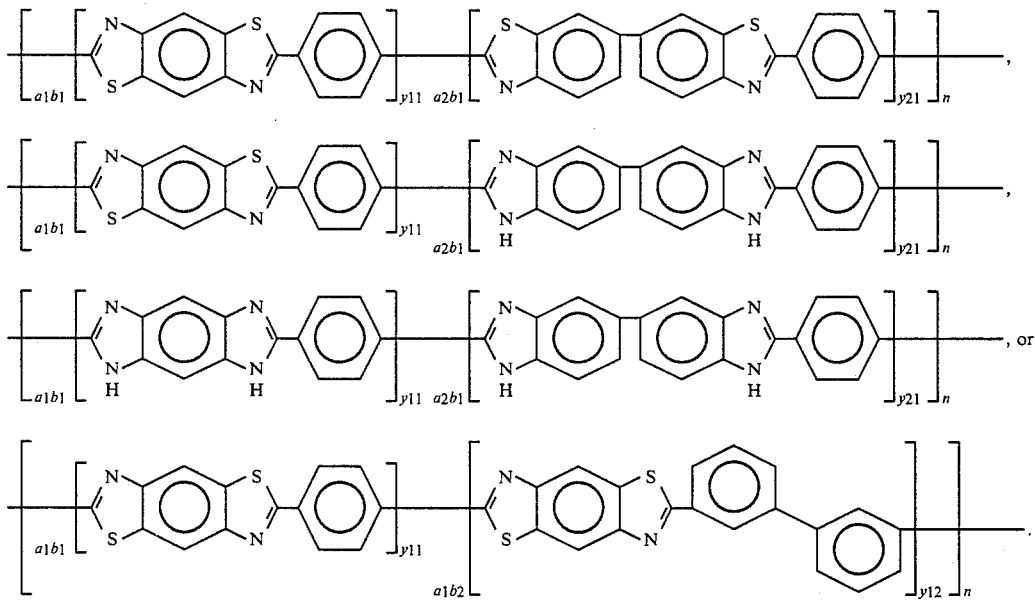

The preferred ranges of $a_1b_1$ are from nearly zero to nearly one for copolymers in this classification with the overall proviso that the overall copolymer concentration in the polyphosphoric acid be above a critical concentration determined by the least mesogenic recurring unit. Thus, above about 13% the above copolymers may have $a_1b_1$ values between about one and zero, $y_{11}$ values of nearly one and greater, and $y_{21}$ values of nearly one and greater. The preferred concentration with these $a_1b_2$ and $a_2b_1$ values may be between about 15 ent invention is the preparation of General formulas X, XV, and XVII by the addition of monomers of Types 3, 5, and 9, respectively, to the initial solution of the above copolymer procedure. The unique feature of the geometry of monomers of Types 3 (except for 3k), 5, and 9 is the requirement that the block lengths, $y_k$, be large or, if small, be an even number. This condition dictates that preferred compositions of formulas X, XV, and XVII are prepared by a block polymer procedure described below.

The general formula XI copolymer composition shown above is prepared according to the following procedure:

(a) mixing at leat two of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) then increasing the phosphorus pentoxide content of the mixture resulting from step (b) to provide a first monomer reaction medium of greater phosphorus pentoxide content suitable for polymerization, (d) causing polymerization of the first and second monomer at a temperature sufficient to effect reaction at a rate to form a first co-oligomeric product having a preselected intrinsic viscosity or a first copolymeric product.

Selected molar quantities ($c_1m, c_2m, \ldots c_km$) of Type 3 monomers may be mixed with a phosphoric acid having a phosphorus pentoxide content of from about 63% to about 78%, preferably greater than about 68%, most preferably about 78%, and the protecting groups, if present, may be substantially removed by heating, and applying reduced pressure, if desired. The quantity of phosphoric acid is determined in accordance with equation a* above, making the necessary calculations for the addition of monomers of possibly different molecular weights and different proportions. The phosphorus pentoxide content of the resulting mixture may then be raised in accordance with equation b* above, so as to raise the final phosphorus pentoxide of the substantially copolymerized mixture to a value greater than about 81%, most preferably between about 82% to about 83% but less than about 84%. The resulting mixture may then be heated to about 100° C. to about 200° C., most preferably between about 150° C. to about 185° C. within a practical period of time, preferably within a time period of less than about 1 hour to about 5 hours or more, and most preferably within a period of about 1 hour to about 3 hours, and then maintained at the selected temperature for sufficient time to achieve the desired n value.

The practice of the present invention as it relates to the production of novel liquid-crystalline compositions that include copolymers with the general formula XI is further illustrated for those compositions wherein the selected monomers of Type 3 are further classified as being of Type (3,2).
The polymers

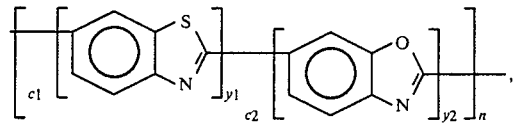

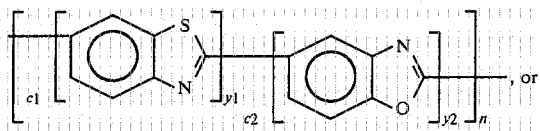

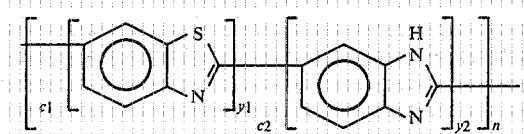

are prepared according to the above procedure wherein $c_1$ is the molar proportion of the more soluble recurring unit and selected to be above about 0.5, more preferably above about 0.7, to ensure the solubility of the resulting copolymer to the high concentrations required for liquid-crystalline behaviour. A weight percent of the copolymer above about 15 weight percent, more preferably above about 17.5 weight percent, may be selected. Molar proportions selected above and monomer reactivity ratios determine the average block lengths $y_1$ and $y_2$. The block length does not bear on whether liquid-crystalline behavior in polyphosphoric acid is obtained with these polymers. The important factor is the maintenance of solubility at high concentration and the preparation of these copolymers in polyphosphoric acid at high concentration from monomers.

Blockpolymeric Compositions and their preparation

In accordance with a still further aspect of the invention, there is provided a liquid-crystalline composition useful in the preparation of fibers and films comprising a polycondensation product consisting essentialy of a blend of certain polyphosphoric acids and a high concentration of at least one high molecular weight extended chain block polymer having the general formulas:

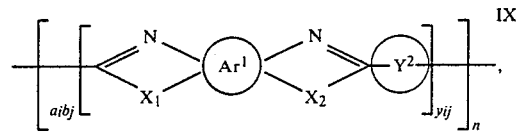

wherein $Ar^1$ represents an aromatic moiety and is XXX as defined above, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or represents a bivalent organic radical and is XXXI as defined above, $a_ib_j$ represents the molar proportions of the respective different recurring units present in said block polymer, $y_{ij}$ represents an average number of the respective different sequential recurring units present in said block polymer, n being a positive integer;

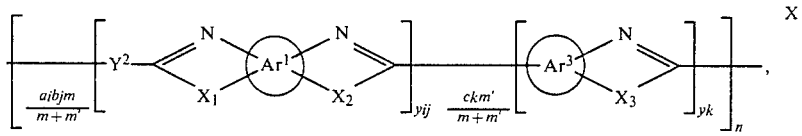

wherein Ar[1] represents an aromatic moiety and is XXX as defined above, $X_1$ and $X_2$ are the same or different and are sulfur, oxygen, or NR (R being hydrogen or an organic group), the nitrogen atoms and $X_1$ and $X_2$ being bonded to aromatic carbon atoms of Ar[1], N and $X_1$ or $X_2$ of each hetero ring are disposed ortho to one another and $Y^2$ is nil or represents a bivalent organic radical and is XXXI as defined above, $a_ib_jm/m+m'$ represents the molar proportions of the respective different recurring units present in said block polymer, $y_{ij}$ represents an average number of the respective different sequential recurring units present in said block polymer, Ar[3] represents an aromatic moiety and is XXII as defined above, $X_3$ is sulfur, oxygen, or NR (R being hydrogen or an organic group), the nitrogen atoms and $X_3$ being bonded to aromatic carbon atoms of Ar[1], N and $X_3$ of each hetero ring are disposed ortho to one another, $c_km'/m+m'$ represents the molar proportions of the respective different recurring units present in said block polymer, $y_k$ represents an average number of the respective different sequential recurring units present in said block polymer, n being a positive integer;

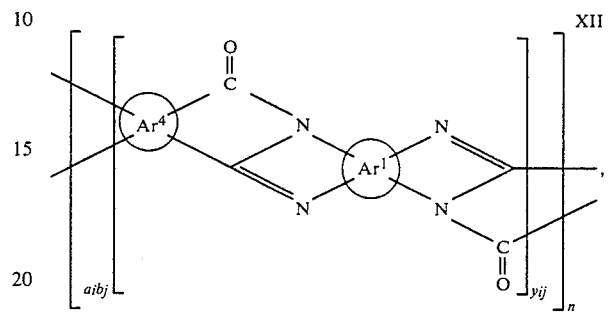

wherein Ar[1] represents an aromatic moiety and is XXXII as defined above, Ar[4] represents a different aromatic moiety and is XXIII as defined above, the nitrogen atoms being bonded to Ar[1] and the carbon atoms being bonded to Ar[4], $a_ib_j$ represents the molar proportions of the respective different recurring units present in said block polymer, $y_{ij}$ represents an average number of the respective different sequential recurring units present in said block polymer, n being a positive integer;

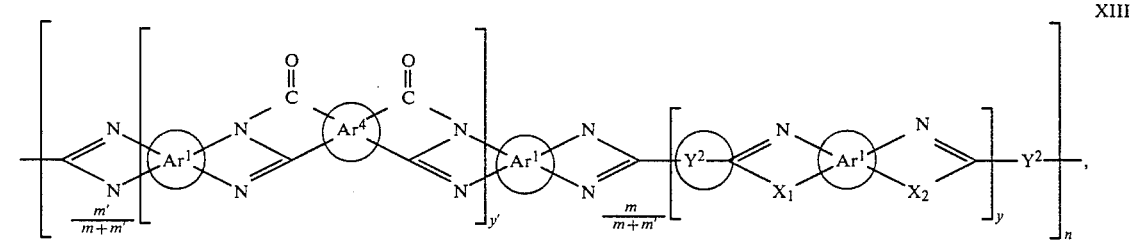

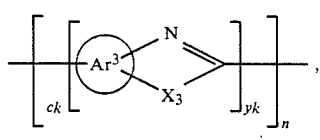

wherein Ar[3] represents an aromatic moiety and is XXII as defined above, $X_3$ is sulfur, oxygen, or NR (R being hydrogen or an organic group), the nitrogen atoms and $X_3$ being bonded to aromatic carbon atoms of Ar[3], N and $X_3$ of each hetero ring are disposed ortho to one another, $c_k$ represents the molar proportions of the respective different recurring units present in said block polymer, $y_k$ represents an average number of the respective different sequential recurring units present in said block polymer, n being a positive integer;

wherein Ar[1] represents an aromatic moiety and is XXXII or XXX as defined above with the proviso that when Ar[1] is bonded to nitrogen atoms Ar[1] is XXXII and when Ar[1] is bonded to both nitrogen atoms and $X_1$ and $X_2$, Ar[1] is XXX as defined above, Ar[4] represents a different aromatic moiety and is XXIII as defined above, the carbon atoms being bonded to Ar[4], $m'/m+m'$ represents the molar proportions of the respective different recurring units present in said block polymer, $y'$ represents an average number of the respective different sequential recurring units present in said block polymer, $X_1$ and $X_2$ are the same or different and are sulfur, oxygen, or NR (R being hydrogen or an organic group), the nitrogen atoms and $X_1$ and $X_2$ being bonded to aromatic carbon atoms of Ar[4], N and $X_1$ and $X_2$ of each hetero ring are disposed ortho to one another and $Y^2$ is nil or represents a bivalent organic radical and is XXXI as defined above, $m/m+m'$ represents the molar proportions of the respective different recurring units present in said block polymer, y represents an average number of the respective different sequential recurring units present in said block polymer, n being a positive integer;

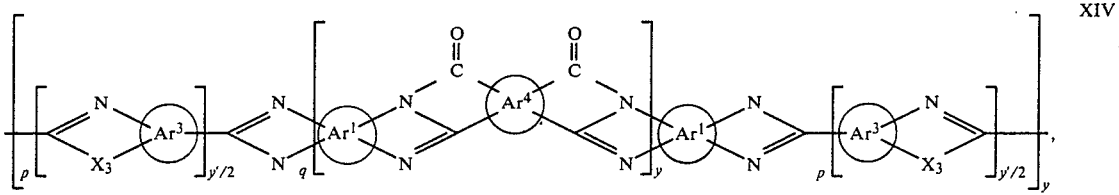

wherein Ar³ represents an aromatic moiety and is XXII as defined above, X₃ is sulfur, oxygen, or NR (R being hydrogen or an organic group), the nitrogen atoms and X₃ being bonded to aromatic carbon atoms of Ar³, N and X₃ of each hetero ring are disposed ortho to one another, p represents the molar proportions of the respective different recurring units present in said block polymer, y'/2 represents an average number of the respective different sequential recurring units present in said block polymer, Ar¹ represents an aromatic moiety and is XXXII as defined above, Ar⁴ represents a different aromatic moiety and is XXIII as defined above, the nitrogen atoms being bonded to Ar¹ and the carbon atoms being bonded to Ar⁴, q represents the molar proportions of the respective different recurring units present in said block polymer, y represents an average number of the respective different sequential recurring units present in said block polymer, n being a positive integer;

tive different sequential recurring units present in said block polymer, $a_ib_jm/m+m'$ represents the molar proportions of the respective different recurring units present in said block polymer, $y_{ij}$ represents an average number of the respective different sequential recurring units present in said block polymer, n being a positive integer;

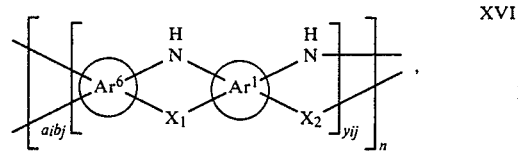

wherein Ar¹ represents an aromatic moiety and is XXX as defined above, Ar⁶ represents a different aromatic moiety and is XXV as defined above, X₁ and X₂ are the same or different and are sulfur, oxygen, or NR (R being hydrogen or an organic group), the NH groups and X₁ and X₂ being bonded to aromatic carbon atoms

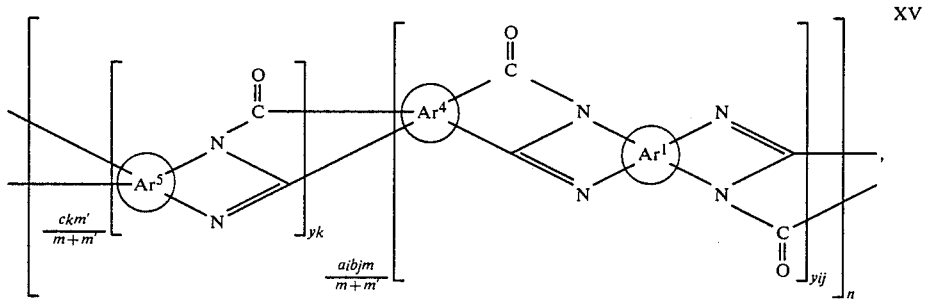

wherein Ar⁴ represents a different aromatic moiety and is XXIII as defined above, Ar¹ represents an aromatic moiety and is XXXII as defined above, and Ar⁵ represents an aromatic moiety different from Ar⁴ and Ar¹ and is XXIV as defined above, the carbon atoms being bonded to Ar⁴ and Ar⁵ and the nitrogen atoms being bonded to Ar¹ and Ar⁵, n being a positive integer; $c_km'/m+m'$ represents the molar proportions of the respective different recurring units present in said block polymer, $y_k$ represents an average number of the respecof Ar⁶ and Ar¹, NH and X₁ or X₂ of each hetero ring are disposed ortho to one another, $a_ib_j$ represents the molar proportions of the respective different recurring units present in said block polymer, $y_{ij}$ represents an average number of the respective different sequential recurring units present in said block polymer, n being a positive integer;

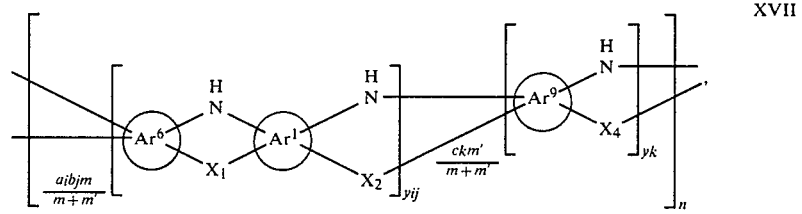

wherein Ar¹ represents an aromatic moiety and is XXX as defined above, Ar⁶ represents a different aromatic moiety and is XXV as defined above, $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_j b_j m/m+m'$ represents the molar proportions of the respective different recurring units present in said block polymer, $y_{ij}$ represents an average number of the respective different sequential recurring units present in said block polymer, $Ar^9$ represents an aromatic moiety different from $Ar^6$ and $Ar^1$ and is XXVI as defined above, $X_4$ is sulfur, oxygen, or NR (R being hydrogen or an organic group), the NH groups and $X_4$ being bonded to aromatic carbon atoms of $Ar^6$ and $Ar^9$, $c_k m'/m+m'$ represents the molar proportions of the respective different recurring units present in said block polymer, $y_k$ represents an average number of the respective different sequential recurring units present in said block polymer, n being a positive integer; or

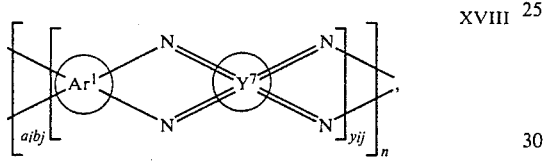

XVIII wherein $Ar^1$ represents an aromatic moiety and is XXXII as defined above, $Y^7$ represents an aromatic or heteroaromatic moiety and is XXVIII as defined above, the nitrogen atoms being bonded to aromatic carbon atoms of $Ar^1$ and bonded to adjacent carbon atoms of $Y^7$, $a_j b_j$ represents the molar proportions of the respective different recurring units present in said block polymer, $y_{ij}$ represents an average number of the respective different sequential recurring units present in said block polymer, n being a positive integer.

In accordance with the practice of the present invention, the synthesis of the aforementioned formulas IX--XIX block polymers may be illustrated by the following general reaction system:

Reaction Mechanism

Formation of formula IX block polymer

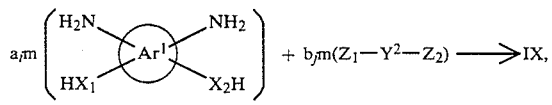

Formation of formula X block polymer

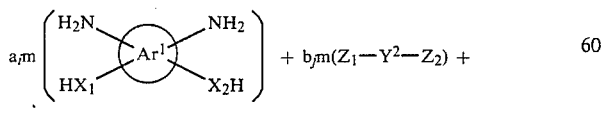

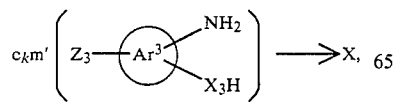

Formation of formula XI block polymer

-continued
Reaction Mechanism

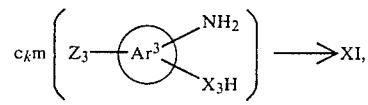

Formation of formula XII block polymer

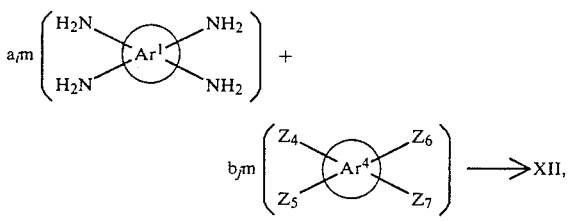

Formation of formula XIII block polymer

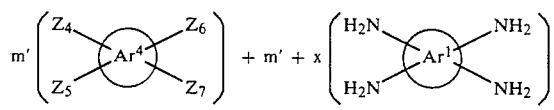

and

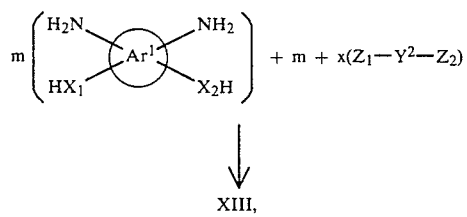

XIII,

Formation of formula XIV block polymer

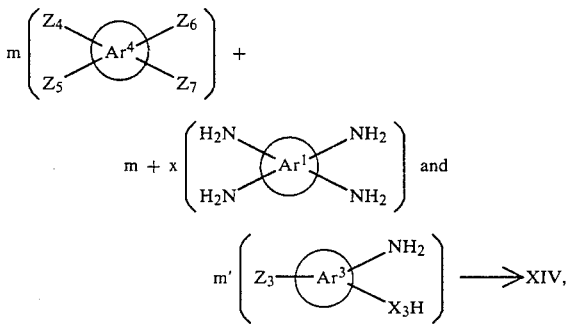

Formation of formula XV block polymer

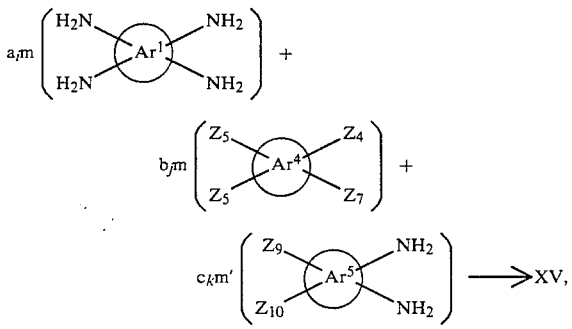

Formation of formula XVI block polymer

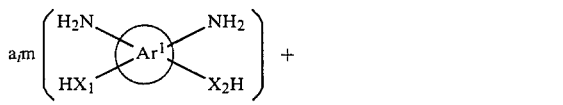

-continued
Reaction Mechanism

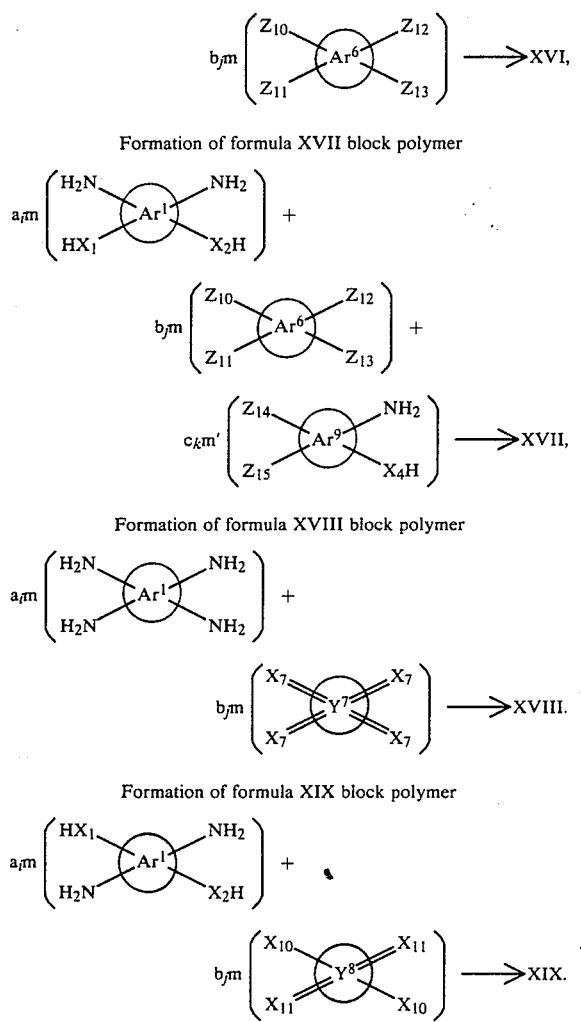

The above-mentioned formulas IX, XII, XVI, XVIII, and XIX block polymer compositions may be prepared in accordance with the above process parameters by:

(a) mixing at least one of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) adding at least one of a selected second monomer in the resulting mixture of step (b) to provide a mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization, (e) causing polymerization of the first and second monomer at a temperature sufficient to effect reaction at a rate to form a first homo-oligomeric product having a preselected intrinsic viscosity, (f) mixing a selected amount of the first homo-oligomeric product with a selected amount of at least one of a selected second homo-oligomeric product so as to form a first poly-oligomeric product, said second homo-oligomeric product being formed by like steps (a), (b), (c), (d), and (e) with the overall proviso that at least one of the selected monomer of step (a) or (c) which forms the second homo-oligomeric product be different from at least one of the selected monomer of step (a) or (c) which forms the first homo-oligomeric product, (g) causing polymerization of the poly-oligomeric product at a temperature sufficient to effect reaction at a rate to form a first block-oligomeric product having a preselected intrinsic viscosity or a first block-polymeric product.

Alternatively, formulas IX, XII, XVI, XVIII, and XIX block polymer compositions may be prepared by:

(a) mixing at least one of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) adding at least one of a selected second monomer in the resulting mixture of step (b) to provide a first mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization, (e) causing polymerization of the first and second monomer at a temperature sufficient to effect reaction at a rate to form a first homo-oligomeric product having a preselected intrinsic viscosity, (f) mixing a selected amount of the first homo-oligomeric product with a selected amount of a second mixture of a different first and second monomer in the preliminary solvent, said second mixture being formed by like steps (a), (b) and (c) with the overall proviso that at least one of the selected monomer of step (a) or (c) which forms the second mixture be different from at least one of the selected monomer of step (a) or (c) which forms the first homo-oligomeric product, (g) then increasing the phosphorus pentoxide content of the mixture resulting from step (f) to provide a first oligomer-monomer reaction medium of greater phosphorus pentoxide content suitable for polymerization, (h) causing polymerization of the mixture resulting from step (g) at a temperature sufficient to effect reaction at a rate to form a first block-oligomeric product having a preselected intrinsic viscosity or a first block-polymeric product.

The above IX–XIX block polymers forming the liquid crystalline block polymer compositions of the instant invention can be characterized as having more than one recurring unit, the distribution or sequencing of which may be different from that obtained by the random condensation of monomers as in the copolymers described above and is further characterized as having contiguous blocks of the same recurring unit as obtained by the random condensation of oligomers.

The preferred formulas IX, XII, XVI, XVIII, and XIX block polymers are those polymers wherein $a_ib_j$ is the mole fraction of the recurring unit formed by the condensation of a homo-oligomeric reaction product (defined below) derived from the ith monomer of Type 1 with a stoichiometric quantity of jth monomer of Type 2, 4, 6, 7, or 8, respectively, and incorporated by a block-polymeric procedure described below, and $y_{ij}$ and n have the same meaning as described above for copolymers.

The preferred XI block polymers are those wherein $c_k$ is the mole fraction of the recurring unit formed by the condensation of a homo-oligomeric reaction product (defined below) derived from the kth monomer of Type 3 and incorporated by a block polymeric procedure described below, and $y_k$ and n are as defined for copolymers.

The preferred X, XV, and XVII block polymers are those wherein $a_ib_jm/m+m'$ is the mole fraction of the recurring unit formed by the condensation of m moles of recurring units of a homo-oligomeric reaction product derived from the ith monomer of Type 1 and the jth monomer of Type 2, 4, or 6 and combined with m' moles of recurring units of a homo-oligomeric reaction product derived from condensation of the kth monomer of Type 3, 5, or 9, respectively, and $y_{ij}$, $y_k$, and n are as defined for copolymers.

The preferred XIII block polymers are those wherein m' and m are appropriate molar quantities of the monomers that form the reaction products and are selected to give desired yields and molar proportions of the respective recurring units, y' and y are block lengths as defined above, n is the total number of recurring units, and x is a molar quantity substantially less than m' that is selected to give an appropriate block length of the first homo-oligomer end-capped with o-diamine functional groups, The preferred XIV block polymers are those wherein m', m, x, n, y, y' are as defined above, q is equal to m'/m+m' and p is equal to m/2(m+m').

Selected molar quantity, m, of a monomer of Type 1 may be mixed with a phosphoric acid having a phosphorus pentoxide content of from about 63% to about 78%, preferably greater than about 68%, most preferably about 78%, and the protecting groups, if present, may be removed as described previously. The quantity of the phosphoric acid is most desirably determined in accordance with equation a* as described above. A stoichiometric quantity (i.e., m) of a monomer of Type 2, 4, 6, 7, or 8 may then be added to the resulting solution. The phosphorus pentoxide content of the resulting mixture may then be raised in accordance with equation b* given above, so as to raise the final phosphorus pentoxide content of the substantially polymerized mixture to a value greater than about 81%, most preferably between about 82% to about 83.5%, but less than about 84%. The resulting mixture may then be heated to about 100° C. to about 185° C., most preferably to about 170° C. to about 185° C., within a practical period of time, preferably within a period of from less than about one to about 5 hours, most preferably from about one to about 3 hours. This temperature is maintained for sufficient time to achieve a selected n value, hereinafter referred to as the homo-oligomeric n value, that is above a selected minimum value to be described for specific cases below, is characterized as being equal to $\frac{1}{2}(1-p)$, where p is the extent of reaction, defined as the mole fraction of either type of functional group present that has undergone condensation, and being preferably below a selected maximum value characteristic of complete polymerization. A selected molar quantity, $m_{ij}$, of the homo-oligomeric reaction product thus obtained is diverted into a second vessel containing a selected molar quantity, $m_{ij}$, of a similarly obtained but structurally different homo-oligomeric reaction product and the heating at elevated temperatures continued.

The average block lengths, $y_{ij}$, of the block polymers of the compositions of the present invention may be determined in the following way. The ijth homo-oligomeric reaction product is prepared by adding $a_i$ moles of a first monomer to an equimolar $b_j$ of the second monomer. The sum of all $a_i$ or $b_j$ is one. The ijth homo-oligomeric reaction product prepared above has, by definition, been polymerized to a selected intermediate extent of reaction, $P_{ij}$. The homo-oligomeric n value of the ijth homo-oligomeric reaction product, $n_{ij}$, is given by $\frac{1}{2}(1-p_{ij})$. The molar proportions of the recurring units incorporated into the block polymer is given by $$\sqrt{a_ib_j}$$

The block lengths $y_{ij}$ may be calculated by the equation $$Y_{ij} = \frac{n_{ij}}{1 - \frac{\sqrt{a_ib_j}\,(1-P_{ij})}{\sum_{ij}\sqrt{a_ib_j}\,(1-P_{ij})}}$$

which assumes that the homo-oligomers condense with equal reactivity. The above equation for $y_{ij}$ shows that if either of two homo-oligomeric reaction products are polymerized to high conversion, (i.e., allowed to achieve a high $n_{ij}$ value before mixing) then both block lengths in the resulting block polymer will be high.

The practice of the present invention as it relates to the production of novel liquid-crystalline compositions that include block polymers with the general formulas IX, XII, XVI, XVIII, and XIX is illustrated for those compositions including general formula IX wherein the selected first homo-oligomer may be prepared from monomers of Type 1 and Type 2 that are further classified as belonging to Class 1 and the selected second homo-oligomer is further characterized as belonging to either Class 1, Class 2, or Class 3.

General formula IX block polymers may be prepared from homo-oligomers derived exclusively from Class 1 monomers. The block polymers, about 75, most preferably from about 25 to about 50, by selecting appropriate $p_{11}$ and $p_{12}$, $p_{21}$, or $p_{22}$ values. In practice, the members of this selected class of block

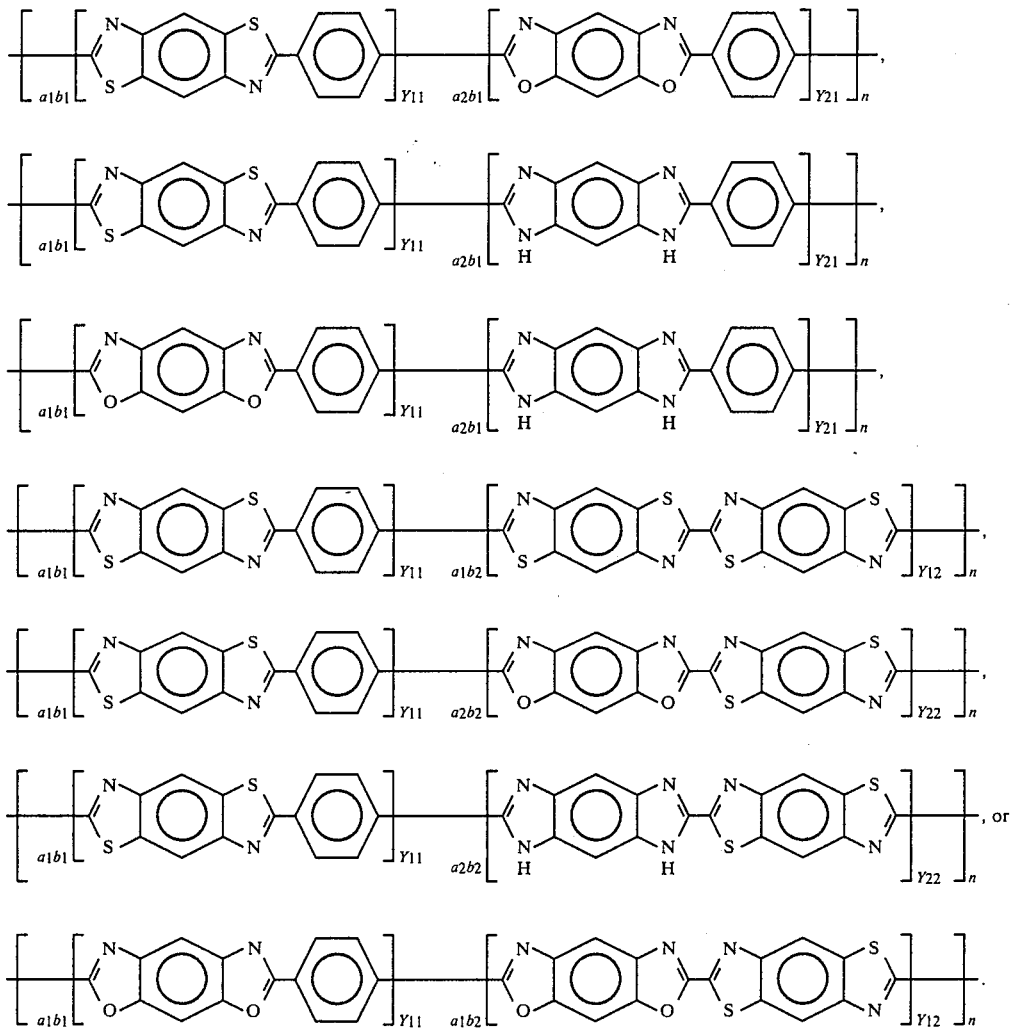

have the same advantage of a broad range of operable concentrations as described for copolymers formed exclusively from Class 1 monomers. The advantage to the block polymer procedure described above for these polymers is the ability to vary $y_{11}$ and $y_{12}$, or $y_{21}$, or $y_{22}$ essentially independent of the molar proportion $a_1b_1$, or $a_2b_2$, or $a_2b_1$, or $a_1b_2$ by selecting appropriate extents of reaction for the corresponding homo-oligomer. For example, $y_{11}$ may be 20 or greater for a broad range of $a_1b_1$ values by increasing the extent of reaction, $p_{11}$, as the $a_1b_1$ value is decreased. $y_{12}$, $y_{21}$, or $y_{22}$ of the above formulas may be obtained with values from about one to polymers, because all the recurring units have a high degree of mesogenicity, are liquid-crystalline when an n value of greater than about 40 is obtained at a concentration of greater than about 6 weight percent independent of the block lengths achieved. The practice of the invention as it relates to block polymers of Class 1 is further illustrated in Examples 75-84 below.

General formula IX block polymers may be prepared from a first homo-oligomer of Class 1 and a second homo-oligomer derived from monomer pairs containing Class 2 monomers. The block polymers,

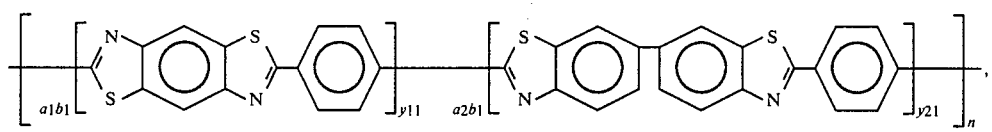

-continued

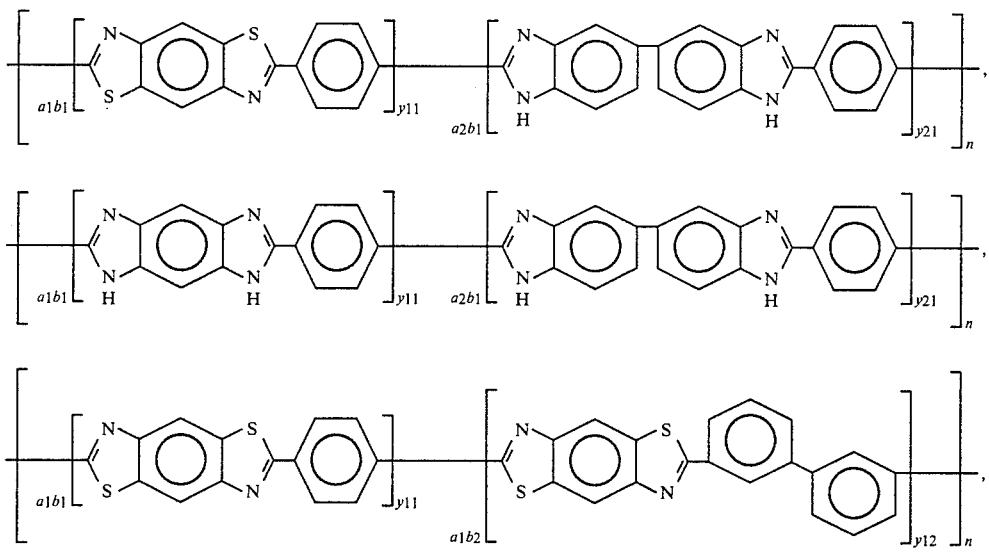

are derived from homo-oligomers of different mesogenicity. The selection of $a_1b_1$ (the molar proportion of the first and more highly mesogenic recurring unit) and the preferred $y_{11}$ (the average block length of the first and more highly mesogenic recurring unit) are governed by the following considerations. The block polymer reaction product is the first case may derive liquid-crystalline behavior by virtue of the sole presence of the first recurring unit when $y_{11}$ is greater than about 30, more preferably greater than about 40, at concentrations of the first recurring unit alone (i.e., the weight of the first oligomer added/weight of the final block polymer reaction product) greater than about 7 percent, or the block polymer reaction product in the second case may derive liquid-crystalline behavior by virtue of the combined presence of both recurring units, independent of $y_{11}$, at concentrations above which the moderately mesogenic recurring unit derived from the second homo-oligomer is liquid-crystalline alone. The preferred values of $a_1b_1$ are from about 0.4 to about one, with $y_{11}$ ranging from about 80 to about 20, respectively, as $a_1b_1$ is varied from 0.4 to one. The most preferred concentrations of these block polymers is above about 15 weight percent but may be lower as either the $a_1b_1$ value or the $y_{11}$ value or both values are increased. The preferred n value for these compositions is from about 50 to 150, most preferably greater than 100. Obtaining sufficient n values may be aided by the addition of the second homo-oligomeric reaction product before the phosphorus pentoxide content is raised to the value necessary for polymerization (i.e., when $p_{12}$ or $p_{21}$ is zero and $n_{12}$ or $n_{21} = \frac{1}{2}$) and then adding the appropriate amount of phosphorus pentoxide to raise the mixture to sufficient phosphorus pentoxide content. This procedure aids in mixing and is most preferred when the homo-oligomeric n value of the first homo-oligomer, $n_{11}$, is large. The practice of the invention as it relates to the preparation of block polymers of Class 2 is further illustrated in Examples 85–88 below.

General formula IX block polymers may be prepared from a first homo-oligomer of Class 1 and a second homo-oligomer derived from monomer pairs containing Class 3 monomers. The block polymers

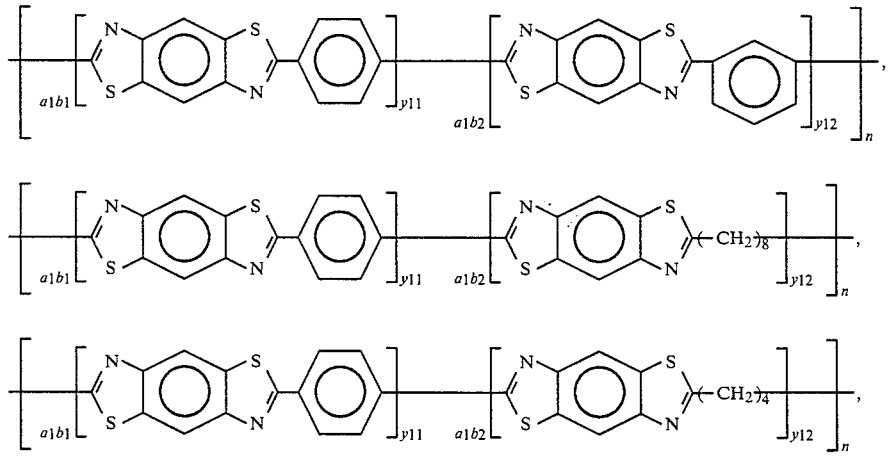

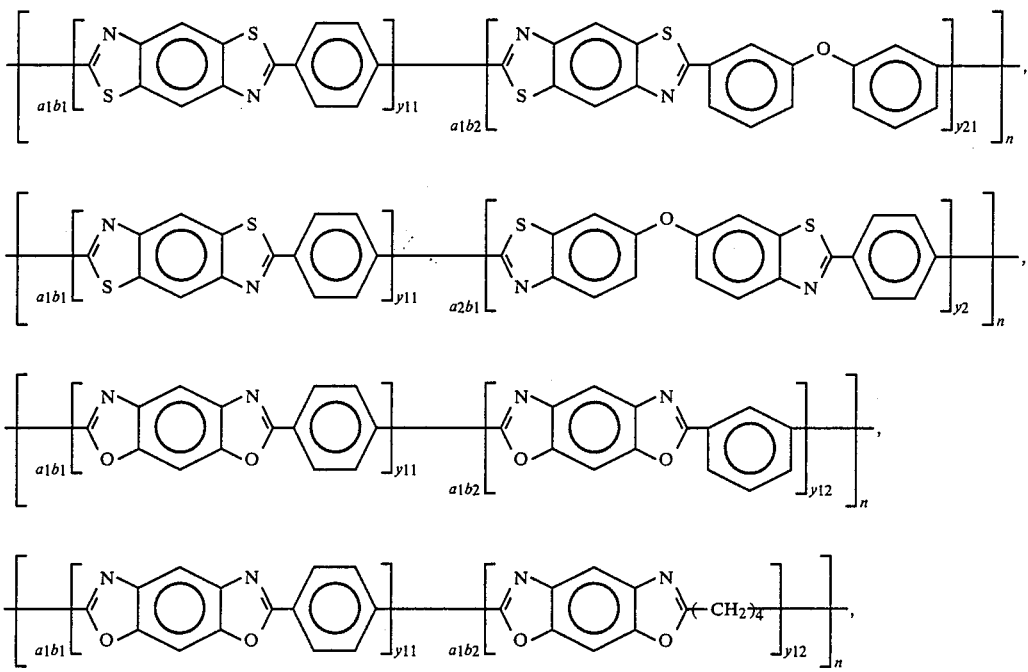

derive their liquid-crystalline behavior entirely from the presence of the first recurring unit, its average block length $y_{11}$, and its concentration alone in the total weight of the final block polymer reaction product. Thus, the values of $a_1b_1$, $y_{11}$, and concentration must meet the conditions of the first case described for the block polymers containing Class 2 monomers. The method of the invention allows the preparation of such highly concentrated mixtures of mesogenic units, i.e., reaction products substantially higher in polymer concentration than that required for liquid-crystalline behavior, that incorporation of significant amounts of non-mesogenic units is possible if the above conditions are met.

The preferred values of $a_1b_1$ are from about 0.6 to about one. The preferred values of $y_{11}$ are from at least about 30 to about 100, more preferably between about 50 to 100. The preferred values of $y_{12}$ or $y_{21}$ are from about one to about 50. The preferred values of n are from about 50 to 200 with the most preferred values being about 100 to 150. The preferred selected concentrations of the block polymer are above about 15 weight percent, especially as the proportion of the non-mesogenic recurring unit is increased. The practice of the invention as it relates to production of block polymers containing Class 3 monomers is further illustrated in Examples 73, 74, 89-94 below.

The practice of the invention as it relates to the production of novel liquid-crystalline compositions that include block polymers with the general formulas X, XV, XVII are illustrated for block polymers of formula X wherein the selected first homo-oligomer is prepared from Type (1,1) or (1,2) and Type (2,1) monomers and the selected second homo-oligomer is prepared from monomers of Type (3,2).

The general formulas X, XV, and XVII liquid crystalline block polymer compositions shown above are prepared according to the following procedure:

(a) mixing at least one of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) then increasing the phosphorus pentoxide content of the mixture resulting from step (b) to provide a first monomer reaction medium of greater phosphorus pentoxide content suitable for polymerization, (d) causing polymerization of the first monomer at a temperature sufficient to effect reaction at a rate to form a first homo-oligomeric product having a preselected intrinsic viscosity, (e) mixing a selected amount of the first homo-oligomeric product with a selected amount of at least one of a selected second homo-oligomeric product so as to form a first poly-oligomeric product, said second homo-oligomeric product being formed by like steps (a) and (b) followed by:

(1e) adding at least one of a selected second monomer in the resulting mixture of step (b) to provide a mixture of a first and second monomer in the preliminary solvent, (2e) then increasing the phosphorus pentoxide content of the mixture resulting from step (1e) to provide a first and second monomer reaction medium of greater phosphorus pentoxide content suitable for polymerization, (3e) causing polymerization of the first and second monomer at a temperature sufficient to effect reaction at a rate to form said second homo-oligomeric product having a preselected intrinsic viscosity, with the overall proviso that at least one of the selected monomer of step (a) or (1e) which forms the second homo-oligomeric product be different from at least one of the selected monomer of step (a) which forms the first homo-oligomeric product, (f) causing polymerization of the poly-oligomeric product at a temperature sufficient to effect reaction at a rate to form a first block-oligomeric product having a preselected intrinsic viscosity or a first block-polymeric product.

Alternatively, the general formulas X, XV, and XVII liquid crystalline block polymer compositions shown above may be also prepared by:

(a) mixing at least one of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) mixing a selected amount of the solution of step (b) with a selected amount of at least one of a selected first homo-oligomeric product so as to form a first oligomeric-first monomer reaction medium, said first homo-oligomeric product being formed by like steps (a) and (b) followed by:

(1c) adding at least one of a selected second monomer in the resulting solution of step (b) to provide a mixture of a first and second monomer in the preliminary solvent, (2c) then increasing the phosporus pentoxide content of the mixture resulting from step (1) to provide a first and second monomer reaction medium of greater phosphorus pentoxide content suitable for polymerization.

(3c) causing polymerization of the first and second monomer at a temperature sufficient to effect reaction at a rate to form said first homo-oligomeric product having a preselected intrinsic viscosity, with the overall proviso that at least one of the selected monomer of step (a) or (1c) which forms the first monomer mixture, be different from at least one of the selected monomer of step (a) which forms the first homo-oligomeric product, (d) then increasing the phosphorus pentoxide content of the mixture resulting from step (c) to provide a reaction medium of greater phosphorus pentoxide content suitable for polymerization, (e) causing polymerization of the first oligomer-monomer at a temperature sufficient to effect reaction at a rate to form a first block-oligomeric product having a preselected intrinsic viscosity or a first block-polymeric product.

General formula X block polymers may be derived from a first homo-oligomer of Class 1 and a second homo-oligomer of Type (3,2). The block polymers of general formula X are prepared by a procedure analogous to the procedure described for general formula IX block polymers, except that the second homo-oligomer is prepared from a single monomer.

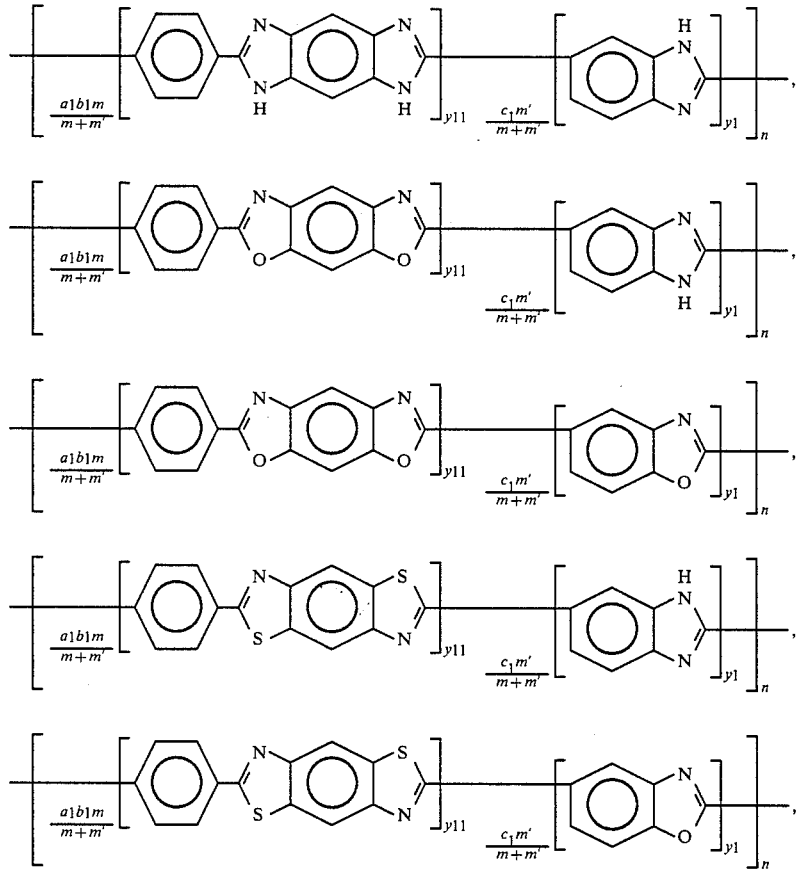

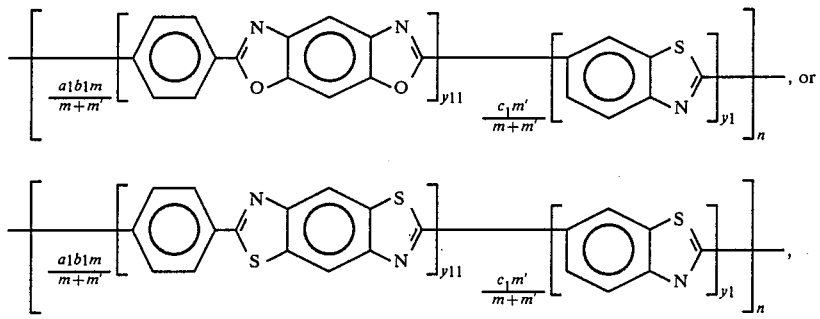

have preferred molar proportion of the first recurring unit, $a_1b_1m/m+m'$ of from about zero to about 0.5 when the concentration selected to be above about 15 weight percent. When $a_1b_1m/m+m'$ is selected to be above about 0.5 but less than one then the operable concentration range is extended to include concentration of 7%, more preferably 10 weight percent. At concentrations above about 15 weight percent all selected values of $y_{11}$ and values of $y_1$ greater than about 5 give liquid-crystalline products, but n must be greater than about 50, preferably above about 100 to give desirable mechanical properties.

The practice of the invention as it relates to the block polymers of this Class is further illustrated in Examples 102-112 below General formula X block polymer may be derived from a first homo-oligomer of Class 2 and a second homo-oligomer of Type (3,2). The block polymers are prepared from two homo-oligomers of Class 2 which dictates the selection of concentrations greater than about 15' weight percent. The molar proportions of the various recurring units are selected based on desired mechanical properties or the maintenance of solubility in two recurring units of different solubility characteristics. The preferred values of $y_1$ are those from about 5-50, more preferably greater than 30. The practice of the invention as it relates to block polymers of this Class is further illustrated in Examples 113-115 below.

The practice of the invention is illustrated for general formula XI for block polymers prepared from a single monomer of Type (3,2).

The general formula XI liquid crystalline block polymer compositions shown above are prepared according to the following procedure:

(a) mixing at least one of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent, (c) then increasing the phosphorus pentoxide content of the mixture resulting from step (b) to provide a first monomer reaction medium of greater phosphorus pentoxide content suitable for polymerization,

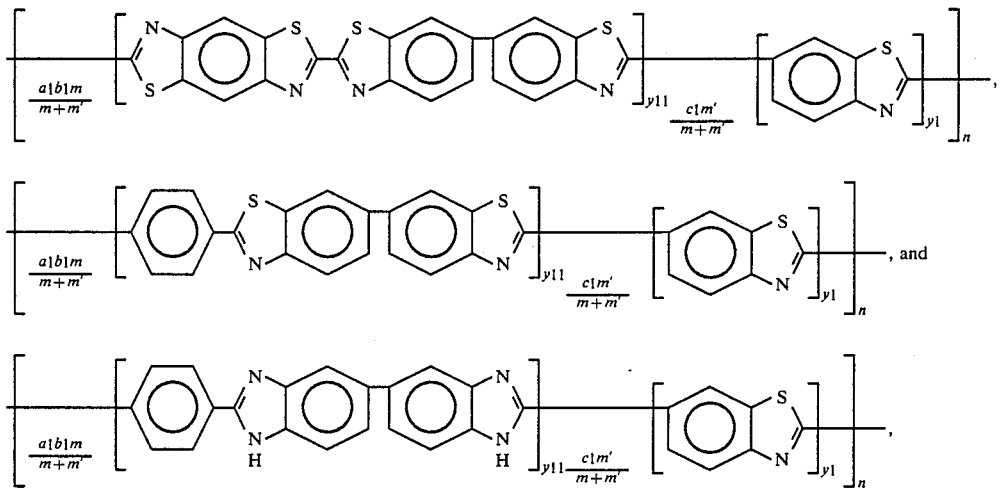

(d) causing polymerization of the first monomer at a temperature sufficient to effect reaction at a rate to form a first homo-oligomeric product having a preselected intrinsic viscosity, (e) mixing a selected amount of the first homo-oligomeric product with a selected amount of at least one of a selected second homo-oligomeric product so as to form a first poly-oligomeric product, said second homo-oligomeric product being formed by like steps (a), (b), (c), and (d) with the overall proviso that at least one of the selected monomer of step (a) which forms the second homo-oligomeric product be different from at least one of the selected monomer of step (a) which forms the first homo-oligomeric product,
(f) causing polymerization of the poly-oligomeric product at a temperature sufficient to effect reaction at a rate to form a first block-oligomeric product having a preselected intrinsic viscosity or a first block-polymeric product.

The block polymers

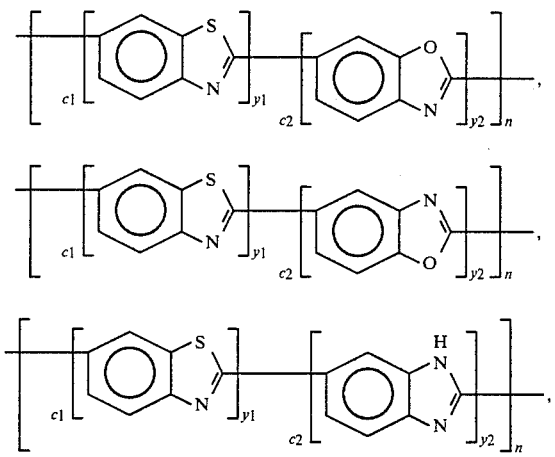

have preferred values of $c_1$ between 0.5 and one, owing to the greater solubility and mesogenicity of the first recurring unit and preferred values of $y_1$ greater than about 25 but less than about 100, owing to the higher mesogenicity. Concentrations greater than about 15%, more preferably greater than about 18%, and most preferably 20%, are selected. Examples 98–101 below further illustrate the method of the present invention.

The method of the invention also relates to the preparation of block polymers by the condensation of co-oligomeric reaction products, instead of the homo-oligomeric reaction products described in the above procedures, however these will not be described here for the sake of simplicity.

Intrinsic Viscosity

Intrinsic viscosity is determined by extrapolation of $\eta_{rel}-1/c$ and $\ln \eta_{rel}/c$ to zero concentration in methane sulfonic acid at 30° C.

Anisotropic Character of the Compositions

The extended chain polymer compositions of this invention are optically anisotropic, i.e., microscopic regions of a given extended chain composition are birefringent; a bulk extended chain composition sample depolarizes plane-polarized light because the light transmission properties of the microscopic areas of the extended chain composition vary with direction. This characteristic is associated with the existence of at least part of the extended chain polymer compositions in the liquid crystalline or mesomorphic state.

The extended chain polymer compositions of this invention that exhibit optical anisotropy do so while the extended chain polymer compositions are in the relaxed state. This is in contrast to conventional polymer solutions which may be caused to depolarize plane-polarized light when subjected to appreciable shear.

The extended chain polymer concentration of the compositions of the instant invention is above the "critical concentration point." The "critical concentration point" is routinely determined using conventional concentration and viscosity measuring techniques (see Kwolek U.S. Pat. No. 3,671,542).

Another qualitative determination of the liquid crystalline character of these extended chain polymer compositions may be made with the naked eye. These extended chain polymer compositions may appear turbid or hazy and yet contain no, or practically no undissolved solid. When the extended chain polymer compositions, seen under reflected ordinary light, is disturbed by shaking or rolling the vessel containing the extended chain polymer compositions or by only slow stirring, there is produced a characteristic, readily observed, satin-like sheen or glow which is observed even after the disturbance ceases, and which decreases in intensity thereafter. This may be described as being a pearly or opalescent quality of the extended chain polymer compositions of this invention. Compositions which are disturbed as described above often give the appearance of having striations and/or graininess in the surface. These visual effects are observed in the liquid crystalline extended chain polymer compositions of this invention. This may commonly be referred to as "stir opalescence." Further details on qualitative and quantitative determinations of optical anisotropy are presented in Kwolek U.S. Pat. No. 3,671,542.

Fiber Preparation

The liquid crystalline compositions may be formed into fibers of high quality by spinning them into suitable baths such as by wet and "air gap" spinning techniques, using spinnerets and other apparatus constructed of materials resistant to the strong acids used. In "air-gap" spinning the spinneret is usually located in air or in an inert gaseous medium a short distance (e.g., 1 to 24 cm) above the surface of a coagulating bath.

However, air-gaps suitable for use in the present invention may range from less than about 1 cm to about 150 cm or longer, preferably from about 2 cm to about 300 cm, more preferably from about 10 cm to about 200 cm, and most preferably from about 10 cm to about 100 cm.

In the present invention, the initial draw ratio is approximately from about 1:1 to about 50:1 and higher. Preferably, the initial draw ratio is from about 20:1 to about 80:1, especially preferably, from about 60:1 to about 200:1, and, most preferably, from about 100:1 to about 150:1.

The term "draw ratio", as is well known, is a measure of the degree of stretching during the orientation of the fibrous material. In the present invention, the initial draw ratio is a measure of the degree of stretching of the filaments which occurs between the extrusion orifices and the exit from the coagulation bath. The initial draw ratio is defined as exit velocity divided by jet speed.

The jet speed is the speed at which the extruded polymer exits an extrusion orifice. It is conveniently determined by dividing the total polymer extrusion velocity by the total surface area of the extrusion orifices.

The exit velocity is the speed at which the filaments leave the coagulation bath. Although any means of measurement may be used, the exit velocity is conveniently determined by the surface speed of the rolls which take up the filaments after their exit from the bath. Thus, the speed of the wash rolls is preferably measured for this purpose.

Spinning of polybenzimidazole fibers by one working of this general technique is described in, e.g., Tan U.S. Pat. No. 4,263,245. A variety of baths may be used to coagulate the extruded dope into fibers. The baths may be, e.g., water or methanol and the like, or a dilute solution of a mineral acid (for example, phosphoric acid or sulfuric acid and the like). Preferably, the temperature of a coagulation bath is room temperature or below.

It is desirable to completely remove the spinning solvent from fiber samples prepared from the liquid crystalline compositions of this invention. Water alone or aqueous alkaline solutions may be used for removal of the residual acid. A convenient method is to spray the threadline as it leaves the coagulating bath with an aqueous alkaline solution (e.g., saturated sodium bicarbonate), remove the surface liquid from the threadline with a wiping device (e.g., a sponge) or a jet, wash with water and/or aqueous alkaline solutions to reduce the acid content, and wind up the fibers on bobbins. The fibers may be soaked in water for a period sufficient to remove the acid. The thoroughly washed fibers may be dried on the bobbin in the area of temperatures of up to about 110° C. They can also be conveniently dried on heated rolls.

The liquid crystalline compositions are especially suitable for extruding. This and other methods of article frabication are fully described in J. S. Robinson, "Spinning, Extruding, and Processing of Fibers"; Chemical Technology Review No. 159, Noyes Data Corp., 1980. The above cited patents and/or publications are incorporated herein by reference.

The fibers prepared from the polymers of this invention exhibit high values of tensile properties, especially in the as-extruded state, i.e., without subsequent hot drawing or annealing. The tensile properties of these as-extruded fibers can be enhanced by subjecting the undrawn fibers to a heat treatment. Fiber tensile properties.

Filament properties are measured on fibers that are conditioned at 21 degrees C. and 65% relative humidity (R.H.) for at least 16 hours unless otherwise specified. Yarn properties are measured on yarn that are conditioned at 24 degrees C. and 55% R.H. for at least 16 hours. All measurements are made in the fiber conditioning environment.

Tenacity (breaking tenacity) (T), elongation (breaking elongation( E), and initial modulus (Mi) are obtained from breaking a single filament or a multifilament yarn on an Instron tester (Instron Engineering Corp., Canton, Mass.).

Single filaments are broken with a gage length (distance between jaws) of 1.0 inch (2.54 cm.). The results on 3 filaments are averaged. Yarns are given 3 turns per inch (2.54 cm.) twist (under 0.1 g.p.d. tension) and broken with a 10 inch (25.4 cm.) gage length. All samples are elongated at a constant rate of extension (10% elongation/minute for fibers having an E of under 8%, and 60% elongation/minute for fibers with E of 8 to 100%) until the sample breaks.

The denier of a single filament (d.p.f.) is calculated from its functional resonant frequency, determined by vibrating a 7 to 9 cm. length of fiber under tension with changing frequency (ASTM D1577-1973). This filament is then used for 1 break.

The denier of yarn is determined by weighing a known length (at 0.1 g.p.d. tension); 90 cm. length is convenient.

The tenacity (grams/denier), elongation (percent) and initial modulus (gram/denier) as defined in ASTM 3379-75e are obtained from the load-elongation curve and the measured denier. In actual practice, the measured denier of the sample, test conditions and sample identification maybe fed to a computer before the start of a test; the computer record the load-elongation curve of the fiber as it is broken and then calculates the fiber properties.

It should be noted that different values maybe obtained from single filaments (filament properties) and from multifilament strands (yarn properties) of the same sample. Unless specified otherwise all properties given herein are filament properties.

Additives

It will be understood that the usual additives such as dyes, fillers, antioxidants, and the like can be incorporated into the compositions of the present invention for the purpose intended, before preparation of the shaped article.

Mineral acids that are solvents for the extended chain polymers of the instant compositions such as polyphosphoric acid, methane sulfonic acid, 100% sulfuric acid, chlorosulfonic acid, and the like, may be added to the compositions of the invention in minor amounts (without departing from the scope of the invention) for purposes of modifying conditions for processing into shaped articles. The strong acid additives may contain one or more of the acid-soluble polymers described in Helmimiak, et. al., U.S. Pat. No. 4,207,407 and P. D. Sybert, "Rigid-Rod Polyquinolines: Synthesis, Structure-Property Relationships and High-Strength Fibers", Colorado State University, Ph.D. Thesis, 1980. The above cited patent and thesis are incorporated herein by reference. 4. Industrial Applicability The liquid crystalline extended chain polymer compositions are extremely suitable for spinning into highly ordered and high strength fibers. Such fibers are useful as reinforcement substitutes for other inorganic or organic products. Various examples include glass fibers, asbestos, boron fibers, carbon and graphite fibers, whiskers, quartz and silica fibers, ceramic fibers, metal fibers, natural organic fibers, and synthetic organic fibers. A reinforcement may be defined simply as the material that is added to a resinous matrix to improve the strength and other physical and chemical properties of the material.

Furthermore, the polymers of the instant compositions can be employed in any use typically performed by engineering thermoplastic materials, such as metal replacements and those areas where high performance is necessary. Extended chain polymer compositions may be employed for use in forming high strength films suitable in the production of composites, belts, tires, i.e., as tire cords, and the like. The films are suitable as construction materials for rocket nose cones and various other parts of space craft.

Depending on the extended chain polymer fiber or films selected (i.e., homopolymer, copolymer, block polymer, or mixture thereof) the properties of the article formed may be controlled to suit the desired use. The control of polymer properties is an advantage, since, in the various areas of utility for such polymers, e.g. as laminates, structural materials, adhesives and ablative materials, the needs vary considerably.

By way of comparison, Examples 1-5 below are illustrative of low molecular weight (i.e., low intrinsic viscosity) and/or low polymer concentration compositions.

EXAMPLE 1

In a 6-L resin flask were placed 386.76 g (1.5774 mol) of 2,5-diamino-1,4-benzenedithiol dihydrochloride (1a) and 2.98 kg of freshly prepared PPA. The PPA was prepared as described in Wolfe and Arnold, *Macromolecules*, Vol 14, 909 (1981). The mixture was stirred at room temperature under a flow of argon for 24h and heated at 60°-70° C. for 34h. The resulting solution was clear with no evidence of bubbles. Terephthalic acid (262.35 g, 1,5792 mol) was then added and incorporated into the solution by rapid stirring at 110° C. Additional PPA (4.1 kg) was then added. The yellow mixture was heated as follows: 110°-165° C. in 5h, 165° C. for 12h, 180° C. for 12h, and 195° C. for 12h. The mixture became stir-opalescent after 6h at polymerization temperatures. Reduced pressure was applied during the first 6h of reaction but was alternated with an argon stream such that the mixture did not foam above a predetermined flask wall level. The hazy green product exhibiting yellow-green opalescence was removed from the flask and precipitated into a large volume of water. The copper-colored polymer was washed until the water was no longer acidic and then dried at 80°-100° C. under reduced pressure for 48h. A portion of the reaction product was bottled for use in fiber-spinning studies: intrinsic viscosity $[\eta] = 30.3$ dL/g (MSA). Anal.-Calcd for $C_{14}H_6N_2S_2$: C,63.13; H,2.27; N,10.51; S,24.08. Found: C,62.75; H, 2.346; N, 10.24; S, 23.22. The foregoing procedure provided a 5.6 wt % of polymer $-[AI]_n-$ in PPA. Polymerization mixtures of higher polymer concentration (up to 10%) were prepared. These runs required higher monomer 1a concentration during dehydrochlorination. Intermittent cooling was cycled with argon pressure as required to control foaming at the desired level in the reaction vessel. Similarly, polymer $-[AI]_n-$ in PPA of lower concentration were prepared and these required less time for complete dehydrochlorination than that described.

EXAMPLE 2

In a 6-L resin flask were placed 919.94 g (3.7519 mol) of 1a and approximately 2.7 kg of 115% PPA; the % $P_2O_5$ content profile for this Example is illustrated in FIG. 8. The 115% PPA was obtained from FMC Corporation and heated to 150° C. under an argon atmosphere, heated at 150° C. under reduced pressure for 18h, and cooled to room temperature immediately before use. The viscous mixture was stirred and an ice bath was applied for 24h to prevent vigorous foaming. Five additional days of stirring at room temperature were required to remove enough hydrogen chloride to allow heating above room temperature. A clear, viscous solution was obtained after heating for 18h at 80° C. Finely powdered 2a (622.90 g, 3.7454 mol) and an additional 2.773 g of the above 115% PPA were then added. The mixture was then stirred and heated to 140° C. for 3h and then heated at 150°-160° C. for 16h. The mixture gradually darkened, became optically isotropic, and never became noticeably more viscous. Samples that were removed and precipitated in water gave a dark green non-fibrous material. Additional heating failed to increase the viscosity to an extent to yield a fibrous material. The theoretical polymer concentration $-[AI]-$ for this experiment was 14.8% in a PPA with an intermediate $P_2O_5$ content of 83.8% and a final of 79.8%.

EXAMPLE 3

To a 100 mL flask containing 15.8 g of concentrated orthophosphoric acid (85.4% $H_3PO_4$) that had been cooled in an ice bath was added 24.2 g of phosphorus pentoxide and the mixture heated at 150° C. for 6h under an argon atmosphere. The % $P_2O_5$ content profile for this Example is illustrated in FIG. 9. After cooling the PPA (84.9% $P_2O_5$) to room temperature, 6.0 g (0.029 mol) of 4-amino-3-mercaptobenzoic acid hydrochloride (3a) (prepared by the method of Wolfe, AFOSR Final Technical Report, Dec. 15, 1980) was added and the viscous mixture stirred at 40° C. for 24h. The mixture was then placed under reduced pressure and the temperature slowly raised to 70° C. The orangeyellow mixture was then heated to 150° C. over a 2h period. The resulting dark red solution was optically isotropic. The solution was then stirred at 150° C. for an additional 24h. The polymer was isolated from the resulting optically isotropic solution containing 8.6% of the polymer by precipitation with water to give brittle films. The intrinsic viscosity of the isolated polymer $-[T]_n-$ was 3.0 dL/g in methanesulfonic acid at 30° C.

EXAMPLE 4

To a 50 mL round bottom flask containing 48.15 g of PPA that was prepared as described in Wolfe and Arnold, *Macromolecules*, Vol. 14, 909 (1981) was added 7.436 g (0.03616 mol) of 4-amino-3-mercaptobenzoic acid hydrochloride (3a) that was prepared as described in Wolfe, AFOSR Final Technical Report, Dec. 15, 1980. The mixture was stirred at room temperature under an argon flow for 18h. After stirring for 2h under reduced pressure between 50° to 80° C. the solution was a clear orange color. The solution was then heated under reduced pressure as follows: 90° C. for 0.5h; 100° C. for 0.5h; 110° C. for 0.5h; 130° C. for 0.5h; 140° C. for 0.5h; 180° C. for 8h; 150° C. for 5h; 190° C. for 16h; 160° C. for 16h; 160° C. for 16h; 200° C. for 200h and 170° C. for 7h. The resulting isotropic solution having a concentration of polymer $-(T)_{\overline{n}}$ of 9.4% by weight gave only brittle amorphous films when precipitated in water. The intrinsic viscosity of the isolated polymer was 3.80 dL/g in methanesulfonic acid at 30.0° C.

EXAMPLE 5

To 38 g of PPA that was prepared as described in Wolfe and Arnold, *Macromolecules*, Vol. 14, 909 (1981) was added 1.421 g (8.41 mmol) of 4-amino-3-mercaptobenzoic acid (3b) that was prepared by neutralization of an aqueous suspension of 4-amino-3-mercaptobenzoic acid hydrochloride (3a) (prepared according to Wolfe, AFOSR Final Technical Report, Dec. 15, 1980) followed by extraction with ethyl acetate, evaporation of the ethyl acetate, and recrystallization of the pale yellow residue from methylene chloride. The viscous mixture was heated to 140° C. under an argon flow in a 0.5h period. The temperature was raised to 160° C. over a 0.5h period and then maintained at 160° C. for 18h under reduced pressure. The optically isotropic, red solution was then heated under reduced pressure for 8h at 200° C. The isolated polymer $-(T)_{\overline{n}}$ had an intrinsic viscosity of 4.57 dL/g in MSA at 30.0° C.

The compositions of this invention, their production and their advantages and uses are further illustrated in the following examples. These are intended only to demonstrate the invention and are not to be construed as limiting its scope, which scope is instead defined by the appended claims.

All polyphosphoric acid (PPA) hereinafter referred to as 115% was obtained from FMC Corporation and used as received. Terephthalic acid (2a) was obtained from Amoco Chemicals Company, reduced to an average particle size of 95% <10 μm by an air-impact method, and dried before use. All monomers and $P_2O_5$ that were added to PPA were deaerated by placing them in a desiccator, applying reduced pressure, filling with an inert gas, and repeating the procedure at least once.

EXAMPLE 6

A mixture of 88.2 g of concentrated orthophosphoric acid (85.4% $H_3PO_4$) and 205.2 g of 115% PPA was stirred at 100° C. for 2h under reduced pressure. After allowing the PPA solution to cool to approximately 50° C. a portion of this solution (282.1 g) was added to a 500 mL resin kettle containing 53.01013 g (0.21620 mol) of 1a. After stirring to incorporate the solid monomer into the PPA, the mixture was stirred at room temperature for 2h under argon and then under reduced pressure at: 25°–30° C. for 24h; 50° C. for 3h; and 70° C. for 16h. Monomer 2a (35.91734 g, 0.216196 mol) was then added to the resulting clear light green soltion in four portions. After the addition of each portion, the reaction kettle was placed under reduced pressure before the 2a was incorporated by stirring. The mixture was allowed to cool to approximately 50° C. before 118.3 g of $P_2O_5$ was added to increase the effective $P_2O_5$ content to 83.9%. The viscous slurry was then heated as follows: 100°–170° C. in 3h; 170° C. for 17h; 185° C. for 5h; and 200° C. for 19h. The intrinsic viscosities (in dL/g) of the polymer $-(AI)_{\overline{n}}$ were determined from samples of the polymer solution withdrawn at the polymerization times indicated: 9.2 (8.5h), 12.6 (25.5h), 15.8 (44.0h). Heating this reaction solution at 200° C. for an additional 76h only increased the intrinsic viscosity of the $-(AI)_{\overline{n}}$ component to 16.4 dL/g. The reaction product is characterized as having a final $P_2O_5$ content of approximately 80.8% with the $-(AI)_{\overline{n}}$ polymer concentration being approximately 12.6 wt %.

EXAMPLE 7

A mixture of 57.3 g of concentrated orthophosphoric acid (85.4% $H_3PO_4$) and 133.7 g of 115% PPA was stirred at 100° C. for 4h under reduced pressure. After allowing the PPA solution to cool to room temperature, a portion of this solution (185.0 g) was added to a 500 mL resin kettle containing 53.61422 g (0.21866 mol) of 1a. (Monomer 1a of small crystal size was prepared without a final recrystallization according to the method of Wolfe, Loo, and Arnold, *Macromolecules* Vol. 14, 915 (1981) using the final isolation procedure involving the transfer of the dipotassium salt of 1a as an aqueous solution into 6N hydrochloric acid.) After stirring to incorporate the monomer into the PPA, the mixture was stirred at 55°–65° C. for 5.5h under reduced pressure, at 25° C. for 15.5h under an argon flow, and at 65°–72° C. for 4h under reduced pressure. Monomer 2a (36.3268 g), 0.21866 mol) was added to the resin kettle cotaining the dehydrochlorinated solution of monomer 1a in PPA. After the addition of each of the six portions, the incorporation of the solid into the solution was aided by placing the kettle under reduced pressure before stirring was initiated. Powdered phosphorus pentoxide (114.4 g) was then added to increase the effective $P_2O_5$ content to 86.4% and the mixture was stirred at 100° C. for 27h. The polymerization mixture was then heated as follows: 100°–170° C. in 1h; 170° C. for 21.5h; and 200° C. for 71.5h. The intrinsic viscosities (in dL/g) of the polymer $-(AL)_{\overline{n}}$ were determined from samples withdrawn at the polymerization times indicated: 23.1 (22.5h), 24.8 (29.0h), 27.0 (94h). The reaction product is characterized as having a final effective $P_2O_5$ content of approximately 82.2% and a polymer $-(AI)_{\overline{n}}$ concentration being approximately 15.2 wt %.

EXAMPLE 8

182.7 g of a PPA solution with an effective $P_2O_5$ content of 77.2% (prepared by mixing 30 wt % of $H_3PO_4$ and 70 wt % of 115% PPA) was added to a 500 mL resin kettle containing 52.62853 g (0.21460 mol) of 1a. (Monomer 1a of large crystal size was prepared with a final recrystallization according to the method of Wolfe, Loo, and Arnold, *Macromolecules*, 14, 915 (1981) using the final isolation procedure involving a transfer of the dipotassium salt of monomer 1a as solid into 6N hydrochloric acid.) After stirring to incorporate the solid monomer into the PPA, the mixture was substantially dehydrochlorinated by heating the mixture at 55°–70° C. under reduced pressure for approximately 31h. Monomer 2a (35.6522 g, 0.21460 mol) was added to the resin kettle and incorporated as described in the previous Example. Powdered $P_2O_5$ (123.35 g) was then added to increase the effective $P_2O_5$ content to approximately 86.4% and resulting mixture was stirred at 100° C. for 17h under an argon flow. The polymerization mixture was then heated with stirring as follows: 100°–170° C. in 1h, 170° C. for 23h, and 200° C. for 24h. The intrinsic viscosities (in dL/g) were determined for the $\{AI\}_{\overline{n}}$ polymer from samples withdrawn at the indicated times: 17.2 (7h), 22.8 (24h), and 35.4 (48h). Heating without stirring for an additional 24h did not increase the intrinsic viscosity of the $\{AI\}_{\overline{n}}$ polymer. The green reaction product exhibits stir-opalescence and is characterized as having a final effective $P_2O_5$ content of 82.2% with $\{AI\}_{\overline{n}}$ polymer concentration being approximately 15.1 wt %.

EXAMPLE 9

A mixture of 4,925 g of concentrated orthophosphoric acid (85.4% $H_3PO_4$) and 11.491 g of 115% PPA was stirred in a 22 L flask for 5h at 100° C. under reduced pressure. After allowing the PPA solution to cool to 50° C. under a flow of argon, a portion of this solution (11,321 g) was added to a 40-L glass resin kettle (equipped with a mechanical stirrer consisting of a 3/4 hp variable speed drive and stirring blades made of Hastelloy C-276) containing 2,380.55 g (9.7088 mol) of 1a prepared as described in Example 7. The mixture was then stirred at: 65° C. for 17h under a flow of argon; 65° C. for 2h at 700–400 mm Hg; and 65° C. for 2h at 40 mm Hg. An additional 2,552.77 g (10.4112 mol) of monomer 1a that had been prepared and deaerated as described in Example 8 was then added under a flow of argon. An additional 4,874 g of the above-mentioned PPA was added and the mixture stirred at: 65° C. for 1h at 700–300 mm Hg; 65°–70° C. for 3.25h at 40 mm Hg; 70° C. for 2.5h at less than 5 mm Hg; 700° C. for 7.5h under a flow of argon; and 80° C. for 26h at less than 5 mm Hg. Monomer 2a (3,342.62 g, 20.1205 mol) was then added. The resulting slurry was then cooled to 40° C. and 6,512.1 g of powdered $P_2O_5$ was added over a 4.5 period. The resulting viscous mixture was stirred at 80° C. for 17h under an argon flow. The mixture was then heated to 100° C. and an additional 4,655.4 g of $P_2O_5$ was added to increase the effective $P_2O_5$ content to 86.5%. After stirring for an additional 48h at 100°–108° C., the polymerization mixture was heated as follows: 100°–170° C. in 3h; 170° C. for 20h; and 200° C. for 1.5h. The intrinsic viscosities (in dL/g) were determined from samples withdrawn at the indicated reaction times: 17.9 (14h), 18.5 (16.5h), 19.0 (23h), 24.34 (24.5h). Additional heating at 200° C. only increased the intrinsic viscosity to 24.6 dL/g. The reaction product exhibited stir-opalescence and is characterized as having a final effective $P_2O_5$ content of 82.2% with the $\{AH\}_{\overline{n}}$ polymer concentration being approximately 15.6% by weight.

EXAMPLE 10

To a 500 mL resin kettle containing a deaerated mixture of 12.06155 g (0.0594092 mol) of terephthaloyl chloride (2b) and 14.5665 g (0.0594081 mol) of 1a was added approximately 140 g of 115% PPA that had been stirred at 100° C. under reduced pressure for 1–2h, and had cooled to room temperature. The mixture was then stirred under an argon flow at: 40° C. for 23h; 50° C. for 3h; 60° C. for 2h; 70° C. for 19h; and 80° C. for 3h. The solution was then stirred at 80° C. under reduced pressure for 1h. An additional 140 g of deaerated 115% PPA was then incorporated into the solution. The polymerization was stirred under argon at: 100° C. for 30 min; 110° C. for 30 min; 120° C. for 30 min; 130° C. for 30 min; 140° C. for 30 min; 150° C. for 30 min; 160° C. for 45 min; 170° C. for 11h; 185° C. for 5h; and 200° C. for 46.5h. Precipitation in water of a small amount of the anisotropic product provided polymer $\{AH\}_{\overline{n}}$ which possessed an intrinsic viscosity of 17.7 (dL/g) in MSA at 30° C.

EXAMPLE 11

A mixture of 74.52 g of 85.7% orthophosphoric acid and 173.88 g of 115% PPA (83.8% $P_2O_5$ content) is stirred under reduced pressure for 2h at 100° C. After cooling to room temperature, 55.23561 g (0.225273 mol) of 1a (prepared as described in Example 8) and 45.73607 g (0.225273 mol) of 2b (freshly sublimed) are added in eight portions. After the addition of each portion of monomer stirring is initiated to incorporate the monomer. The mixture is then stirred while the temperature is slowly increased and the pressure is slowly decreased until dehydrochlorination is complete. Deaerated phosphorus pentoxide (87.54 g) is then added to the dehydrochlorination mixture at 50° C. The mixture is then stirred at 100° C. for several hours. The polymerization is then stirred under an argon atmosphere at 170° C. for approximately 20h, at 180° C. for approximately 8h, and at 200° C. for 3h. The resulting product contains 15 wt % of $\{AH\}_{\overline{n}}$ in PPA (82.2% $P_2O_5$).

EXAMPLE 12

86.17 g of a PPA solution with an effective $P_2O_5$ content of 74.9% (prepared by mixing 40 wt % of 85% $H_3PO_4$ and 60 wt % of 115% PPA) was added to a 500 mL resin kettle containing 27.62485 g (0.112665 mol) of 1a. The monomer was incorporated into the PPA solution by stirring and the resulting mixture was then substantially dehydrochlorinated by heating the mixture at 55°–80° C. under reduced pressure for approximately 21hours. The % $P_2O_5$ content profile for this Example is illustrated in FIG. 10. Monomer 2a (18.7208g, 0.112686 mol) was then added to the resin kettle. Powdered $P_2O_5$ (83.17 g) was then added to increase the effective $P_2O_5$ content to approximately 87.2%. The resulting yellow slurry was stirred at 100° C. for 15h under an argon flow. This slurry, which had not noticeably increased in bulk viscosity, was then stirred vigorously and heated by increasing the oil bath temperature from 100° C. to 178° C. within 40 minutes, and to 185° C. within 1h. Polymerization times indicated below begin with time above 100° C. The 185° C. temperature was then maintained for 76.5h. Intrinsic viscosities in MSA at 30° C. (in dL/g) were determined for the $-AI]_n$ polymer from samples withdrawn at the indicated polymerization times: 16.6 (1.5h), 21.7 (2.25h), 24.2 (3.25h), 35.7 (7.7h), and 42.1 (76.5h). The intrinsic viscosity of 42.1 corresponds to an average n value of polymerization of about 140. The polymerization product was stir-opalescent after a polymerization time of 0.75h and was found to be highly drawable after 1.25h. Fibers prepared by directly drawing this product and precipitating the strands into water were amber, translucent, birefringent (crossed polars), showed extinction of transmitted light when a single polaroid sheet was placed perpendicular to the fiber direction, and could be fibrillated into microfibrils. Fibers prepared after 1.5h by the same method were noticeably stronger than the sample at 1.25h. The bulk viscosity of the product and the relaxation time of opalescence had noticeably increased after 2.25h. The $P_2O_5$ content of the PPA component of the product was approximately 83.2% and the concentration of the $-[AI]_n$ polymer was 14.5% by weight based on the total weight of the resulting reaction product.

EXAMPLE 13

A mixture of 17.7 g of concentrated orthophosphoric acid (85.7% $H_3PO_4$) and 26.6 g of 115% PPA was stirred under reduced pressure at 100° C. for 2hours. The % $P_2O_5$ content profile for this Example is illustrated in FIG. 11. The resulting solution was then poured at approximately 100° C. under a stream of argon into a 200 mL resin kettle containing 11.41145 g (0.054028 mol) of 4,6-diamino-1,3-benzenediol dihydrochloride (1b) that was prepared according to the method of Wolfe and Arnold, *Macromolecules*, Vol. 14, 909 (1981), recrystallized from aqueous hydrochloric acid containing 3 wt % stannous chloride, and dried for 20h at 63° C. under reduced pressure immediately before use. The mixture was stirred at 53° C. for 15h and 62° C. for 4h under reduced pressure. Upon heating to 70° C., the monomer precipitated. Addition of 16.6 g of $P_2O_5$ resulted in redissolution of the monomer. The solution was then heated at 100° C. for 3h under reduced pressure to complete the dehydrochlorination. Monomer 2a (8.9761 g, 0.05403 mol) was then added under an argon flow. Additional $P_2O_5$ (19.0 g) was then added. The solution was then heated as follows: 100° C. for 48h; 150° C. for 2.5h; 160° C. for 10h (the dark green solution became stiropalescent during this period); and 180° C. for 25h. The resulting reaction product was deep purple with a metallic luster, exhibited stiropalescence, depolarized plane-polarized light as evidenced by strong birefringence when viewed between crossed polars, and is further characterized as havng a final effective $P_2O_5$ content of 82% with the $-[BH]_n$ polymer concentration being 13.3% by weight. The intrinsic viscosity of the polymer $-[BH]_n$ isolated from the reaction product was 23.9 dL/g in MSA at 30° C., which corresponds to an average number of recurring units, n, of approximately 110.

EXAMPLE 14

The reaction product from Example 13 was drawn many times its length to give highly fibrillar fibers. A portion of the solution was removed from the reaction flask and placed in a KBr press equipped with a die with a circular orifice of 0.13 mm in diameter. The solution was extruded into the air and stretched by pulling manually and then the fiber was dipped in water. The fiber thus produced was washed with water and then dried under tension in an air oven overnight at 110° C. The fiber produced was measured to be between 0.0093 mm and 0.012 mm in diameter. High orientation was evident from fibrils which split from the surface of the fiber and by the complete extinction of light transmitted through the fiber when a single polaroid was placed in a perpendicular direction only between the source and the fiber.

EXAMPLE 15

The procedure of Example 8 is essentially repeated. Instead of monomers 1a and 2a, 48.9831 g (0.19978 mol) of monomer 1a is dehydrochlorinated in an "initial" solution of 269.68 g PPA having a $P_2O_5$ content of 77.2% (prepared by mixing 80.9 g of 85.4% $H_3PO_4$ with 188.8 g of 115% PPA). When dehydrochlorination is substantially complete, 79.9805 g (0.19978 mol) of monomer 2s is added followed by the gradual addition of 142.23 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 85.07% prior to the start of polymerization and an effective $P_2O_5$ content of approximately 82.2% subsequent to substantial complete polymerization. The reaction product obtained exhibits stir-opalescence and is further characterized as having a polymer concentration of 19%; fibers are readily formed by direct spinning, or drawing from the reaction product. The polymer obtained is of the following structure:

characterized by an intrinsic viscosity of 20 dL/g in MSA at 30° C. which corresponds to an n value of average polymerization of about 50.

EXAMPLE 16

The procedure of Example 8 is essentially repeated. Instead of monomers 1a and 2a, 64.4470 g (0.26284 mol) of monomer 1a is dehydrochlorinated in an "initial" solution of 341.97 g PPA having a $P_2O_5$ content of 77.2% (prepared by mixing 102.6 g of 85.4% $H_3PO_4$ with 239.4 g of 115% PPA). When dehydrochlorination is substantially complete, 63.6826 g (0.26284 mol) of monomer 2j is added followed by the gradual addition of 137.3 g of $P_2O_5$. The mixture is then stirred and heated essentially according to Example 8. The amount of P₂O₅ is preselected (as determined in accord with the aforementioned formulae a* and b*) to provide the reaction mixture with an effective P₂O₅ content of approximately 83.7% prior to the start of polymerization and an effective P₂O₅ content of approximately 82.2% subsequent to substantial complete polymerization. The reaction product obtained exhibits stir-opalescence and is further characterized as having a polymer concentration of 17%; fibers are readily formed by direct spinning, or drawing from the reaction product. The polymer obtained is of the following structure:

characterized by an intrinsic viscosity of 15 dL/g in MSA at 30° C. which corresponds to an n value of average polymerization of about 100.

EXAMPLE 17

The procedure of Example 8 is essentially repeated. Instead of monomers 1a and 2a, 61.1619 g (0.28706 mol) of monomer 1b is dehydrochlorinated in an "initial" solution of 338.4 g PPA having a P₂O₅ content of 77.2% (prepared by mixing 101.5 g of 85.4% H₃PO₄ with 236.8 g of 115% PPA). When dehydrochlorination is substantially complete, 69.5488 g (0.28706 mol) of monomer 2j is added followed by the gradual addition of 140.1 g of P₂O₅. The mixture is then stirred and heated essentially according to Example 8. The amount of P₂O₅ is preselected (as determined in accord with the aforementioned formulae a* and b*) to provide the reaction mixture with an effective P₂O₅ content of approximately 83.8% prior to the start of polymerization and an effective P₂O₅ content of approximately 82.2% subsequent to substantial complete polymerization. The reaction product obtained exhibits stir-opalescence and is further characterized as having a polymer concentration of 17%; fibers are readily formed by direct spinning, or drawing from the reaction product. The polymer obtained is of the following structure:

─(AB)ₙ─ characterized by an intrinsic viscosity of 16 dL/g in MSA at 30° C. which corresponds to an n value of average polymerization fo about 60.

EXAMPLE 18

The procedure of Example 8 is essentially repeated. Instead of monomers 1a and 2a, 81.9923 g (0.28869 mol) of monomer 1c is dehydrochlorinated in an "initial" solution of 366.8 g PPA having a P₂O₅ content of 77.2% (prepared by mixing 110 g of 85.4% H₃PO₄ with 256.8 g of 115% PPA). When dehydrochlorination is substantially complete, 69.9438 g (0.28869 mol) of monomer 2j is added followed by the gradual addition of 148.4 g of P₂O₅. The mixture is then stirred and heated essentially according to Example 8. The amount of P₂O₅ is preselected (as determined in accord with the aforementioned formulae a* and b*) to provide the reaction mixture with an effective P₂O₅ content of approximately 83.8% prior to the start of polymerization and an effective P₂O₅ content of approximately 82.2% subsequent to substantial complete polymerization. The reaction product obtained exhibits stir-opalescence and is further characterized as having a polymer concentration of 16%; fibers are readily formed by direct spinning, or drawing from the reaction product. The polymer obtained is of the following structure:

characterized by an intrinsic viscosity of 16 dL/g in MSA at 30° C. which corresponds to an n value of average polymerization of about 60.

EXAMPLE 19

The procedure of Example 8 is essentially repeated. Instead of monomers 1a and 2a, 93.8232 g (0.29202 mol) of monomer 1i is dehydrochlorinated in an "initial" solution of 263.5 g PPA having a P₂O₅ content of 77.2% (prepared by mixing 79.1 g of 85.4% H₃PO₄ with 184.4 g of 115% PPA). When dehydrochlorination is substantially complete, 48.5129 g (0.29202 mol) of monomer 2a is added followed by the gradual addition of 171 g of P₂O₅. The mixture is then stirred and heated essentially according to Example 8. The amount of P₂O₅ is preselected (as determined in accord with the aforementioned formulae a* and b*) to provide the reaction mixture with an effective P₂O₅ content of approximately 86.2% prior to the start of polymerization and an effective P₂O₅ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 15 dL/g in MSA at 30° C.

EXAMPLE 20

The procedure of Example 8 is essentially repeated. Instead of monomers 1a and 2a, 93.1836 g (0.32225 mol) of monomer 1j is dehydrochlorinated in an "initial" solution of 254.0 g PPA having a P₂O₅ content of 77.2% (prepared by mixing 76.2 g of 85.4% H₃PO₄ with 177.8 g of 115% PPA). When dehydrochlorination is substantially complete, 53.5357 g (0.32225 mol) of monomer 2a is added, followed by the gradual addition of 178.4 g of P₂O₅. The mixture is then stirred and heated essentially according to Example 8. The amount of P₂O₅ is preselected (as determined in accord with the aforementioned formulae a* and b*) to provide the reaction mixture with an effective P₂O₅ content of approximately 86.6% prior to the start of polymerization and an effective P₂O₅ content of approximately 82.2% subsequent to substantial complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 14 dL/g in MSA at 30° C.

EXAMPLE 21

The procedure of Example 8 is essentially repeated. Instead of monomers 1a and 2a, 93.1836 g (0.32225 mol) of monomer 1k is dehydrochlorinated in an "initial" solution of 254.0 g PPA having a $P_2O_5$ content of 77.2% (prepared by mixing 76.2 g of 85.4% $H_3PO_4$ with 177.8 g of 115% PPA). When dehydrochlorination is substantially complete, 53.5357 g (0.32225 mol) of monomer 2a is added, followed by the gradual addition of 178.4 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 86.6% prior to the start of polymerization and an effective $P_2O_5$ content of approximately 82.2% subsequent to substantial complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 14 dL/g in MSA at 30° C.

EXAMPLE 22

The procedure of Example 8 is essentially repeated. Instead of monomers 1a and 2a, 128.4748 g (0.32431 mol) of monomer 1l is dehydrochlorinated in an "initial" solution of 233.5 g PPA having a $P_2O_5$ content of 79.4% (prepared by mixing 44.7 g of 85.4% $H_3PO_4$ with 178.8 g of 115% PPA). When dehydrochlorination is substantially complete, 53.8778 g (0.32431 mol) of monomer 2a is added, followed by the gradual addition of 197.0 g of $P_2O_5$. Inorganic salts, such as lithium salts (e.g., LiCl, LiF, Lithium phosphate, and the like) can be added at this point, if required, to promote polymer solubility. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 89.1% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

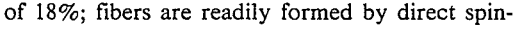

characterized by an intrinsic viscosity of 12 dL/g in MSA at 30° C.

EXAMPLE 23

The procedure of Example 8 is essentially repeated. Instead of monomers 1a and 2a, 70.3707 g (0.21902 mol) of monomer 1i is dehydrochlorinated in an "initial" solution of 323.1 g PPA having a $P_2O_5$ content of 77.2% (prepared by mixing 96.9 g of 85.4% $H_3PO_4$ with 226.2 g of 115% PPA). When dehydrochlorination is substantially complete, 53.0654 g (0.21902 mol) of monomer 2j is added followed by the gradual addition of 125.0 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 83.6% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 17 dL/g in MSA at 30° C.

EXAMPLE 24

The procedure of Example 8 is essentially repeated. Instead of monomers 1a and 2a, 68.1280 g (0.23560 mol) of monomer 1j is dehydrochlorinated in an "initial" solution of 320.7 g PPA having a $P_2O_5$ content of 77.2% (prepared by mixing 96.2 g of 85.4% $H_3PO_4$ with 224.5 g of 115% PPA. When dehydrochlorination is substantially complete, 57.824 g (0.23560 mol) of monomer 2j is added followed by the gradual addition of 126.9 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 83.7% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 15 dL/g in MSA at 30° C.

EXAMPLE 25

The procedure of Example 8 is essentially repeated. Instead of monomers 1a and 2a, 68.1280 g (0.23560 mol) of monomer 1k is dehydrochlorinated in an "initial" solution of 320.64 g PPA having a $P_2O_5$ content of 77.2% (prepared by mixing 96.19 g of 85.4% $H_3PO_4$ with 184.4 g of 115% PPA). When dehydrochlorination is substantially complete, 57.0824 g (0.23560 mol) of monomer 2j is added followed by the gradual addition of 126.88 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 83.7% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 14 dL/g in MSA at 30° C.

Analogous to the foregoing Examples 6–25, other Type I extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Tables 16a, 16b, 17a, 17b, and 17c. The m--→, e--→, and p--→ denote most preferred, especially preferred, and preferred selected monomer reactions respectively.

TABLE 16a

Polymers of Type I, Class 1
Polymerization Reactions:

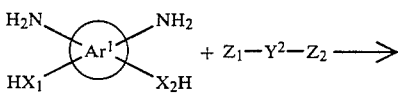

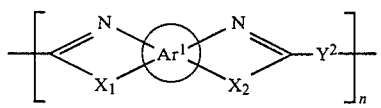

| Monomer (1,1) | + | Monomer (2,1) | ------> | Polymer I(1) |
|---|---|---|---|---|
| 1a | + | 2e | e ---> | —[AJ]$_n$— |
| 1a | + | 2f | e ---> | —[AJ]$_n$— |
| 1a | + | 2i | e ---> | —[AK]$_n$— |
| 1a | + | 2k | e ---> | —[AB]$_n$— |
| 1a | + | 2l | e ---> | —[AC]$_n$— |
| 1a | + | 2m | e ---> | —[AD]$_n$— |

TABLE 16a-continued

Polymers of Type I, Class 1
Polymerization Reactions:

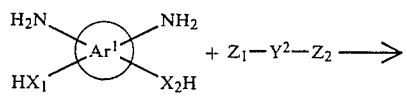

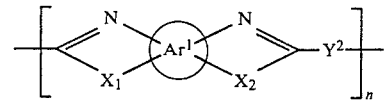

| Monomer (1,1) | + | Monomer (2,1) | ------> | Polymer I(1) |
|---|---|---|---|---|
| 1a | + | 2n | e ---> | —[AE]$_n$— |
| 1a | + | 2o | e ---> | —[AF]$_n$— |
| 1a | + | 2p | e ---> | —[AG]$_n$— |
| 1a | + | 2q | e ---> | —[AH]$_n$— |
| 1a | + | 2t | e ---> | —[AICI]$_n$— |
| 1a | + | 2u | e ---> | —[AIDI]$_n$— |
| 1a | + | 2v | e ---> | —[AIEI]$_n$— |
| 1a | + | 2w | e ---> | —[AIFI]$_n$— |
| 1a | + | 2x | e ---> | —[AIGI]$_n$— |
| 1a | + | 2y | e ---> | —[AIHI]$_n$— |
| 1b | + | 2e | e ---> | —[BJ]$_n$— |
| 1b | + | 2i | e ---> | —[BK]$_n$— |
| 1b | + | 2k | e ---> | —[B]$_n$— |
| 1b | + | 2l | e ---> | —[BC]$_n$— |
| 1b | + | 2m | e ---> | —[BD]$_n$— |
| 1b | + | 2n | e ---> | —[BE]$_n$— |
| 1b | + | 2o | e ---> | —[BF]$_n$— |
| 1b | + | 2p | e ---> | —[BG]$_n$— |
| 1b | + | 2q | e ---> | —[BH]$_n$— |
| 1b | + | 2t | e ---> | —[BICI]$_n$— |
| 1b | + | 2u | e ---> | —[BIDI]$_n$— |
| 1b | + | 2v | e ---> | —[BIEI]$_n$— |
| 1b | + | 2w | e ---> | —[BIFI]$_n$— |
| 1b | + | 2x | e ---> | —[BIGI]$_n$— |
| 1b | + | 2y | e ---> | —[BIHI]$_n$— |
| 1c | + | 2a | e ---> | —[CI]$_n$— |
| 1c | + | 2e | e ---> | —[CJ]$_n$— |
| 1c | + | 2i | e ---> | —[CK]$_n$— |
| 1c | + | 2k | e ---> | —[BC]$_n$— |
| 1c | + | 2l | e ---> | —[C]$_n$— |
| 1c | + | 2m | e ---> | —[CD]$_n$— |
| 1c | + | 2n | e ---> | —[CE]$_n$— |

TABLE 16a-continued

Polymers of Type I, Class 1
Polymerization Reactions:

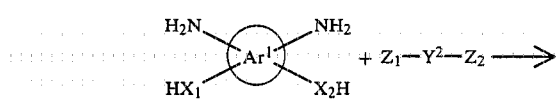

| Monomer (1,1) | + | Monomer (2,1) | ---> | Polymer I(1) |
|---|---|---|---|---|
| 1c | + | 2o | e ---> | —[CF]$_n$— |
| 1c | + | 2p | e ---> | —[CG]$_n$— |
| 1c | + | 2q | e ---> | —[CH]$_n$— |
| 1c | + | 2u | e ---> | —[CIDI]$_n$— |
| 1c | + | 2v | e ---> | —[CIEI]$_n$— |
| 1c | + | 2w | e ---> | —[CIFI]$_n$— |
| 1c | + | 2x | e ---> | —[CIGI]$_n$— |
| 1c | + | 2y | e ---> | —[CIHI]$_n$— |
| 1d | + | 2a | e ---> | —[DI]$_n$— |
| 1d | + | 2e | e ---> | —[DJ]$_n$— |
| 1d | + | 2i | e ---> | —[DK]$_n$— |
| 1d | + | 2m | e ---> | —[D]$_n$— |
| 1d | + | 2n | e ---> | —[DE]$_n$— |
| 1d | + | 2o | e ---> | —[DF]$_n$— |
| 1d | + | 2p | e ---> | —[DG]$_n$— |
| 1d | + | 2q | e ---> | —[DH]$_n$— |
| 1d | + | 2v | e ---> | —[DIEI]$_n$— |
| 1d | + | 2w | e ---> | —[DIFI]$_n$— |
| 1d | + | 2x | e ---> | —[DIGI]$_n$— |
| 1d | + | 2y | e ---> | —[DIHI]$_n$— |
| 1e | + | 2a | e ---> | —[EI]$_n$— |
| 1e | + | 2e | e ---> | —[EJ]$_n$— |
| 1e | + | 2i | e ---> | —[EK]$_n$— |
| 1e | + | 2n | e ---> | —[E]$_n$— |
| 1e | + | 2o | e ---> | —[EF]$_n$— |
| 1e | + | 2p | e ---> | —[EG]$_n$— |
| 1e | + | 2q | e ---> | —[EH]$_n$— |
| 1e | + | 2w | e ---> | —[EIFI]$_n$— |
| 1e | + | 2x | e ---> | —[EIGI]$_n$— |
| 1e | + | 2y | e ---> | —[EIHI]$_n$— |
| 1f | + | 2a | e ---> | —[FI]$_n$— |
| 1f | + | 2e | e ---> | —[FJ]$_n$— |

TABLE 16a-continued

Polymers of Type I, Class 1
Polymerization Reactions:

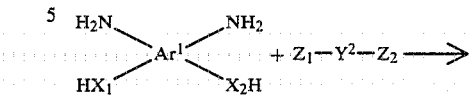

| Monomer (1,1) | + | Monomer (2,1) | ---> | Polymer I(1) |
|---|---|---|---|---|
| 1f | + | 2i | e ---> | —[FK]$_n$— |
| 1f | + | 2o | e ---> | —[F]$_n$— |
| 1f | + | 2p | e ---> | —[FG]$_n$— |
| 1f | + | 2q | e ---> | —[FH]$_n$— |
| 1f | + | 2x | e ---> | —[FIGI]$_n$— |
| 1f | + | 2y | e ---> | —[FIHI]$_n$— |
| 1g | + | 2g | e ---> | —[GI]$_n$— |
| 1g | + | 2e | e ---> | —[GJ]$_n$— |
| 1g | + | 2i | e ---> | —[GK]$_n$— |
| 1g | + | 2p | e ---> | —[G]$_n$— |
| 1g | + | 2q | e ---> | —[GH]$_n$— |
| 1g | + | 2y | e ---> | —[GIHI]$_n$— |
| 1h | + | 2a | e ---> | —[HI]$_n$— |
| 1h | + | 2e | e ---> | —[HJ]$_n$— |
| 1h | + | 2i | e ---> | —[HK]$_n$— |
| 1h | + | 2q | e ---> | —[H]$_n$— |

TABLE 16b

Polymers of Type I, Class 1
Polymerization Reactions:

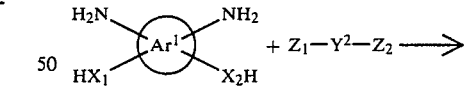

| Monomer (1,1) | + | Monomer (2,1) | ---> | Polymer I(1) |
|---|---|---|---|---|
| 1a | + | 2c | p ---> | —[AI]$_n$— |
| 1a | + | 2d | p ---> | —[AI]$_n$— |
| 1a | + | 2g | p ---> | —[AJ]$_n$— |
| 1a | + | 2h | p ---> | —[AJ]$_n$— |
| 1a | + | 2r | p ---> | —[AI]$_n$— |
| 1a | + | 2z | p ---> | —[A]$_n$— |

TABLE 16b-continued

Polymers of Type I, Class 1
Polymerization Reactions:

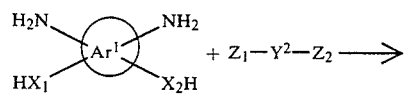

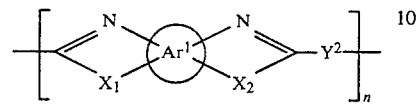

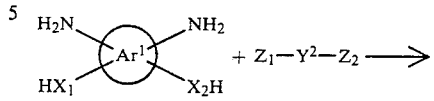

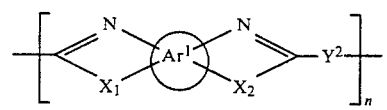

| Monomer (1,1) | + | Monomer (2,1) | ---> | Polymer I(1) | | Monomer (1,1) | + | Monomer (2,1) | ---> | Polymer I(1) |
|---|---|---|---|---|---|---|---|---|---|---|
| 1b | + | 2b | p ---> | —[BI]$_n$— | | 1e | + | 2c | p ---> | —[EI]$_n$— |
| 1b | + | 2c | p ---> | —[BI]$_n$— | | 1e | + | 2d | p ---> | —[EI]$_n$— |
| 1b | + | 2d | p ---> | —[BI]$_n$— | | 1e | + | 2f | p ---> | —[EJ]$_n$— |
| 1b | + | 2f | p ---> | —[BJ]$_n$— | | 1e | + | 2g | p ---> | —[EJ]$_n$— |
| 1b | + | 2g | p ---> | —[BJ]$_n$— | | 1e | + | 2h | p ---> | —[EJ]$_n$— |
| 1b | + | 2h | p ---> | —[BJ]$_n$— | | 1e | + | 2j | p ---> | —[AE]$_n$— |
| 1b | + | 2r | p ---> | —[AIBI]$_n$— | | 1e | + | 2k | p ---> | —[BE]$_n$— |
| 1b | + | 2s | p ---> | —[BI]$_n$— | | 1e | + | 2l | p ---> | —[CE]$_n$— |
| 1b | + | 2z | p ---> | —[B]$_n$— | | 1e | + | 2m | p ---> | —[DE]$_n$— |
| 1c | + | 2b | p ---> | —[CI]$_n$— | | 1e | + | 2r | p ---> | —[AIEI]$_n$— |
| 1c | + | 2e | p ---> | —[CI]$_n$— | | 1e | + | 2s | p ---> | —[BIEI]$_n$— |
| 1c | + | 2d | p ---> | —[CI]$_n$— | | 1e | + | 2t | p ---> | —[CIEI]$_n$— |
| 1c | + | 2f | p ---> | —[CJ]$_n$— | | 1e | + | 2u | p ---> | —[DIEI]$_n$— |
| 1c | + | 2g | p ---> | —[CJ]$_n$— | | 1e | + | 2v | p ---> | —[EI]$_n$— |
| 1c | + | 2h | p ---> | —[CJ]$_n$— | | 1f | + | 2b | p ---> | —[FI]$_n$— |
| 1c | + | 2r | p ---> | —[AICI]$_n$— | | 1f | + | 2c | p ---> | —[FI]$_n$— |
| 1c | + | 2s | p ---> | —[BICI]$_n$— | | 1f | + | 2d | p ---> | —[FI]$_n$— |
| 1c | + | 2t | p ---> | —[CI]$_n$— | | 1f | + | 2f | p ---> | —[FJ]$_n$— |
| 1d | + | 2b | p ---> | —[DI]$_n$— | | 1f | + | 2g | p ---> | —[FJ]$_n$— |
| 1d | + | 2c | p ---> | —[DI]$_n$— | | 1f | + | 2h | p ---> | —[FJ]$_n$— |
| 1d | + | 2d | p ---> | —[DI]$_n$— | | 1f | + | 2j | p ---> | —[AF]$_n$— |
| 1d | + | 2f | p ---> | —[DJ]$_n$— | | 1f | + | 2k | p ---> | —[BF]$_n$— |
| 1d | + | 2g | p ---> | —[DJ]$_n$— | | 1f | + | 2l | p ---> | —[CF]$_n$— |
| 1d | + | 2h | p ---> | —[DJ]$_n$— | | 1f | + | 2m | p ---> | —[DF]$_n$— |
| 1d | + | 2j | p ---> | —[AD]$_n$— | | 1f | + | 2n | p ---> | —[EF]$_n$— |
| 1d | + | 2k | p ---> | —[BD]$_n$— | | 1f | + | 2r | p ---> | —[AIFI]$_n$— |
| 1d | + | 2l | p ---> | —[CD]$_n$— | | 1f | + | 2s | p ---> | —[BIFI]$_n$— |
| 1d | + | 2r | p ---> | —[AIDI]$_n$— | | 1f | + | 2t | p ---> | —[CIFI]$_n$— |
| 1d | + | 2s | p ---> | —[BIDI]$_n$— | | 1f | + | 2u | p ---> | —[DIFI]$_n$— |
| 1d | + | 2t | p ---> | —[CIDI]$_n$— | | 1f | + | 2v | p ---> | —[EIFI]$_n$— |
| 1d | + | 2u | p ---> | —[DI]$_n$— | | 1f | + | 2w | p > | —[FI]$_n$— |
| 1e | + | 2b | p ---> | —[EI]$_n$— | | 1g | + | 2b | p ---> | —[GI]$_n$— |

TABLE 16b-continued
Polymers of Type I, Class 1
Polymerization Reactions:

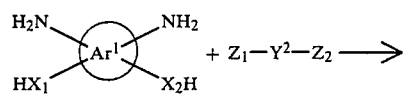

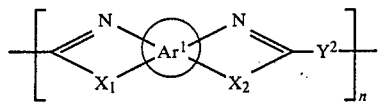

| Monomer (1,1) | + | Monomer (2,1) | ------> | Polymer I(1) |
|---|---|---|---|---|
| 1g | + | 2c | p ---> | —[GI]$_n$— |
| 1g | + | 2d | p ---> | —[GI]$_n$— |
| 1g | + | 2f | p ---> | —[GJ]$_n$— |
| 1g | + | 2g | p ---> | —[GJ]$_n$— |
| 1g | + | 2h | p ---> | —[GJ]$_n$— |
| 1g | + | 2j | p ---> | —[AG]$_n$— |
| 1g | + | 2k | p ---> | —[BG]$_n$— |
| 1g | + | 2l | p ---> | —[CG]$_n$— |
| 1g | + | 2m | p ---> | —[DG]$_n$— |
| 1g | + | 2n | p ---> | —[EG]$_n$— |
| 1g | + | 2o | p ---> | —[FG]$_n$— |
| 1g | + | 2r | p ---> | —[AIGI]$_n$— |
| 1g | + | 2s | p ---> | —[BIGI]$_n$— |
| 1g | + | 2t | p ---> | —[CIGI]$_n$— |
| 1g | + | 2u | p ---> | —[DIGI]$_n$— |
| 1g | + | 2v | p ---> | —[EIGI]$_n$— |
| 1g | + | 2w | p ---> | —[FIGI]$_n$— |
| 1g | + | 2x | p ---> | —[GI]$_n$— |
| 1h | + | 2b | p ---> | —[HI]$_n$— |
| 1h | + | 2c | p ---> | —[HI]$_n$— |
| 1h | + | 2d | p ---> | —[HI]$_n$— |
| 1h | + | 2f | p ---> | —[HJ]$_n$— |
| 1h | + | 2g | p ---> | —[HJ]$_n$— |
| 1h | + | 2h | p ---> | —[HJ]$_n$— |
| 1h | + | 2j | p ---> | —[AH]$_n$— |
| 1h | + | 2k | p ---> | —[BH]$_n$— |
| 1h | + | 2l | p ---> | —[CH]$_n$— |
| 1h | + | 2m | p ---> | —[DH]$_n$— |
| 1h | + | 2n | p ---> | —[EH]$_n$— |
| 1h | + | 2o | p ---> | —[FH]$_n$— |
| 1h | + | 2p | p ---> | —[GH]$_n$— |
| 1h | + | 2r | p ---> | —[AIHI]$_n$— |

TABLE 16b-continued
Polymers of Type I, Class 1
Polymerization Reactions:

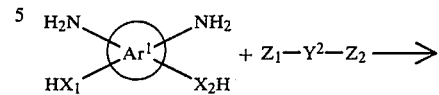

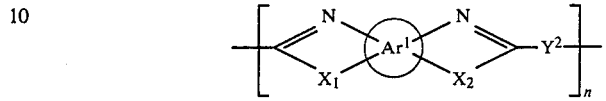

| Monomer (1,1) | + | Monomer (2,1) | ------> | Polymer I(1) |
|---|---|---|---|---|
| 1h | + | 2s | p ---> | —[BIHI]$_n$— |
| 1h | + | 2t | p ---> | —[CIHI]$_n$— |
| 1h | + | 2u | p ---> | —[DIHI]$_n$— |
| 1h | + | 2v | p ---> | —[EIHI]$_n$— |
| 1h | + | 2w | p ---> | —[FIHI]$_n$— |
| 1h | + | 2x | p ---> | —[GIHI]$_n$— |
| 1h | + | 2y | p ---> | —[HI]$_n$— |

TABLE 17a
Polymers of Type I, Class 2
Polymerization Reactions:

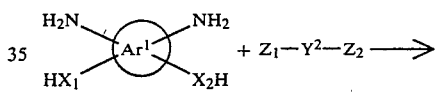

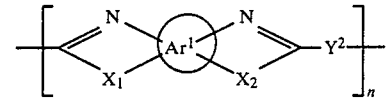

| Monomer (1,2) | + | Monomer (2,1) | ------> | Polymer I(2) |
|---|---|---|---|---|
| 1i | + | 2b | e ---> | —[LI]$_n$— |
| 1i | + | 2c | p ---> | —[LI]$_n$— |
| 1i | + | 2d | p ---> | —[LI]$_n$— |
| 1i | + | 2e | e ---> | —[LJ]$_n$— |
| 1i | + | 2f | p ---> | —[LJ]$_n$— |
| 1i | + | 2g | p ---> | —[LJ]$_n$— |
| 1i | + | 2h | p ---> | —[LJ]$_n$— |
| 1i | + | 2i | e ---> | —[LK]$_n$— |
| 1i | + | 2k | e ---> | —[BL]$_n$— |
| 1i | + | 2l | e ---> | —[CL]$_n$— |
| 1i | + | 2m | e ---> | —[DL]$_n$— |
| 1i | + | 2n | e ---> | —[EL]$_n$— |
| 1i | + | 2o | e ---> | —[FL]$_n$— |
| 1i | + | 2p | e ---> | —[GL]$_n$— |
| 1i | + | 2q | p ---> | —[HL]$_n$— |

TABLE 17a-continued

Polymers of Type I, Class 2
Polymerization Reactions:

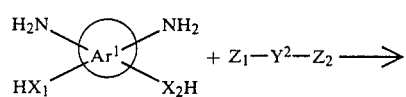  + $Z_1-Y^2-Z_2 \longrightarrow$

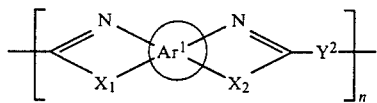

| Monomer (1,2) | + | Monomer (2,1) | ---> | Polymer I(2) |
|---|---|---|---|---|
| 1i | + | 2r | m ---> | —[AILI]$_n$— |
| 1i | + | 2s | m ---> | —[BILI]$_n$— |
| 1i | + | 2t | e ---> | —[CILI]$_n$— |
| 1i | + | 2u | e ---> | —[DILI]$_n$— |
| 1i | + | 2v | e ---> | —[EILI]$_n$— |
| 1i | + | 2w | e ---> | —[FILI]$_n$— |
| 1i | + | 2x | e ---> | —[GILI]$_n$— |
| 1i | + | 2y | p ---> | —[HILI]$_n$— |
| 1i | + | 2z | e ---> | —[L]$_n$— |
| 1j | + | 2b | e ---> | —[MI]$_n$— |
| 1j | + | 2c | p ---> | —[MI]$_n$— |
| 1j | + | 2d | p ---> | —[MI]$_n$— |
| 1j | + | 2e | e ---> | —[MJ]$_n$— |
| 1j | + | 2f | p ---> | —[MJ]$_n$— |
| 1j | + | 2g | p ---> | —[MJ]$_n$— |
| 1j | + | 2h | p ---> | —[MJ]$_n$— |
| 1j | + | 2i | e ---> | —[MK]$_n$— |
| 1j | + | 2k | e ---> | —[BM]$_n$— |
| 1j | + | 2l | e ---> | —[CM]$_n$— |
| 1j | + | 2m | e ---> | —[DM]$_n$— |
| 1j | + | 2n | e ---> | —[EM]$_n$— |
| 1j | + | 2o | e ---> | —[FM]$_n$— |
| 1j | + | 2p | e ---> | —[GM]$_n$— |
| 1j | + | 2q | e ---> | —[HM]$_n$— |
| 1j | + | 2r | e ---> | —[AIMI]$_n$— |
| 1j | + | 2s | e ---> | —[BIMI]$_n$— |
| 1j | + | 2t | e ---> | —[CIMI]$_n$— |
| 1j | + | 2u | e ---> | —[DIMI]$_n$— |
| 1j | + | 2v | e ---> | —[EIMI]$_n$— |
| 1j | + | 2w | e ---> | —[FIMI]$_n$— |
| 1j | + | 2x | e ---> | —[GIMI]$_n$— |
| 1j | + | 2y | p ---> | —[HIMI]$_n$— |

TABLE 17a-continued

Polymers of Type I, Class 2
Polymerization Reactions:

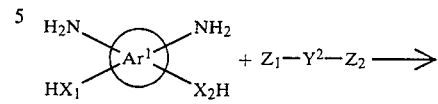  + $Z_1-Y^2-Z_2 \longrightarrow$

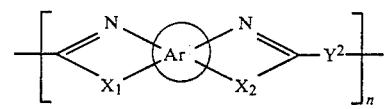

| Monomer (1,2) | + | Monomer (2,1) | ---> | Polymer I(2) |
|---|---|---|---|---|
| 1j | + | 2z | e ---> | —[M]$_n$— |
| 1k | + | 2b | e ---> | —[NI]$_n$— |
| 1k | + | 2c | p ---> | —[NI]$_n$— |
| 1k | + | 2d | p ---> | —[NI]$_n$— |
| 1k | + | 2e | e ---> | —[NJ]$_n$— |
| 1k | + | 2f | p ---> | —[NJ]$_n$— |
| 1k | + | 2g | p ---> | —[NJ]$_n$— |
| 1k | + | 2h | p ---> | —[NJ]$_n$— |
| 1k | + | 2i | e ---> | —[NK]$_n$— |
| 1k | + | 2k | e ---> | —[BN]$_n$— |
| 1k | + | 2l | e ---> | —[CN]$_n$— |
| 1k | + | 2m | e ---> | —[DN]$_n$— |
| 1k | + | 2n | e ---> | —[EN]$_n$— |
| 1k | + | 2o | e ---> | —[FN]$_n$— |
| 1k | + | 2p | e ---> | —[GN]$_n$— |
| 1k | + | 2q | p ---> | —[HN]$_n$— |
| 1k | + | 2r | e ---> | —[AINI]$_n$— |
| 1k | + | 2s | e ---> | —[BINI]$_n$— |
| 1k | + | 2t | e ---> | —[CINI]$_n$— |
| 1k | + | 2u | e ---> | —[DINI]$_n$— |
| 1k | + | 2v | e ---> | —[EINI]$_n$— |
| 1k | + | 2w | e ---> | —[FINI]$_n$— |
| 1k | + | 2x | e ---> | —[GINI]$_n$— |
| 1k | + | 2y | p ---> | —[HINI]$_n$— |
| 1k | + | 2z | e ---> | —[N]$_n$— |
| 1l | + | 2b | e ---> | —[OI]$_n$— |
| 1l | + | 2c | p ---> | —[OI]$_n$— |
| 1l | + | 2d | p ---> | —[OI]$_n$— |
| 1l | + | 2e | e ---> | —[OJ]$_n$— |
| 1l | + | 2f | p ---> | —[OJ]$_n$— |
| 1l | + | 2g | p ---> | —[OJ]$_n$— |
| 1l | + | 2h | p ---> | —[OJ]$_n$— |

TABLE 17a-continued
Polymers of Type I, Class 2
Polymerization Reactions:

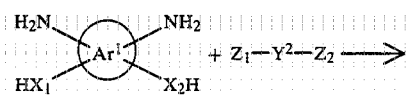

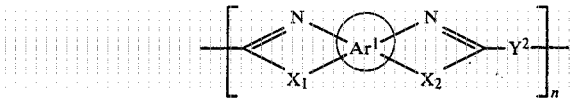

| Monomer (1,2) | + | Monomer (2,1) | ---> | Polymer I(2) |
|---|---|---|---|---|
| 1l | + | 2i | e ---> | —[OK]$_n$— |
| 1l | + | 2j | e ---> | —[AO]$_n$— |
| 1l | + | 2k | e ---> | —[BO]$_n$— |
| 1l | + | 2l | e ---> | —[CO]$_n$— |
| 1l | + | 2m | e ---> | —[DO]$_n$— |
| 1l | + | 2n | e ---> | —[EO]$_n$— |
| 1l | + | 2o | e ---> | —[FO]$_n$— |
| 1l | + | 2p | e ---> | —[GO]$_n$— |
| 1l | + | 2q | p ---> | —[HO]$_n$— |
| 1l | + | 2r | e ---> | —[AIOI]$_n$— |
| 1l | + | 2s | e ---> | —[BIOI]$_n$— |
| 1l | + | 2t | e ---> | —[CIOI]$_n$— |
| 1l | + | 2u | e ---> | —[DIOI]$_n$— |
| 1l | + | 2v | e ---> | —[EIOI]$_n$— |
| 1l | + | 2w | e ---> | —[FIOI]$_n$— |
| 1l | + | 2x | e ---> | —[GIOI]$_n$— |
| 1l | + | 2y | p ---> | —[HIOI]$_n$— |
| 1m | + | 2a | p ---> | —[PI]$_n$— |
| 1m | + | 2b | p ---> | —[PI]$_n$— |
| 1m | + | 2c | p ---> | —[PI]$_n$— |
| 1m | + | 2d | p ---> | —[PI]$_n$— |
| 1m | + | 2e | p ---> | —[PJ]$_n$— |
| 1m | + | 2f | p ---> | —[PJ]$_n$— |
| 1m | + | 2g | p ---> | —[PJ]$_n$— |
| 1m | + | 2h | p ---> | —[PJ]$_n$— |
| 1m | + | 2i | p ---> | —[PK]$_n$— |
| 1m | + | 2j | p ---> | —[AP]$_n$— |
| 1m | + | 2k | p ---> | —[BP]$_n$— |
| 1m | + | 2l | p ---> | —[CP]$_n$— |
| 1m | + | 2m | p ---> | —[DP]$_n$— |
| 1m | + | 2n | p ---> | —[EP]$_n$— |
| 1m | + | 2o | p ---> | —[FP]$_n$— |

TABLE 17a-continued
Polymers of Type I, Class 2
Polymerization Reactions:

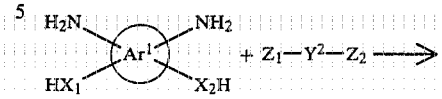

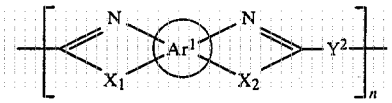

| Monomer (1,2) | + | Monomer (2,1) | ---> | Polymer I(2) |
|---|---|---|---|---|
| 1m | + | 2p | p ---> | —[GP]$_n$— |
| 1m | + | 2q | p ---> | —[HP]$_n$— |
| 1m | + | 2r | p ---> | —[AIPI]$_n$— |
| 1m | + | 2s | p ---> | —[BIPI]$_n$— |
| 1m | + | 2t | p ---> | —[CIPI]$_n$— |
| 1m | + | 2u | p ---> | —[DIPI]$_n$— |
| 1m | + | 2v | p ---> | —[EIPI]$_n$— |
| 1m | + | 2w | p ---> | —[FIPI]$_n$— |
| 1m | + | 2x | p ---> | —[GIPI]$_n$— |
| 1m | + | 2y | p ---> | —[HIPI]$_n$— |
| 1n | + | 2a | e ---> | —[QI]$_n$— |
| 1n | + | 2b | p ---> | —[QI]$_n$— |
| 1n | + | 2c | p ---> | —[QI]$_n$— |
| 1n | + | 2d | p ---> | —[QI]$_n$— |
| 1n | + | 2e | e ---> | —[QJ]$_n$— |
| 1n | + | 2f | p ---> | —[QJ]$_n$— |
| 1n | + | 2g | p ---> | —[QJ]$_n$— |
| 1n | + | 2h | p ---> | —[QJ]$_n$— |
| 1n | + | 2i | e ---> | —[QK]$_n$— |
| 1n | + | 2j | e ---> | —[AQ]$_n$— |
| 1n | + | 2k | e ---> | —[BQ]$_n$— |
| 1n | + | 2l | e ---> | —[CQ]$_n$— |
| 1n | + | 2m | e ---> | —[DQ]$_n$— |
| 1n | + | 2n | e ---> | —[EQ]$_n$— |
| 1n | + | 2o | e ---> | —[FQ]$_n$— |
| 1n | + | 2p | e ---> | —[GQ]$_n$— |
| 1n | + | 2q | p ---> | —[HQ]$_n$— |
| 1n | + | 2r | e ---> | —[AIQI]$_n$— |
| 1n | + | 2s | e ---> | —[BIQI]$_n$— |
| 1n | + | 2t | e ---> | —[CIQI]$_n$— |
| 1n | + | 2u | e ---> | —[DIQI]$_n$— |
| 1n | + | 2v | e ---> | —[EIQI]$_n$— |

TABLE 17a-continued

Polymers of Type I, Class 2
Polymerization Reactions:

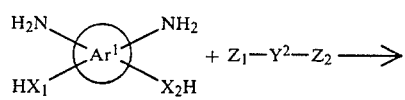

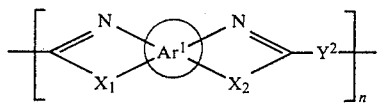

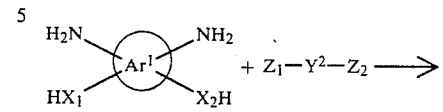

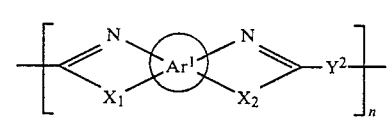

| Monomer (1,2) | + | Monomer (2,1) | ---> | Polymer I(2) |
|---|---|---|---|---|
| 1n | + | 2w | e ---> | —[FIQI]$_n$— |
| 1n | + | 2x | e ---> | —[GIQI]$_n$— |
| 1n | + | 2y | p ---> | —[HIQI]$_n$— |
| 1n | + | 2z | e ---> | —[Q]$_n$— |
| 1o | + | 2a | e ---> | —[RI]$_n$— |
| 1o | + | 2b | p ---> | —[RI]$_n$— |
| 1o | + | 2c | p ---> | —[RI]$_n$— |
| 1o | + | 2d | p ---> | —[RI]$_n$— |
| 1o | + | 2e | e ---> | —[RJ]$_n$— |
| 1o | + | 2f | p ---> | —[RJ]$_n$— |
| 1o | + | 2g | p ---> | —[RJ]$_n$— |
| 1o | + | 2h | p ---> | —[RJ]$_n$— |
| 1o | + | 2i | e ---> | —[RK]$_n$— |
| 1o | + | 2j | e ---> | —[AR]$_n$— |
| 1o | + | 2k | e ---> | —[BR]$_n$— |
| 1o | + | 2l | e ---> | —[CR]$_n$— |
| 1o | + | 2m | e ---> | —[DR]$_n$— |
| 1o | + | 2n | e ---> | —[ER]$_n$— |
| 1o | + | 2o | e ---> | —[FR]$_n$— |
| 1o | + | 2p | e ---> | —[GR]$_n$— |
| 1o | + | 2q | p ---> | —[HR]$_n$— |
| 1o | + | 2r | e ---> | —[AIRI]$_n$— |
| 1o | + | 2s | e ---> | —[BIRI]$_n$— |
| 1o | + | 2t | e ---> | —[CIRI]$_n$— |
| 1o | + | 2u | e ---> | —[DIRI]$_n$— |
| 1o | + | 2v | e ---> | —[EIRI]$_n$— |
| 1o | + | 2w | e ---> | —[FIRI]$_n$— |
| 1o | + | 2x | e ---> | —[GIRI]$_n$— |
| 1o | + | 2y | p ---> | —[HIRI]$_n$— |
| 1o | + | 2z | e ---> | —[R]$_n$— |
| 1p | + | 2a | e ---> | —[SI]$_n$— |
| 1p | + | 2b | p ---> | —[SI]$_n$— |
| 1p | + | 2c | p ---> | —[SI]$_n$— |
| 1p | + | 2d | p ---> | —[SI]$_n$— |
| 1p | + | 2e | e ---> | —[SJ]$_n$— |
| 1p | + | 2f | p ---> | —[SJ]$_n$— |
| 1p | + | 2g | p ---> | —[SJ]$_n$— |
| 1p | + | 2h | p ---> | —[SJ]$_n$— |
| 1p | + | 2i | e ---> | —[SK]$_n$— |
| 1p | + | 2j | e ---> | —[AS]$_n$— |
| 1p | + | 2k | e ---> | —[BS]$_n$— |
| 1p | + | 2l | e ---> | —[CS]$_n$— |
| 1p | + | 2m | e ---> | —[DS]$_n$— |
| 1p | + | 2n | e ---> | —[ES]$_n$— |
| 1p | + | 2o | e ---> | —[FS]$_n$— |
| 1p | + | 2p | e ---> | —[GS]$_n$— |
| 1p | + | 2q | p ---> | —[HS]$_n$— |
| 1p | + | 2r | p ---> | —[AISI]$_n$— |
| 1p | + | 2s | p ---> | —[BISI]$_n$— |
| 1p | + | 2t | p ---> | —[CISI]$_n$— |
| 1p | + | 2u | p ---> | —[DISI]$_n$— |
| 1p | + | 2v | p ---> | —[EISI]$_n$— |
| 1p | + | 2w | p ---> | —[FISI]$_n$— |
| 1p | + | 2x | p ---> | —[GISI]$_n$— |
| 1p | + | 2y | p ---> | —[HISI]$_n$— |

TABLE 17b

Polymers of Type I, Class 2
Polymerization Reactions:

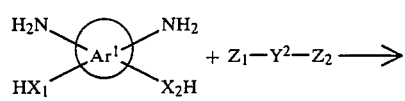

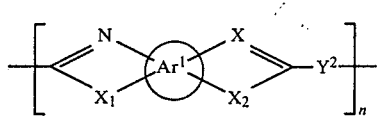

| Monomer (1,1) + Monomer (2,2) ------> | | Polymer I(2) |
|---|---|---|
| 1a + 2hh | e ---> | ⁺AVIV'⁾ₙ |
| 1a + 2ii | e ---> | ⁺ATIT'⁾ₙ |
| 1a + 2jj | e ---> | ⁺ATKT'⁾ₙ |
| 1b + 2hh | e ---> | ⁺BVIV'⁾ₙ |
| 1b + 2ii | e ---> | ⁺BTIT'⁾ₙ |
| 1b + 2jj | e ---> | ⁺BTKT'⁾ₙ |
| 1c + 2hh | e ---> | ⁺CVIV'⁾ₙ |
| 1c + 2ii | e ---> | ⁺CTIT'⁾ₙ |
| 1c + 2jj | e ---> | ⁺CTKT'⁾ₙ |
| 1d + 2hh | e ---> | ⁺DVIV'⁾ₙ |
| 1d + 2ii | e ---> | ⁺DTIT'⁾ₙ |
| 1d + 2jj | e ---> | ⁺DTKT'⁾ₙ |
| 1e + 2hh | e ---> | ⁺EVIV'⁾ₙ |
| 1e + 2hh | e ---> | ⁺ETIT'⁾ₙ |
| 1e + 2jj | e ---> | ⁺ETKT'⁾ₙ |
| 1f + 2hh | e ---> | ⁺FVIV'⁾ₙ |
| 1f + 2ii | e ---> | ⁺FTIT'⁾ₙ |
| 1f + 2jj | e ---> | ⁺FTKT'⁾ₙ |
| 1g + 2hh | e ---> | ⁺GVIV'⁾ₙ |
| 1g + 2ii | e ---> | ⁺GTIT'⁾ₙ |
| 1g + 2jj | e ---> | ⁺GTKT'⁾ₙ |
| 1h + 2hh | e ---> | ⁺HVIV'⁾ₙ |
| 1h + 2ii | e ---> | ⁺HTIT'⁾ₙ |
| 1h + 2jj | e ---> | ⁺HTKT'⁾ₙ |

TABLE 17c

Polymers of Type I, Class 2
Polymerization Reactions:

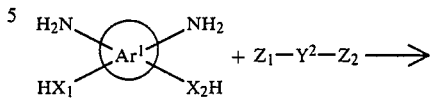

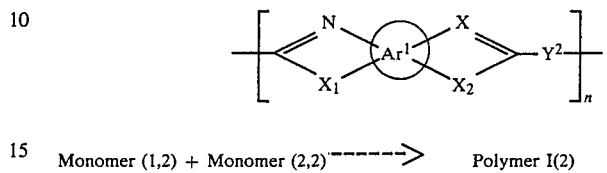

| Monomer (1,2) + Monomer (2,2) ------> | | Polymer I(2) |
|---|---|---|
| 1i + 2hh | e ---> | ⁺LVIV'⁾ₙ |
| 1i + 2ii | e ---> | ⁺LTIT'⁾ₙ |
| 1i + 2jj | e ---> | ⁺LTKT'⁾ₙ |
| 1j + 2hh | e ---> | ⁺MVIV'⁾ₙ |
| 1j + 2ii | e ---> | ⁺MTIT'⁾ₙ |
| 1j + 2jj | e ---> | ⁺MTKT'⁾ₙ |
| 1k + 2hh | e ---> | ⁺NVIV'⁾ₙ |
| 1k + 2ii | e ---> | ⁺NTIT'⁾ₙ |
| 1k + 2jj | e ---> | ⁺NTKT'⁾ₙ |
| 1l + 2hh | e ---> | ⁺OVIV'⁾ₙ |
| 1l + 2ii | e ---> | ⁺OTIT'⁾ₙ |
| 1l + 2jj | e > | ⁺OTKT'⁾ₙ |
| 1m + 2hh | e ---> | ⁺PVIV'⁾ₙ |
| 1m + 2ii | e ---> | ⁺PTIT'⁾ₙ |
| 1m + 2jj | e ---> | ⁺PTKT'⁾ₙ |
| 1n + 2hh | e ---> | ⁺QVIV'⁾ₙ |
| 1n + 2ii | e ---> | ⁺QTIT'⁾ₙ |
| 1n + 2jj | e ---> | ⁺QTKT'⁾ₙ |
| 1o + 2hh | e ---> | ⁺RVIV'⁾ₙ |
| 1o + 2ii | e ---> | ⁺RTIT'⁾ₙ |
| 1o + 2jj | e ---> | ⁺RTKT'⁾ₙ |
| 1p + 2hh | e ---> | ⁺SVIV'⁾ₙ |
| 1p + 2ii | e ---> | ⁺STIT'⁾ₙ |
| 1p + 2jj | e ---> | ⁺STKT'⁾ₙ |

EXAMPLE 26

A solution consisting of 63.34 g concentrated phosphoric acid and 147.59 g of 115% PPA was stirred at 100° C. under reduced pressure for 3h in a 300 ml 3-necked flask. To a 500 mL resin kettle was added 63.49 g (0.3087 mol) of 4-amino-3-mercaptobenzoic acid hydrochloride (3a) (prepared by the method of Wolfe, AFOSR Final Technical Report, Dec. 15, 1980). A portion of the above-prepared PPA having a $P_2O_5$ of 77.3% (207.57 g) was poured into the resin kettle containing the monomer while under argon flow. After the monomer had been incorporated, a second portion of monomer (30.71 g, 0.1493 mol) was added. The mixture was heated to 55° C. and the pressure was gradually decreased over 1.5h. An additional 5.35 g of monomer was added to the kettle under argon flow bringing the total monomer added to 99.65 g (0.4845 mol). The mixture was then stirred under reduced pressure at 50° C. overnight. The temperature was then raised to 70° C. for 8h. Phosphorus pentoxide (138.62 g) was then added in one portion to increase the effective $P_2O_5$ content to 86.4%. After heating at 100° C. with stirring overnight the reaction product was stir-opalescent. After placing the mixture, which still contained undissolved monomer, under reduced pressure for 3h, a sample was removed and was placed between a microscope slide and a cover glass. The unprecipitated product depolarized plane-polarized light. The reaction mixture was then heated under argon as follows: an additional 2.5h at 100° C.; 2h at 120° C.; 16h at 130° C.; 31h at 170° C.; 43.5h at 200° C. A sample of the green, opalescent polymer reaction product yielded gold-orange fibers upon precipitation in water. The sample was extracted in water for 24h and dried under vacuum at 140° C. for 24h. The intrinsic viscosity was determined to be 8.2 dL/g in MSA at 30.1° C. The reaction product is characterized as having a final effective $P_2O_5$ content of 82.2% with the polymer $-\text{I}\overline{]_n}$ having a concentration of 15.1% by weight.

EXAMPLE 27

A mixture of 125.8 g of 115% PPA and 53.9 g of concentrated phosphoric acid (85.7% $H_3PO_4$) was heated to 100° C. for 4h under reduced pressure in a 500 mL 3-necked flask. The % $P_2O_5$ content profile for this Example is illustrated in Example 12. To a 500 mL resin kettle was added 91.85 g (0.4466 mol) of 3a. The kettle containing the monomer was deaerated. 108.17 g of the PPA prepared above (having a $P_2O_5$ content of 77.2%) was then added. The kettle was then heated with an oil bath at 50° C. under a thin stream of argon overnight. The kettle was then placed under reduced pressure again and heated to 70° C. for 23h. $P_2O_5$ (108.32 g) was then added in three portions to increase the effective $P_2O_5$ content to 88.5%. Reduced pressure was applied to degas the $P_2O_5$ and to cause foaming that aided in mixing. After 3h of stirring the temperature was raised to 100° C. and maintained at that temperature under reduced pressure for 21h. The mixture was stir-opalescent and depolarized plane-polarized light. The mixture was then heated as follows: 115° C. under argon for 3h; 130° C. under reduced pressure for 2h; 170° C. for 0.5h; 190° C. for 17h. A sample of the green, opalescent reaction product was removed and gave a fibrillar, golden-colored fiber upon drawing followed by precipitation in water. After extracting with water in a Soxhlet apparatus for 24h the sample was dried for 24h at 110° C. under reduced pressure. The intrinsic viscosity of this sample was 15.8 dL/g in MSA at 30° C. An additional 7.5h of heating gave a sample with an intrinsic viscosity of 16.7 dL/g. The reaction product thus obtained was 20.3% by weight of polymer  in PPA with a final $P_2O_5$ content of 82.4%.

EXAMPLE 28

The procedure of Example 27 is essentially repeated. Instead of monomer 3a, 146.9123 g (0.4305753 mol) of monomer 3k is dehydrochlorinated in an "initial" solution of 265.9 g of PPA having a $P_2O_5$ content of 77.3% (prepared by mixing 78.6 g of 85.4% $H_3PO_4$ with 187.4 g of 115% PPA). When dehydrochlorination is substantially complete, an additional 144.85 g of $P_2O_5$ is gradually added to the mixture and dissolved by stirring and heating essentially according to the schedule given in Example 27. The amount of $P_2O_5$ added is preselected (as determined in accord with the aforementioned formulae a* and b*) to provide the reaction mixture with an effective $P_2O_5$ content of approximately 85.3% prior to the start of polymerization and an effective $P_2O_5$ content of approximately 82.2% subsequent to substantial complete polymerization. The reaction product obtained exhibits stir-opalescence and is further characterized as having a polymer concentration of 19%; fibers are readily formed by direct spinning, or drawing from the reaction product. The polymer obtained is of the following structure:

$$-\text{CH}\overline{]_n}$$

characterized by an intrinsic viscosity of 15 dL/g in MSA at 30° C. which corresponds to an average n value of polymerization of about 70.

EXAMPLE 29

The procedure of Example 27 is essentially repeated. Instead of monomer 3a, 161.90 g (0.85391 mol) of monomer 3c is dehydrochlorinated in an "initial" solution of 198.8 g of PPA having a $P_2O_5$ content of 77.3% (prepared by mixing 58.7 g of 85.4% $H_3PO_4$ with 140.0 g of 115% PPA). When dehydrochlorination is substantially complete, an additional 196.8 g of $P_2O_5$ is gradually added to the mixture and dissolved by stirring and heating essentially according to Example 27. The amount of $P_2O_5$ added is preselected (as determined in accord with the aforementioned formulae a* and b*) to provide the reaction mixture with an effective $P_2O_5$ content of approximately 88.6% prior to the start of polymerization and an effective $P_2O_5$ content of approximately 82.2% subsequent to substantial complete polymerization. The reaction product obtained exhibits stir-opalescence and is further characterized as having a polymer concentration of 19%; fibers are readily formed by direct spinning, or drawing from the reaction product. The polymer obtained is of the following structure:

characterized by an intrinsic viscosity of 12 dL/g in MSA at 30° C.

EXAMPLE 30

The procedure of Example 27 is essentially repeated. Instead of monomer 3a, 161.90 g (0.85391 mol) of monomer 3d is dehydrochlorinated in an "initial" solution of 221.7 g of PPA having a $P_2O_5$ content of 77.3% (prepared by mixing 65.50 g of 85.4% $H_3PO_4$ with 156.2 g of 115% PPA). When dehydrochlorination is substantially complete, an additional 203.1 g of $P_2O_5$ is gradually added to the mixture and dissolved by stirring and heating essentially according to Example 27. The amount of $P_2O_5$ added is preselected (as determined in accord with the aforementioned formulae a* and b*) to provide the reaction mixture with an effective $P_2O_5$ content of approximately 88.2% prior to the start of polymerization and an effective $P_2O_5$ content of approximately 82.2% subsequent to substantial complete polymerization. The reaction product obtained exhibits stir-opalescence and is further characterized as having a polymer concentration of 18%; fibers are readily formed by direct spinning, or drawing from the reaction product. The polymer obtained is of the following structure: characterized by an intrinsic viscosity of 12 dL/g in MSA at 30° C.

Analogous to the foregoing Examples 26–30, other Type II extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Table 19. The e--> denotes especially preferred selected monomer reactions.

TABLE 19

Polymers of Type II, Class 2
Polymerization Reactions:

| Monomer (3,2) | > | Polymer II(2) |
|---|---|---|
| 3f | e ---> | $+X+_n$ |
| 3g | e ---> | $+Y+_n$ |
| 3h | e ---> | $+TI+_n$ |
| 3i | e ---> | $+UI+_n$ |

EXAMPLE 31

The procedure of Example 8 is essentially repeated. Instead of monomers 1a and 2a, 99.923 g (0.35182 mol) of monomer 1c is dehydrochlorinated in an "initial" solution of 602.0 g of PPA having a $P_2O_5$ content of 77.3% (prepared by mixing 177.9 g of 85.4% $H_3PO_4$ with 424.1 g of 115% PPA). When dehydrochlorination is substantially complete, 76.740 g (0.35182 mol) of monomer 4a is added followed by the gradual addition of 272.7 g of $P_2O_5$. The mixture is then stirred and heated essentially according to Example 8. The amount of $P_2O_5$ added is preselected (as determined in accord with the aforementioned formulae a* and b*) to provide the reaction mixture with an effective $P_2O_5$ content of approximately 84.4% prior to the start of polymerization and an effective $P_2O_5$ content of approximately 82.0% subsequent to substantial complete polymerization. The reaction product obtained exhibits stir-opalescence and is further characterized as having a polymer concentration of 10%; fibers are readily formed by direct spinning, or drawing from the reaction product. The polymer obtained is of the following structure:

—ZB'A'B']$_n$ characterized by an intrinsic viscosity of 10 dL/g in MSA at 30° C.

Analogous to the foregoing Example 31, other Type III extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Table 20. The e--> denotes especially preferred selected monomer reactions.

TABLE 20

Polymers of Type III, Class 1
Polymerization Reactions:

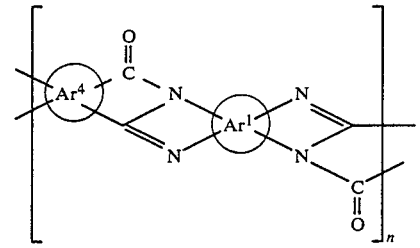

| Monomer (1,1) + Monomer (4,1) | > | Polymer III(1) |
|---|---|---|
| 1c + 4b | e ---> | $+B'A'F'Z+_n$ |
| 1e + 4a | e ---> | $+C'A'B'Z+_n$ |
| 1e + 4b | e ---> | $+C'A'F'Z+_n$ |

EXAMPLE 32

The procedure of Example 8 is essentially repeated. Instead of monomers 1a and 2a, 109.94 g (0.27752 mol) of monomer 1l is dehydrochlorinated in an "initial" solution of 317.2 g of PPA having a $P_2O_5$ content of 77.3% (prepared by mixing 93.7 g of 85.4% $H_3PO_4$ with 223.5 g of 115% PPA). When dehydrochlorination is substantially complete, 60.533 g (0.27752 mol) of monomer 4a is added followed by the gradual addition of 219.5 g of $P_2O_5$. The mixture is then stirred and heated essentially according to Example 8. The amount of $P_2O_5$ added is preselected (as determined in accord with the aforementioned formulae a* and b*) to provide the reaction mixture with an effective $P_2O_5$ content of approximately 86.6% prior to the start of polymerization and an effective $P_2O_5$ content of approximately 82.0% subsequent to substantial complete polymerization. The reaction product obtained exhibits stir-opalescence and is further characterized as having a polymer concentration of 15%; fibers are readily formed by direct spinning, or drawing from the reaction product. The polymer obtained is of the following structure:

$$\{ZD'A'B'\}_{\overline{n}}$$ 

characterized by an intrinsic viscosity of 7 dL/g in MSA at 30° C. Analogous to the foregoing Example 32, other Type III extended chain polymers may be synthesized to yield liquid-crystalline compositions having varying proportions of polymer concentration, $P_2O_5$ content and polymer intrinsic viscosity in accordance with the present invention.

The synthesis is illustrated by the reactions in Table 21. The e→ denotes especially preferred selected monomer reactions.

TABLE 21

Polymers of Type III, Class 2
Polymerization Reactions:

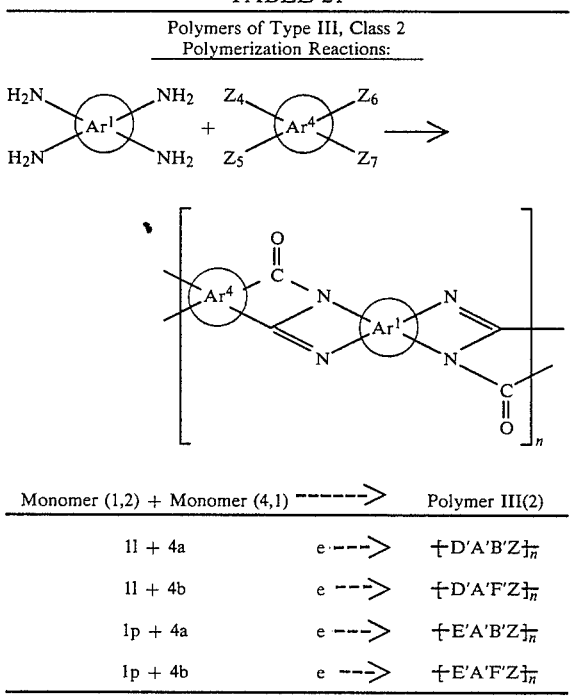

| Monomer (1,2) + Monomer (4,1) | ------> | Polymer III(2) |
|---|---|---|
| 1l + 4a | e ---> | $\{D'A'B'Z\}_{\overline{n}}$ |
| 1l + 4b | e ---> | $\{D'A'F'Z\}_{\overline{n}}$ |
| 1p + 4a | e ---> | $\{E'A'B'Z\}_{\overline{n}}$ |
| 1p + 4b | e ---> | $\{E'A'F'Z\}_{\overline{n}}$ |

EXAMPLE 33

The procedure of Example 27 is essentially repeated. Instead of monomer 3a, 117.5156 g (0.5149463 mol) of monomer 5a is dissolved in an "initial" solution of 623.7 g of PPA having a $P_2O_5$ content of 77.0% (prepared by mixing 192.8 g of 85.4% $H_3PO_4$ with 430.9 g of 115% PPA). When dissolution is substantially complete, an additional 257.8 g of $P_2O_5$ is gradually added to the mixture and dissolved by stirring and heating essentially according to Example 27. The amount of $P_2O_5$ added is preselected (as determined in accord with the aforementioned formulae a* and b*) to provide the reaction mixture with an effective $P_2O_5$ content of approximately 83.7% prior to the start of polymerization and an effective $P_2O_5$ content of approximately 82.0% subsequent to substantial complete polymerization. The reaction product obtained exhibits stir-opalescence and is further characterized as having a polymer concentration of 10%; fibers are readily formed by direct spinning, or drawing from the reaction product. The polymer obtained is of the following structure:

$$\{F'A'\}_{\overline{n}}$$ 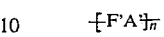

characterized by an intrinsic viscosity of 10 dL/g in MSA at 30° C.

EXAMPLE 34

The procedure of Example 8 is essentially repeated. Instead of monomers 1a and 2a, 70.784 g (0.28869 mol) of monomer 1a is dehydrochlorinated in an "initial" solution of 242.6 g of PPA having a $P_2O_5$ content of 77.3% (prepared by mixing 71.7 g of 85.4% $H_3O_4$ with 171.0 g of 115% PPA). When dehydrochlorination is substantially complete, 71.070 g (0.28869 mol) of monomer 6a is added followed by the gradual addition of 162.9 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 86.4% prior to the start of polymerization and an effective $P_2O_5$ content of approximately 82.2% subsequent to substantial complete polymerization. The reaction product obtained exhibits stir-opalescence and is further characterized as having a polymer concentration of 19%; fibers are readily formed by direct spinning, or drawing from the reaction product. The polymer obtained is of the following structure:

$$\{B'G'\}_n$$ 

characterized by an intrinsic viscosity of 7 dL/g in MSA at 30° C.

EXAMPLE 35

The procedure of Example 13 is essentially repeated. Instead of monomers 1b and 2a, 67.798 g (0.31820 mol) of monomer 1b is dehydrochlorinated in an "initial" mixture of 343.3 g of PPA having a $P_2O_5$ content of 77.3% (prepared by mixing 101.4 g of 85.4% $H_3PO_4$ with 241.9 g of 115% PPA). When dehydrochlorination is substantially complete, 78.336 g (0.31820 mol) of monomer 6a is added followed by the gradual addition of 200.4 g of $P_2O_5$. The mixture is then stirred and heated according to a schedule similar to Example 13. The amount of $P_2O_5$ added is preselected (as determined in accord with the aforementioned formula a* and b*) to provide the reaction mixture with an effective $P_2O_5$ content of approximately 85.7% prior to the start of polymerization and an effective $P_2O_5$ content of approximately 82.2% subsequent to substantial complete polymerization. The reaction product obtained exhibits stir-opalescence and is further characterized as having a polymer concentration of 15%; fibers are readily formed by direct spinning, or drawing from the reaction product. The polymer obtained is of the following structure:

characterized by an intrinsic viscosity of 7 dL/g in MSA at 30° C.

EXAMPLE 36

The procedure of Example 8 is essentially repeated. Instead of monomers 1a and 2a, 90.945 g (0.32021 mol) of monomer 1c is dehydrochlorinated in an "initial" solution of 402.5 g of PPA having a $P_2O_5$ content of 77.3% (prepared by mixing 192.1 g of 85.4% $H_3PO_4$ with 210.4 g of 115% PPA). When dehydrochlorination is substantially complete, 78.830 g (0.32021 mol) of monomer 6a is added followed by the gradual addition of 307.8 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 84.9% prior to the start of polymerization and an effective $P_2O_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

characterized by an intrinsic viscosity of 7 dL/g in MSA at 30° C.

Analogous to the foregoing Examples 34–36, other Type V extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Table 23. The e→ denotes especially preferred selected monomer reactions.

TABLE 23

Polymers of Type V, Class 1
Polymerization Reactions:

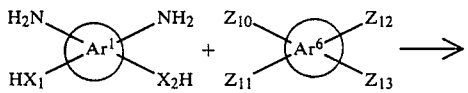

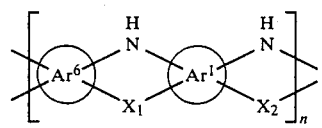

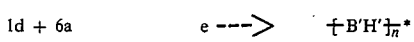

| Monomer (1,1) + Monomer (6,1) ------> | | Polymer V(1) |
|---|---|---|
| 1d + 6a | e ---> | ${-B'H'-}_n^*$ |

TABLE 23-continued

Polymers of Type V, Class 1
Polymerization Reactions:

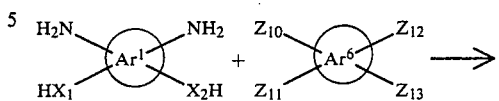

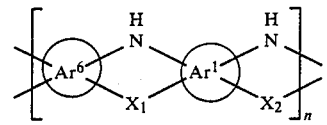

| Monomer (1,1) + Monomer (6,1) ------> | | Polymer V(1) |
|---|---|---|
| 1e + 6a | e ---> | ${-C'I'-}_n$ |
| 1f + 6a | e ---> | ${-C'H'-}_n$ |
| 1g + 6a | e ---> | ${-C'G'-}_n$ |
| 1h + 6a | e ---> | ${-B'M'-}_n$ |

*Note: Oxygens always para on B'

EXAMPLE 37

The procedure of Example 8 is essentially repeated. Instead of monomers 1a and 2a, 58.035 g (0.23669 mol) of monomer 1a is dehydrochlorinated in an "initial" solution of 307.7 g of PPA having a $P_2O_5$ content of 77.3% (prepared by mixing 90.9 g of 85.4% $H_3PO_4$ with 216.8 g of 115% PPA). When dehydrochlorination is substantially complete. 76.281 g (0.23669 mol) of monomer 6b is added followed by the gradual addition of 163.5 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 85.2% prior to the start of polymerization and an effective $P_2O_5$ content of approximately 82.2% subsequent to substantial complete polymerization. The reaction product obtained exhibits stir-opalescence and is further characterized as having a polymer concentration of 17%; fibers are readily formed by direct spinning, or drawing from the reaction product. The polymer obtained is of the following structure:

characterized by an intrinsic viscosity of 7 dL/g in MSA at 30° C.

EXAMPLE 38

The procedure of Example 13 is essentially repeated. Instead of monomers 1b and 2a, 54.581 g (0.25617 mol) of monomer 1b is dehydrochlorinated in an "initial" solution of 330.4 g of PPA having a $P_2O_5$ content of 77.3% (prepared by mixing 97.6 g of 85.4% $H_3PO_4$ with 232.7 g of 115% PPA). When dehydrochlorination is substantially complete, 82.559 g (0.25617 mol) of monomer 6b is added followed by the gradual addition of 176.2 g of P$_2$O$_5$. The mixture is then stirred and heated according to a schedule similar to Example 13. The amount of P$_2$O$_5$ added is preselected (as determined in accord with the aforementioned formulae a* and b*) to provide the reaction mixture with an effective P$_2$O$_5$ content of approximately 85.2% prior to the start of polymerization and an effective P$_2$O$_5$ content of approximately 82.2% subsequent to substantial complete polymerization. The reaction product obtained exhibits stir-opalescence and is further characterized as having a polymer concentration of 16%; fibers are readily formed by direct spinning, or drawing from the reaction product. The polymer obtained is of the following structure:

characterized by an intrinsic viscosity of 7 dL/g in MSA at 30° C.

EXAMPLE 39

The procedure of Example 8 is essentially repeated. Instead of monomers 1a and 2a, 73.126 g (0.25747 mol) of monomer 1c is dehydrochlorinated in an "initial" solution of 362.6 g of PPA having a P$_2$O$_5$ content of 77.3% (prepared by mixing 107.1 g of 85.4% H$_3$PO$_4$ with 255.5 g of 115% PPA). When dehydrochlorination is substantially complete, 82.978 g (0.25747 mol) of monomer 6b is added followed by the gradual addition of 185.5 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 85.0% prior to the start of polymerization and an effective P$_2$O$_5$ content of approximately 82.2% subsequent to substantial complete polymerization. The reaction product obtained exhibits stir-opalescence and is further characterized as having a polymer concentration of 15%; fibers are readily formed by direct spinning, or drawing from the reaction product. The polymer obtained is of the following structure:

characterized by an intrinsic viscosity of 6 dL/g in MSA at 30° C.

Analogous to the foregoing Examples 37–39, other Type V extended chain polymers may be synthesized to yield liquid-crystalline compositions having varying proportions of polymer concentration, P$_2$O$_5$ content and polymer intrinsic viscosity in accordance with the present invention.

The synthesis is illustrated by the reaction systems in Table 24a. The e→ denotes especially preferred selected monomer reactions.

TABLE 24a
Polymers of Type V, Class 2
Polymerization Reactions:

$$\text{H}_2\text{N}-\text{Ar}^1(\text{HX}_1)(\text{X}_2\text{H})-\text{NH}_2 + \text{Z}_{10}-\text{Ar}^6(\text{Z}_{11})(\text{Z}_{13})-\text{Z}_{12} \longrightarrow$$

$$\left[ -\text{Ar}^6(\text{X}_1)-\overset{H}{N}-\text{Ar}^1(\text{X}_2)-\overset{H}{N}- \right]_n$$

| Monomer (1,1) + Monomer (6,2) | | Polymer V(2) |
|---|---|---|
| 1d + 6b | e ---> | ─(B'K')$_n$─* |
| 1e + 6b | e ---> | ─(C'L')$_n$─ |
| 1f + 6b | e ---> | ─(C'K')$_n$─ |
| 1g + 6b | e ---> | ─(C'J')$_n$─ |
| 1h + 6b | e ---> | ─(B'N')$_n$─ |

*Note: Oxygens always para on B'

EXAMPLE 40

The procedure of Example 8 is essentially repeated. Instead of monomers 1a and 2a, 76.047 g (0.23369 mol) of monomer 1i is dehydrochlorinated in an "initial" solution of 369.2 g of PPA having a P$_2$O$_5$ content of 77.3% (prepared by mixing 109.1 g of 85.4% H$_3$PO$_4$ with 260.1 g of 115% PPA). When dehydrochlorination is substantially complete, 58.269 g (0.23369 mol) of monomer 6a is added followed by the gradual addition of 180.4 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 84.8% prior to the start of polymerization and an effective P$_2$O$_5$ content of approximately 82.2% subsequent to substantial complete polymerization. The reaction product obtained exhibits stir-opalescence and is further characterized as having a polymer concentration of 15%; fibers are readily formed by direct spinning, or drawing from the reaction product. The polymer obtained is of the following structure:

characterized by an intrinsic viscosity of 10 dL/g in MSA at 30° C.

EXAMPLE 41

The procedure of Example 8 is essentially repeated. Instead of monomers 1a and 2a, 74.075 g (0.25617 mol) of monomer 1j is dehydrochlorinated in an "initial" solution of 493.7 g of PPA having a P$_2$O$_5$ content of 77.3% (prepared by mixing 145.9 g of 85.4% H$_3$PO$_4$ with 347.8 g of 115% PPA). When dehydrochlorination is substantially complete, 63.065 g (0.25617 mol) of monomer 6a is added followed by the gradual addition of 221.2 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 84.3% prior to the start of polymerization and an effective $P_2O_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

characterized by an intrinsic viscosity of 6 dL/g in MSA at 30° C.

EXAMPLE 42

The procedure of Example 8 is essentially repeated. Instead of monomers 1a and 2a, 74.075 g (0.25617 mol) of monomer 1k is dehydrochlorinated in an "initial" solution of 493.7 g of PPA having a $P_2O_5$ content of 77.3% (prepared by mixing 145.9 g of 85.4% $H_3PO_4$ with 347.8 g of 115% PPA). When dehydrochlorination is substantially complete, 63.065 g (0.25617 mol) of monomer 6a is added followed by the gradual addition of 221.2 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 84.3% prior to the start of polymerization and an effective $P_2O_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

$\text{-}[D'H']_{\overline{n}}$ characterized by an intrinsic viscosity of 6 dL/g in MSA at 30° C.

EXAMPLE 43

The procedure of Example 8 is essentially repeated. Instead of monomers 1a and 2a, 101.996 g (0.25747 mol) of monomer 1l is dehydrochlorinated in an "initial" solution of 493.3 g of PPA having a $P_2O_5$ content of 77.3% (prepared by mixing 145.7 g of 85.4% $H_3PO_4$ with 347.6 g of 115% PPA). When dehydrochlorination is substantially complete, 63.385 g (0.25747 mol) of monomer 6a is added followed by the gradual addition of 221.5 g of $P_2O_5$. The mixture is then stirred and heated according to a schedule similar to Example 8. The amount of $P_2O_5$ added is preselected (as determined accord with the aforementioned formulae a* and b*) to provide the reaction mixture with an effective $P_2O_5$ content of approximately 84.3% prior to the start of polymerization and an effective $P_2O_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

characterized by an intrinsic viscosity of 7 dL/g in MSA at 30° C.

Analogous to the foregoing Examples 40–43, other Type V extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Tables 24b and 24c. The e→ and p→ denote especially preferred and preferred selected monomer reactions respectively.

TABLE 24b

Polymers of Type V, Class 2
Polymerization Reactions:

| Monomer (1,2) + Monomer (6,1) | | Polymer V(2) |
|---|---|---|
| 1m + 6a | e ---> | $\text{-}[D'M']_{\overline{n}}$ |
| 1n + 6a | e ---> | $\text{-}[E'G']_{\overline{n}}$ |
| 1o + 6a | e ---> | $\text{-}[E'H']_{\overline{n}}$ |
| 1p + 6a | e ---> | $\text{-}[E'I']_{\overline{n}}$ |

TABLE 24c

| Monomer (1,2) + Monomer (6,2) | | Polymer V(2) |
|---|---|---|
| 1i + 6b | e ---> | $\text{-}[D'J']_{\overline{n}}$ |
| 1j + 6b | e ---> | $\text{-}[D'K']_{\overline{n}}$* |
| 1k + 6b | e ---> | $\text{-}[D'K']_{\overline{n}}$** |
| 1l + 6b | e ---> | $\text{-}[D'L']_{\overline{n}}$ |
| 1m + 6b | e ---> | $\text{-}[D'N']_{\overline{n}}$ |
| 1n + 6b | e ---> | $\text{-}[E'J']_{\overline{n}}$ |
| 1o + 6b | e ---> | $\text{-}[E'K']_{\overline{n}}$ |

TABLE 24c-continued

| Monomer (1,2) + Monomer (6,2) ------> | | Polymer V(2) |
|---|---|---|
| 1p + 6b | e ---> | +E'L'+<sub>n</sub> |

*Note: Oxygen always in 3,3'-positions on D'
**Note: Oxygens always in 4,4'-positions on D'

EXAMPLE 44

The procedure of Example 27 is essentially repeated. Instead of monomer 3a, 123.074 g (0.64042 mol) of monomer 9a is dissolved in an "initial" solution of 423.1 g of PPA having a $P_2O_5$ content of 77.3% (prepared by mixing 125.0 g of 85.4% $H_3PO_4$ with 298.1 g of 115% PPA). When dissolution is substantially complete, an additional 223.0 g of $P_2O_5$ is gradually added to the mixture and dissolved by stirring and heating essentially according to Example 27. The amount of $P_2O_5$ added is preselected (as determined in accord with the aforementioned formulae a* and b*) to provide the reaction mixture with an effective $P_2O_5$ content of approximately 85.1% prior to the start of polymerization and an effective $P_2O_5$ content of approximately 82.2% subsequent to substantial complete polymerization. The reaction product obtained exhibits stir-opalescence and is further characterized as having a polymer concentration of 13%; fibers are readily formed by direct spinning, or drawing from the reaction product. The polymer obtained is of the following structure:

characterized by an intrinsic viscosity of 10 dL/g in MSA at 30° C.

EXAMPLE 45

The procedure of Example 8 is essentially repeated. Instead of monomers 1a and 2a, 86.502 g (0.30457 mol) of monomer 1c is dehydrochlorinated in an "initial" solution of 468.4 g of PPA having a $P_2O_5$ content of 77.3% (prepared by mixing 141.3 g of 85.4% $H_3PO_4$ with 337.0 g of 115% PPA). When dehydrochlorination is substantially complete. 79.864 g (0.30457 mol) of monomer 7a is added followed by the gradual addition of 233.0 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 84.7% prior to the start of polymerization and an effective $P_2O_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

characterized by an intrinsic viscosity of 10 dL/g in MSA at 30° C.

Analogous to the foregoing Example 45, other Type VII extended chain polymers may be synthesized to yield liquid-crystalline compositions having varying proportions of polymer concentration. $P_2O_5$ content and polymer intrinsic viscosity in accordance with the present invention.

The synthesis is illustrated by the reaction systems in Tables 26 and 27. The e--> denotes especially preferred selected monomer reactions.

TABLE 26
Polymers of Type VII, Class 1
Polymerization Reactions:

$$H_2N-Ar^1-NH_2 \;+\; X_7-Y^7-X_7 \longrightarrow$$
$$\begin{bmatrix} Ar^1 \underset{N}{\overset{N}{=}} Y^7 \underset{N}{\overset{N}{=}} \end{bmatrix}_n$$

| Monomer (1,1) + Monomer (7,1) ----> | | Polymer VII(1) |
|---|---|---|
| 1e + 7a | e ---> | +C'O'+<sub>n</sub> |

TABLE 27
Polymers of Type VII, Class 2
Polymerization Reactions:

$$H_2N-Ar^1-NH_2 \;+\; X_7-Y^7-X_7 \longrightarrow$$
$$\begin{bmatrix} Ar^1 \underset{N}{\overset{N}{=}} Y^7 \underset{N}{\overset{N}{=}} \end{bmatrix}_n$$

| Monomer (1,2) + Monomer (7,1) ----> | | Polymer VII(2) |
|---|---|---|
| 1l + 7a | e ---> | +D'O'+<sub>n</sub> |
| 1p + 7a | e ---> | +E'O'+<sub>n</sub> |

EXAMPLE 46

The procedure of Example 8 is essentially repeated. Instead of monomers 1a and 2a, 102.35 g (0.48036 mol) of monomer 1b is dehydrochlorinated in an "initial" solution of 329.2 g of PPA having a $P_2O_5$ content of 77.3% (prepared by mixing 97.3 g of 85.4% $H_3PO_4$ with 231.9 g of 115% PPA). When dehydrochlorination is substantially complete, 67.296 g (0.48036 mol) of monomer 8a is added followed by the gradual addition of 250.5 g of $P_2O_5$. The mixture is then stirred and heated according to a schedule similar to Example 8. The amount $P_2O_5$ added is preselected (as determined in accord with the aforementioned formulae a* and b*) to provide the reaction mixture with an effective $P_2O_5$ content of approximately 87.1% prior to the start of polymerization and an effective $P_2O_5$ content of approximately 82.2% subsequent to substantial complete polymerization. The reaction product obtained exhibits stir-opalescence and is further characterized as having a polymer concentration of 14%; fibers are readily formed by direct spinning, or drawing from the reaction product. The polymer obtained is of the following structure:

characterized by an intrinsic viscosity of 7 dL/g in MSA at 30° C.

EXAMPLE 47

The procedure of Example 8 is essentially repeated. Instead of monomers 1a and 2a, 137.73 g (0.48494 mol) of monomer 1c is dehydrochlorinated in an "initial" solution of 370.8 g of PPA having a $P_2O_5$ content of 77.3% (prepared by mixing 109.6 g of 85.4% $H_3PO_4$ with 261.3 g of 115% PPA). When dehydrochlorination is substantially complete, 67.939 g (0.48494 mol) of monomer 8a is added followed by the gradual addition of 263.5 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 86.7% prior to the start of polymerization and an effective $P_2O_5$ content of approximately 82.2% subsequent to substantial complete polymerization. The reaction product obtained exhibits stir-opalescence and is further characterized as having a polymer concentration of 13%; fibers are readily formed by direct spinning, or drawing from the reaction product. The polymer obtained is of the following structure:

characterized by an intrinsic viscosity of 7 dL/g in MSA at 30° C.

Analogous to the foregoing Examples 46 and 47, other Type VIII extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Table 28. The e→ and p→ denote especially preferred and preferred selected monomer reactions respectively.

TABLE 28
Polymers of Type VIII, Class 1
Polymerization Reactions:

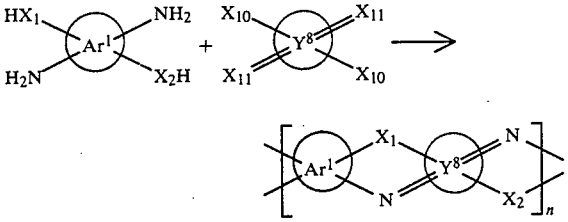

| Monomer (1,1) + Monomer (8,1) ----> | | Polymer VIII(1) |
|---|---|---|
| 1a + 8a | p ---> | ⁺B'R'⁾ₙ |
| 1d + 8a | p ---> | ⁺B'S'⁾ₙ |
| 1e + 8a | e ---> | ⁺C'Q'⁾ₙ |
| 1f + 8a | e ---> | ⁺C'S'⁾ₙ |
| 1f + 8a | p ---> | ⁺C'R'⁾ₙ |
| 1h + 8a | p ---> | ⁺B'U'⁾ₙ |

EXAMPLE 48

The procedure of Example 8 is essentially repeated. Instead of monomers 1a and 2a, 140.33 (0.35423 mol) of monomer 1l is dehydrochlorinated in an "initial" solution of 313.01 g of PPA having a $P_2O_5$ content of 77.3% (prepared by mixing 92.5 g of 85.4% $H_3PO_4$ with 220.5 g of 115% PPA). When dehydrochlorination is substantially complete, 49.627 g (0.35423 mol) of monomer 8a is added followed by the gradual addition of 263.0 of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 85.8% prior to the start of polymerization and an effective $P_2O_5$ content of approximately 82.2% subsequent to substantial complete polymerization. The reaction product obtained exhibits stir-opalescence and is further characterized as having a polymer concentration of 14%; fibers are readily formed by direct spinning, or drawing from the reaction product. The polymer obtained is of the following structure:

characterized by an intrinsic viscosity of 6 dL/g in MSA at 30° C.

EXAMPLE 49

A mixture of 123.38 g of 115% PPA and 52.63 g of concentrated orthophosphoric acid (85.7% $H_3PO_4$) was stirred at 100° C. for 2½ h under reduced pressure. After allowing the solution to cool to 50° C. under a flow of argon, a portion (168.18 g) of the PPA (77.3% $P_2O_5$) was added under a flow of argon to a resin kettle containing 57.61082 g (0.23496 mol, $a_1=0.95$) of 1a that had been prepared as described in Example 8 and 2.6358 g (0.012371 mol, $a_2=0.05$) of 1b that had been prepared by the method of Wolfe and Arnold, *Macromolecules*, Vol. 14, 909 (1981) and recrystallized from hydrochloric acid containing 3 wt % of stannous chloride. The mixture was then stirred at 50° C. for 33$h$ under reduced pressure and 90° C. for 4$h$ under reduced pressure. Monomer 2a (41.0899 g, 0.24733 mol=m, b$_1$=1) was then added. The mixture was cooled to approximately 40° C. and 139.18 g of P$_2$O$_5$ was added to increase the effective P$_2$O$_5$ content before polymerization to 87.6%.

394.5 g of PPA. The slurry was then stirred under reduced pressure for 0.5 h at 110° C. and under an argon atmosphere at: 120° C. for 1$h$; 130° C. for 0.5 h; 140° C. for 0.5 h; 150° C. for 0.5 h; 160° C. for 1.0 h; 170° C. for 15.5 h; 185° C. for 6.5 h; and 200° C.for 19$h$. The optically anisotropic product contained 5.3 wt % polymer in PPA (84.0% P$_2$O$_5$ content). Precipitation of a small amount of the polymeric product provided the random copolymer, believed to have the structure:

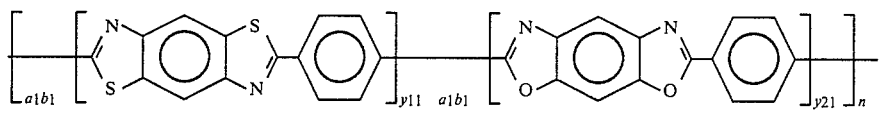

The mixture was then stirred at the specified temperatures for the specified times under a flow of argon: 100° C. for 24$h$; 150° C. for 1$h$; 160° C. for 1$h$; 170° C. for 5.5 h ; and 200° C. for 64$h$. The final concentration of the resulting random copolymer was 16.8% in a PPA with an approximate P$_2$O$_5$ content of 82.5%. Fibers of the copolymer were isolated by drawing the resulting green, opalescent product and precipitating into water. The intrinsic viscosity of the copolymer isolated after heating at 200° C. for 1.5 h was shown to be 25.4 dL/g and actually decreased to 24.4 dL/g after completing the above heating schedule. The copolymer obtained apparently is of the following structure:

where $a_1b_1=0.75$, $y_{11}=4$, $a_2b_1=0.25$, and $y_{21}=1.33$, with an intrinsic viscosity of 26.59 dL/g in MSA at 30° C., which corresponds to an n value of approximately 110.

EXAMPLE 51

To a deaerated mixture of 22.36319 g (0.0912061 mol, $a_1=0.9$) of 1a and 2.15918 g (0.0101340 mol, $a_2=0.10$) of 1b was added approximately 230 g of freshly prepared deaerated PPA. (The PPA was prepared by stirring a mixture of 135.97 g of 85.4% orthophosphoric acid and 207.36 g of phosphorous pentoxide at 150° C. overnight under an argon atmosphere, followed by

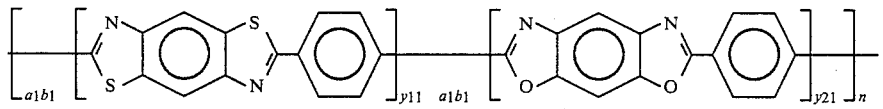

where the mole fraction of AI units (a$_1$b$_1$) is believed to be 0.95, the mole fraction of BI units (a$_2$b$_1$) is believed to be 0.05, the average block lengths y$_{11}$ and y$_{21}$ are believed to be 20 and 1, respectively, and the average total number of recurring units of both types (n) is believed to be approximately 100.

EXAMPLE 50

To a deaerated mixture of 16.09147 g (0.0656275 mol, a$_1$=0.75) of 1a and 4.66149 g (0.0218778 mol, a$_2$=0.25) of 1b was added 220 g of freshly prepared and deaerated PPA (The PPA was prepared from 173.81 g of 86.8% orthophosphoric acid and 267.64 g of phosphorous pentoxide, equilibrated, and deaerated). The mixture was stirred under an argon flow at: room temperature overnight; 50° C. for 3.5 h; and 72° C. for 21 h. The mixture was stirred under reduced pressure at 72° C. overnight to substantially complete dehydrochlorination. Terephthalic acid (2a) (14.53762 g, 0.0875059 mol) was added to the solution and the mixture was deaerated before stirring was initiated. The PPA prepared above was then added to this mixture to give a total of deaeration by stirring under reduced pressure at 150° C. for 5.5 h. The solution was allowed to cool to room temperature under agron before use). The mixture was stirred under an argon flow at: room temperature overnight; 50° C. for 3$h$; and at 70° C. overnight. The solution was then stirred under reduced pressure for 2.5 h at 70° C. Terephthalic acid (2a) (16.83595 g, 0.101340 mol); was added to the solution and, after placing the kettle under reduced pressure, stirring was initiated. The remaining above-mentioned PPA was then added to the mixture (total PPA added=317.6 g) under an argon atmosphere. The polymerization mixture was then stirred under an argon atmosphere at 110° C. for 30 min; 120° C. for 30 min; 130° C. for 30 min; 140° C. for 30 min; 150° C. for 30 min; 160° C. for 30 min; and 170° C. for 14.5h. The polymerization mixture was heated under an argon atmosphere without stirring at 185° C. for 5$h$ and at 193°-200° C. for 28$h$. The final polymer concentration was 7.6 wt % in PPA (83.0% P$_2$O$_5$). Precipitation of a small amount of the anisotropic polymer product provided the random copolymer of Type IX, Class 1 with the structure:

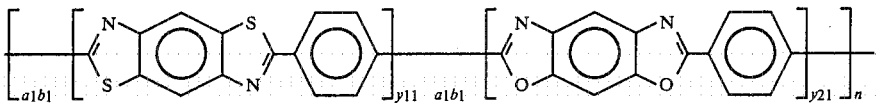

where $a_1b_1=0.9$, $a_2b_1=0.10$, and the average block lengths $y_{11}$ and $y_{21}$ are believed to be 10 and 1.11, respectively. The isolated copolymer possessed an intrinsic viscosity of 26.36 dL/g in MSA at 30° C., which corresponds to an n value of approximately 110.

EXAMPLE 52

A solution of 135.51 g of 115% PPA and 59.10 g of 85.7% $H_3PO_4$ was stirred at 100° C. for 2h under reduced pressure. The solution was allowed to cool to room temperature under reduced pressure, and 180.16 g of the mixture was added to 30.20054 g of 1a under an argon atmosphere. After a homogeneous mixture was obtained 28.29941 g (58.49995 g total, 0.23859 mol total=m, $a_1=1$) of deaerated 1a was added. The mixture was stirred under reduced pressure at: 50° C. for 18.5 h; 70° C. for 10 min; 80° C. for 25 min; and 90° C. for 5.5 h. Deaerated 2a (35.6892 g, 0.21482 mol, $b_1=0.9$) and 5.79905 g (0.02394 mol, $b_2=0.10$) of deaerated 4,4'-biphenyldicarboxylic acid (2aa) were added under an inert atmosphere. After the monomers were incorporated into the mixture, the reaction mixture was cooled to 40° C. and 138.11 g of deaerated $P_2O_5$ was added to give an effective $P_2O_5$ content before polymerization of 87.01%. After stirring at 100° C. for 63 h, the polymerization was stirred at: 160° C. for 2.5 h; 170° C. for 5.5 h, and 200° C. for 64 h. The concentration of the resulting copolymer was 15.9% in PPA with a $P_2O_5$ content of approximately 82.5%. The reaction product was stiropalescent and was drawn into oriented fibers. The copolymer possessed an intrinsic viscosity of 7.9 dL/g in MSA at 30° C. The structure of the resulting polymer is believed to be:

under reduced pressure, a portion (82.45 g) was added under a flow of argon to a 200 mL resin kettle containing 20.2783 g (0.082703 mol=m, $a_1=1$) of 1a that had been prepared and deaerated was described in Example 7. The mixture was then stirred at the specified temperatures for the specified times under either reduced pressure (vac) or argon flow (Ar): 50° C. 4h, vac; 50° C., 15h, Ar; 60° C., 3h, vac; 80° C., 1h, vac; 90° C., 3h, vac; 60° C., 15h, Ar; 80° C., 7h, vac. Trans-1,2-cyclohexanedicarboxylic acid (2 gg) (0.6781 g, 0.004132 mol, $b_2=0.05$) that as obtained from Aldrich Chemical Company and was recrystallized from methanol before use was added to the kettle and then terephthalic acid (2a) (13.05455 g, 0.078579 mol, $b_1=0.95$) was added. Powdered $P_2O_5$ (45.00 g) was then added to the mixture that had been cooled to 50° C. to increase the effective $P_2O_5$ content before polymerization to 86.8%. The mixture was then stirred for 17h at 100° C. under an argon flow. The yellow mixture was then heated with stirring under argon as follows: 120° C. for 1h; 130°-140° C. for 1h; 150° C. for 2h; 160° C. for 0.5h; 170° C. for 4h (stiropalescence was apparent during this time); 185° C. for 15.5h; and 200° C. for 75h. The final concentration of the resulting random copolymer was 16.4% in PPA, with a $P_2O_5$ content of approximately of 82.2%. The polymer obtained apparently is of the following structure:

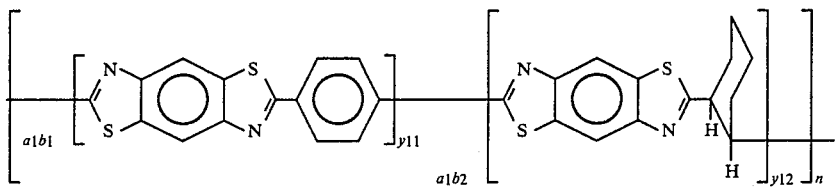

characterized as having an intrinsic viscosity in methanesulfonic acid at 30° C. of 10.0 dL/g, which corresponds to an average n value of about 50, a mole fraction of $-[AH]_{\overline{n}}$ units ($a_1b_1$) of 0.95, and a mole fraction of $-[AA]''_n$ units ($a_1b_2$) of 0.05. The average block lengths, $y_{11}$ and $y_{12}$, are believed to be 20 and 1, respectively.

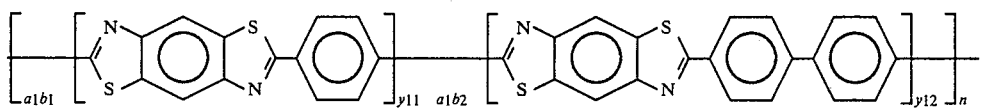

where $a_1b_1$ is 0.9, $a_1b_2$ is 0.1, $y_{11}$ is 10, $y_{12}$ is 1.1, and n is approximately 40.

EXAMPLE 53

A mixture of 20.10 g of concentrated orthophosphoric acid (85.7% $H_3PO_4$) and 46.74 g of 115% PPA was stirred at 100° C. for 2 h under reduced pressure in a 100 mL 3-necked flask. After allowing this PPA solution, having a $P_2O_5$ content of 77.3%, to cool to 50° C.

EXAMPLE 54

The procedure of Example 49 is essentially repeated. Instead of using 95 mol % of monomer 1a, 5 mol % of monomer 1b, and 100 mol % of monomer 2a, a mixture of 50 mol % of monomer 1a and 50 mol % of monomer 1c is substantially dehydrochlorinated in a comparable weight percent of PPA with essentially similar P₂O₅ content. After the addition of a stoichiometric amount of monomer 2a and an appropriate amount of P₂O₅ (thereby raising the final P₂O₅ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

monomer 2a and 50 mol % of monomer 2j and an appropriate amount of P₂O₅ (thereby raising the final P₂O₅ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

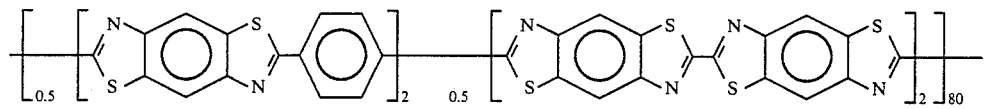

polymer obtained is of the following structure:

EXAMPLE 57

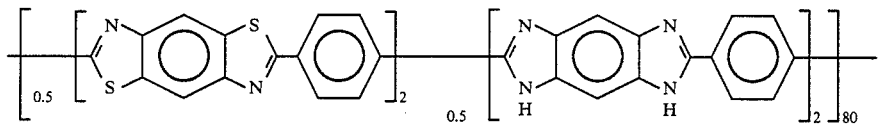

EXAMPLE 55

The procedure of Example 49 is essentially repeated. Instead of using 95 mol % of monomer 1a, 5 mol % of monomer 1b, and 100 mol % of monomer 2a, a mixture of 50 mol % of monomer 1b and 50 mol % of monomer 1c is substantially dehydrochlorinated in a comparable weight percent of PPA with essentially similar P₂O₅ content. After the addition of a stoichiometric amount of monomer 2a and an appropriate amount of P₂O₅ (thereby raising the final P₂O₅ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

The procedure of Example 53 is essentially repeated. Instead of using 100 mol % of monomer 1a, 95 mol % of monomer 2a, and 5 mol % of monomer 2 gg, 100 mol % of monomer 1a is substantially dehydrochlorinated in a comparable weight percent of PPA with essentially similar P₂O₅ content. After the addition of 50 mol % of monomer 2a and 50 mol % of monomer 2k and an appropriate amount of P₂O₅ (thereby raising the final P₂O₅ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

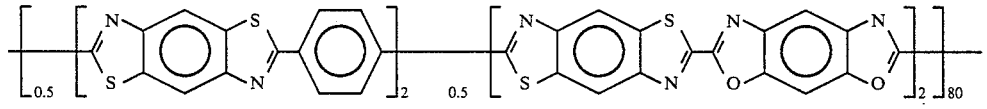

polymer obtained is of the following structure:

EXAMPLE 58

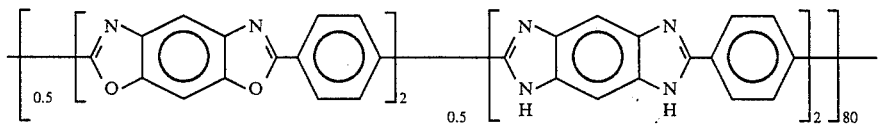

EXAMPLE 56

The procedure of Example 53 is essentially repeated. Instead of using 100 mol % of monomer 1a, 95 mol % of monomer 2a, and 5 mol % of monomer 2 gg, 100 mol % of monomer 1a is substantially dehydrochlorinated in a comparable weight percent of PPA with essentially similar P₂O₅ content. After the addition of 50 mol % of The procedure of Example 53 is essentially repeated. Instead of using 100 mol % of monomer 1a, 95 mol % of monomer 2a, and 5 mol % of monomer 2 gg, 100 mol % of monomer 1a is substantially dehydrochlorinated in a comparable weight percent of PPA with essentially similar P₂O₅ content. After the addition of 50 mol % of monomer 2a and 50 mol % of monomer 2l and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

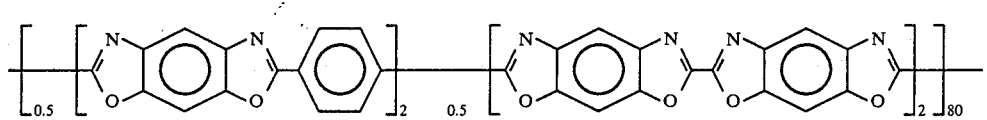

EXAMPLE 59

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar P$_2$O$_5$ content. After the addition of 50 mol% of monomer 2a and 50 mol% of monomer 2j and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

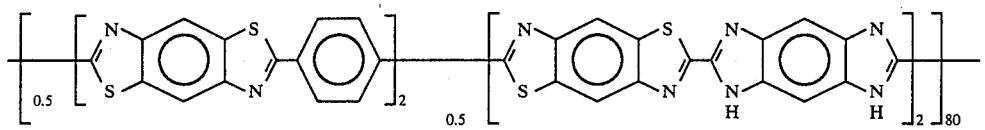

EXAMPLE 60

The procedure of Example 53 is essentially repeated. Instead of using 100 mol % of monomer 1a, 95 mol % of monomer 2a, and 5 mol % of monomer 2 gg, 100 mol % of monomer 1b is substantially dehydrochlorinated in a comparable weight percent of PPA with essentially similar P$_2$O$_5$ content. After the addition of 50 mol % of monomer 2a and 50 mol % of monomer 2 K and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

EXAMPLE 61

The procedure of Example 53 is essentially repeated. Instead of using 100 mol % of monomer 1a, 95 mol % of monomer 2a, and 5 mol % of monomer 2 gg, 100 mol % of monomer 1b is substantially dehydrochlorinated in a comparable weight percent of PPA with essentially similar P$_2$O$_5$ content. After the addition of 50 mol % of monomer 2a and 50 mol % of monomer 2l and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

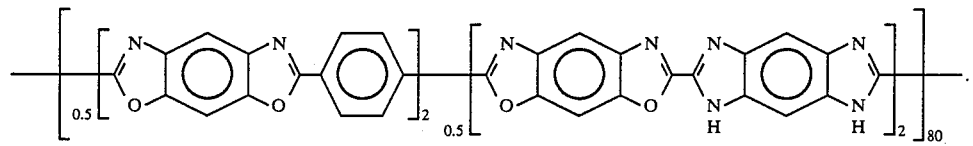

EXAMPLE 62

The procedure of Example 53 is essentially repeated. Instead of using 100 mol % of monomer 1a, 95 mol % of monomer 2a, and 5 mol % of monomer 2 gg, 100 mol % of monomer 1a is substantially dehydrochlorinated in a comparable weight percent of PPA with essentially similar P$_2$O$_5$ content. After the addition of 75 mol % of

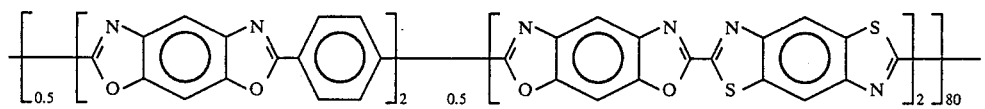

monomer 2a and 25 mol % of monomer 2i and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

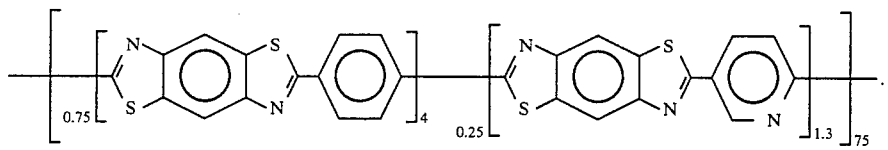

EXAMPLE 63

The procedure of Example 53 is essentially repeated. Instead of using 100 mol % of monomer 1a, 95 mol % of monomer 2a, and 5 mol % of monomer 2gg, 100 mol % of monomer 1b is substantially dehydrochlorinated in a comparable weight percent of PPA with essentially similar P$_2$O$_5$ content. After the addition of 75 mol % of monomer 2a and 25 mol % of monomer 2i and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

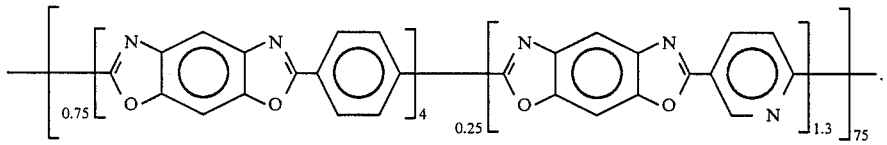

EXAMPLE 64

The procedure of Example 53 is essentially repeated. Instead of using 100 mol % of monomer 1a, 95 mol % of monomer 2a, and 5 mol % of monomer 2gg, 100 mol % of monomer 1c is substantially dehydrochlorinated in a comparable weight percent of PPA with essentially similar P$_2$O$_5$ content. After the addition of 75 mol % of monomer 2a and 25 mol % of monomer 2i and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

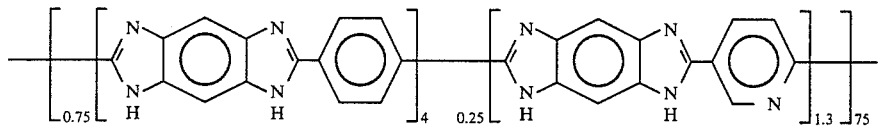

EXAMPLE 65

The procedure of Example 53 is essentially repeated. Instead of using 100 mol % of monomer 1a, 95 mol % of monomer 2a, and 5 mol % of monomer 2gg, 100 mol % of monomer 2a, and 5 mol % of monomer 2gg, 100 mol % of monomer 1a is substantially dehydrochlorinated in a comparable weight percent of PPA with essentially similar P$_2$O$_5$ content. After the addition of 75 mol % of monomer 2a and 25 mol % of monomer 2e and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

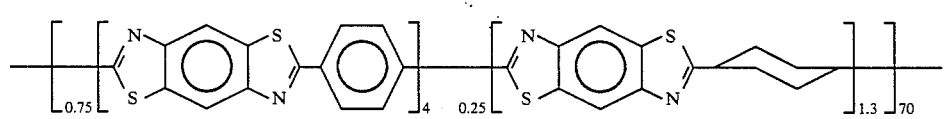

EXAMPLE 66

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar P₂O₅ content. After the addition of 75 mol% of monomer 2a and 25 mol% of monomer 2e and an appropriate amount of P₂O₅ (thereby raising the final P₂O₅ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

mixture of 80 mol% of monomer 1a and 20 mol% of monomer 1l was substantially dehydrochlorinated in a comparable weight percent of PPA with essentially similar P₂O₅ content. After the addition of a stoichiometric amount of monomer 2a and an appropriate amount of P₂O₅ (thereby raising the final P₂O₅ content to substantially above about 82%), the resultant mixture was then heated in essentially the same manner in accordance with Example 12 to provide a copolymerization product. The product so formed was anisotropic-liquid crystalline (exhibited stir-opalescence) and was formed into ordered fibers by simple drawing. The copolymer obtained is believed to be of the following structure:

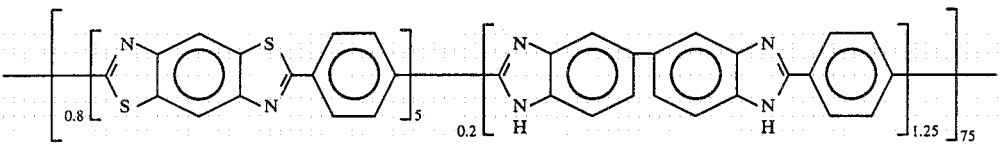

EXAMPLE 69

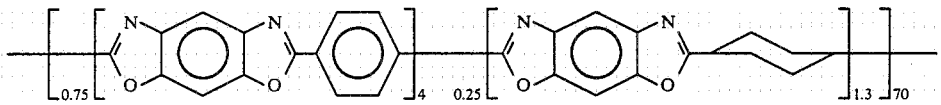

EXAMPLE 67

The procedure of Example 49 is essentially repeated. Instead of using 95 mol% of monomer 1a, 5 mol% of monomer 1b, and 100 mol% of monomer 2a, a mixture of 60 mol% of monomer 1a and 40 mol% of monomer 1i is substantially dehydrochlorinated in a comparable weight percent of PPA with essentially similar P₂O₅ content. After the addition of a stoichiometric amount of monomer 2a and an appropriate amount of P₂O₅ (thereby raising the final P₂O₅ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

The procedure of Example 69 is essentially repeated. Instead of using 95 mol% of monomer 1a, 5 mol% of monomer 1b, and 100 mol% of monomer 2a, a mixture of 85 mol% of monomer 1c and 15 mol% of monomer 1l is substantially dehydrochlorinated in a comparable weight percent of PPA with essentially similar P₂O₅ content. After the addition of a stoichiometric amount of monomer 2a and an appropriate amount of P₂O₅ (thereby raising the final P₂O₅ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

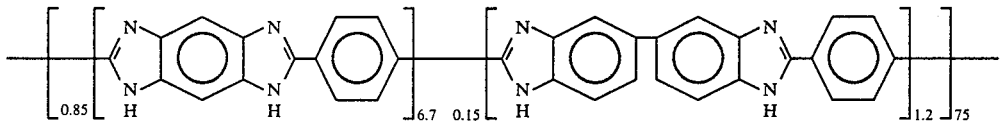

EXAMPLE 70

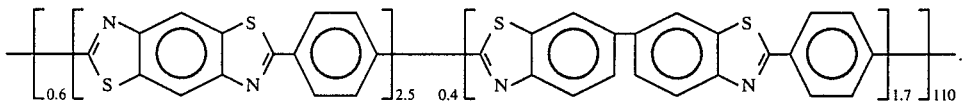

EXAMPLE 68

The procedure of Example 49 was essentially repeated. Instead of using 95 mol% of monomer 1a, 5 mol% of monomer 1b, and 100 mol% of monomer 2a, a The procedure of Example 52 is essentially repeated. Instead of using 100 mol% of monomer 1a, 90 mol% of monomer 2a, and 10 mol% of monomer 2aa, 100 mol% of monomer 1b is substantially dehydrochlorinated in a comparable weight percent of PPA with essentially similar P$_2$O$_5$ content. After the addition of 95 mol% of monomer 2a and 5 mol% of monomer 2aa and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

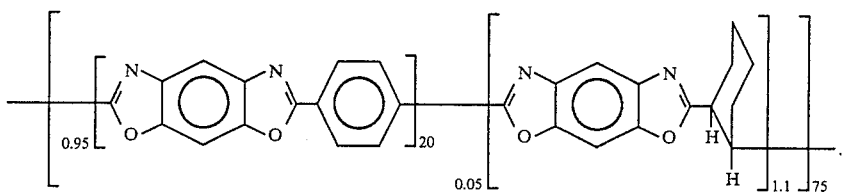

EXAMPLE 71

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar P$_2$O$_5$ content. After the addition of 95 mol% of monomer 2a and 5 mol% of monomer 2gg and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

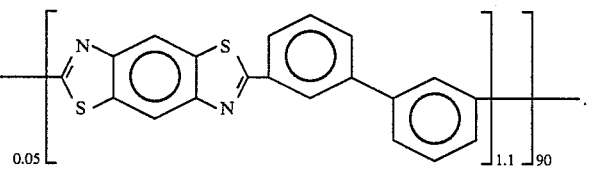

EXAMPLE 72

The procedure of Example 53 is essentially repeated. Instead of using 100 mol% of monomer 1a, 95 mol% of monomer 2a, and 5 mol% of monomer 2gg, 100 mol% of monomer 1a is substantially dehydrochlorinated in a comparable weight percent of PPA with essentially similar P$_2$O$_5$ content. After the addition of 95 mol% of monomer 2a and 5 mol% of monomer 2ff and an appropriate amount of P$_2$O$_5$ (thereby raising the final P$_2$O$_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

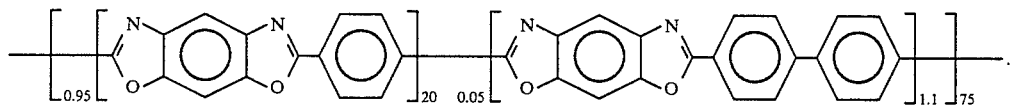

EXAMPLE 73

Two polymerizations (Step A and Step B) were conducted simultaneously in separate resin kettles and combined at a later stage (Step C) to give a product of a block copolymer believed to have the following structure:

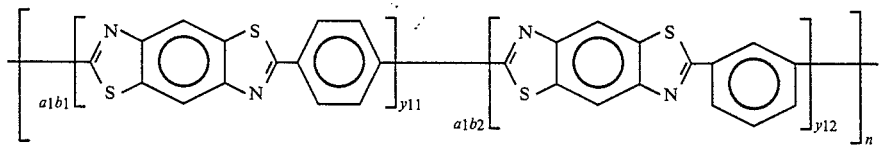

where $a_1b_1$ is 0.793 and $a_1b_2$ is 0.207 and $y_{11}$ is greater than about 30.

Step A: Preparation of $\{-A\}_{\overline{n}}$ A mixture of 92.06g of 115% PPA and 39.45g of concentrated orthophosphoric acid (85.7% H₃PO₄) was stirred at 100° C. for 2h under reduced pressure. A portion (128.63g) of the hot PPA (77.3% P₂O₅) was added under a flow of argon to a resin kettle containing 41.42682g (0.16896 mol) of 1a. The mixture was stirred at 50° C. under argon flow for 15h, then under reduced pressure at 60° C. for 23.5h, 70° C. for 6h, and 80° C. for 8.5h to effect dehydrochlorination. Terephthalic acid (2a)

had not been added to the product from Step A (but had been heated according to the same schedule as the mixture) had an intrinsic viscosity of 1.8 dL/g in MSA at 30° C. The weight percent of polymer ${AH}_{\overline{n}}$ in the product from Step A was 16.2; the weight percent of polymer ${AG''}_{\overline{n}}$ in the product from Step B was 16.3. The weight percent of block copolymer

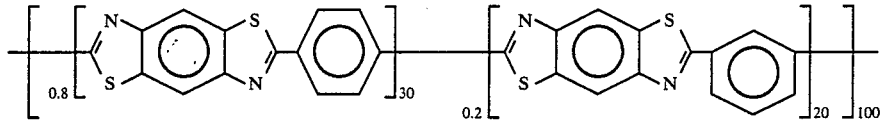

(28.0688g, 0.16895 mol) was then added in four portions. The mixture was cooled to approximately 40° C. and 92.22g of P₂O₅ was added. The mixture was stirred at the following temperatures for the specified times under a flow of argon: 100° C. for 42.5h; 120° C. to 160° C. in increments of 10° C. per 0.5h; 170° C. for 2.5h. At this time the mixture became stir-opalescent and a sample of the dope exhibited birefringence under plane-polarized light. After an additional 3h at 170° C. the polymer from Step B was added (See Step C). The intrinsic viscosity of Polymer ${AH}_{\overline{n}}$ isolated from the reaction mixture immediately before Step C was 2.3 dL/g which corresponds to an n value (average number of recurring units) of 30 and a p value (extent of reaction) of 0.983.

Step B: Preparation of ${AG''}_{\overline{n}}$. A mixture of 30.72g of 115% PPA and 13.13g of concentrated orthophosphoric acid (85.7% H₃PO₄) was stirred at 100° C. for 2h under reduced pressure. The PPA (41.66g; 77.3% P₂O₅) was added without cooling under a flow of argon to a resin kettle containing 13.80877g (0.05632 mol) of 1a. The mixture was stirred at 50° C. under argon flow for 15h, then under reduced pressure at 60° C. for 23.5h, 70° C. for 6h, and 80° C. for 35.5h. Isophthalic acid (2ss) (9.3569g, 0.05632 mol) that had been obtained from Aldrich Chemical Company in 99% purity was twice recrystallized from 90% aqueous ethanol and dried at 110° C. for 24h and was then added in two portions incorporating the solid after each addition. The mixture was cooled to approximately 40° C. and then 31.59g of P₂O₅ was added. The mixture was then heated simultaneously and at the same heating schedule as the solution in Step A.

Step C: Block Copolymerization. After 5.5h at 170° C., 72g of the viscous, red, optically isotropic product from Step B was added to the kettle from Step A under an argon atmosphere at the time indicated in Step A. Both kettles were heated under an argon flow as follows: 170° C. for 12.8h; 190° C. for 2h; 200° C. for 26h. The resulting mixture remained stir-opalescent and continued to polymerize as indicated by intrinsic viscosities of samples removed at various times. Upon precipitation in H₂O, the final sample of the resulting copolymer had an intrinsic viscosity of 17.5 dL/g in MSA at 30° C. The final precipitated sample of the portion of the product from Step B that was therefore calculated to be 16.2; the weight percents of the individual ${AH}_{\overline{n}}$ and ${AG''}_{\overline{n}}$ segments of the block copolymer in the final product were 12.9 and 3.4, respectively, as calculated from the weights of the constituent polymers added and the total weight of the resulting product. The mol percent of mesogenic ${AH}_{\overline{n}}$ and flexible ${AG''}_{\overline{n}}$ units were 79.3 and 20.7, respectively, as calculated from the weights of the constituent polymers added.

EXAMPLE 74

Two polymerizations were conducted simultaneously in separate resin kettles (Steps A and B), and combined at a later stage (Step C) to give a block polymer product believed to have the following structure:

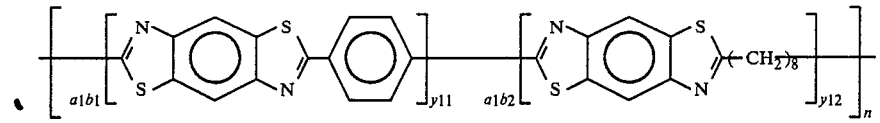

where a₁b₁ is 0.587 and a₁b₂ is 0.413 and Y₁₁ is greater than about 40.

Step A: Preparation of ${AH}_{\overline{n}}$. A mixture of 36.73g of 115% PPA and 24.43g of concentrated orthophosphoric acid (85.0% H₃PO₄) was stirred at 100° C. for 4.5h under reduced pressure. A portion (58.69%) of the hot PPA (74.9% P₂O₅) was added under a flow of argon to a resin kettle containing 20.71434g (0.08448 mol) of 1a. The mixture was stirred under reduced pressure at 50° C. for 1h, 70° C. for 1.3h, and 80° C. for 23h. To dissolve monomer, 6.02g of P₂O₅ was added, and the kettle was heated at 80° C. for an additional 26h. Terephthalic acid (2a) (14.0351g, 0.08448 mol) was then added in three portions. The acid monomer was incorporated by stirring after each addition. The kettle was cooled to 50° C. and an additional 46.24g deaerated P₂O₅ was added. The mixture was stirred under argon flow at the following temperatures for the specified times: 100° C. for 18h; 150° C. for 2h; 170° C. for 5h. (After 1h at 170° C. the mixture exhibited stir-opalescence). At this time the polymer from Step B was added. (See Step C).

Step B: Preparation of ${AN''}_{\overline{n}}$ A mixture of 63.88g of 115% PPA and 42.51g of concentrated orthophosphoric acid (85.0% H₃PO₄) was stirred at 100° C. for 4.5h under reduced pressure. A portion (104.41g) of the PPA (74.9% P₂O₅) was added without cooling under a flow of argon to a resin kettle containing 20.26865g (0.08266 mol) of 1a. The mixture was stirred under reduced pressure at 50° C. for 0.8h, 60° C. for 7.5h, and 80° C. for 9.5h. Sebacic acid, (monomer 2zz, purified by crystallization of the disodium salt, then repeated recrystallization of the free acid in H₂O and dried in vacuo at 80° C. for 24h) (16.7190g, 0.08266 mol), was then added in three portions to the resin kettle, incorporating after each addition. The mixture was cooled to 50° C. and 70.91g of P₂O₅ was added slowly. The polymerization proceeded rapidly, and the gellike solid was heated without stirring at 100° C. for 16.5h and at 130° C. for 7.8h. At this time the polymer was removed in an inert atmosphere, leaving a portion in the kettle which was reassembled and heated according to the same schedule as the block copolymer.

Step C: Block Copolymerization. A portion of the polymer from Step B (153.13g) was added under an argon atmosphere to the kettle from Step A. The mixture was then stirred under argon flow at 170° C. for 16h and at 200° C. for 28h. The mixture remained stir-opalescent and continued to polymerize as shown by an increase in the bulk viscosity. The weight percent of polymer $+AH_{\overline{n}}$ in the product from Step A was 16.1; the weight percent of polymer $+AN^{u}_{\overline{n}}$ in the product from Step B was 12.1. The weight percent of block copolymer was calculated to be 12.1; the weight percents of $+AH_{\overline{n}}$ and $+AN^{u}_{\overline{n}}$ segments of the block copolymer in solution were 6.8 and 5.6 respectively. The mole percent of mesogenic $+AH_{\overline{n}}$ and $+AN^{u}_{\overline{n}}$ units were 58.7 and 41.3 respectively, as calculated from the weights of the constituent polymers added. The resulting polymer isolated was not completely soluble in methane sulfonic acid thus precluding intrinsic viscosity measurements.

EXAMPLE 75

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 13 are diverted into a common agitated reaction vessel in amounts to give a ratio of 3:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

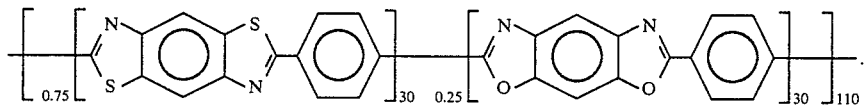

EXAMPLE 76

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 13 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

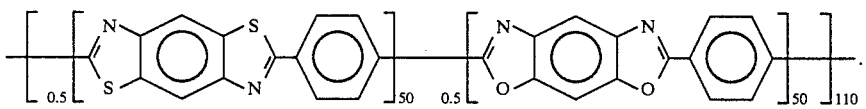

EXAMPLE 77

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 13 are diverted into a common agitated reaction vessel in amounts to give a ratio of 1:3. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

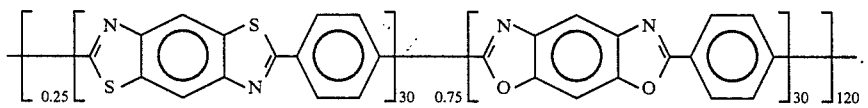

EXAMPLE 78

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 13 are diverted into a common agitated reaction vessel in amounts to give a ratio of 1:4. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

(i.e., homp-oligomers) of Examples 13 and 28 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

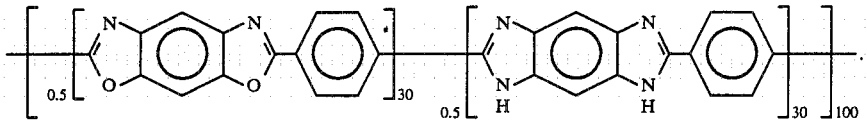

EXAMPLE 81

The procedure of Example 73 is essentially repeated.

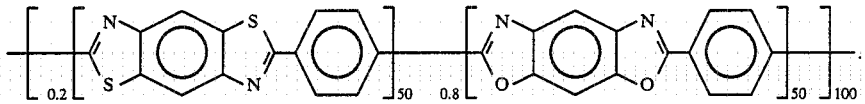

EXAMPLE 79

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 28 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

Subsequent to the start of polymerization and at a preselected range of intrinsic viscosities or after a predetermined selected temperature and rate of reaction, the (partially completed) separate polymerization products (i.e., homo-oligomers) of Examples 8 and 16 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

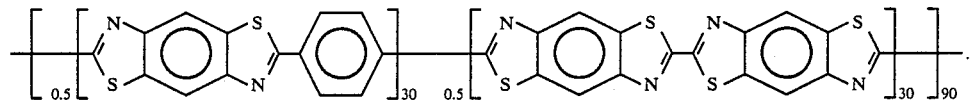

EXAMPLE 82

The procedure of Example 73 is essentially repeated.

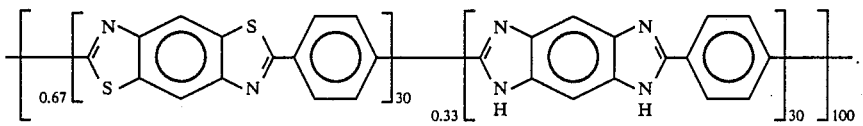

EXAMPLE 80

The procedure of Example 73 is essentially repeated. Subsequent to the start of polymerization and at a preselected range of intrinsic viscosities or after a predetermined selected temperature and rate of reaction, the (partially completed) separate polymerization products Subsequent to the start of polymerization and at a preselected range of intrinsic viscosities or after a predetermined selected temperature and rate of reaction, the (partially completed) separate polymerization products (i.e., homo-oligomers) of Examples 8 and 17 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

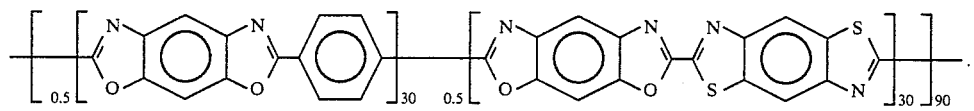

(exhibits stir-opalescence) and can be directly utilized for forming into articles by spinning or drawing and the like. The blockpolymer obtained is of the following structure:

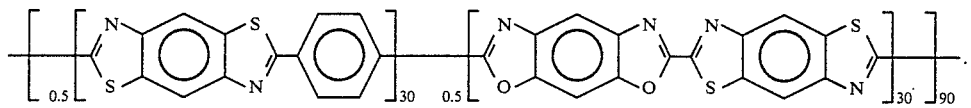

EXAMPLE 83

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 18 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

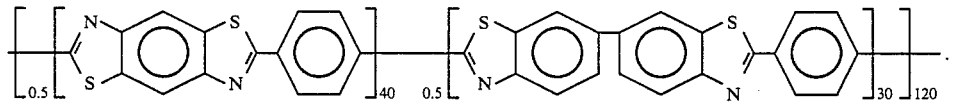

EXAMPLE 84

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 17 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

EXAMPLE 85

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 19 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

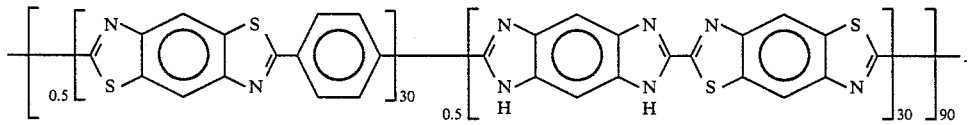

EXAMPLE 86

The procedure of Example 73 essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 22 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

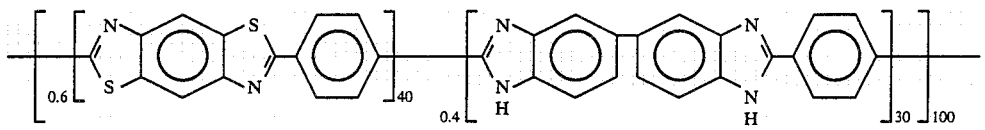

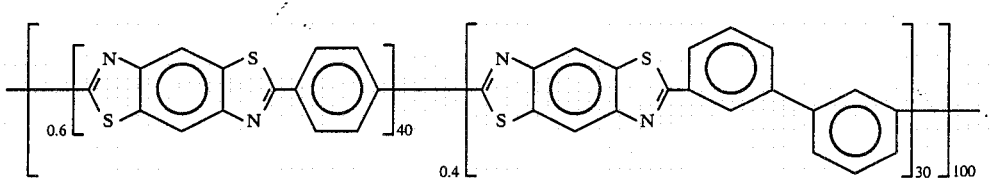

EXAMPLE 87

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 28 and 22 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure;

EXAMPLE 89

The procedure of Example 73 is essentially repeated. Instead of using monomers 1a and 2ss in Step B, equimolar quantities of monomers 1a and 2xx are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

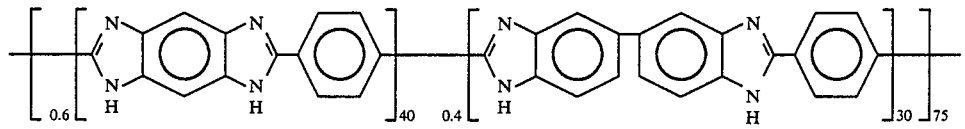

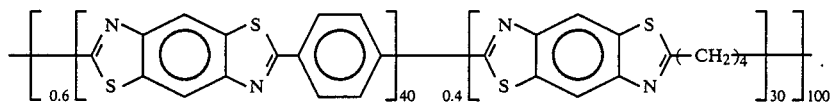

EXAMPLE 88

The procedure of Example 73 is essentially repeated. Instead of using monomers 1a and 2ss in Step B, equimolar quantities of monomers 1a and 2ff are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a subsantially polymerized block-polymerization product. The product so formed is anisotropic-liquid crystalline (exhibits stir-opalescence) and can be directly utilized for forming into articles by

EXAMPLE 90

The procedure of Example 73 is essentially repeated. Instead of using monomers 1a and 2ss in Step B, equimolar quantities of monomers 1a and 2uu are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

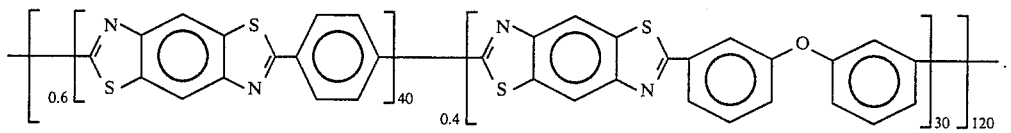

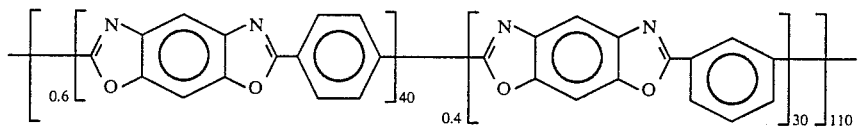

EXAMPLE 91

The procedure of Example 73 is essentially repeated. Instead of using monomers 1a and 2ss in Step B, equimolar quantities of monomers 1q and 2a are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a substantially polymerized block-polymerization product. The product so formed is anisotropic-liquid crystalline (exhibits stir-opalescence) and can be directly utilized for forming into articles by spinning or drawing and the like. The blockplymer obtained is of the following structure:

EXAMPLE 92

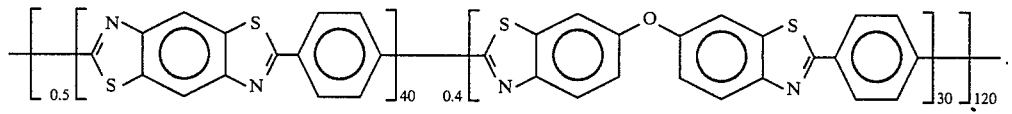

The procedure of Example 73 is essentially repeated. Instead of using monomer 1a in Step A, an equimolar quantity of 1b is used. Instead of using monomers 1a and 2ss in step B, equimolar quantities of monomers 1b and 2ss are polymerized at a comparable concentration and to a comparable extent of reaction. The (partially completed) separate polymerization products (i.e., homo-oligomers) from Steps A and B diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

EXAMPLE 93

The procedure of Example 73 is essentially repeated. Instead of using monomer 1a in Step A, an equimolar quantity of 1b is used. Instead of using monomers 1a and 2ss in Step B, equimolar quantities of monomers 1b and 2xx are polymerized at a comparable concentration and to a comparable extent of reaction. The (partially completed) separate polymerization products (i.e., homo-oligomers) from Steps A and B are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

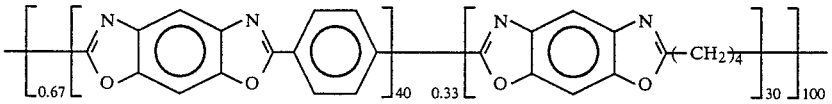

EXAMPLE 94

The procedure of Example 73 is essentially repeated. Instead of using monomer 1a in Step A, an equimolar quantity of 1b is used. Instead of using monomers 1a and 2ss in Step B, equimolar quantities of monomers 1b and 2zz are polymerized at a comparable concentration and to a comparable extent of reaction. The (partially completed) separate polymerization products (i.e., homo-oligomers) from Steps A and B are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

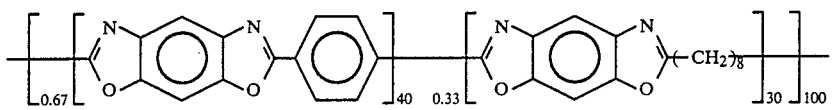

EXAMPLE 95

The procedure of Example 27 is essentially repeated. Instead of using monomer 3a, a mixture of 80 mol % of monomer 3a and 20 mol % of monomer 3c is substantially dehydrochlorinated in a comparable weight percent of PPA with essentially similar $P_2O_5$ content. After the addition of appropriate amount of $P_2O_5$ (thereby raising the final $P_2O_5$ content to substantially above about 82%), the resultant mixture is then heated in essentially the same manner in accordance with Example 27 to provide a copolymerization product. The product so formed is anisotropic-liquid crystalline (exhibits stir-opalescence) and can be directly utilized for forming into articles by spinning, or drawing. The copolymer obtained is of the following structure:

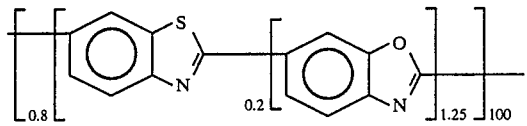

EXAMPLE 96

The procedure of Example 27 is essentially repeated. Instead of using monomer 3a, a mixture of 80 mol % of monomer 3a and 20 mol % of monomer 3d is substantially dehydrochlorinated in a comparable weight percent of PPA with essentially similar $P_2O_5$ content. After the addition of appropriate amount of $P_2O_5$ (thereby raising the final $P_2O_5$ content to substantially above about 82%), the resultant mixture is then heated in essentially the same manner in accordance with Example 27 to provide a copolymerization product. The product so formed is anisotropic-liquid crystalline (exhibits stir-opalescence) and can be directly utilized for forming into articles by spinning, or drawing. The copolymer obtained is of the following structure:

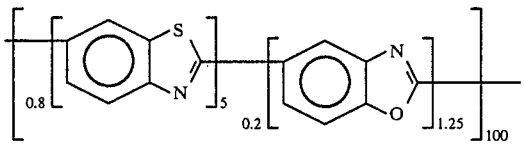

EXAMPLE 97

The procedure of Example 27 was essentially repeated. Instead of using monomer 3a, a mixture of 80 mol % of monomer 3a and 20 mol % of monomer 3e was substantially dehydrochlorinated in a comparable weight percent of PPA with essentially similar $P_2O_5$ content. After the addition of appropriate amount of $P_2O_5$ (thereby raising the final $P_2O_5$ content to substantially above about 82%), the resultant mixture was then heated in essentially the same manner in accordance with Example 27 to provide a copolymerization product. The product so formed was anisotropic-liquid crystalline (exhibit stir-opalescence), highly drawable, and could be directly utilized for forming into articles by spinning, or drawing. The copolymer obtained is believed to be of the following struccture:

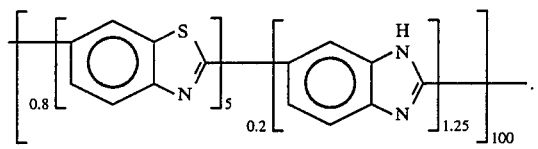

EXAMPLE 98

The Procedure of Example 73 is essentially repeated. Subsequent to the start of polymeriztion and at a preselected range of intrinsic viscosities or after a predetermined selected temperature and rate of reaction, the (partially completed) separate polymerization products (i.e., homo-oligomers) of Examples 27 and 29 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

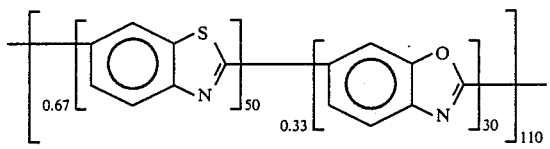

EXAMPLE 99

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 27 and 30 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

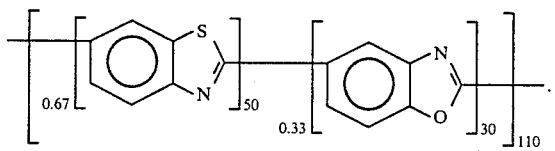

EXAMPLE 100

3,4-diaminobenzoic acid (3e) (Aldrich, 97%) was recrystallized from hot water with 3-g of carbon black and 0.5 g of sodium dithionite added for every 30 g of 3e. The recovered light orange crystals were dried at room temperature under reduced pressure for 24 h. An acid mixture prepared from 183.4 g of 115% PPA and 78.6 g of 85.7% $H_3PO_4$ (J. T. Baker Analyzed Reagent) was deaerated by heating in a 3-necked flask at 100° C. for 2 h under reduced pressure and then at 50° C. under reduced pressure for 17 h. To a 500 mL resin kettle was added 20.24 g of 3e. The kettle was then deaerated by applying reduced pressure and then filling with nitrogen three times. 51.11 g of the above-mentioned PPA was added to the kettle and the contents stirred until well mixed. 38.77 g of $P_2O_5$ (J. T. Baker Analyzed Reagent, 99.1%) was added. The temperature of the kettle was raised to 100° C. and the $P_2O_5$ incorporated into the mixture. The following heating schedule was used with color changes as noted: 100° C. for 20 min; 110° C. for 20 min; 120° C. for 20 min; 130° C. for 20 min; color changed from tan to green; 140° C. for 20 min; the green color became darker. Reduced pressure was briefly applied which caused considerable foaming; 105° C. for 20 min; 160° C. for 20 min. A sample was removed and precipitated in water to give a red polymeric substance with an intrinsic viscosity in MSA at 30.0° C. of 4.25 dL/g. Heating at 160° C. was continued for another 30 h. The intrinsic viscosity in MSA at 30° C. of polymer component of a sample removed at this time was measured to be 4.5 dL/g. The reaction was heated at 175° C. an additional 35 h. The resultant red-brown polymeric material isolated from this solution had an intrinsic viscosity of 4.5 dL/g in methanesulfonic acid at 30.0° C. Final reaction product contained 16.8% of polymer $+W+_{\bar{n}}$ in PPA. Initial $P_2O_5$ content was 77.3%, final $P_2O_5$ content was 82.2%.

EXAMPLE 101

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 27 and 100 are diverted into a common agitated reaction vessel in amounts to give a ratio of 2.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

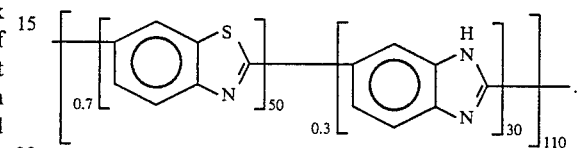

EXAMPLE 102

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 27 are diverted into a common agitated reaction vessel in amounts to give a ratio of 1:3. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

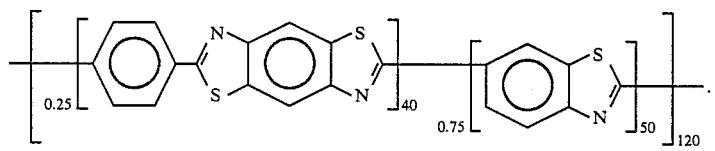

EXAMPLE 103

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 26 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

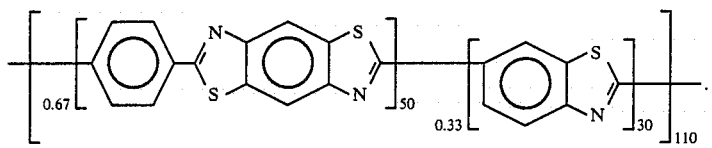

EXAMPLE 104

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 27 are diverted into a common agitated reaction vessel in amounts to give a ratio of 1:4. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

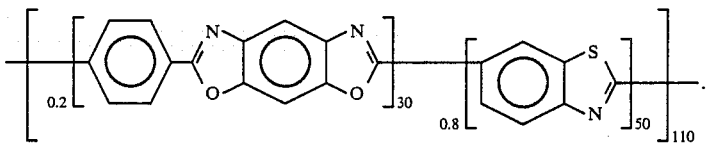

EXAMPLE 105

The procedure of Example 73 is essentially repeated. Subsequent to the start of polymerization and at a preselected range of intrinsic viscosities or after a predetermined selected temperature and rate of reaction, the (partially completd) separate polymerization products (i.e., homo-oligomers) of Examples 13 and 26 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

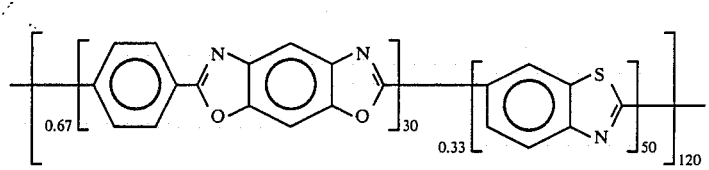

EXAMPLE 106

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 30 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

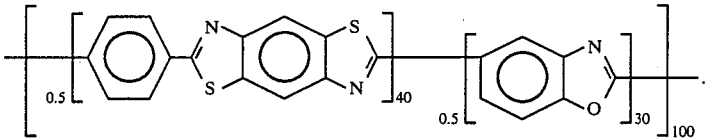

EXAMPLE 107

The procedure of Example 73 is essentially repeated. Subsequent to the start of polymerization and at a preselected range of intrinsic viscosities or after a predetermined selected temparature and rate of reaction, the (partially completed) separate polymerization products (i.e., homo-oligomers) of Examples 8 and 30 are diverted into a common agitated reaction vessel in amounts to give a ratio of 3:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

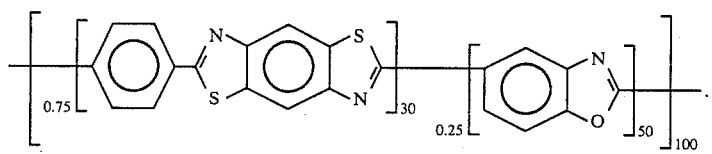

EXAMPLE 108

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 30 are diverted into a common agitated reaction vessel in amounts to give a ratio of 1:3. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

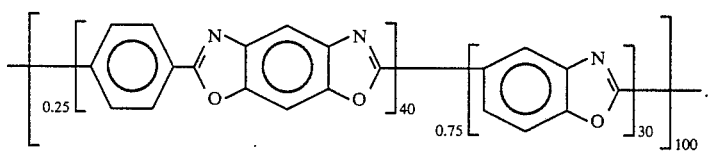

EXAMPLE 109

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 30 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

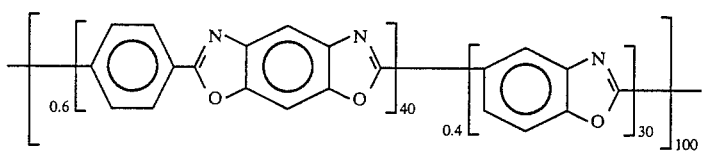

EXAMPLE 110

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 100 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

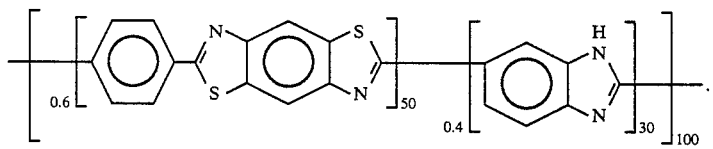

EXAMPLE 111

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 100 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

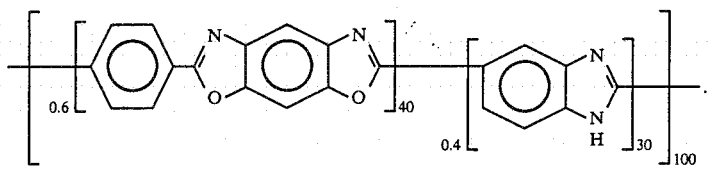

EXAMPLE 112

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 28 and 100 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spining or drawing and the like. The blockpolymer obtained is of the following structure:

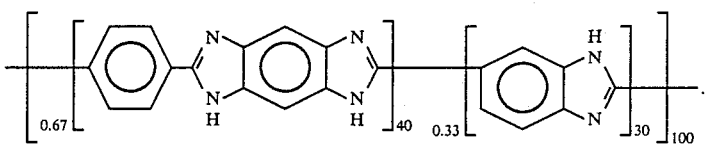

EXAMPLE 113

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 19 and 27 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

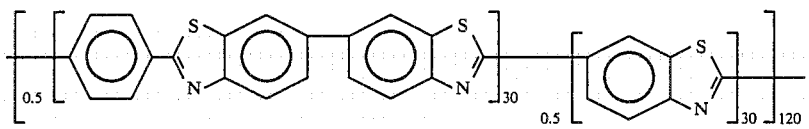

EXAMPLE 114

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 23 and 27 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

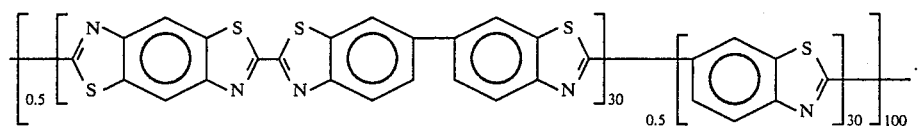

EXAMPLE 115

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 22 and 27 are diverted into a common agitated reaction of vessel in amounts to give a ratio of 1:2. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

13.14% and an intrinsic viscosity of 6.57 dL/g in MSA at 30° C. The polymer obtained is of the following structure:

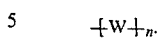

EXAMPLE 117

The reaction product of Example 13 was placed in a constant displacement spinning apparatus and extruded

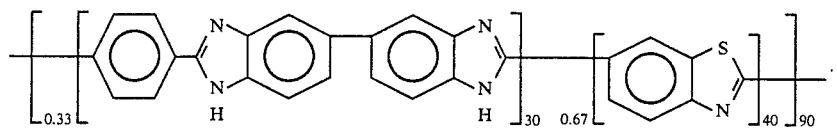

EXAMPLE 116

A mixture of 42.13 g of PPA (83.8% $P_2O_5$) and 18.06 g of $H_3PO_4$ (85.9%) was stirred and heated to 100° C. in a 100 ml 3-necked flask. The flask was placed under reduced pressure overnight. 21.34 g of 3,4-diaminobenzoic acid.2HCl was added to a 100 ml resin kettle. The resin kettle was deaerated and flushed with argon and 42.81 g of the above prepared PPA solvent with a $P_2O_5$ content of 77.32% was then added to the kettle. The flask was heated with an oil bath at 55° C. with slow stirring under a water aspirator (reduced pressure) for 0.33 hours. The flask was then placed under vacuum for an additional 45.87 hours. During the initial 5 hours of dehydrochlorination, the temperature was increased from 55° C. to 70° C. Near the end of the dehydrochlorination, the mixture changed from a very pale pink to a blue-green color that was almost transparent. 26.56 g of deaerated $P_2O_5$ was added as a powder under argon flow. The $P_2O_5$ was incorporated using a combination of stirring and vacuum at about 70° C. The mixture was allowed to equilibrate at 100° C. with stirring under argon flow for 17.33 hours. The amount of $P_2O_5$ added was calculated to provide the reaction mixture with an effective $P_2O_5$ content of approximately 86% prior to the beginning of polymerization and an effective $P_2O_5$ content of approximately 81.97% subsequent to substantial complete polymerization. The mixture was heated to a final temperature of 200° C. following the heating schedule outlined below.

| Temperature (°C.) | Time (Hours) | Observations |
| --- | --- | --- |
| 110 | 0.33 | Dark mint green; creamy. |
| 120 | 0.67 | Less viscous. |
| 130 | 0.38 | |
| 140 | 0.70 | More viscous (mixture full of bubbles). |
| 150 | 0.63 | Darker green; shiny glass-like appearance. |
| 160 | 0.48 | Mixture riding on stir blades. |
| 170 | 0.55 | Unable to stir fast; darker green. |
| 185 | 2.43 | Mixture more transparent |
| 200 | 19.15 | |

The reaction product obtained is optically isotropic characterized as having a polymer concentration of at about 3.4 MPa (500 psi) through a 0.381 mm (0.015 in.) diameter orifice and passed through a 20.96 cm (8.25 in.) air gap at a selected take up rate to give a spin draw ratio of about 6.12:1. The extrusion temperature was about 63° C. The coagulation medium was water. The average tensile properties of seven single filaments (ASTM D 3379, 2.54 cm (1.0 in.) gage length) were 2.96 GPa ($4.3 \times 10^5$ psi) tensile strength, 89.6 GPa ($13 \times 10^6$ psi) modulus, and elongation at break range from 4.2–6%. The fiber diameters ranged from 33–37 micrometer (0.00129 to 0.00146 inches). Heat treated filaments (conditioned under tension at 500° C. for 60 seconds in a nitrogen atmosphere) gave average values of tensile stength 3.45 GPa ($5.0 \times 10^5$ psi), modulus 317 GPa ($46 \times 10^6$ psi), and elongation at break 1.8–2.4%. The heat treated fiber diameters ranged from 29.7–33.3 micrometer (0.00117 to 0.00133 inches).

EXAMPLE 118

The procedure of Example 13 was essentially repeated using 21.0018 g (0.09857 mol) of 1b and 16.3768 g (0.09858 mol) of 2a. The $P_2O_5$ content during dehydrochlorination was 75.16% for 8 hours and was increased to 81.37% by the addition of deaerated $P_2O_5$ for an additional 24 hours. The concentration of monomer 1b during dehydrochlorination was initially 21.94%. After the addition of 2a, $P_2O_5$ was added so as to raise the $P_2O_5$ content to 87.5% before polymerization and to give a $P_2O_5$ content after substantial polymerization of 83.17%. The mixture was then heated at 185° C. for 28 hours. The concentration of polymer $+BI+_n$ was 13.8 weight percent. The isolated polymer $+BI+_n$ had an intrinsic viscosity of 24.4 dL/g.

EXAMPLE 119

The reaction product from Example 118 was dry-jet-wet spun as in Example 117 except that the extrusion temperature was 70° C., the jet diameter was 0.254 mm (0.010 in.), the air gap was 20.3 cm (8 in.) and the required extrusion pressure was 1.17 MPa (170 psi). The average tensile strength of nine single filaments was 3.12 GPa (453,000 psi) which ranged from about 2.82 to about 3.35 GPa (410,000 to 486,000 psi). The average tensile modulus was 303 GPa ($43.9 \times 10^6$ psi). After treating this fiber at 450° C. in air for 30 seconds with a 2% strength was unchanged and the modulus had increased to an average of 410 GPa (59.5×10⁶ psi). Repeating these conditions with a 2.8% stretch gave identical strength and a modulus of 394 GPa (57.09×10⁶ psi). After treating the as spun fiber at 500° C. in air for 30 seconds with a 2.5% stretch the tensile strength increased to an average of 3.58 GPa (519,000 psi) and the modulus increased to 467 GPa (67.8×10⁶ psi).

EXAMPLE 120

A mixture of 13.35 g of 115% PPA and 8.89 g of 85.9% $H_3PO_4$ was stirred under reduced pressure for 3.3 h at 100° C. To a 100-mL resin kettle was added 17.76096 g (0.09368 mol) of 3-amino-4-hydroxybenzoic acid hydrochloride (3d). The kettle was flushed with argon, and 20.45 g of the above PPA ($P_2O_5$ content=75.2%) was added. This mixture was stirred under reduced pressure; however, the mixture solidified overnight. 115% PPA (8.20 g, $P_2O_5$ content=83.8%) was added to obtain a stirrable mixture with a $P_2O_5$ content of 77.6%. After 8 h, 10.17 g of $P_2O_5$ was added as a powder, giving a $P_2O_5$ content of 83.49%. Dehydrochlorination was substantially complete after stirring for an additional 15 h at 80° C. Additional $P_2O_5$ (12.65 g) was then added at 100° C. in accordance with equation b* to give an f of 82.2% and an intermediate $P_2O_5$ content of 87.55%. The kettle was placed under reduced pressure before incorporating the $P_2O_5$ by stirring. The mixture was then stirred for 2.4 h at 100° C., and the temperature was increased to 140° C. After 1 h at this temperature, a clear amber solution was obtained. The temperature was raised to 150° C. for 1 h and then raised to 185° C. After 1 h at 185° C., the reaction mixture showed a tan pearlescence when stirred and was birefringent when viewed at rest under crossed polars. The reaction mixture was then heated at 185° C. for an additional 40 h. Nearly colorless, high strength fibers were readily formed by drawing the reaction product. The concentration of polymer $+V+_n$ in the product was calculated to be 16.67%. The intrinsic viscosity of polymer $+V+_n$ isolated from the product was measured to be 13.84 dL/g in MSA at 30° C. The dried polymer had a TGA break in air at 10° C./min of 640° C. Anal. Calcd. for $C_7H_3NO$: C, 71.80; H, 2.58; N, 11.96. Found: C, 71.09; H, 2.64; N, 11.67; Residue, 0.8.

EXAMPLE 121

The reaction mixture of Example 120 was placed in a constant displacement spinning apparatus and extruded at about 3.4 MPa (500 psi) through a 0.381 mm (0.015 in.) diameter orifice into a 31.75 cm (12.5 in.) air gap with a take-up rate to supply a spin draw ratio of 6.6:1. The temperature of the spinning dope was 65° C. The as spun fiber was of poor quanlity and very non-uniform. The as-spun properties were (340×10³ psi) tensile strength, 41.3-96.5 GPa (6-14×10⁶ psi) modulus, with no elongation to break determined. After heat treatment under tension at 500° C. for 60 seconds in nitrogen, the strength was essentially unchanged and the modulus had increased to an average value of 136 GPa (19.7×10⁶ psi).

EXAMPLE 122

The procedure of Example 120 was essentially repeated using 80.95 g (0.4269 mol) of monomer 3d, 34.37 g of 85.9% $H_3PO_4$, 80.13 g of 115% PPA and 118.06 g of $P_2O_5$. These amounts gave a $m_o$ of 77.32%, an intermediate $P_2O_5$ content of 88.83%, and (because of the loss of 1.54 g of water during polycondensation) an $f$ of 83.8%. The $P_2O_5$ content profile for this example is graphically presented by the step-wise curve of FIG. 13. The concentration of polymer $+V+_n$ in the reaction product was calculated to be 16.87 weight %. The total reaction time above 100° C. was 43.5 hours. The stir-opalescent reaction product was birefringent at rest and gave colorless fibers after drawing and precipitating in water. The intrinsic viscosity of isolated polymer $+V+_n$ was 12.0 dL/g.

EXAMPLE 123

The reaction product of Example 122 was placed in a constant displacement spinning apparatus and extruded at about 3.4 MPa (500 psi) through a 0.25 mm (0.010 in.) diameter orifice into a 20.3 cm (8 in.) air gap with a take up rate to supply a spin draw ratio of 145:1. The temperature of the spinning dope was 90° C. The tensile strength of fibers (average of nine breaks) spun from said dope was 3.57 GPa (518,000 psi). One of the fibers tested gave a break value of 5.01 GPa (727,000 psi). The average tensile modulus was 133 GPa (19.3×10⁶ psi). This value does not take into account the machine compliance. The average strain at break was 3.3%. The fiber diameter was 16 micrometer (0.63×10⁻³ in.).

EXAMPLE 124

The reaction product of Example 122 was placed in a constant displacement spinning apparatus and extruded at about 3.4 MPa (500 psi) through a 0.250 mm (0.010 in.) diameter orifice into a 20.3 cm (8.0 in.) air gap with a take up rate to supply a spin draw ratio of 125:1. The temperature of the spinning dope ws 90° C. The tensile strength of fibers (average of ten breaks) spun from said dope was 2.57 GPa (373,000 psi). One of the fibers tested gave a break value of 3.38 GPa (491,000 psi). The average tensile modulus was 79 GPa (11.5×10⁶ psi). This value does not take into account the machine compliance. The average strain at break was 4.6%. The fiber diameter was 19 micrometer (0.748×10⁻³ in.).

EXAMPLE 125

The reaction product of Example 122 was placed in a constant displacement spinning apparatus and extruded at about 3.4 MPa (500 psi) through a 0.25 mm (0.010 in.) diameter orifice into a 20.3 cm (8.0 in.) air gap with a take up rate to supply a spin draw ratio of 100:1. The temperature of the spinning dope was 90° C. The tensile strength of fibers (average of seven breaks) spun from said dope was 2.83 GPa (410,000 psi). One of the fibers tested gave a break value of 3.29 GPa (491,000 psi). The average tensile modulus was 61 GPa (8.8×10⁶ psi). This value does not take into account the machine compliance. The average strain at break was 4.8%. The fiber diameter was 21 micrometer (0.827×10⁻³ in.).

EXAMPLE 126

The reaction product of Example 122 was placed in a constant displacement spinning apparatus and extruded at about 3.4 MPa (500 psi) through a 0.025 mm (0.010 in.) diameter orifice into a 20.3 cm (8.0 in.) air gap with a take up rate to supply a spin draw ratio of 17.2:1. The temperature of the spinning dope was 80° C. The tensile strength of fibers (average of seven breaks) spun from said dope was 2.76 GPa (400,000 psi). The average tensile modulus was 41 GPa ($6.0 \times 10^6$ psi). This value does not take into account the machine compliance. The fiber diameter was 45 micrometer ($1.76 \times 10^{-3}$ in.).

EXAMPLE 127

Poly-2,5-pyridinebenzobisoxazole

A mixture of 13.25 g of concentrated orthophosphoric acid (85.9% $H_3PO_4$) and 29.75 g of 115% PPA was stirred under reduced pressure at 100° C. for 2.5 hours. The resulting solution was then poured under a stream of argon at 20° C. into a 100 ml resin kettle containing 10.8621 g (0.050980 mol) of 4,6-diamino-1,3-benzenediol dihydrochloride (1b) that was prepared according to the method of Wolfe, et al., *Macromolecules*, Vol. 14, 909 (1981), recrystallized from aqueous hydrochloric acid containing 3 wt % stannous chloride, and dried for 72 hours at 20° C. under reduced pressure immediately before use. The mixture was stirred at 55° C. for 18 hours, at 76° C. for 24 hours under reduced pressure. 2,5-pyridinedicarboxylic acid (2i) (8.5720 g, 0.050984 mol) was then added under argon flow. Additional $P_2O_5$ (31.18 g) was then added. The solution was stirred, and heated as follows: 100° C. for 1 hour; 120° C. for 3 hours; 130° C. for 0.5 hours; 140° C. for 0.5 hours; 150° C. for 0.5 hours; 185° C. for 48 hours (the dark red solution became stir-opalescent during the first hour of this last period). The resulting product was deep red with a metallic luster, exhibited stir-opalescence, and is further characterized as having a final effective $P_2O_5$ content of 84% with the $+BK+_n$ polymer concentration being 13.4% by weight. The intrinsic viscosity of the polymer $+BK+_n$ isolated from the reaction product was 4.96 dL/g in MSA at 30° C., which corresponds to an average number of recurring units, n, of approximately 50.

EXAMPLE 128

The reaction products from Examples 27 and 120 were precipitated in water and the polymers obtained (polymers $+T+_n$ and $+V+_n$, respectively) were chopped in a Waring Blender and dried. The reaction product from Example 12 was dry-jet wet spun into fiber (polymer $+AI+_n$) and dried. All of the precipiated polymers and spun fiber of Examples 12, 27, and 120 including as spun fiber (polymer $+BI+_n$) produced in Example 117 were tested as follows: the precipitated polymers and spun fibers were placed in four of the ten positions in an isothermal aging apparatus developed by SRL Laboratories of Dayton, Ohio and heated at 371° C. in circulating air for 200 hours. The apparatus has ten positions and the weight remaining in each of the positions is recorded at 20 minute intervals. Each of the polymer samples lost approximately 14% of their original weight initially indicating the presence of residual volatile species (e.g. water). The weight losses due to isothermal aging of the individual polymers (after the initial weight loss) were as follows:

| Polymer | Wt % Loss |
| --- | --- |
| $+V+_n$ | 8.0 |
| $+BI+_n$ | 12.0 |
| $+T+_n$ | 23.0 |
| $+AI+_n$ | 27.0 |

The results are shown graphically in FIGS. 1 and 2.

EXAMPLE 129

The samples described in Example 128 were analyzed in a Du Pont 990 Thermogravimetric Analyzer at a heating rate of 5° C./min. The weight retention in He and air atmospheres (flow rate=60 ml/min) as a function of temperature is shown for the four polymers in FIGS. 3, 4 (in He) and 5, 6 (in air). The isothermal aging (see FIGS. 1 and 2) of all four polymers of Example 128 show a marked improvement especially for polymers $+V+_n$, $+BI+_n$. Polymer $+BI+_n$ can be compared directly with Wolfe and Loo U.S. Pat. No. 4,225,700. The improvement is presumed to be caused by the increase in molecular weight and/or the more highly ordered morphology of the resulting polymers/fibers formed from compositions of the invention. Thermogravimetric analysis in air (at a heating rate of 10° C./min) was also performed on two block polymers of the instant invention; these block polymers were isolated and dried from the reaction products of Example 73 and 74. The results of the TGA are shown in FIG. 2A.

EXAMPLE 130

A mixture of 173.59 g of concentrated orthophosphoric acid (85.5% $H_3PO_4$) and 414.71 g of 115% PPA was stirred under reduced pressure for 2 hours. The resulting solution was then poured at approximately 30° C. under an argon stream into a 2L resin kettle containing 18.70422 g (0.557127 mol) of 4,6-diamino-1,3-benzenediol dihydrochloride (1b) that was prepared according to the method of Wolfe and Arnold, *Macromolcules*, vol. 14, 909 (1981), recrystallized from aqueous hydrochloric acid containing 3 wt % stannous chloride, and dried for 3.5 days at 20° C. under reduced pressure immediately before use. The mixture was stirred at 60° C. for 48 hous and 80° C. for 6 hours under reduced pressure. Monomer 2a (92.55800 g, 0.55713 mol) was then added under argon flow. Deaerated $P_2O_5$ (404.45 g) was added. The mixture was then heated at 100° C. for 18 hours, and 185° C. for 29 hours. The dark blue-black solution became stir-opalescent after 1.5 hours at 185° C. The reaction product was deep purple with a golden metallic luster, exhibited stir-opalescence, and was further characterized as having a final effective $P_2O_5$ content of 83.2%, with the $+BI+_n$ polymer concentration being 11.3% by weight. The intrinsic viscosity of the polymer $+BI+_n$ isolated from the reaction product was 20.4 dL/g in MSA at 30° C., which corresponds to an average number of recurring units, n, of approximately 100.

EXAMPLE 131

The reactor used for the preparation of polymer —AI—$_n$ of this Example was constructed with all wetted parts made of Hastelloy C-276. The working volume was 115 L (30 gal). Mixing was provided by four vertical, stationary baffles attached to the reactor lid and a rotating assembly with four vertical members. The rotating assembly was driven by a 5 hp-2.5 hp two-speed motor and had a bearing and seal at top and bottom. The reactor was charged with 13.4888 kg (55.0129 mol) of monomer 1a and then with 49.1 kg of a PPA prepared from 19.64 kg of 85.8% $H_3PO_4$ and 29.46 kg of 115% PPA. The reactor was then heated to 60° C. within 1 hour and placed under reduced pressure for 20 hours. The $P_2O_5$ content was then raised to 78.5% by the addition of 7.751 kg of $P_2O_5$ over a 2-hour period, which caused the temperature to rise spontaneously to 92° C. After cooling to 68° C., an additional 5.647 kg of $P_2O_5$ was added in 30 minutes, causing the temperature to rise to 84° C. The mixture was stirred at 80° C. under reduced pressure for an additional 17 hours, at which time all the HCl appeared to have been evolved. Monomer 2a (9.1396 kg, 55.015 mol) was then added in four portions. Each portion was added under reduced pressure by first adding the monomer to a 12 L addition bulb, placing both the reactor and bulb under reduced pressure, and then opening a ball valve between the two chambers. Additional $P_2O_5$ (26.296 kg) was then added in two portions according to equation b* to give an intermediate $P_2O_5$ content of 86.26 % and a final $P_2O_5$ content of 82.57%. The reaction mixture was then stirred at slow speed overnight at 100°-112° C. under an argon atmosphere. Using the faster stirring speed, the mixture was then heated, and samples were removed for intrinsic viscosity determinations according to the following schedule:

| Reaction Time minutes | Reaction Temperature °C. | $\{AI\}$, dL/g |
|---|---|---|
| 0-12 | 103-112 | |
| 20 | 127 | |
| 27 | 140 | |
| 42 | 159 | |
| 60 | 172 | |
| 73 | 180 | |
| 87 | 183 | |
| 100 | 185 | 7.83 |
| 120 | 185 | 15.33 |
| 135 | 187 | 17.77 |
| 149 | 186 | 20.18 |
| 165 | 184 | 21.80 |
| 183 | 179 | |

The reaction mixture was then cooled to 110° C. over a period of four hours, at which time the intrinsic viscosity was 24.6 dL/g. The green, opalescent product was then reheated to 130° C. and removed from the reactor for spining. A sample taken at the end of the removal was measured to have an intrinsic viscosity of 27.26 dL/g. A small sample was heated at 185° C. for an additional 24 hours, and the intrinsic viscosity rose to 34.11 dL/g.

EXAMPLE 132

A mixture of 34.97 g of PPA (83.8% $P_2O_5$) and 15.00 g of $H_3PO_4$ was stirred and heated to 100° C. in a 100-ml 3-necked flask. The flask was placed under reduced pressure for 2.0 hours. To a 100-ml resin kettle was added 21.32 g of 3,4-diaminobenzoic acid.2 HCl. The flask was deaerated and flushed with argon. 33.84 g of the above prepared PPA solvent (having a $P_2O_5$ content of 77.32%) was added to the kettle. The kettle was heated with an oil bath at 50° C. with moderate stirring under water-aspirator reduced pressure for 1.0 hour. The flask was then placed under vacuum-pump reduced pressure for an additional 46.83 hours. The temperature remained at 50° C. for 18.0 hours, at 60° C. for 1.77 hours, at 70° C. for 23.81 hours, and at 80° C. for 4.25 hours. At the time the vacuum was removed, the mixture was riding on the stir blades. Near the end of dehydrochlorination, the mixture was still opaque and the color was mint green. The $P_2O_5$ was added as a powder in two additions. The first addition of $P_2O_5$ was in the amount of 6.93 g. The $P_2O_5$ was added under argon at 80° C. with stirring. The $P_2O_5$ was incorporated under reduced pressure. Reduced pressure was maintained for 18.57 hours. The remaining 14.00 g of $P_2O_5$ were added and incorporated under reduced pressure with stirring at 80° C. (Total $P_2O_5$=20.93 g.) The amount of $P_2O_5$ added was calculated to provide the reaction mixture with an effective $P_2O_5$ content of approximately 85.99% prior to the beginning of polymerization and an effective $P_2O_5$ content of approximately 80.94% subsequent to substantially complete polymerization. The mixture was heated to a final temperature of 200° C. following the heating schedule outlined below.

| Temperature (°C.) | Time (Hours) | Observations |
|---|---|---|
| 90 | 0.73 | |
| 110 | 0.63 | Foamy; darker green; vacuum removed. |
| 120 | 0.72 | Pea-soup green; more fluid; clearing. |
| 130 | 0.88 | |
| 142 | 0.50 | |
| 152 | 0.17 | Mixture clearer with small particles present. |
| 161 | 0.27 | Mixture full of bubbles. |
| 169 | 0.45 | |
| 182 | 0.83 | |
| 200 | 20.79 | |

A sample of the reaction product was stretchable, fibrous, and turned white as it was drawn. The fiber was precipitated in water. The fiber and a nonprecipitated sample were birefringent at rest at room temperature under crossed polars. The clear green dope appeared hazy as it was cooled. The intrinsic viscosity of the reaction product was 6.58 dL/g in MSA at 30° C. and the polymer concentration was 15.90%. The polymer obtained is of the following structure:

EXAMPLE 133

A mixture of 14.71 g of concentrated orthophosphoric acid (85.9% $H_3PO_4$) and 22.64 g of 115% PPA was stirred under reduced pressure at 100° C. for 2.5 hours. The resulting solution was then poured at approximately 25° C. under a stream of argon into a 100 ml resin kettle containing 11.04664 g (0.045053 mol) of 2,5-diamino-1,4-benzenedithiol dihydrochloride (1a). The mixture was stirred under reduced pressure at 50° C. for 2 hours; 60° C. for 16 hours, and 80° C. for 12.5 hours to complete the dehydrochlorination. Monomer 2a (7.4863 g, 0.045001 mol) was then added under an argon flow. $P_2O_5$ (48.29 g) was then added. The mixture was heated at 100° C. for 3 hours and at 185° C. for 33 hours. The resulting reaction product was light green with an iridescent luster, exhibited stir-opalescence, and was further characterized as having a final effective $P_2O_5$ content of 83.6% with the $+AI+_n$ polymer concentration being 11.6 wt. %. The intrinsic viscosity of the polymer $+AI+_n$ isolated from the reaction product was 47.8 dL/g in MSA at 30° C., which corresponds to an average number of recurring units, n, of approximately 140.

The physical properties of as spun and heat treated fibers formed from compositions of Examples 117, 119, 121, 123, 124, 125, and 126 above are shown in Tables 29 and 30 below.

TABLE 30

| | EXAMPLES | | |
|---|---|---|---|
| | $+V+_n$ | $+V+_n$ | $+V+_n$ |
| | Example No.: | | |
| CONDITIONS | 124 | 125 | 126 |
| Polymer dope | | | |
| 1. Intrinsic Viscosity (dL/g) | 12.0 | 12.0 | 12.0 |
| 2. $P_2O_5$ Content (%) | 83.8 | 83.8 | 83.8 |
| 3. Polymer Concentration (%) | 16.9 | 16.9 | 16.9 |
| Spinning Conditions | | | |
| 4. Spin Draw Ratio | 125:1 | 100:1 | 17.2:1 |
| 5. Spin Temperature (°C.) | 90 | 90 | 80 |
| 6. Air Gap Distance (cm) | 20.3 | 20.3 | 31.7 |
| 7. Jet Diameter (mm) | 0.25 | 0.25 | 0.25 |
| 8. Dope pressure (MPa) | *3.4 | *3.4 | *3.4 |
| As Spun Fiber Properties | | | |
| 9. Tensile Strength (GPa) | 2.57 | 2.83 | 2.76 |
| 10. Single break Tensile Strength (GPa) highest value | 3.38 | 3.29 | — |
| 11. Modulus (GPa) | 79 | 61 | 41 |
| 12. Elongation (%) | 4.6 | 4.8 | — |
| 13. Fiber diameter (micrometers) | 19 | 21 | 45 |
| Heat Treatment Conditions | | | |
| 14. Temperature (°C.) | 450 | 400 | 500 |
| 15. Time (seconds) | 30 | 30 | 30 |
| 16. Stretch factor (%) | 4.37 | 4.37 | 1.28 |
| 17. Atmosphere condition | Nitrogen | Nitrogen | Nitrogen |
| Post Heat Treatment Fiber Properties | | | |
| 18. Tensile Strength (GPa) | 2.85 | 3.34 | 2.62 |
| 19. Single break tensile Strength (GPa) highest value | 4.94 | 3.76 | 3.00 |
| 20. Modulus (GPa) | 119 | 115 | 144 |
| 21. Elongation (%) | 2.5 | 3.6 | 2.2 |
| 22. Fiber Diameter (micrometers) | 19.15 | — | 42.7 |

*denotes approximate values

TABLE 29

| | EXAMPLES | | | |
|---|---|---|---|---|
| | $+BI+_n$ | $+BI+_n$ | $+V+_n$ | $+V+_n$ |
| | | Example No.: | | |
| CONDITION | 117 | 119 | 121 | 123 |
| Polymer dope | | | | |
| 1. Intrinsic Viscosity (dL/g) | 23.9 | 24.4 | 13.8 | 12.0 |
| 2. $P_2O_5$ Content (%) | 82.3 | 83.2 | 82.2 | 83.8 |
| 3. Polymer Concentration (%) | 13.3 | 13.8 | 16.7 | 16.9 |
| Spinning Conditions | | | | |
| 4. Spin Draw Ratio | 6.1:1 | 53:1 | 6.6:1 | 145:1 |
| 5. Spin Temperature (°C.) | 63 | 70 | 65 | 90 |
| 6. Air Gap Distance (cm) | 21 | 20.3 | 31.7 | 20.3 |
| 7. Jet Diameter (mm) | 0.381 | 0.25 | 0.381 | 0.25 |
| 8. Dope pressure (MPa) | *2 | 1.17 | *3.4 | *3.4 |
| As Spun Fiber Properties | | | | |
| 9. Tensile Strength (GPa) | 2.96 | 3.12 | 2.34 | 3.57 |
| 10. Single break Tensile Strength (GPa) highest value | — | — | — | 5.01 |
| 11. Modulus (GPa) | 89.6 | 303 | 41–96 | 133 |
| 12. Elongation % | 4.2–6 | — | — | 3.3 |
| 13. Fiber diameter (micrometers) | 33 | — | 37–76 | 16 |
| Heat Treatment Conditions | | | | |
| 14. Temperature (°C.) | 500 | 450 | 500 | — |
| 15. Time (seconds) | 60 | 30 | 60 | — |
| 16. Stretch factor (%) | — | 2 | 7.5 | — |
| 17. Atmosphere condition | Nitrogen | Air | Nitrogen | — |
| Post Heat Treatment Fiber Properties | | | | |
| 18. Tensile Strength (GPa) | 3.45 | 3.07 | 2.34 | — |
| 19. Modulus (GPa) | 317 | 410 | 136 | — |
| 20. Elongation (%) | 1.8–2.4 | — | — | — |
| 21. Fiber Diameter (micrometers) | 31.4 | — | — | — |
| 22. Visual | uniform | non-uniform | — | — |

*denotes approximate values

As illustrated in the examples above, the compositions of the invention are prepared in batch fashion, but continuous procedures may be employed.

Some process and product benefits as a result of better control of certain process parameters such as shear and temperature in a continuous process are: (1) a more homogeneous products of reaction as a result of a much higher order of magnitude of mixing; (2) higher throughputs; (3) and improved economics.

ture has passed through an intermediate number of mixing elements.

A very important aspect of the continuous process as well as for the batch process which must be emphasized is that "Stage One", "Stage Two", and "Stage Three" of the invention must be conducted within the shaded phosphorus pentoxide content profile area bounded by ABCDEFGHI of FIG. 14. This is unrealized by the art.

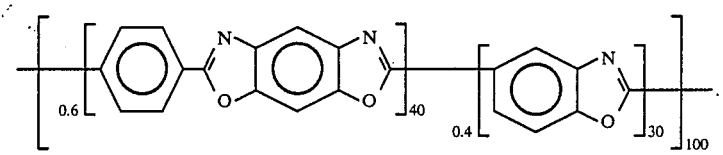

Another advantage of continuous processing is that the resulting reaction products can be blended in essentially all portions with other reaction products of different polymer type and/or reaction products at different stages of reaction.

In a continuous process, the aforementioned dehydrochlorination step of "Stage One" and monomer-$P_2O_5$ addition of "Stage Two" are conducted at a temperature not to exceed about 100° C. in a batch reactor preferably of the type described in Example 131. "Stage Three" of the invention can be conducted in a motionless (static) mixer. Such mixers for paste and very viscous materials are described in "Chemical Engineers' Handbook", R. H. Perry et al., McGraw-Hill Kogakusha, LTD., International Student Edition, pp. 19-24, (1973); "Fluid Mixing Technology", by James Y. Oldshue, McGraw-Hill Publishing Company, pp. 431-438, (1983); and Grout et al., U.S. Pat. No.: 3,800,985. These publications and patent are incorporated herein by reference. The reaction mixture of "Stage Two" is fed from an outlet of the batch reactor through a constant displacement pump to a static mixer (tubular reactor) preferably of the type described in U.S. Pat. No. 3,800,985 where the first mixing element is heated at a temperature between about 140° C. to about 185° C. The second and subsequent intermediate mixing elements are heated at temperatures between about 165° C. and about 200° C. The last mixing elements are heated at temperatures between about 80° C. and about 200° C. depending on the desired temperature selected for spinning the particular extended chain polymer employed.

In order to avoid interruptions in the continuous process, two or more batch reactors (for conducting "Stage One" and "Stage Two") are connected to the static mixer (tubular reactor) in parallel array fashion so as to feed said tubular reactor in time-wise sequence. Preferably, "Stages One and "Stage Two" can be conducted in an emptied batch reactor without the need for clean-up. The volume requirement of the tubular reactor is a function of the size and number of the batch reactor array, the desired (mixing elements) residence time, and the desired flow rate.

Such a continuous process is especially suitable for the preparation of block copolymers of the present invention. Block copolymers can be made by admixing a second reaction mixture after the first reaction mix- While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

APPENDIX

General Structure Reference

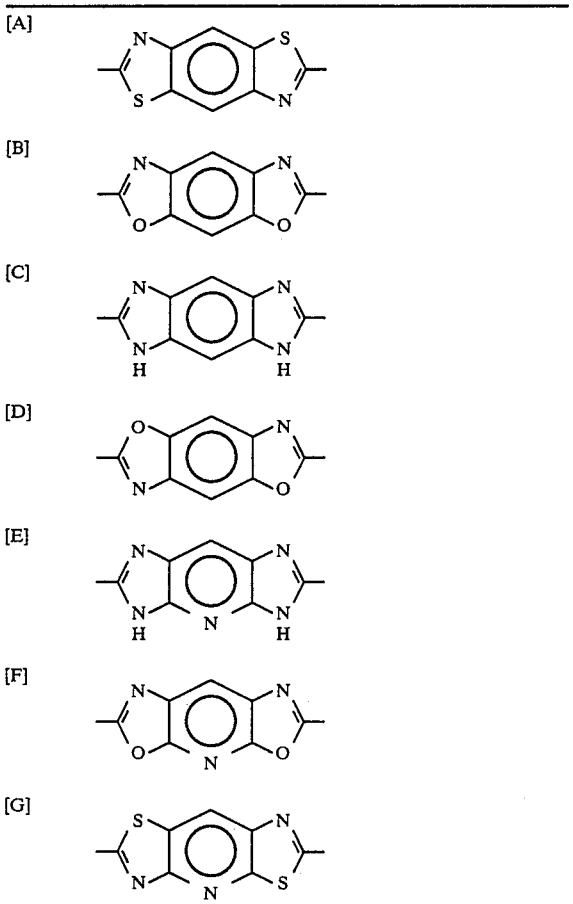

| APPENDIX-continued | | APPENDIX-continued | |
|---|---|---|---|
| General Structure Reference | | General Structure Reference | |
| [H] | 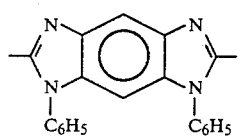 | [S] | 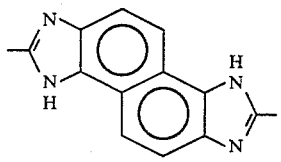 |
| [I] | 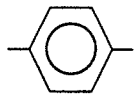 | [T] | 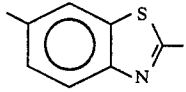 |
| [J] | 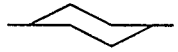 | [U] | 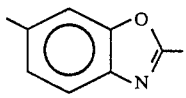 |
| [K] | 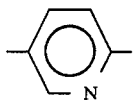 | [V] | 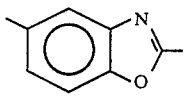 |
| [L] | 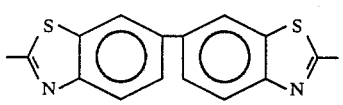 | [W] | 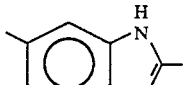 |
| [M] | 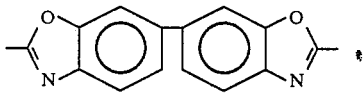 | [X] | 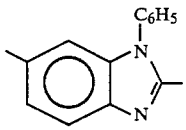 |
| [N] | 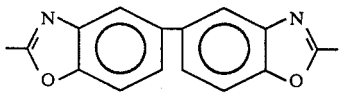 | [Y] | 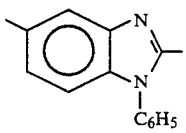 |
| [O] | 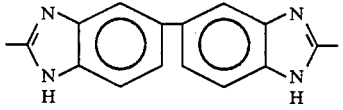 | [Z] | 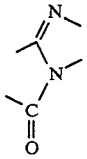 |
| [P] | 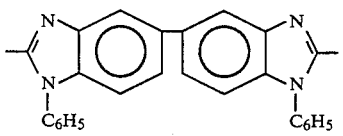 | [A'] | 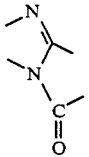 |
| [Q] | 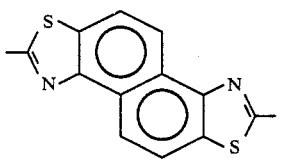 | [B'] | 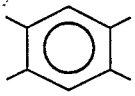 |
| [R] | 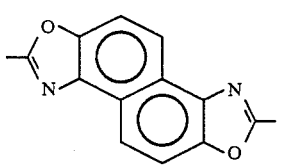 | [C'] | 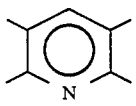 |

APPENDIX-continued
General Structure Reference
[D'] 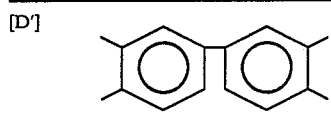
[E'] 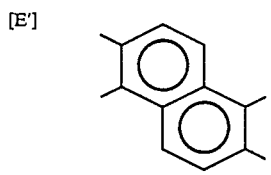
[F'] 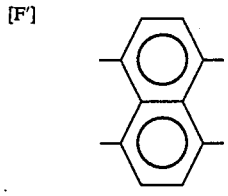
[G'] 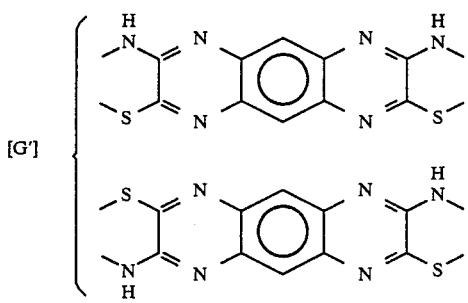
[H'] 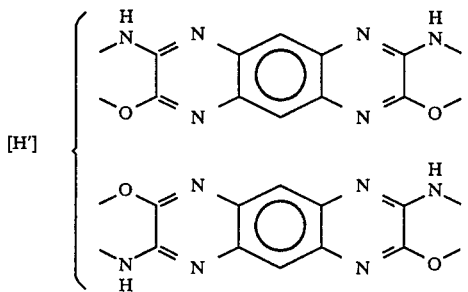
[I'] 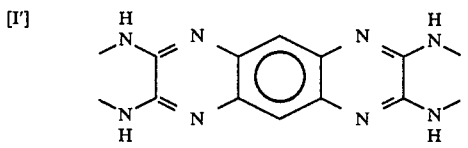
[J'] 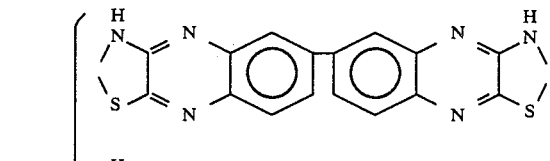
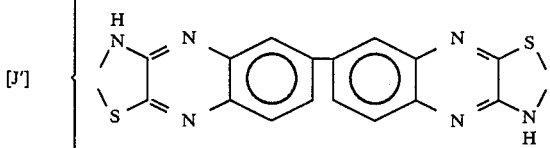
APPENDIX-continued
General Structure Reference
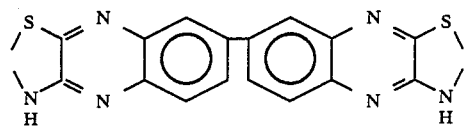
[K'] 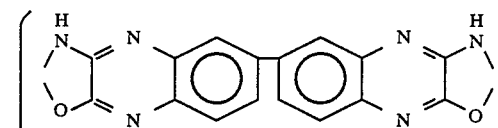
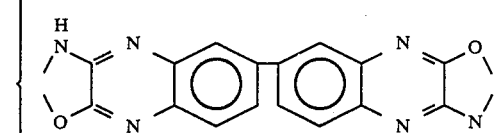
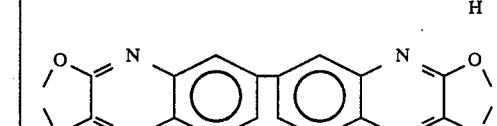
[L'] 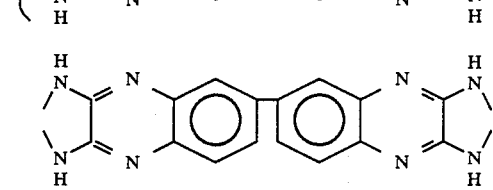
[M'] 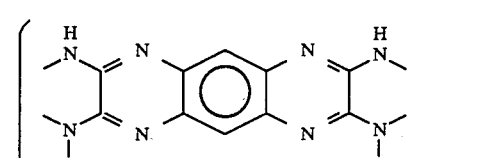
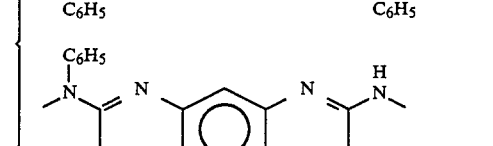
[N'] 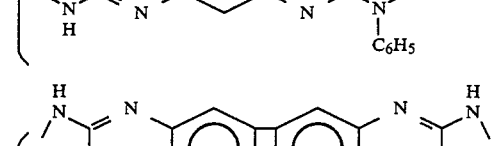
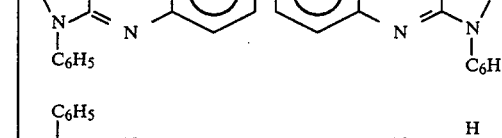
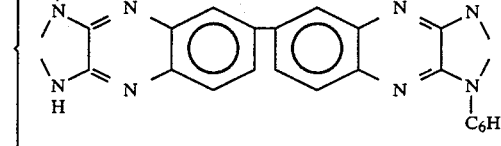
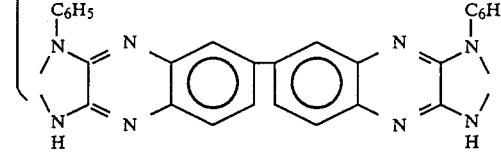

APPENDIX-continued

General Structure Reference

[O'] — tetraimino-pyrene structure

[P'] — bis(methylamino)methylidene diamine structure

[Q'] — diaminodiimino cyclohexadiene (NH/N=)

[R'] — bis(methylthio)diimino cyclohexadiene

[S'] — dimethoxy diimino cyclohexadiene

[T'] — 2-methylbenzothiazole-linked

[U'] — N,N'-diphenyl diamino diimino cyclohexadiene

[V'] — 2-methylbenzoxazole-linked

[W'] — biphenyl (4,4'-linked)

[X'] — naphthalene (2,6-linked)

[Y'] — 2,6-substituted quinoline

[Z'] — biphenyl (3,3'- or meta-linked)

[A''] — cyclohexane (1,4-trans), H shown axial/equatorial

[B''] — 1,4-phenylene-O-1,4-phenylene-O-1,4-phenylene

[C''] — 1,4-phenylene-O-1,3-phenylene-O-1,4-phenylene

[D''] — 1,3-phenylene-O-1,3-phenylene-O-1,3-phenylene

[E''] — 1,3-phenylene-O-1,4-phenylene-O-1,3-phenylene

[F''] — 1,4-phenylene-O-(1,2-phenylene-O)-1,4-phenylene

[G''] — 1,3-phenylene

[H''] — 4,4'-diphenyl ether

[I''] — 3,4'-diphenyl ether

[J''] $-(CH_2)_2-$
[K''] $-(CH_2)_3-$
[L''] $-(CH_2)_4-$
[M''] $-(CH_2)_5-$
[N''] $-(CH_2)_8-$

[O''] — bis(2-methylbenzothiazol-6-yl) ether

APPENDIX-continued

General Structure Reference

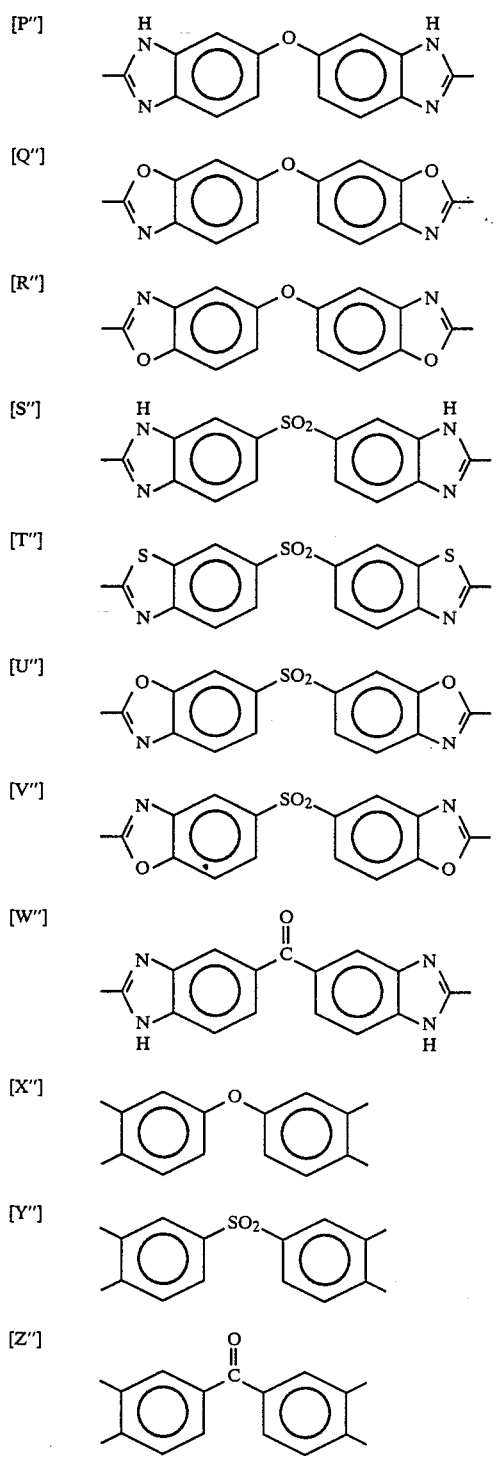

homopolymer I

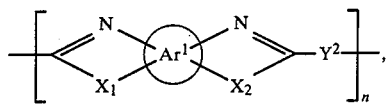

wherein $Ar^1$ is

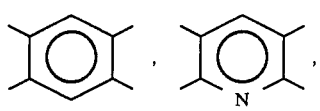

$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

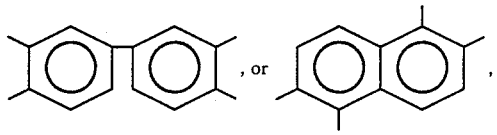

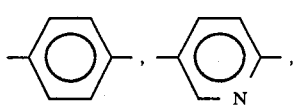

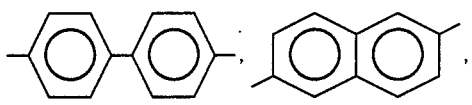

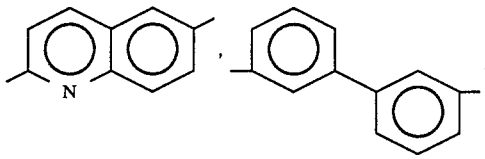

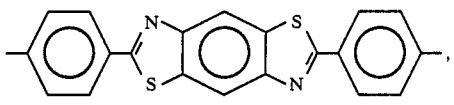

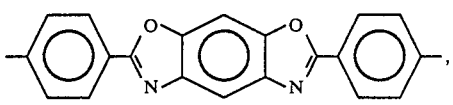

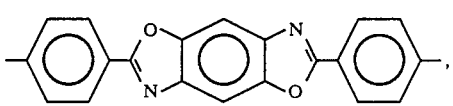

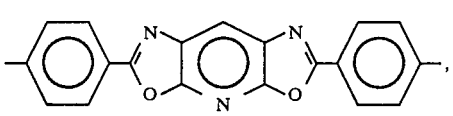

What we claim is:

1. An extended chain crystalline polymer selected from the group consisting of: a homopolymer, a copolymer, or a block polymer, said homopolymer having the formulas:

-continued

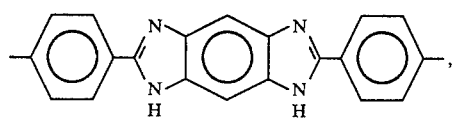

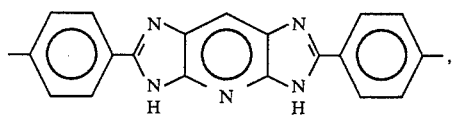

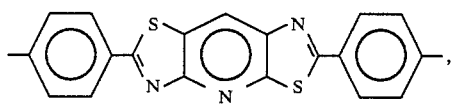

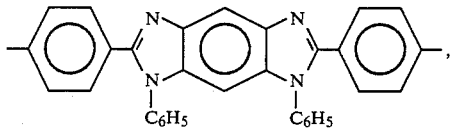

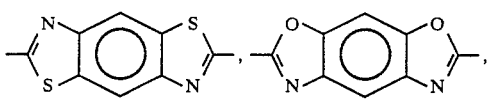

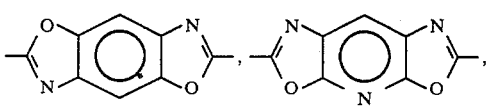

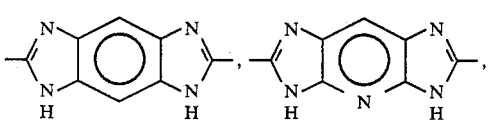

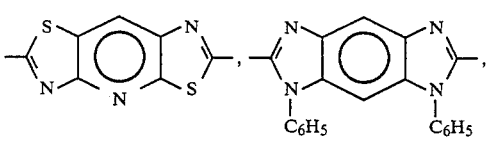

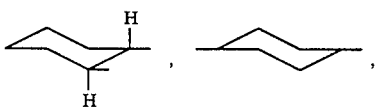

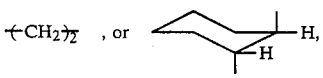

n being a positive integer;

homopolymer II

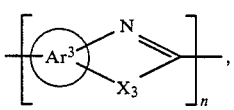

wherein $Ar^3$ is

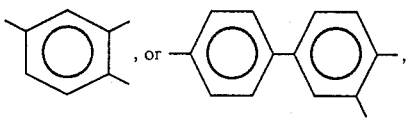

$X_3$ is oxygen, or NR (R being hydrogen or an organic group), the nitrogen atom and $X_3$ being bonded to aromatic carbon atoms of $Ar^3$, N and $X_3$ of each hetero ring are disposed ortho to one another, n being a positive integer;

homopolymer III

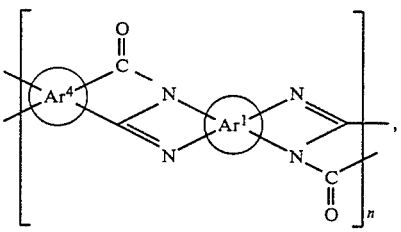

wherein $Ar^1$ is

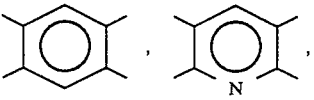

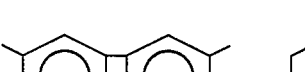

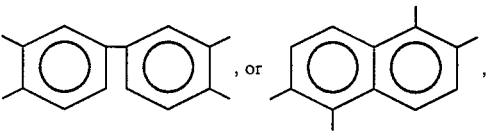

and $Ar^4$ is

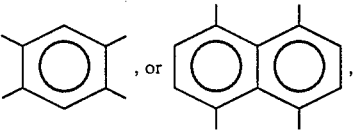

the nitrogen atoms being bonded to aromatic carbon atoms of $Ar^1$ and the carbon atoms being bonded to aromatic carbon atoms of $Ar^4$, n being a positive integer;

homopolymer IV

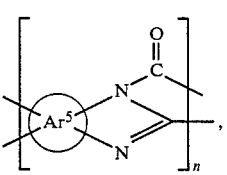

wherein $Ar^5$ is

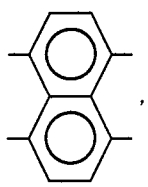

the nitrogen atoms being bonded to Ar⁵, n being a positive integer;

homopolymer V

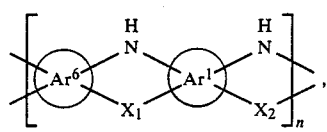

wherein Ar⁶ is

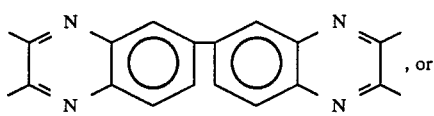, or

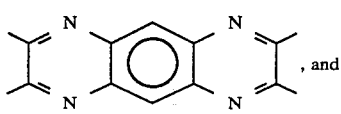, and

Ar¹ is

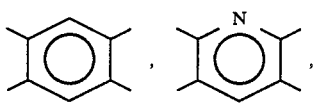,

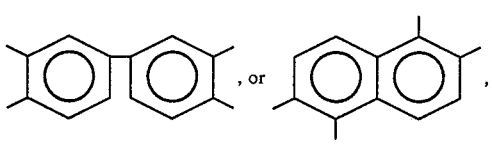, $X_1$ and $X_2$ are the same or different and are sulfur, oxygen, or NR (R being hydrogen or an organic group), the NH groups and $X_1$ and $X_2$ being bonded to aromatic carbon atoms of Ar⁶ and Ar¹. NH and $X_1$ or $X_2$ of each hetero ring are disposed ortho to one another, n being a positive integer;

homopolymer VI

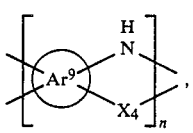

wherein Ar⁹ is

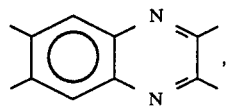, $X_4$ is sulfur, oxygen, or NR (R being hydrogen or an organic group), the NH group and $X_4$ being bonded to aromatic carbon atoms of Ar⁹, n being a positive integer;

homopolymer VII

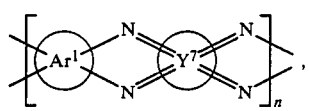

wherein Ar¹ is

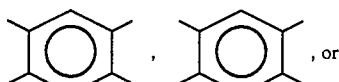, or

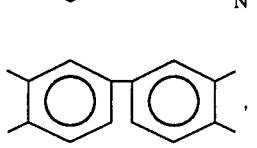,

Y⁷ is

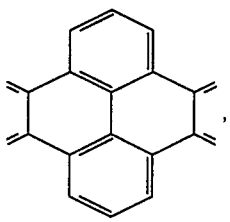, the nitrogen atoms being bonded to aromatic carbon atoms of Ar¹ and bonded to adjacent carbon atoms of Y⁷, n being a positive integer; or homopolymer VIII

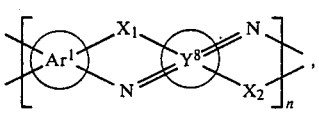

wherein Ar¹ is

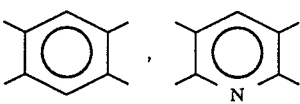,

-continued

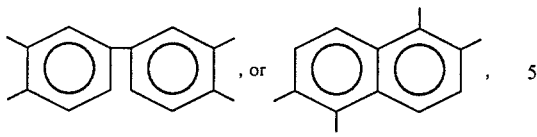, or

Y⁸ is

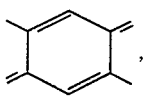, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$ and adjacent carbon atoms of $Y^8$, N and $X_1$ and $X_2$ of each hetero ring are disposed ortho to one another, n being a positive integer; wherein said I, II, III, IV, V, VI, VII, and VIII polymers are characterized as having a molecular weight with an n value corresponding to an intrinsic viscosity greater than about 7 dL/g as determined in methanesulfonic acid at 30° C., with the proviso that when said polymer is poly([benzo-(1,2-d:4,5-d')bisthiazole-2,6-diyl]-1,4-phenylene) that the molecular weight of said poly([benzo-(1,2-d:4,5-d')bisthiazole-2,6-diyl]-1,4-phenylene) correspond to an intrinsic viscosity greater than 30.3 dL/g copolymer having the formulas:

copolymer IX

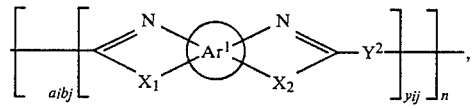, wherein $Ar^1$ is

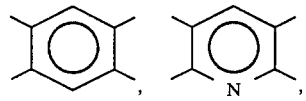,

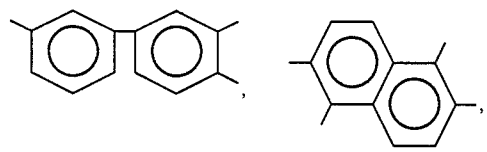,

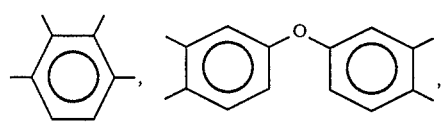,

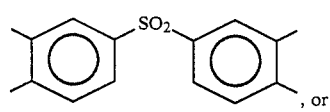, or

-continued

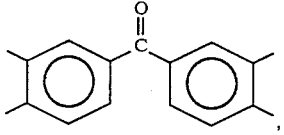, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ and $X_2$ of each hetero ring are disposed ortho to one another, and $Y^2$ is nil or is

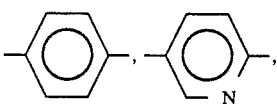,

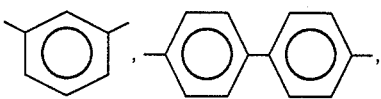,

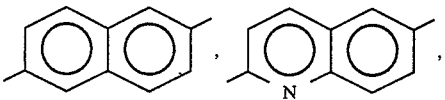,

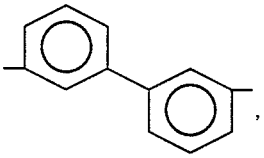,

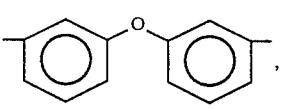,

,

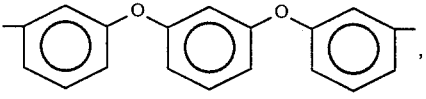,

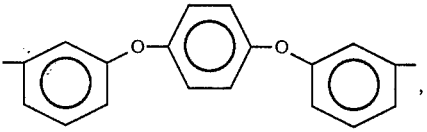,

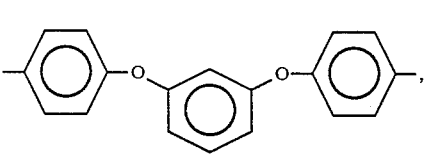,

-continued

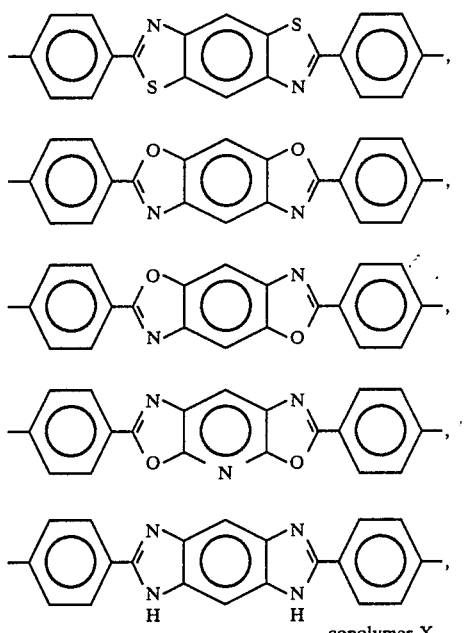

copolymer X

-continued

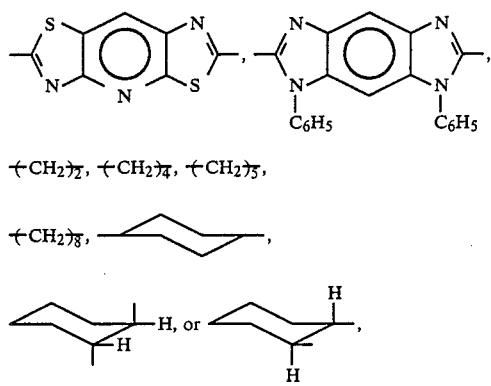

$-(CH_2)_{\overline{2}}, -(CH_2)_{\overline{4}}, -(CH_2)_{\overline{5}},$ $-(CH_2)_{\overline{8}},$ $a_ib_j$ represents the molar proportions of the respective different recurring units present in said copolymer, $y_{ij}$ represents an average number of the respective different sequential recurring units present in said copolymer, n being a positive integer;

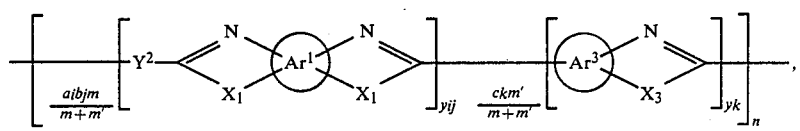

wherein $Ar^1$ is

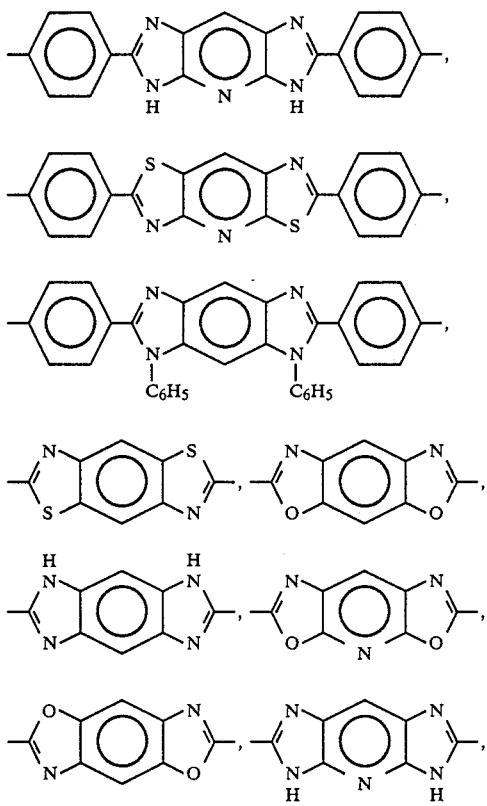

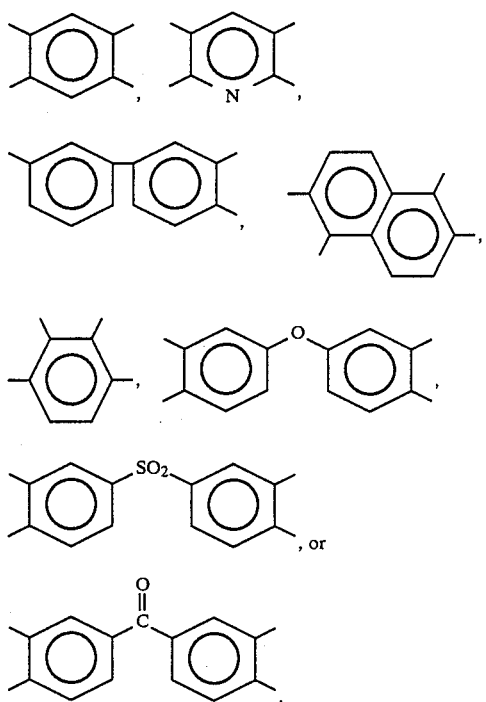

$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is
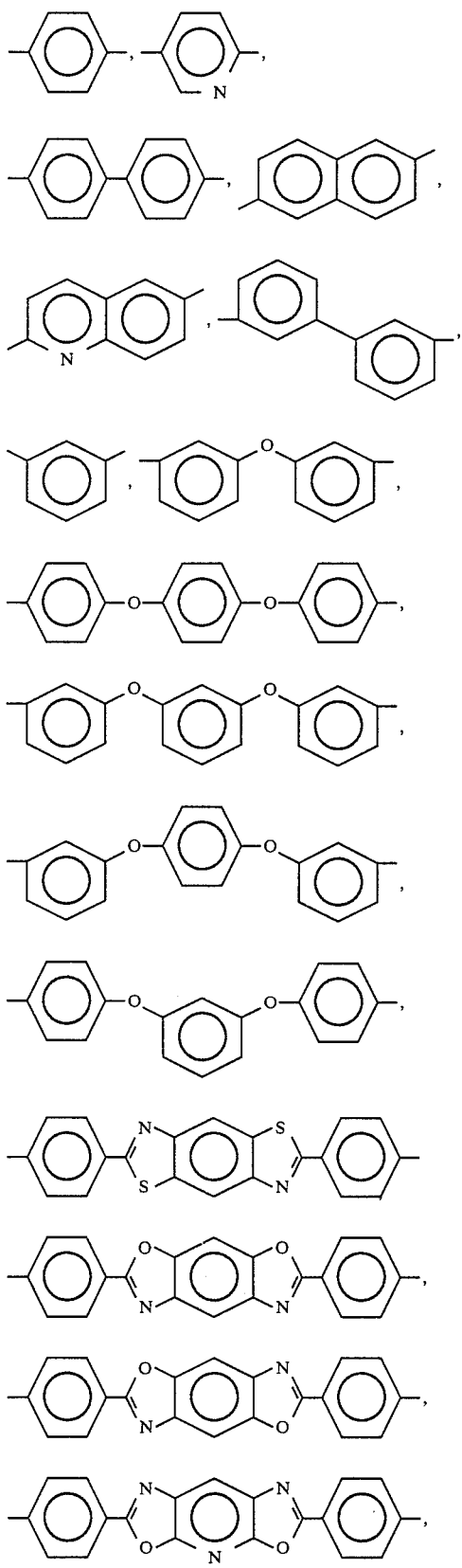
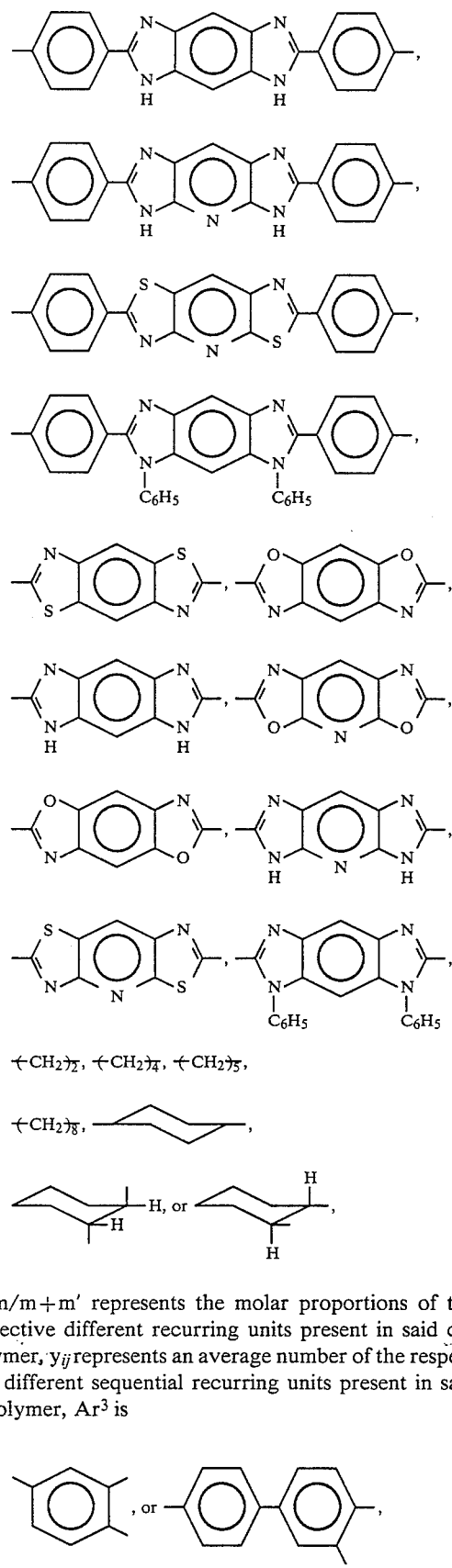
$a_ib_jm/m+m'$ represents the molar proportions of the respective different recurring units present in said co-polymer, $y_{ij}$ represents an average number of the respective different sequential recurring units present in said copolymer, $Ar^3$ is the nitrogen atom and $X_3$ being bonded to aromatic carbon atoms of $Ar^3$, $c_k m'/m+m'$ represents the molar proportions of the respective different recurring units present in said copolymer, $y_k$ represents an average number of the respective different sequential recurring units present in said copolymer, n being a positive integer;

copolymer XI

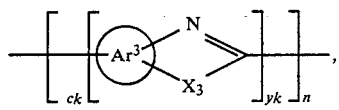

wherein $Ar^3$ is

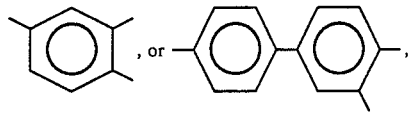

$X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, $c_k$ represents the molar proportions of the respective different recurring units present in said copolymer, $y_k$ represents an average number of the respective different sequential recurring units present in said copolymer, n being a positive integer;

copolymer XII

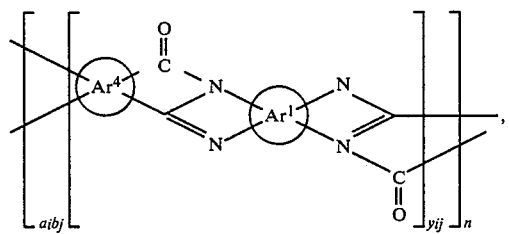

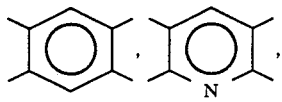

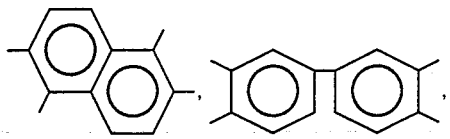

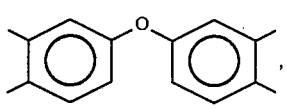

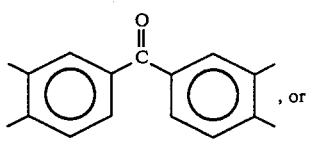, or

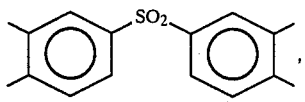, $Ar^4$ is

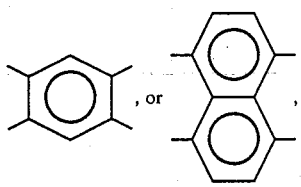

the nitrogen atoms being bonded to $Ar^1$ and the carbon atoms being bonded to $Ar^4$, $a_i b_j$ represents the molar proportions of the respective different recurring units present in said copolymer, $y_{ij}$ represents an average number of the respective different sequential recurring units present in said copolymer, n being a positive integer;

copolymer XV

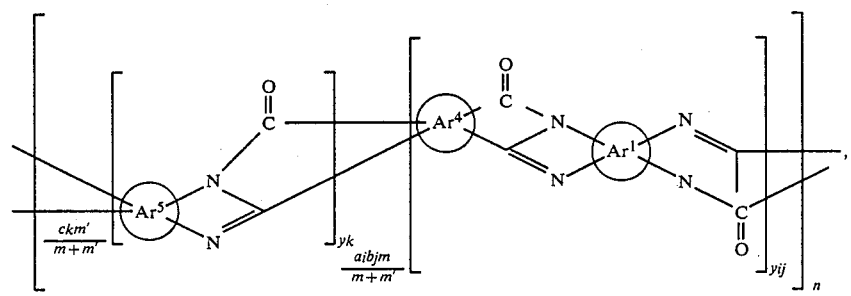

wherein $Ar^1$ is wherein $Ar^4$ is

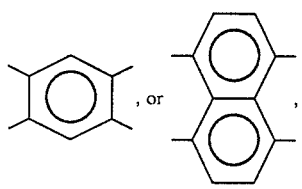

$Ar^1$ is

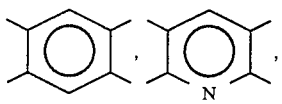

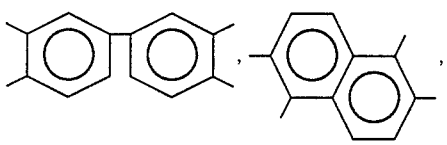

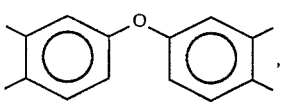

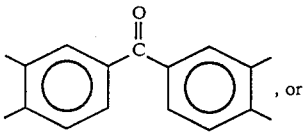

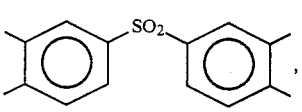

and $Ar^5$ is

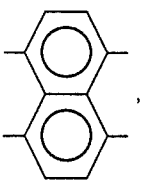

the carbon atoms being bonded to $Ar^4$ and $Ar^5$ and the nitrogen atoms being bonded to $Ar^1$ and $Ar^5$, n being a positive integer; $c_k m'/m+m'$ represents the molar proportions of the respective different recurring units present in said copolymer, $y_k$ represents an average number of the respective different sequential recurring units present in said copolymer, $a_i b_j m/m+m'$ represents the molar proportions of the respective different recurring units present in said copolymer, $y_{ij}$ represents an average number of the respective different sequential recurring units present in said copolymer, n being a positive integer;

copolymer XVI

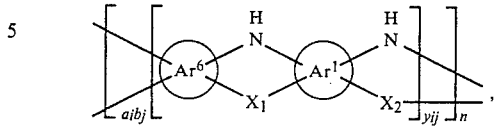

wherein $Ar^1$ is

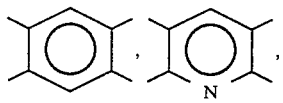

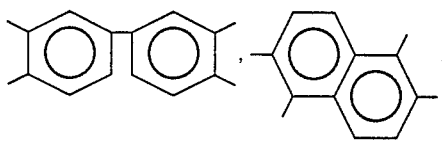

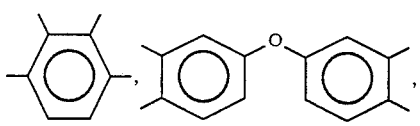

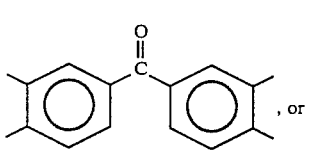

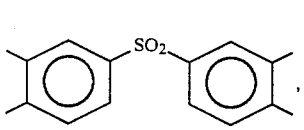

$Ar^6$ is

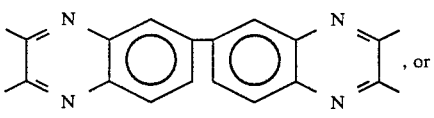

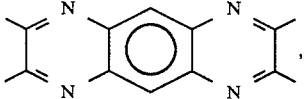

$X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_i b_j$ represents the molar proportions of the respective different recurring units present in said copolymer, $y_{ij}$ represents an average number of the respective different sequential recurring units present in said copolymer, n being a positive integer;

copolymer XVII

-continued

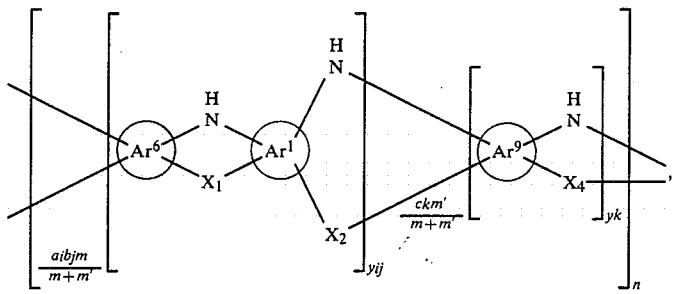

wherein $Ar^6$ is

, or

, $Ar^1$ is

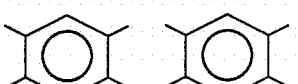,

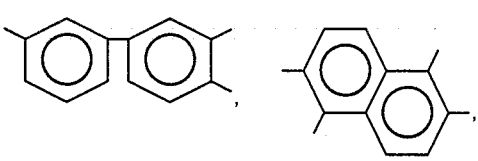,

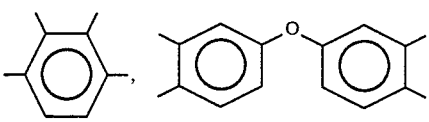,

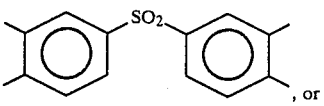, or

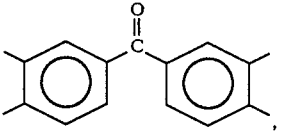, $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_ib_jm/m+m'$ represents the molar proportions of the respective different recurring units present in said copolymer, $y_{ij}$ represents an average number of the respective different sequential recurring units present in said copolymer, $Ar^9$ is

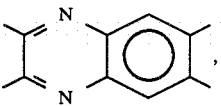, $X_4$ is sulfur, oxygen, or NR (R being hydrogen or an organic group), the NH groups and $X_4$ being bonded to aromatic carbon atoms of $Ar^6$ and $Ar^9$, $c_k m'/m+m'$ represents the molar proportions of the respective different recurring units present in said copolymer, $y_k$ represents an average number of the respective different sequential recurring units present in said copolymer, n being a positive integer; or copolymer XVIII

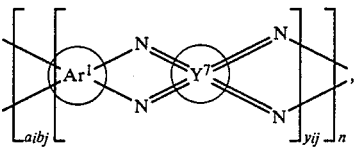

wherein $Ar^1$ is

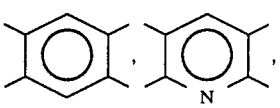,

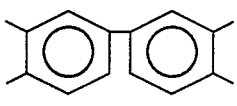,

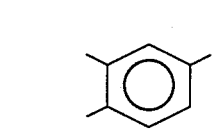,

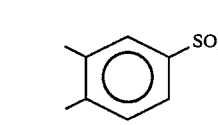,

, or

-continued

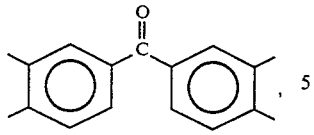,

Y⁷ is

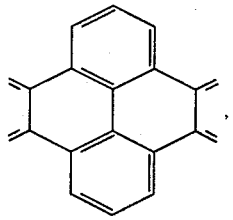, the nitrogen atoms being bonded to aromatic carbon atoms of Ar¹ and bonded to adjacent carbon atoms of Y⁷, $a_i b_j$ represents the molar proportions of the respective different recurring units present in said copolymer, $y_{ij}$ represents an average number of the respective different sequential recurring units present in said copolymer, n being a positive integer; wherein said copolymers X, XI, XII, XV, XVI, XVII, and XVIII are characterized as having a molecular weight with an n value corresponding to an intrinsic viscosity of at least about 5 dL/g as determined in methanesulfonic acid at 30° C. with the proviso that when said copolymer is IX that the molecular weight of said copolymer IX correspond to an intrinsic viscosity greater than 16 dL/g as determined in methanesulfonic acid at 30° C.; said block polymer having the formulas:

block polymer IX

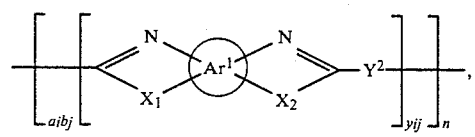, wherein Ar¹ is

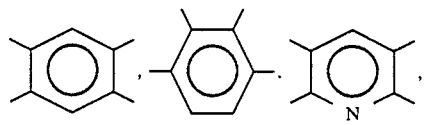

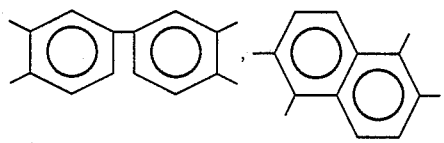

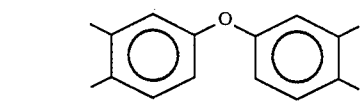,

-continued

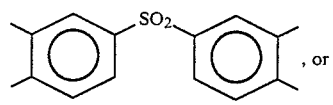, or

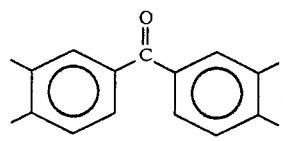, $X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹, N and $X_1$ and $X_2$ of each hetero ring are disposed ortho to one another and Y² is nil or is

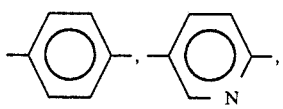

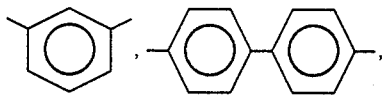

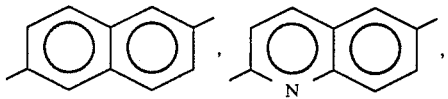

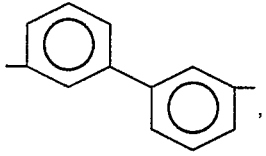

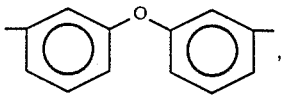

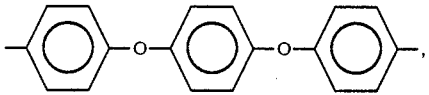

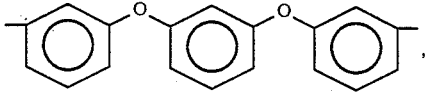

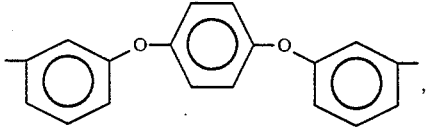

-continued

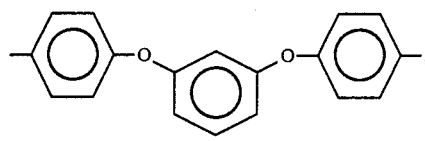

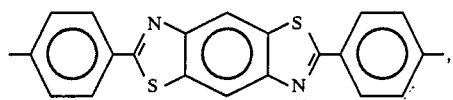

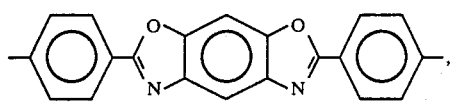

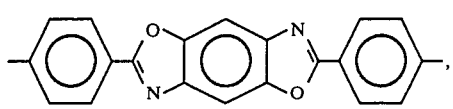

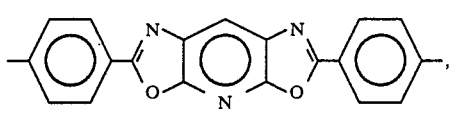

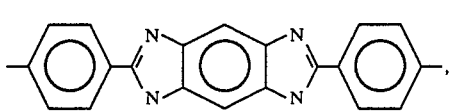

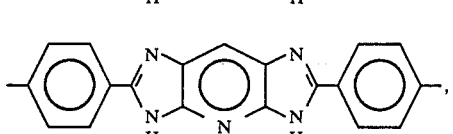

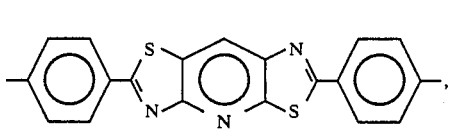

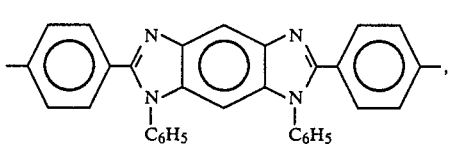

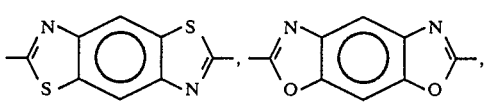

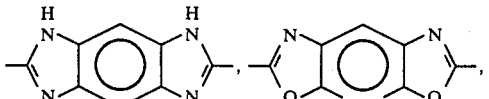

-continued

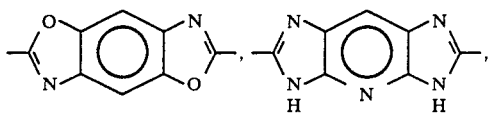

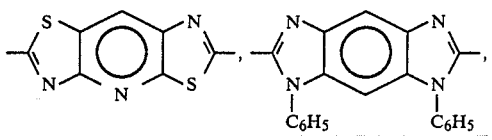

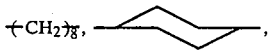

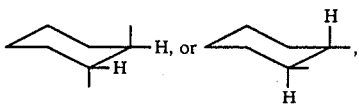

$a_i b_j$ represents the molar proportions of the respective different recurring units present in said block polymer, $y_{ij}$ represents an average number of the respective different sequential recurring units present in said block polymer, n being a positive integer;

block polymer XI

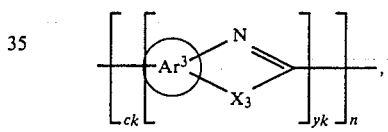

wherein $Ar^3$ is

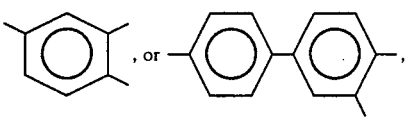

$X_3$ is sulfur, oxygen, or NR (R being hydrogen or an organic group), the nitrogen atom and $X_3$ being bonded to aromatic carbon atoms of $Ar^3$, N and $X_3$ of each hereto ring are disposed ortho to one another, $c_k$ represents the molar proportions of the respective different recurring units present in said block polymer, $y_k$ represents an average number of the respective different sequential recurring units present in said block polymer, n being a positive integer;

block polymer X

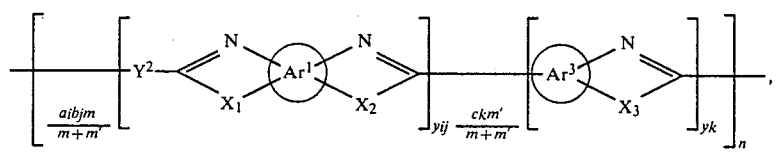

wherein $Ar^1$ is
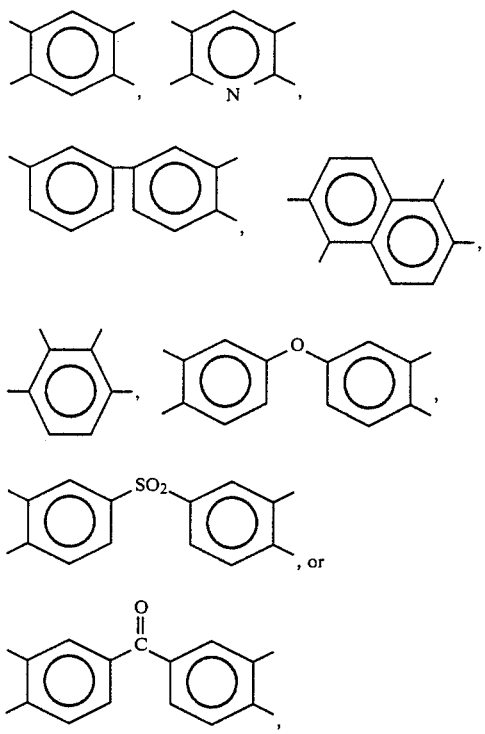
$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ and $X_2$ of each hetero ring are disposed ortho to one another and $Y^2$ is nil or is
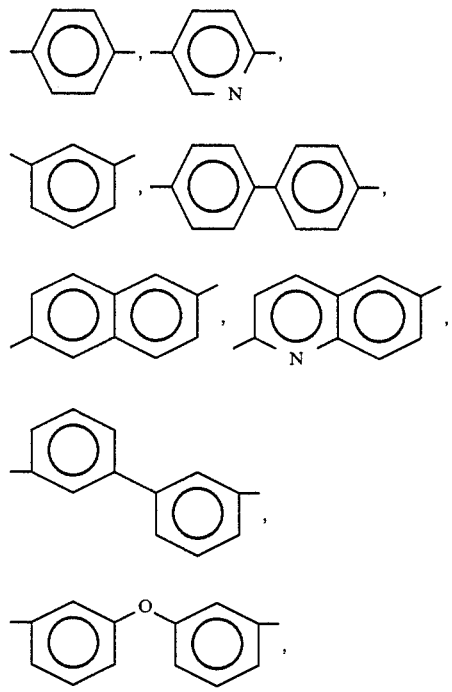
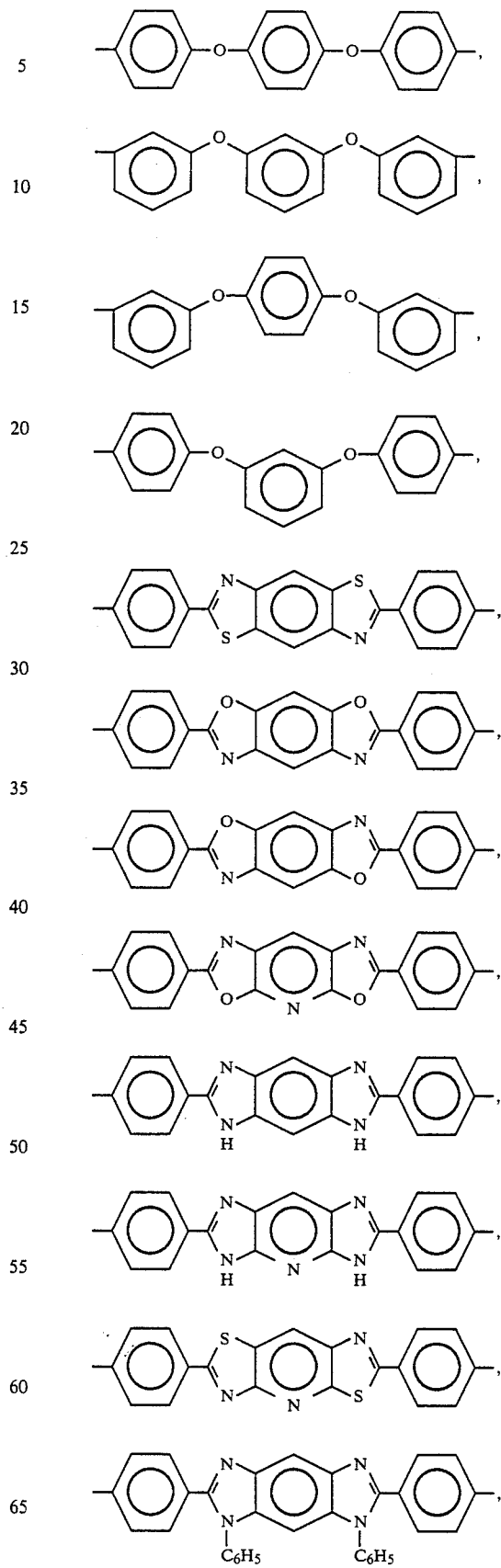

-continued

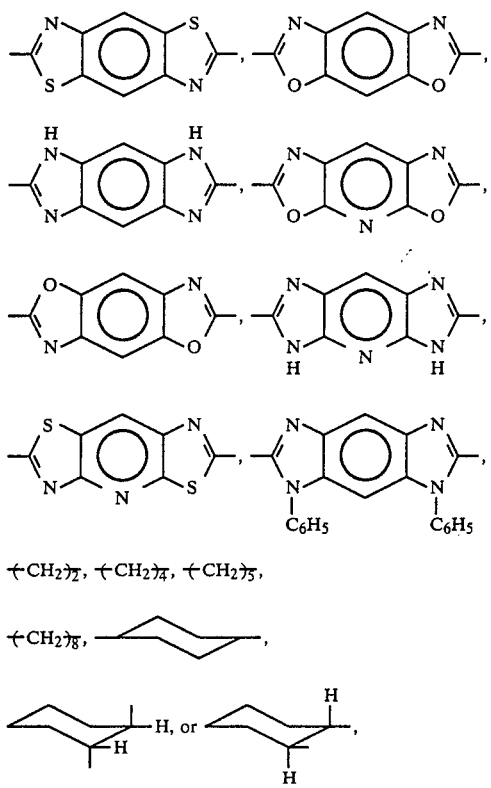

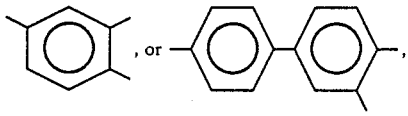

$a_ib_jm/m+m'$ represents the molar proportions of the respective different recurring units present in said block polymer, $y_{ij}$ represents an average number of the respective different sequential recurring units present in said block polymer. $Ar^3$ is

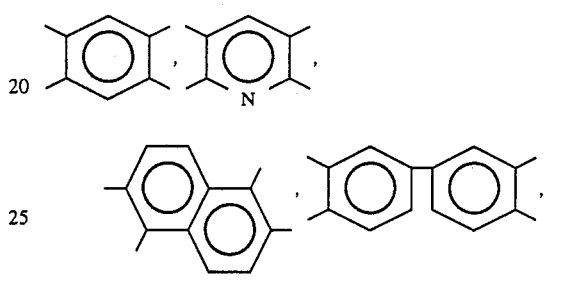

$X_3$ is sulfur, oxygen, or NR (R being hydrogen or an organic group), the nitrogen atom and $X_3$ being bonded to aromatic carbon atoms of $Ar^3$, N and $X_3$ of each hetero ring are disposed ortho to one another, $c_km'/m+m'$ represents the molar proportions of the respective different recurring units present in said block polymer, $y_k$ represents an average number of the respective different sequential recurring units present in said block polymer, n being a positive integer;

block polymer XII

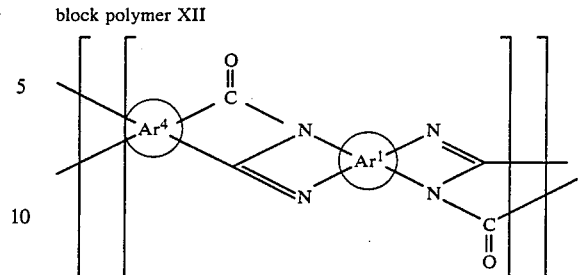

wherein $Ar^1$ is

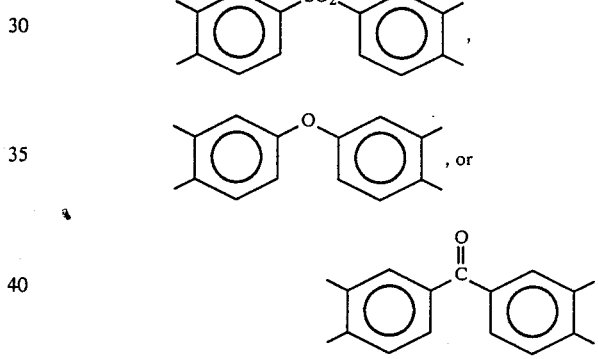

$Ar^4$ is the nitrogen atoms being bonded to $Ar^1$ and the carbon atoms being bonded to $Ar^4$, $a_ib_j$ represents the molar proportions of the respective different recurring units present in said block polymer, $y_{ij}$ represents an average number of the respective different sequential recurring units present in said block polymer, n being a positive integer;

block polymer XIII

-continued

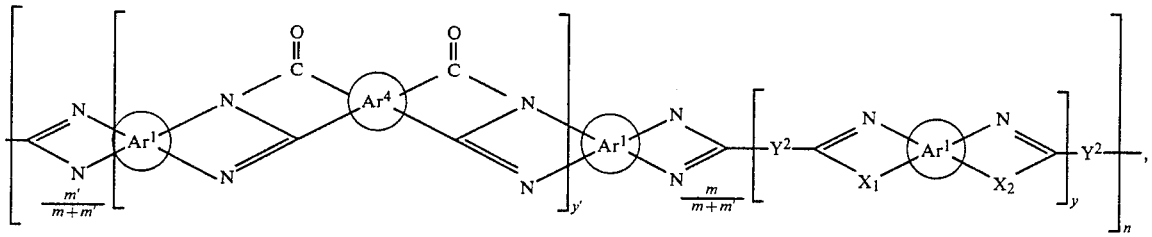

wherein Ar¹ is

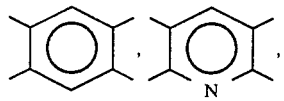

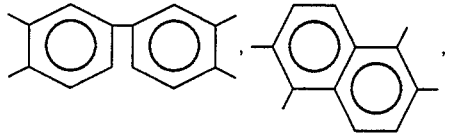

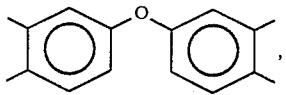

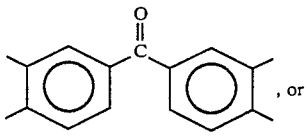, or

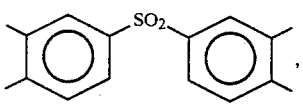, when bonded to nitrogen atoms; and when Ar¹ is bonded to both nitrogen atoms and $X_1$ and $X_2$, Ar¹ is

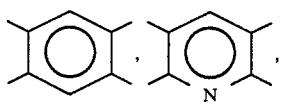

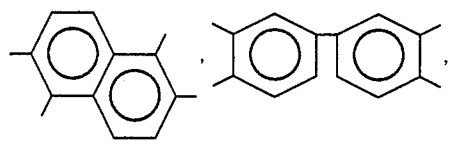,

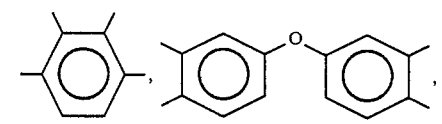,

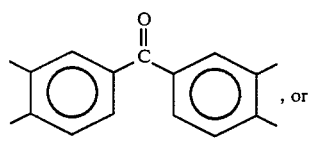, or

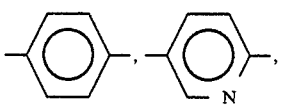,

Ar⁴ is

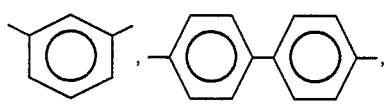, or the nitrogen atoms being bonded to Ar¹ and the carbon atoms being bonded to Ar⁴, $m'/m+m'$ represents the molar proportions of the respective different recurring units present in said block polymer, y' represents an average number of the respective different sequential recurring units present in said block polymer, $X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹, N and $X_1$ or $X_2$ of each hetero ring are disposed ortho to one another and $Y^2$ is nil or is

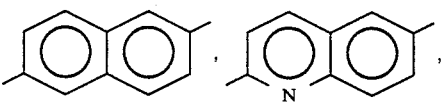

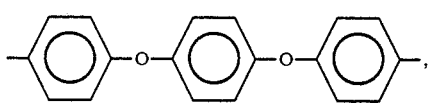

-continued

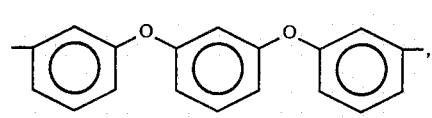

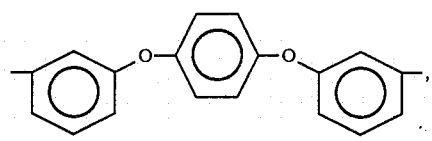

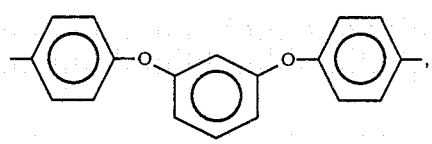

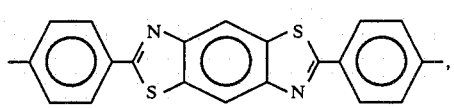

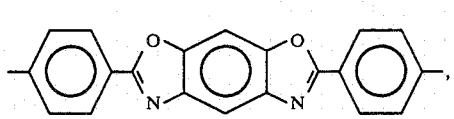

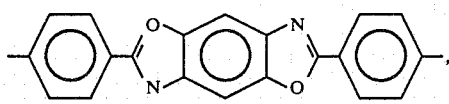

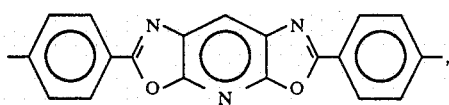

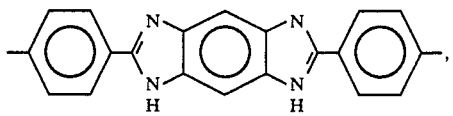

-continued

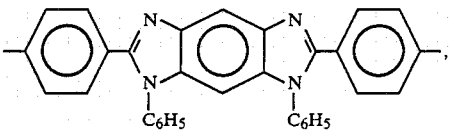

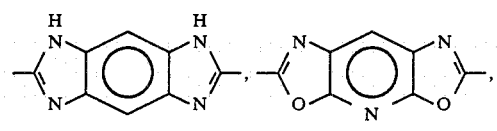

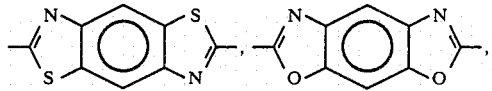

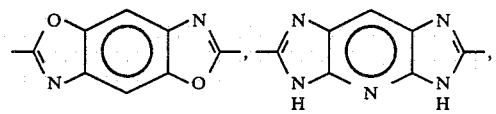

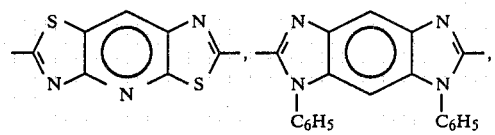

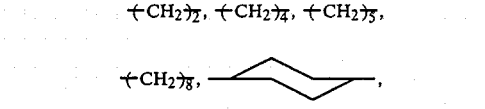

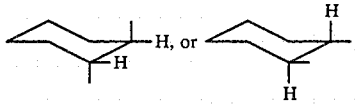

m/m+m′ represents the molar proportions of the respective different recurring units present in said block polymer, y represents an average number of the respective different sequential recurring units present in said block polymer, n being a positive integer;

block polymer XIV

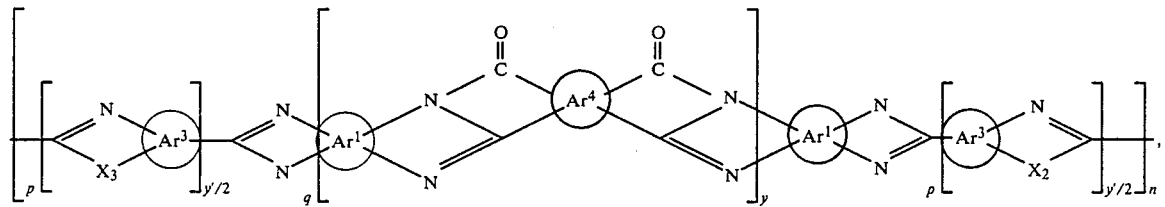

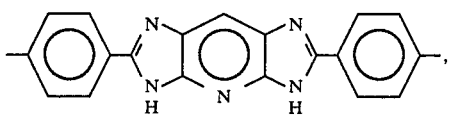

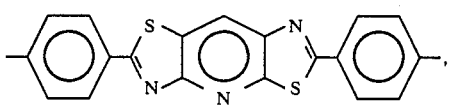

wherein Ar³ is

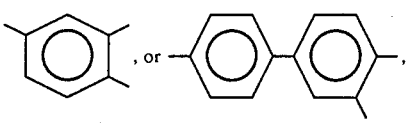

X₃ is sulfur, oxygen, or NR (R being hydrogen or an organic group). the nitrogen atoms and X₃ being bonded to aromatic carbon atoms of Ar³. N and X₃ of each hetero ring are disposed ortho to one another, p present in said block polymer, n being a positive integer;

block polymer XV

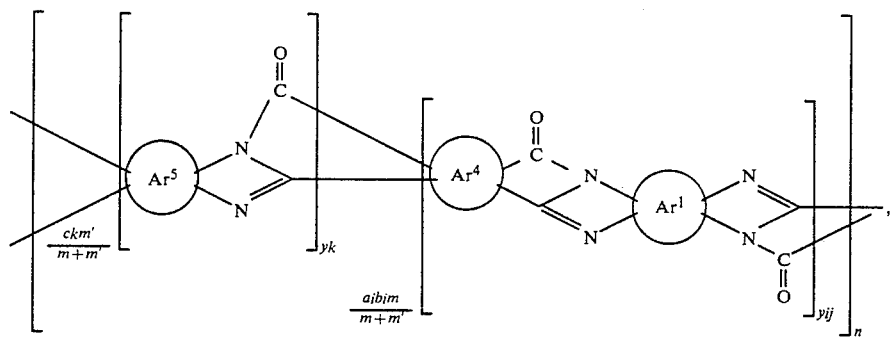

represents the molar proportions of the respective different recurring units present in said block polymer, y'/2 represents an average number of the respective different sequential recurring units present in said block polymer, Ar¹ is

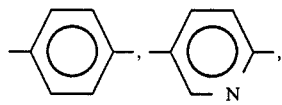

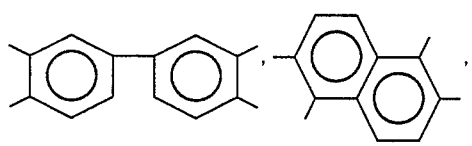

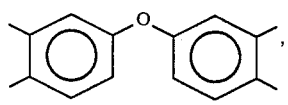

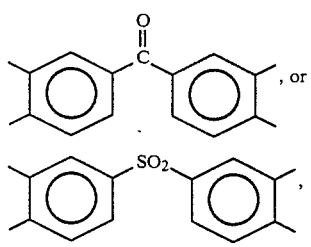

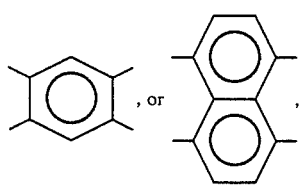

Ar⁴ is

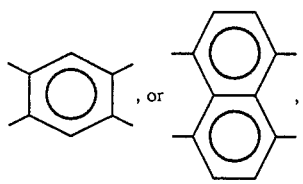

wherein Ar⁴ is

Ar¹ is

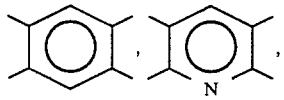

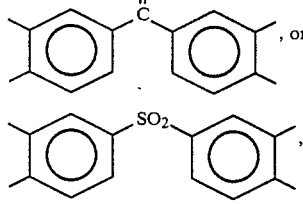

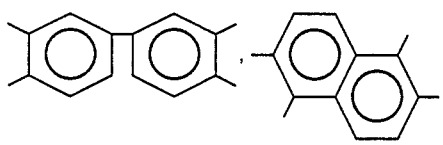

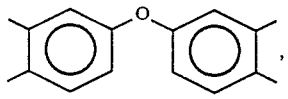

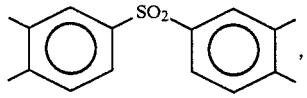

the nitrogen atoms being bonded to Ar¹ and the carbon atoms being bonded at Ar⁴, q represents the molar proportions of the respective different recurring units present in said block polymer, y represents an average number of the respective different sequential recurring units and Ar⁵ is

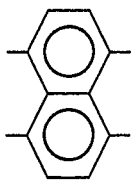

the carbon atoms being bonded to $Ar^4$ and $Ar^5$, and the nitrogen atoms being bonded to $Ar^1$ and $Ar^5$; n being a positive integer; $c_k m'/m+m'$ represents the molar proportions of the respective different recurring units present in said block polymer, $y_k$ represents an average number of the respective different sequential recurring units present in said block polymer, $a_i b_j m/m+m'$ represents the molar proportions of the respective different recurring units present in said block polymer. $y_{ij}$ represents an average number of the respective different sequential recurring units present in said block polymer, n being a positive integer;

block polymer XVI

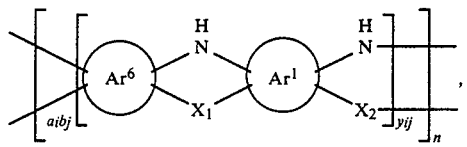

wherein $Ar^1$ is

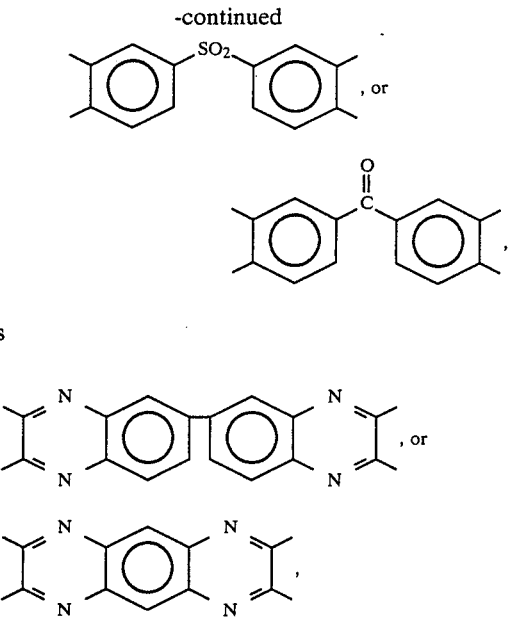

$Ar^6$ is $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$. NH and $X_1$ or $X_2$ of each hetero ring are disposed ortho to one another, $a_i b_j$ represents the molar proportions of the respective different recurring units present in said block polymer, $y_{ij}$ represents an average number of the respective different sequential recurring units present in said block polymer, n being a positive integer;

block polymer XVII

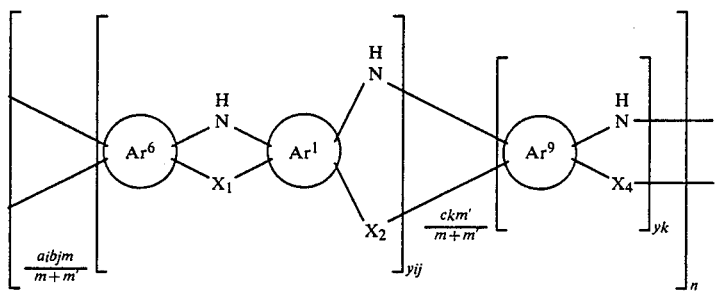

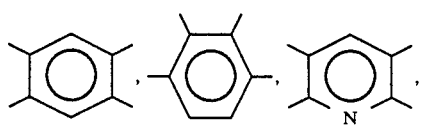

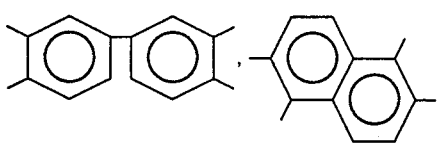

wherein $Ar^1$ is

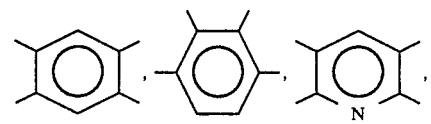

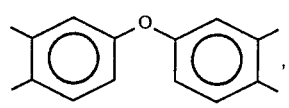

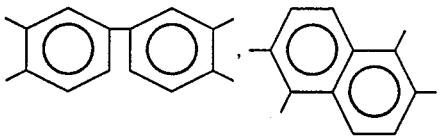

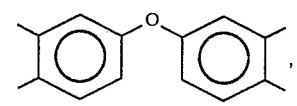

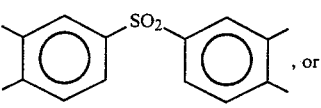, or

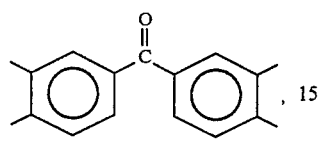,

Ar⁶ is

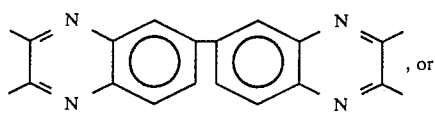, or

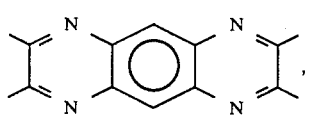, $X_1$ and $X_2$ are the same or different and are sulfur, oxygen, or NR (R being hydrogen or an organic group), the NH groups and $X_1$ and $X_2$ being bonded to aromatic carbon atoms of Ar⁶ and Ar¹, NH and $X_1$ or $X_2$ of each hetero ring are disposed ortho to one another, $a_ib_jm/m+m'$ represents the molar proportions of the respective different recurring units present in said block polymer, $y_{ij}$ represents an average number of the respective different sequential recurring units present in said block polymer, Ar⁹ is

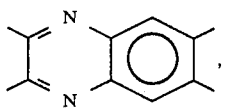, $X_4$ is sulfur, oxygen, or NR (R being hydrogen or an organic group), the NH groups and $X_4$ being bonded to aromatic carbon atoms of Ar⁶ and Ar⁹, $c_km/m+m'$ represents the molar proportions of the respective different recurring units present in said block polymer, $y_k$ represents an average number of the respective different sequential recurring units present in said block polymer, n being a positive integer; or block polymer XVIII

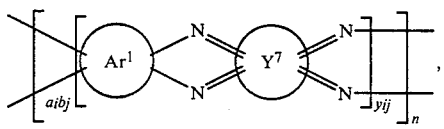

wherein Ar¹ is

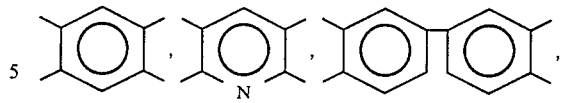,

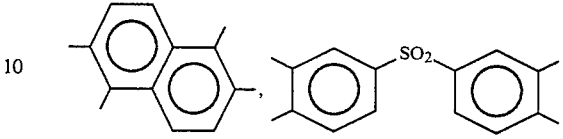,

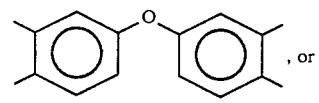, or

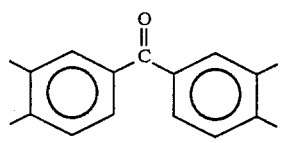,

Y⁷ is

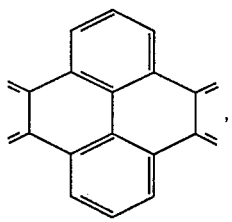, the nitrogen atoms being bonded to aromatic carbon atoms of Ar¹ and bonded to adjacent carbon atoms of Y⁷, $a_ib_j$ represents the molar proportions of the respective different recurring units present in said block polymer, $y_{ij}$ represents an average number of the respective different sequential recurring units present in said block polymer, n being a positive integer.

2. An extended chain crystalline polymer having the general formulas:

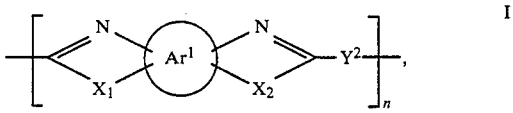 I wherein Ar¹ is

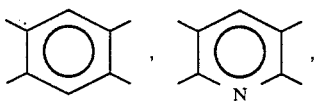,

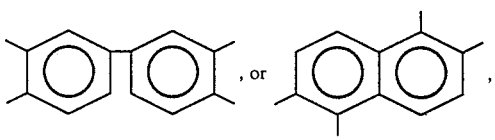,

X₁ and X₂ are the same or different and are sulfur, oxygen, or NR (R being hydrogen or an organic group), the nitrogen atoms and X₁ and X₂ being bonded to aromatic carbon atoms of Ar¹, N and X₁ or X₂ of each hetero ring are disposed ortho to one another and Y² is nil or is

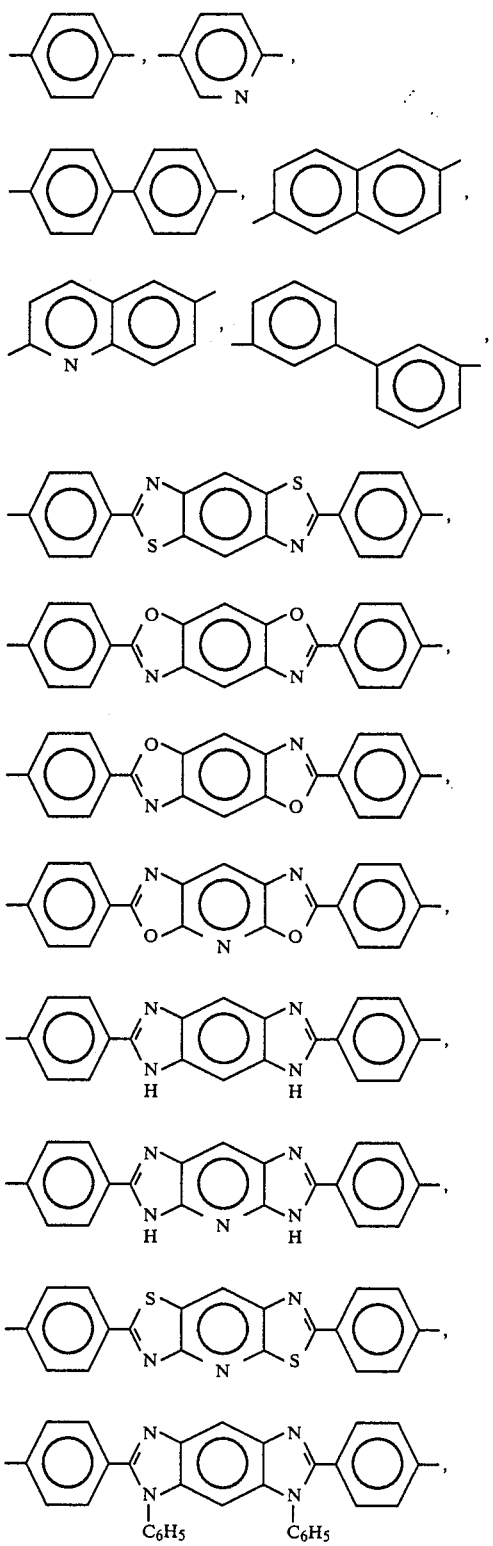

-continued

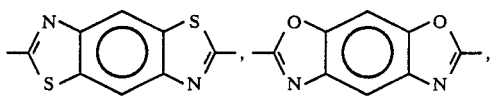

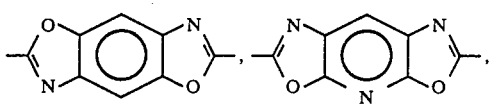

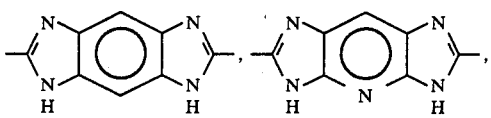

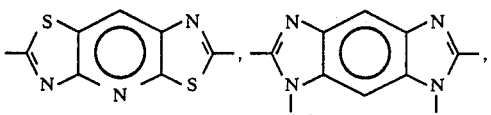

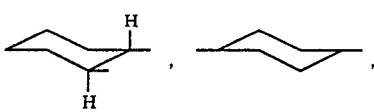

$+CH_2)_{\overline{n}}$, or 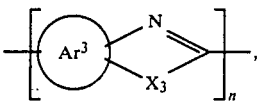

n being a positive integer;

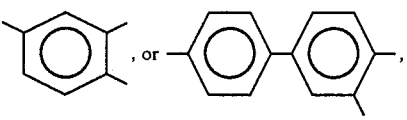     II wherein Ar³ is

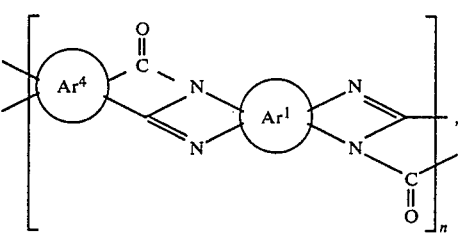

X₃ is sulfur, oxygen, or NR (R being hydrogen or an organic group), the nitrogen atoms and X₃ being bonded to aromatic carbon atoms of Ar³, N and X₃ of each hetero ring are disposed ortho to one another, n being a positive integer;

III wherein Ar¹ is

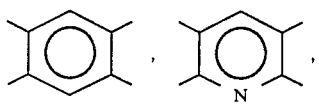

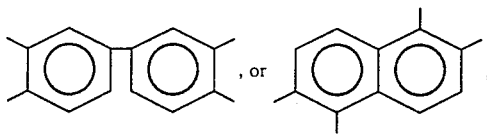

and Ar⁴ is

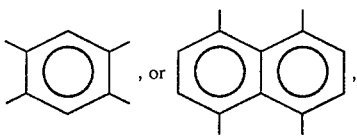

the nitrogen atoms being bonded to aromatic carbon atoms of Ar¹ and the carbon atoms being bonded to aromatic carbon atoms of Ar⁴, n being a positive integer;

IV

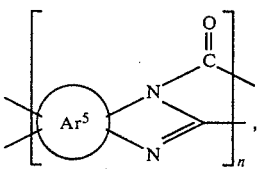

wherein Ar⁵ is

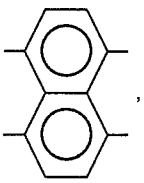

the nitrogen atoms being bonded to Ar⁵, n being a positive integer;

V

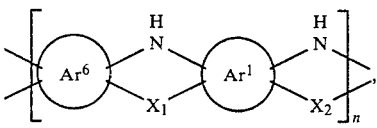

wherein Ar⁶ is

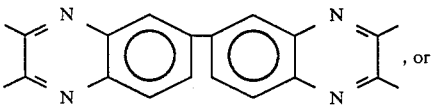, or

-continued

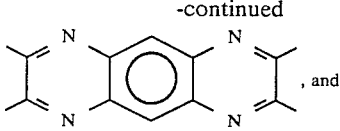, and

Ar¹ is

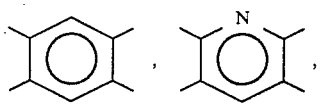

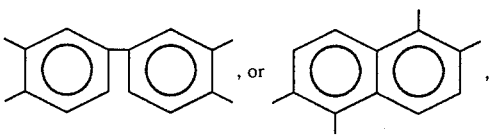, or $X_1$ and $X_2$ are the same or different and are sulfur, oxygen, or NR (R being hydrogen or an organic group), the NH groups and $X_1$ and $X_2$ being bonded to aromatic carbon atoms of Ar⁶ and Ar¹, NH and $X_1$ or $X_2$ of each hetero ring are disposed ortho to one another, n being a positive integer;

VI

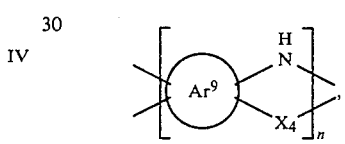

wherein Ar⁹ is

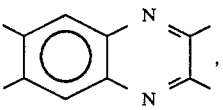

$X_4$ is sulfur, oxygen or NR (R being hydrogen or an organic group), the NH group and $X_4$ being bonded to aromatic carbon atoms of Ar⁹, n being a positive integer;

VII

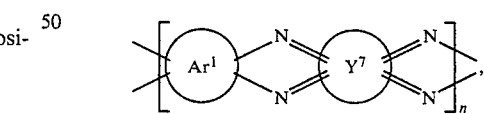

wherein Ar¹ is

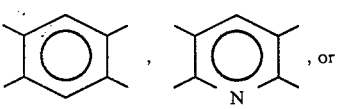, or

,

Y⁷ is

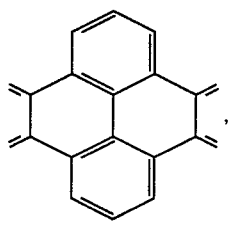

the nitrogen atoms being bonded to aromatic carbon atoms of Ar¹ and bonded to adjacent carbon atoms of Y⁷, n being a positive integer; or

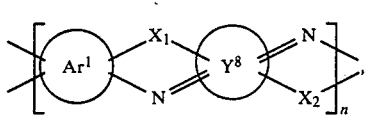   VIII wherein Ar¹ is

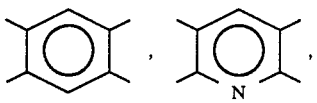

Y⁸ is

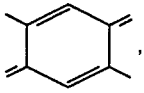

$X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹ and adjacent carbon atoms of Y⁸, N and $X_1$ or $X_2$ of each hetero ring are disposed ortho to one another, n being a positive integer, wherein said polymers I, II, III, IV, V, VI, VII, and VIII are characterized as having a molecular weight with an n value corresponding to an intrinsic viscosity greater than about 7 dL/g as determined in methanesulfonic acid at 30° C., with the proviso that when said polymer is poly([benzo-(1,2-d:4,5-d') bisthiazole-2,6-diyl]-1,4-phenylene) that the molecular weight of said poly([benzo-(1,2-d:4,5-d')bisthiazole-2,6-diyl]-1,4-phenylene) correspond to an intrinsic viscosity greater than 30.3 dL/g as determined in methanesulfonic acid at 30° C.

3. An extended chain crystalline polymer having the general formula:

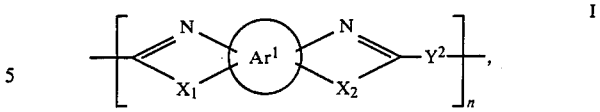   I wherein Ar¹ is

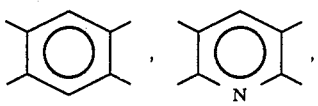

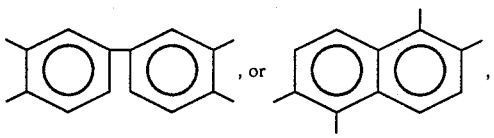

$X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹, N and $X_1$ or $X_2$ of each hetero ring are disposed ortho to one another and Y² is nil or is

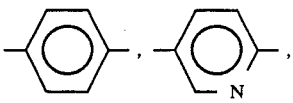

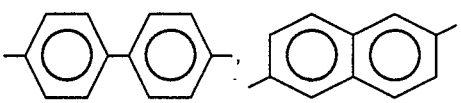

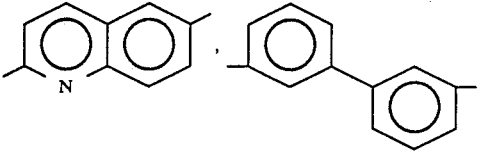

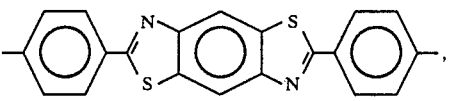

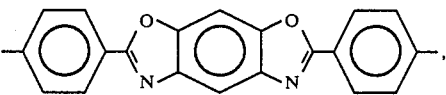

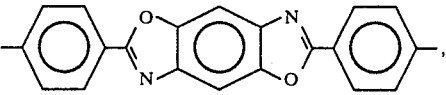

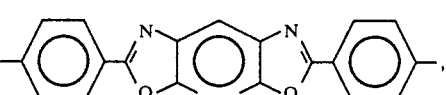

-continued

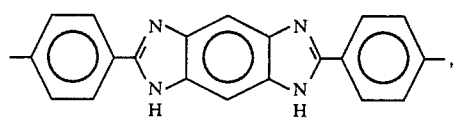

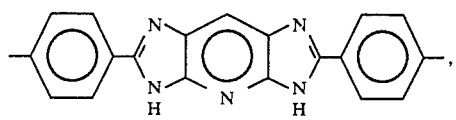

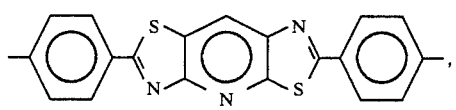

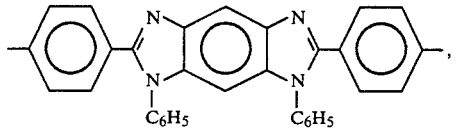

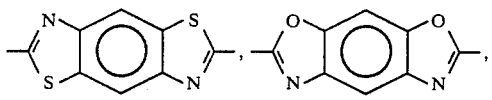

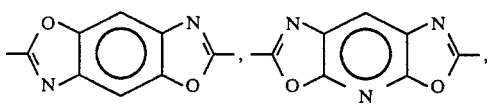

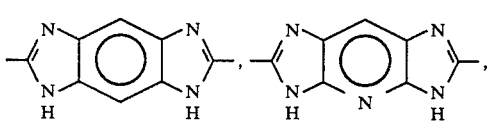

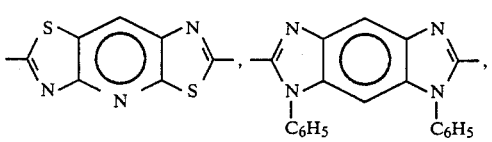

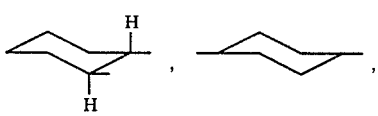

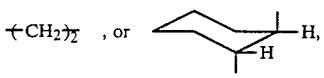

n being a positive integer;
wherein said polymer is characterized as having a molecular weight with an n value corresponding to an intrinsic viscosity greater than about 7 dl/g as determined in methanesulfonic acid at 30° C., with the proviso that when said polymer is poly([benzo-(1,2-d:4,5-d')bisthiazole-2,6-diyl]-1,4-phenylene) that the molecular weight of said poly([benzo-(1,2-d:4,5-d')bisthiazole-2,6-diyl]-1,4-phenylene) correspond to an intrinsic viscosity greater than 30.3 dl/g as determined in methanesulfonic acid at 30° C.

4. An extended chain crystalline homopolymer having the general formula:

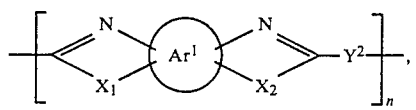 I wherein $Ar^1$ is

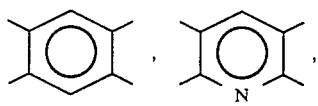

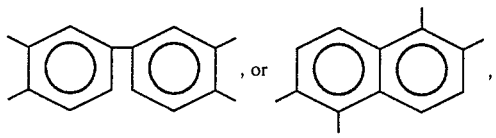

$X_1$ and $X_2$ are the same or different and are oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

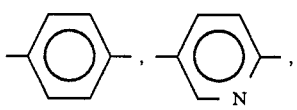

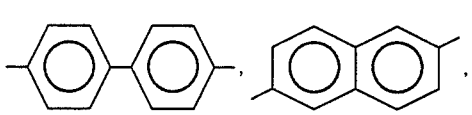

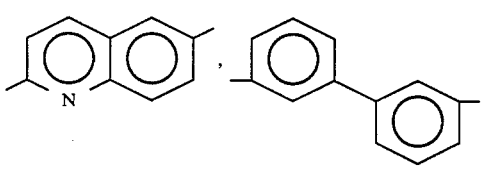

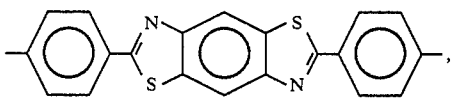

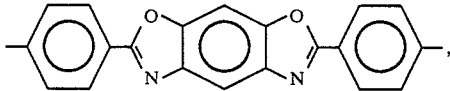

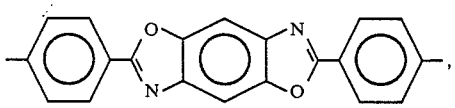

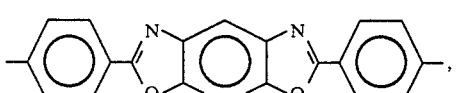

-continued

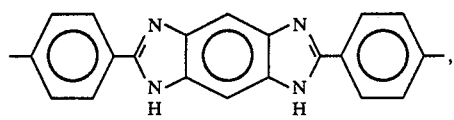

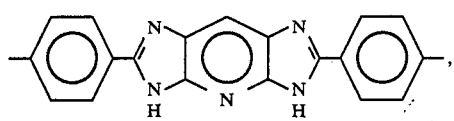

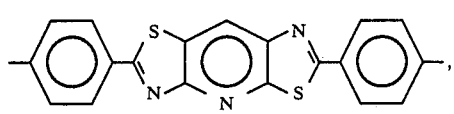

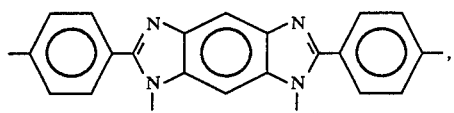

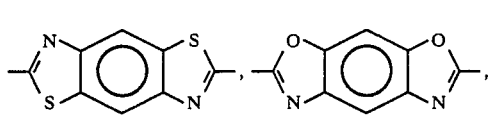

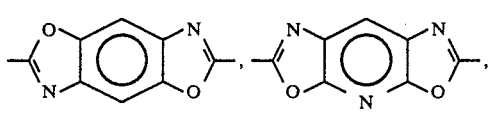

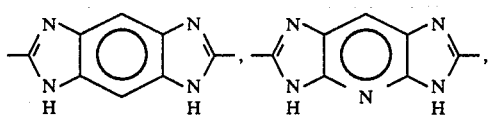

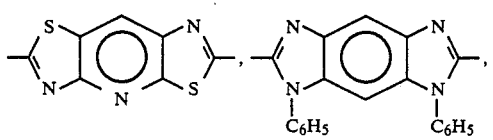

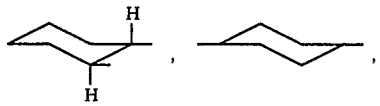

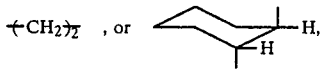

n being a positive integer, wherein said homopolymer is characterized as having a molecular weight with an n value corresponding to an intrinstic viscosity greater than about 7 dL/g as determined in methanesulfonic acid at 30° C.

5. A polymer of claim 1, wherein said polymer is an extended chain crystalline homopolymer having the general formula:

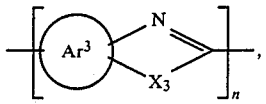

wherein $Ar^3$ is

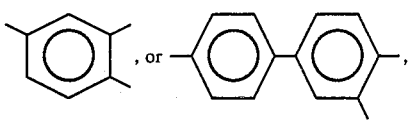

$X_3$ is sulfur, oxygen, or NR (R being hydrogen or an organic group), the nitrogen atom and $X_3$ being bonded to aromatic carbon atoms of $Ar^3$, N and $X_3$ of each hetero ring are disposed ortho to one another, n being a positive integer, wherein said homopolymer is characterized as having a molecular weight with an n value corresponding to an intrinsic viscosity greater than about 5 dL/g as determined in methanesulfonic acid at 30° C.

6. A polymer of claim 1, wherein said polymer is an extended chain crystalline homopolymer having the general formula:

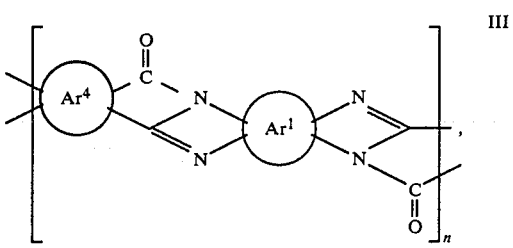

wherein $Ar^1$ is

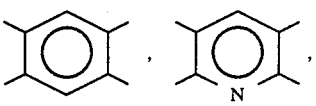

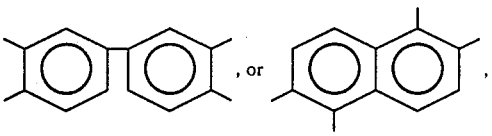

and $Ar^4$ is

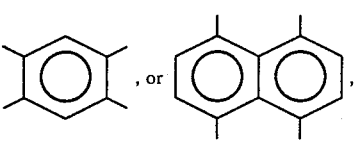

the nitrogen atoms being bonded to aromatic carbon atoms of $Ar^1$ and the carbon atoms being bonded to aromatic carbon atoms of $Ar^4$, n being a positive integer, wherein said polymer is characterized as having a molecular weight with an n value corresponding to an intrinsic viscosity of at least about 5 dL/g as determined in methanesulfonic acid at 30° C., with the proviso that when said polymer is poly(6,9-dihydro-6,9-dioxobisbenzimidazo [2,1-b:1', 2'-j]benzo[1mn][3,8]phenanthroline-2,3, 12, 13-tetrayl) that the molecular weight of said poly(6,9-dihydro-6,9-dioxobisbenzimidazo-[2,1-b:1', 2'-j]benzo[1mn][3,8]phenanthroline-2,3,12,13-tetrayl) corresponding to an intrinsic viscosity greater than 7 dL/g as determined in methanesulfonic acid at 30° C.

7. A polymer of claim 1, wherein said polymer is an extended chain crystalline homopolymer having the general formula:

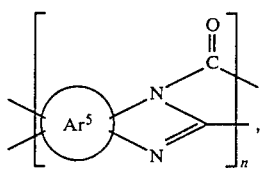

IV wherein Ar$^5$ is

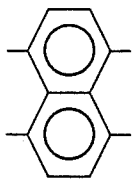

the nitrogen atoms being bonded to Ar$^5$, n being a positive integer, wherein said homopolymer is characterized as having a molecular weight with an n value corresponding to an intrinsic viscosity greater than about 5 dL/g as determined in methanesulfonic acid at 30° C.

8. A polymer of claim 1, wherein said polymer is an extended chain crystalline homopolymer having the general formula:

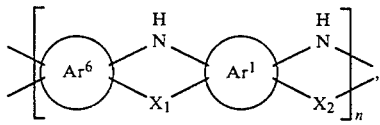

V wherein Ar$^6$ is

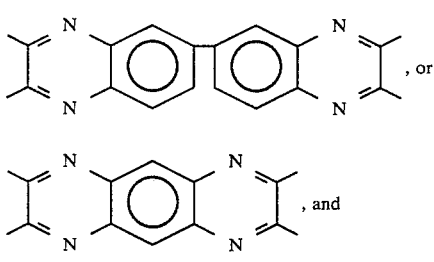

Ar$^1$ is

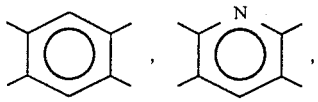

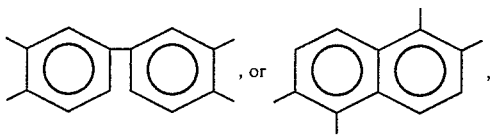

$X_1$ and $X_2$ are the same or different and are sulfur, oxygen, or NR (R being hydrogen or an organic group), the NH groups and $X_1$ and $X_2$ being bonded to aromatic carbon atoms of Ar$^6$ and Ar$^1$, NH and $X_1$ or $X_2$ of each hetero ring are disposed ortho to one another, n being a positive integer, wherein said homopolymer is characterized as having a molecular weight with an n value corresponding to an intrinsic viscosity greater than about 5 dL/g as determined in methanesulfonic acid at 30° C.

9. A polymer of claim 1, wherein said polymer is an extended chain crystalline homopolymer having the general formula:

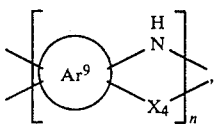

VI wherein Ar$^9$ is

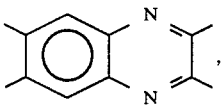

$X_4$ is sulfur, oxygen, or NR (R being hydrogen or an organic group), the NH group and $X_4$ being bonded to aromatic carbon atoms of Ar$^9$, n being a positive integer, wherein said homopolymer is characterized as having a molecular weight with an n value corresponding to an intrinsic viscosity greater than about 5 dL/g as determined in methanesulfonic acid at 30° C.

10. A polymer of claim 1, wherein said polymer is an extended chain crystalline homopolymer having the general formula:

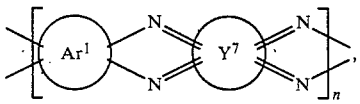

VII wherein Ar$^1$ is

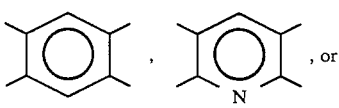

-continued

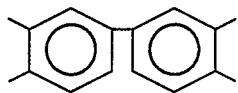,

Y⁷ is

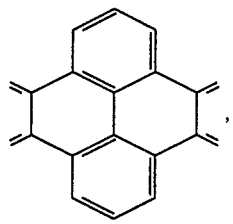, the nitrogen atoms being bonded to aromatic carbon atoms of Ar¹ and bonded to adjacent carbon atoms of Y⁷, n being a positive integer, wherein said homopolymer is characterized as having a molecular weight with an n value corresponding to an intrinsic viscosity greater than about 5 dL/g as determined in methanesulfonic acid at 30° C.

11. A polymer of claim 1, wherein said polymer is an extended chain crystalline homopolymer having the general formula:

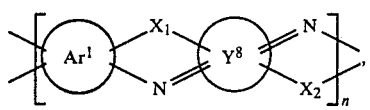 VIII wherein Ar¹ is

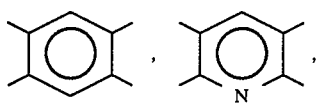,

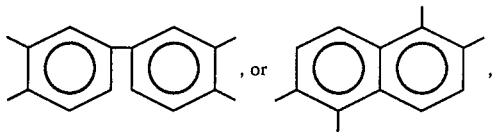,

Y⁸ is

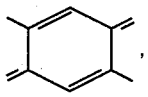, $X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹ and adjacent carbon atoms of Y⁸, N and $X_1$ or $X_2$ of each hetero ring are disposed ortho to one another, n being a positive integer, wherein said homopolymer is characterized as having a molecular weight with an n value corresponding to an intrinsic viscosity greater than about 5 dL/g as determined in methanesulfonic acid at 30° C.

12. A polymer of claim 1, wherein said polymer is a formula I extended chain crystalline homopolymer having the formulas:

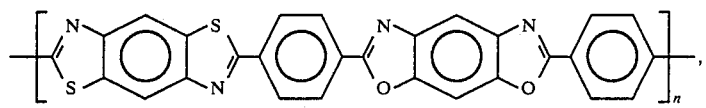,

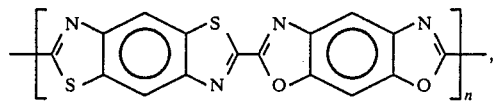,

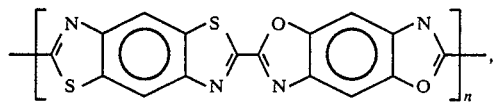,

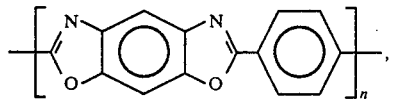,

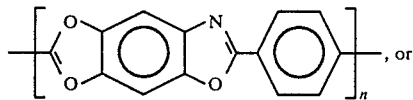, or

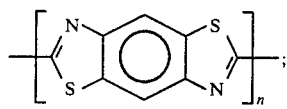

wherein n is greater than 60.

13. A polymer of claim 1, wherein said polymer is a formula I extended chain crystalline homopolymer having the formula:

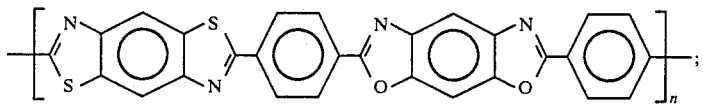

wherein n is greater than 30.

14. A polymer of claim 1, wherein said polymer is a formula I extended chain crystalline homopolymer having the formula:

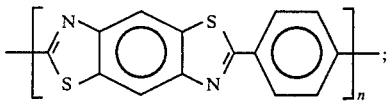

15. A polymer of claim 1, wherein said polymer is a formula I extended chain crystalline homopolymer having the formula:

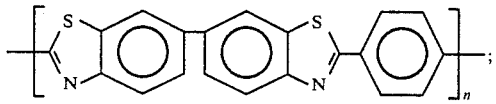

wherein n is greater than 60.

16. A polymer of claim 1, wherein said polymer is a formula I extended chain crystalline homopolymer having the formulas:

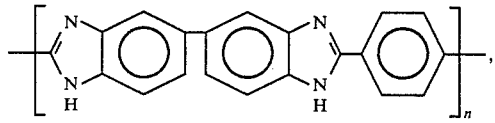,

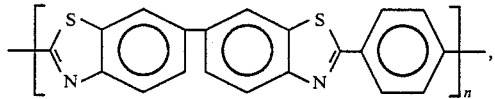,

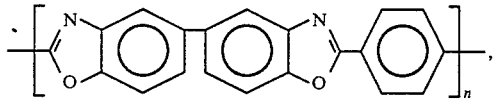,

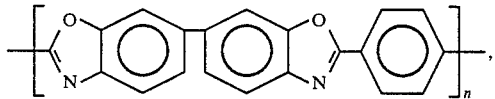,

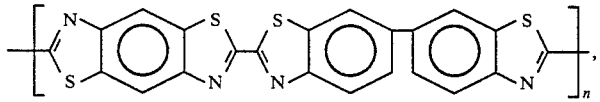,

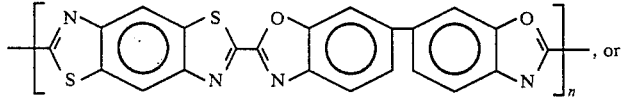, or

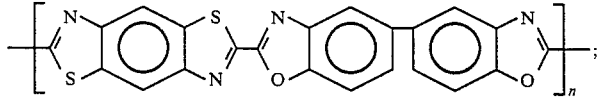;

wherein n is greater than 110.

wherein n is greater than 50.

17. A polymer of claim 1, wherein said polymer is a formula I extended chain crystalline homopolymer having the formula:

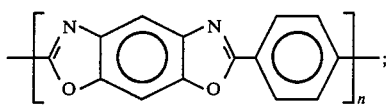

wherein n is greater than 70.

18. A polymer of claim 1, wherein said polymer is a formula I extended chain crystalline homopolymer having the formula:

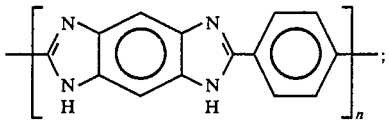

wherein n is greater than 60.

19. A polymer of claim 1, wherein said polymer is a formula I extended chain crystalline homopolymer having the formulas:

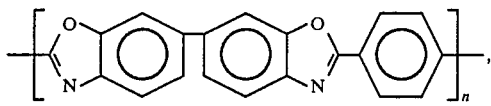

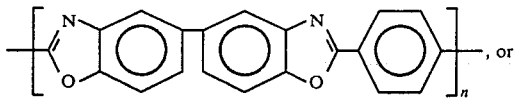

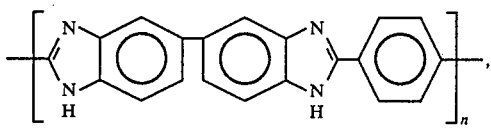

wherein n is greater than 60.

20. A polymer of claim 1, wherein said polymer is a formula II extended chain crystalline homopolymer having the formula:

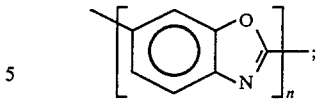

wherein n is greater than 60.

21. A polymer of claim 1, wherein said polymer is a formula II extended chain crystalline homopolymer having the formula:

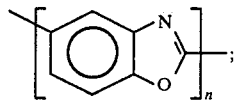

wherein n is greater than 60.

22. A polymer of claim 1, wherein said polymer is a formula III extended chain crystalline homopolymer having the formulas:

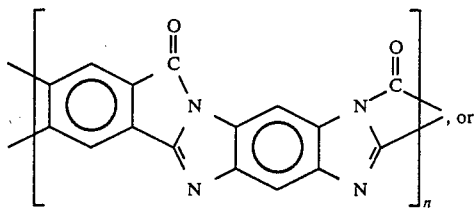

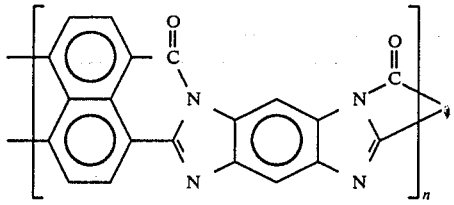

wherein n is greater than 50.

23. A polymer of claim 1, wherein said polymer is a formula III extended chain crystalline homopolymer having the formulas:

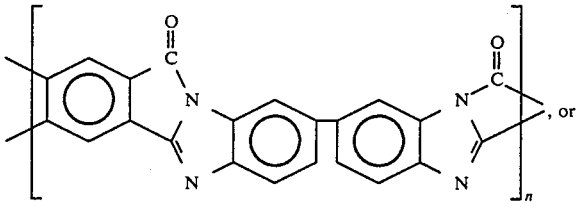

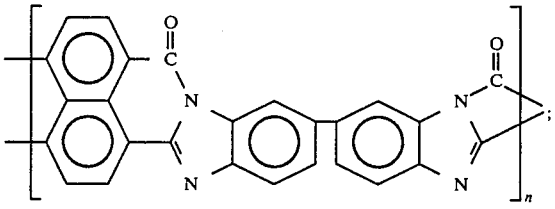

wherein n is greater than 60.

24. A polymer of claim 1, wherein said polymer is a formula IV extended chain crystalline homopolymer having the formula:

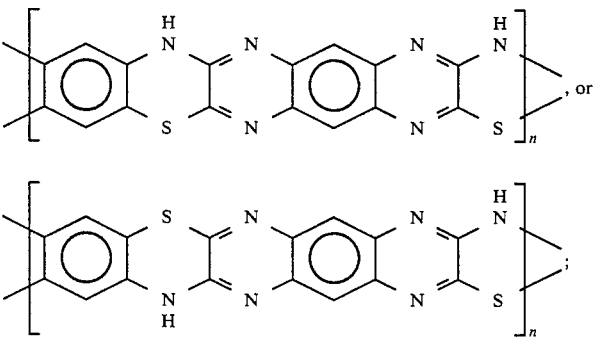

wherein n is greater than 70.

25. A polymer of claim 1, wherein said polymer is a formula V extended chain crystalline homopolymer having the formulas:

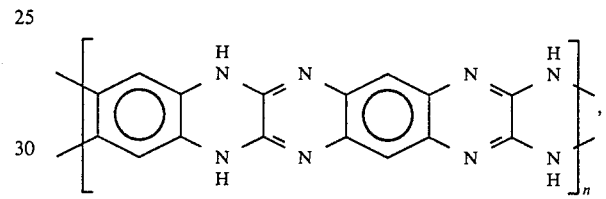

wherein n is greater than 30.

26. A polymer of claim 1, wherein said polymer is a formula V extended chain crystalline homopolymer having the formula:

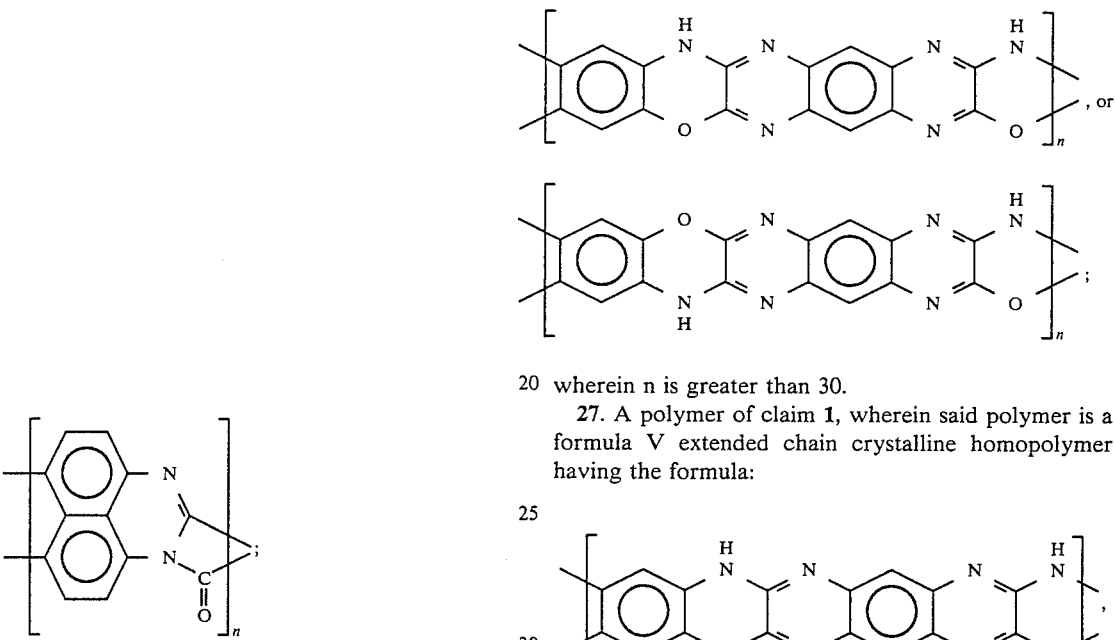

wherein n is greater than 30.

27. A polymer of claim 1, wherein said polymer is a formula V extended chain crystalline homopolymer having the formula:

wherein n is greater than 30.

28. A polymer of claim 1, wherein said polymer is a formula V extended chain crystalline homopolymer having the formulas:

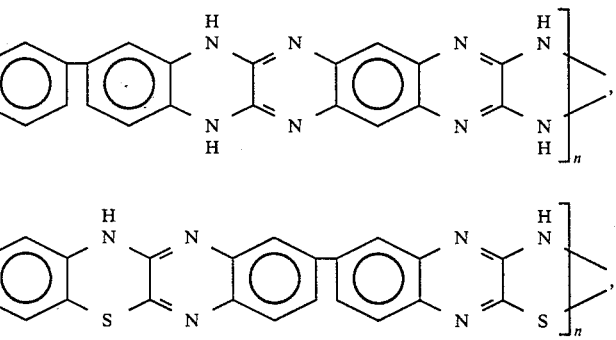

-continued
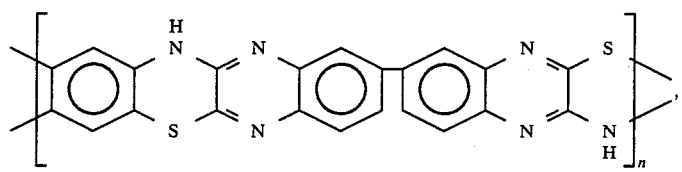,
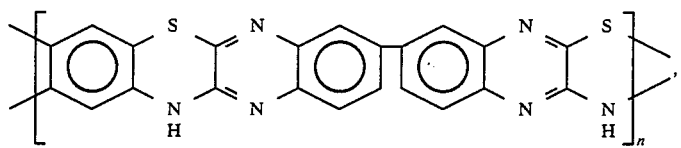,
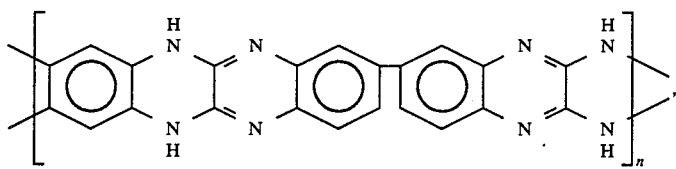,
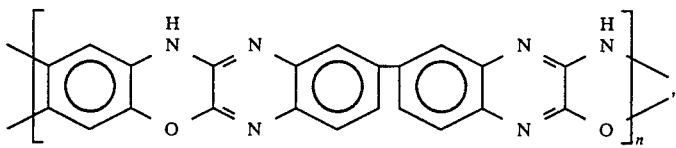,
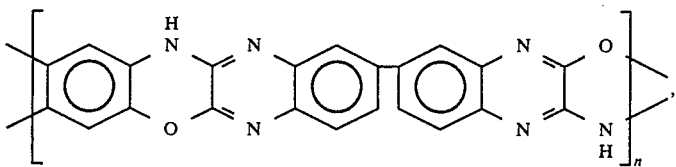,
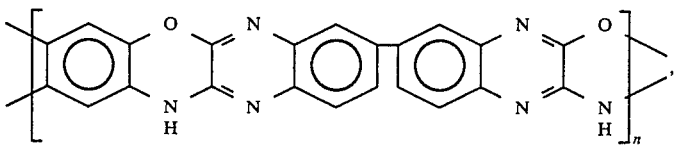,
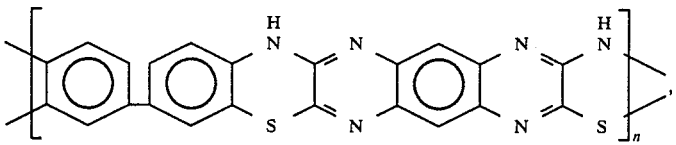,
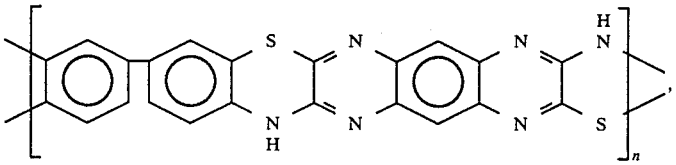,
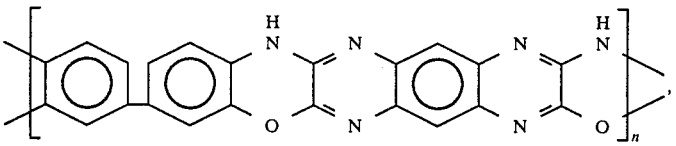, -continued
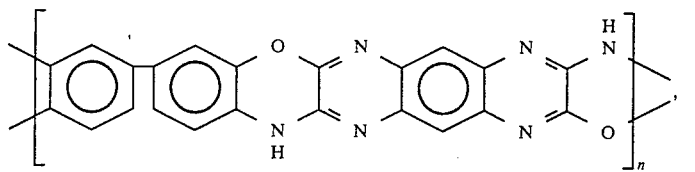
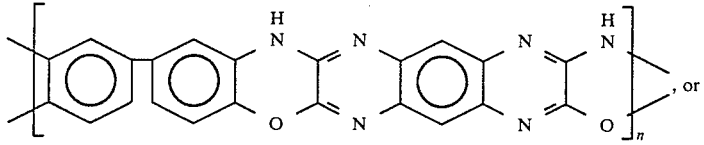
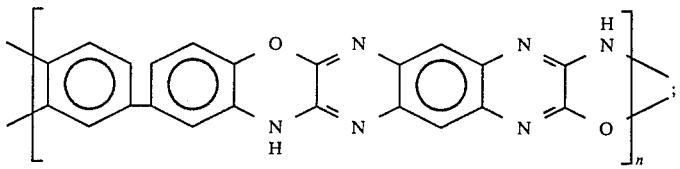
wherein n is greater than 30.
29. A polymer of claim 1, wherein said polymer is a formula V extended chain crystalline homopolymer having the formulas:
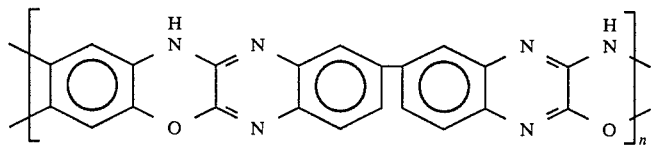
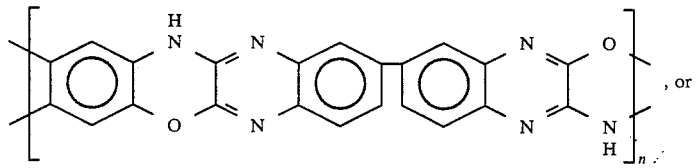
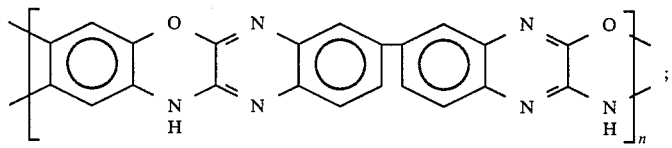
wherein n is greater than 30.
30. A polymer of claim 1, wherein said polymer is a formula V extended chain crystalline homopolymer having the formulas:
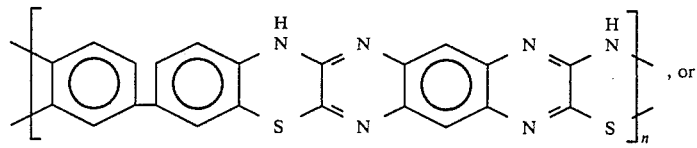
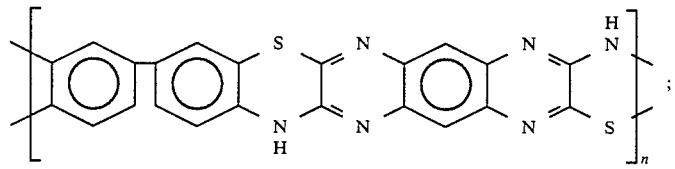
wherein n is greater than 30.

31. A polymer of claim 1, wherein said polymer is a formula V extended chain crystalline homopolymer having the formula:

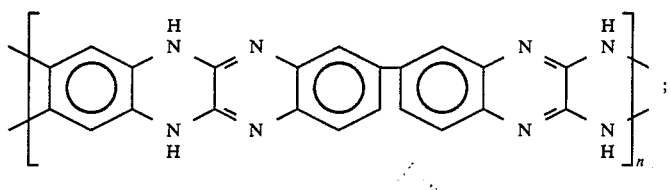

wherein n is greater than 30.

32. A polymer of claim 1, wherein said polymer is a formula V extended chain crystalline homopolymer having the formulas:

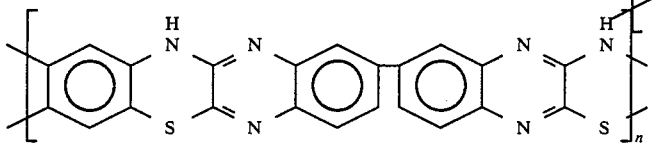

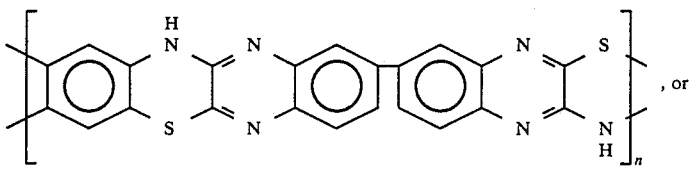

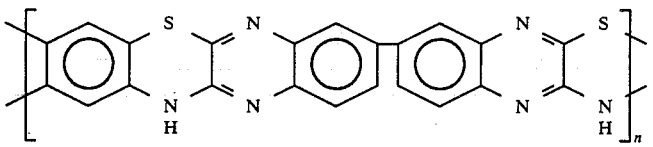

wherein n is greater than 30.

33. A polymer of claim 1, wherein said polymer is a formula VI extended chain crystalline homopolymer having the formula:

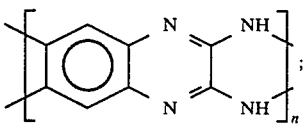

wherein n is greater than 30.

34. A polymer of claim 1, wherein said polymer is a formula VII extended chain crystalline homopolymer having the formula:

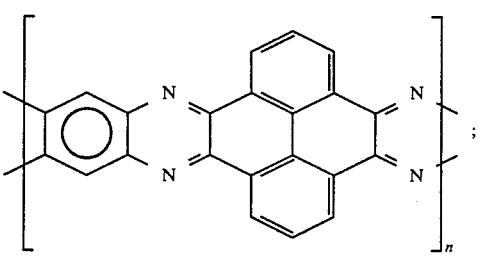

wherein n is greater than 30.

35. A polymer of claim 1, wherein said polymer is a formula VIII extended chain crystalline homopolymer having the formulas:

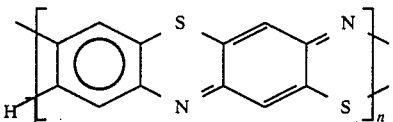

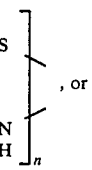

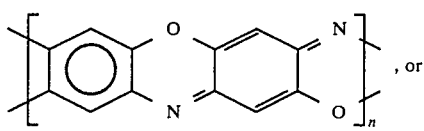

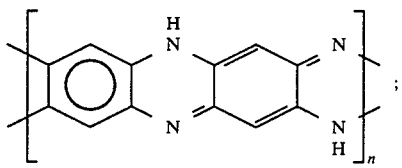

wherein n is greater than 40.

36. A polymer of claim 1, wherein said polymer is a formula VIII extended chain crystalline homopolymer having the formula:

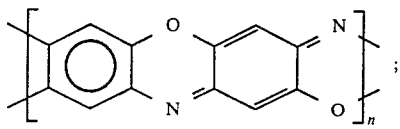

wherein n is greater than 30.

37. A polymer of claim 1, wherein said polymer is a formula VIII extended chain crystalline homopolymer having the formula:

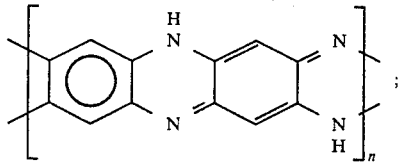

wherein n is greater than 30.

38. A polymer of claim 1, wherein said polymer is a formula VIII extended chain crystalline homopolymer having the formulas:

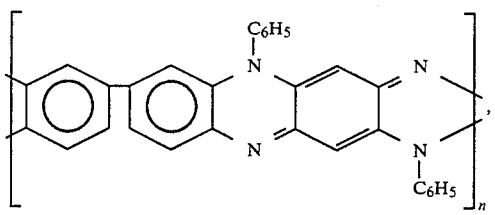

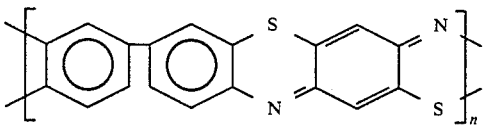

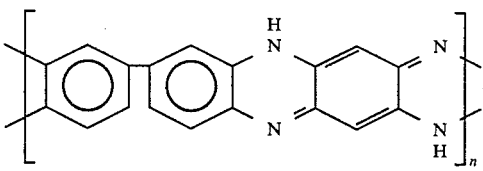

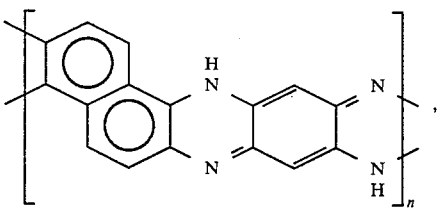

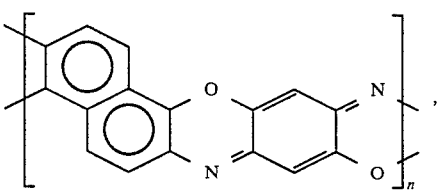

-continued

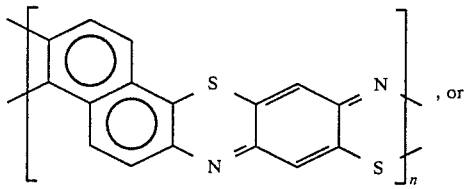, or

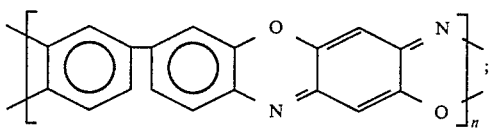;

wherein n is greater than 30.

39. A polymer of claim 1, wherein said polymer is a formula VIII extended chain crystalline homopolymer having the formulas:

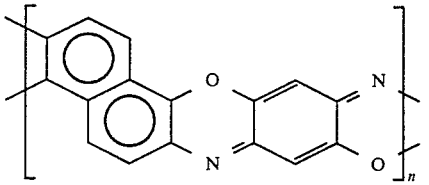,

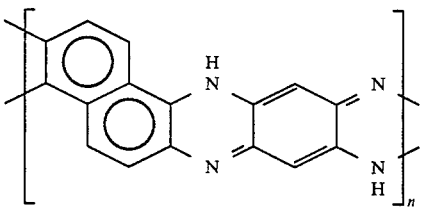,

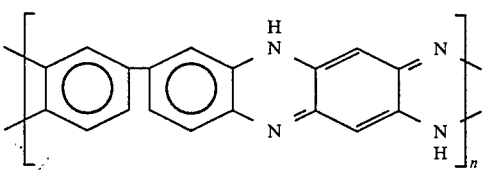,

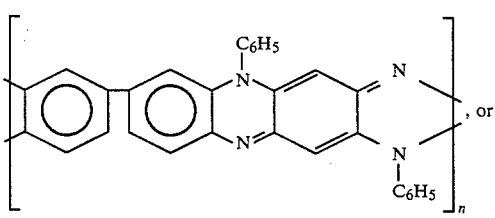, or

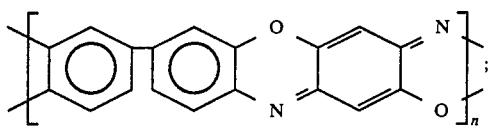

wherein n is greater than 30.

40. A polymer of claim 1, wherein said polymer is an extended chain crystalline copolymer having the general formulas:

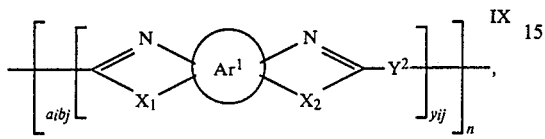

wherein Ar¹ is

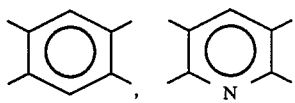

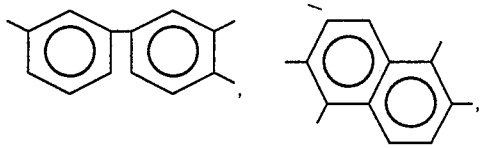

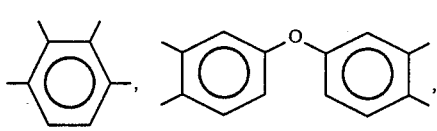

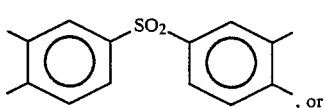

, or

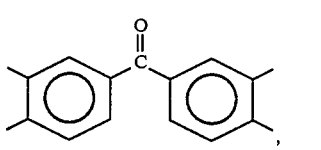

$X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹, N and $X_1$ or $X_2$ of each hetero ring are disposed ortho to one another, and Y² is nil or is

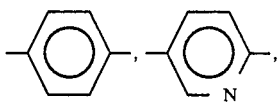

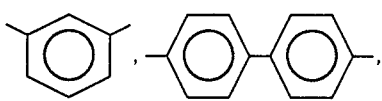

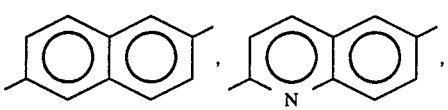

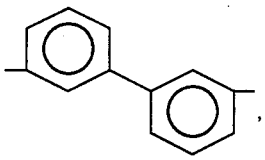

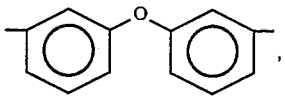

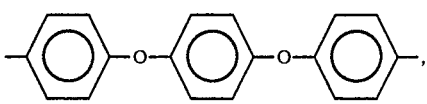

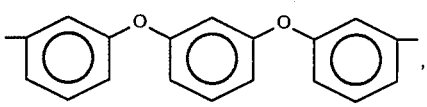

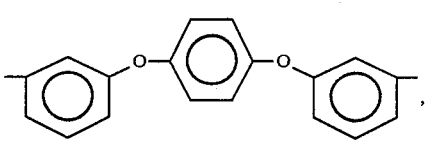

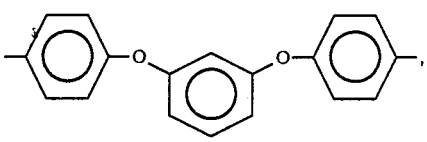

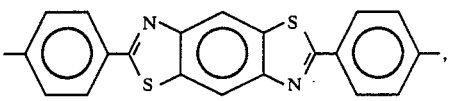

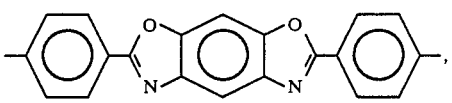

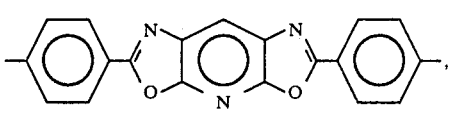

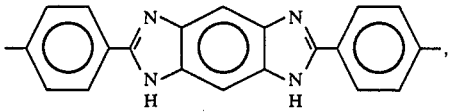

-continued

[chemical structure: bis-imidazopyridine with two phenyl groups, NH]

[chemical structure: bis-thiazolopyridine with two phenyl groups]

[chemical structure: bis-imidazobenzene with two phenyl groups, N-C₆H₅]

[chemical structure: thiazolobenzene fused], [oxazolobenzene fused],

[chemical structure: imidazobenzene NH, NH], [oxazolopyridine],

[chemical structure: oxazolobenzene], [imidazopyridine NH NH],

[chemical structure: thiazolopyridine], [imidazobenzene N-C₆H₅, N-C₆H₅], $-(CH_2)_2-$, $-(CH_2)_4-$, $-(CH_2)_5-$, $-(CH_2)_8-$, [cyclohexylene],

[cyclohexylene with H], or [cyclohexylene with H]

$a_i b_j$ represents the molar proportions of the respective different recurring units present in said copolymer, $y_{ij}$ represents an average number of the respective different sequential recurring units present in said copolymer, n being a positive integer:

$$\left[ \left[ Y^2 \underset{X_1}{\overset{N}{=}} Ar^1 \underset{X_2}{\overset{N}{=}} \right]_{\frac{a_ib_jm}{m+m'}} \left[ \underset{X_3}{\overset{N}{=}} Ar^3 \underset{X_3}{\overset{N}{=}} \right]_{\frac{c_km'}{m+m'}} \right]_{y_k} \right]_n$$

wherein $Ar^1$ is

[phenylene], [pyridylene],

[biphenylene], [naphthylene],

[substituted phenylene], [diphenyl ether],

[diphenyl sulfone], or

[benzophenone], $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y_2$ is nil or is

[phenylene], [pyridylene],

[biphenylene], [naphthylene],

[quinolylene], [m-biphenylene],

[phenylene], [diphenyl ether],

X

-continued

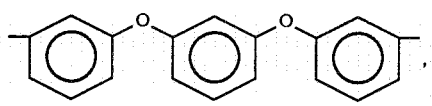

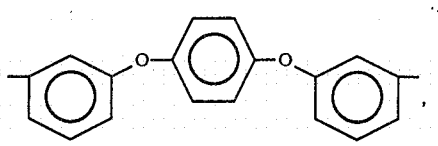

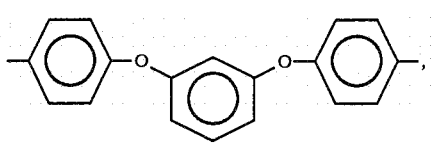

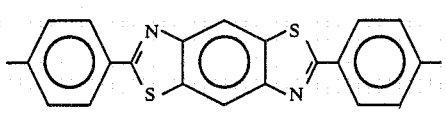

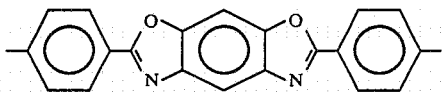

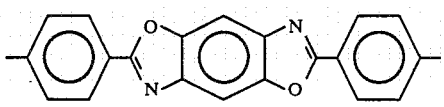

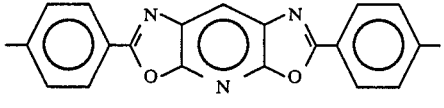

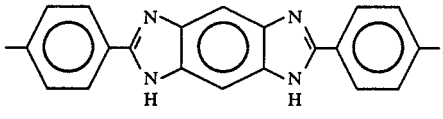

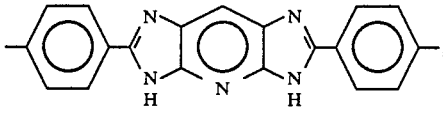

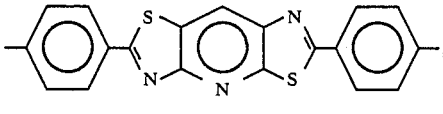

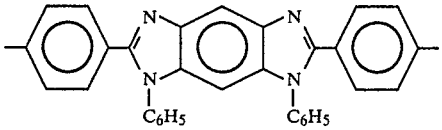

-continued

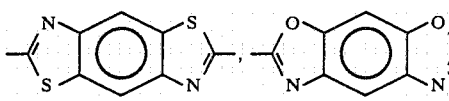

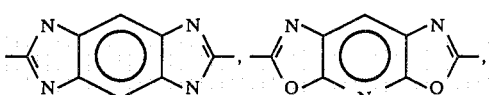

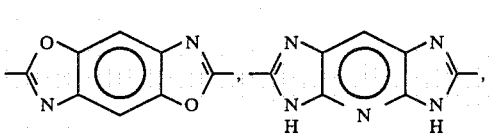

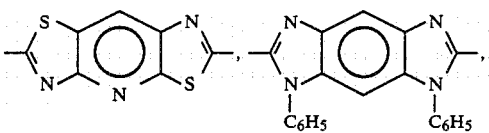

$+CH_2\}_2$, $+CH_2\}_4$, $+CH_2\}_5$,

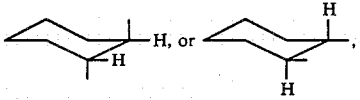

$a_i b_j m/m+m'$ represents the molar proportions of the respective different recurring units present in said copolymer, $y_{ij}$ represents an average number of the respective different sequential recurring units present in said copolymer, $Ar^3$ represents a different aromatic moiety and is

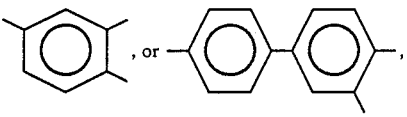

the nitrogen atom and $X_3$ being bonded to aromatic carbon atoms of $Ar^3$, $c_k m'/m+m'$ represents the molar proportions of the respective different recurring units present in said copolymer, $y_k$ represents an average number of the respective different sequential recurring units present in said copolymer, n being a positive integer:

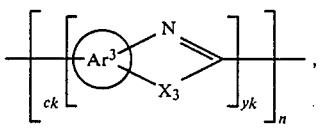

XI wherein $Ar^3$ is

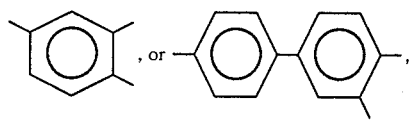

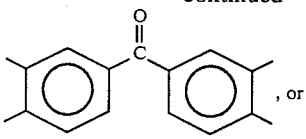

$X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, $c_k$ represents the molar proportions of the respective different recurring units present in said copolymer, $y_k$ represents an average number of the respective different sequential recurring units present in said copolymer, n being a positive integer:

$Ar^4$ is

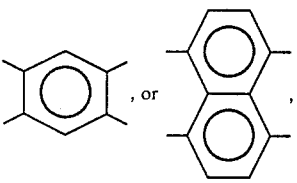

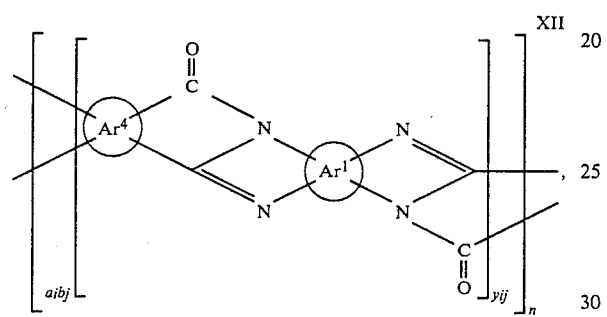

the nitrogen atoms being bonded to $Ar^1$ and the carbon atoms being bonded to $Ar^4$, $a_i b_j$ represents the molar proportions of the respective different recurring units present in said copolymer, $y_{ij}$ represents an average number of the respective different sequential recurring units present in said copolymer, n being a positive integer:

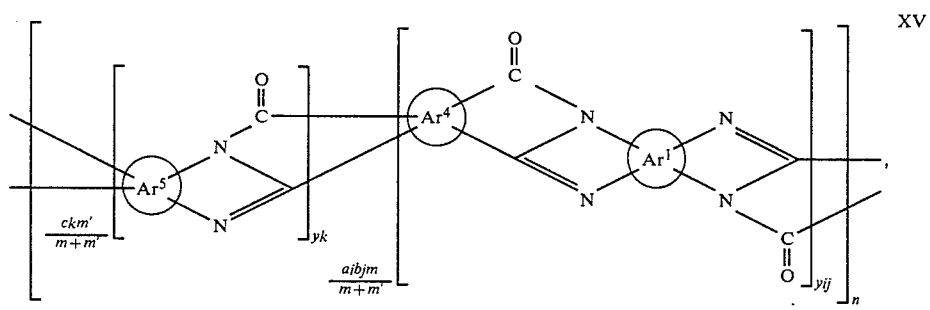

wherein $Ar^1$ is

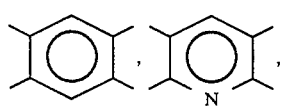

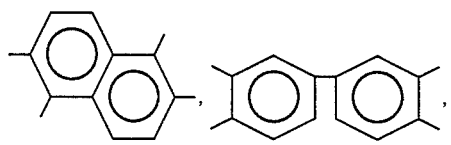

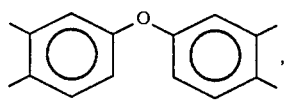

wherein $Ar^4$ is

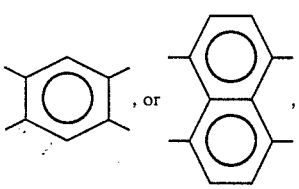

$Ar^1$ is

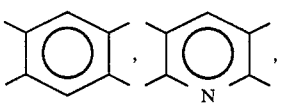

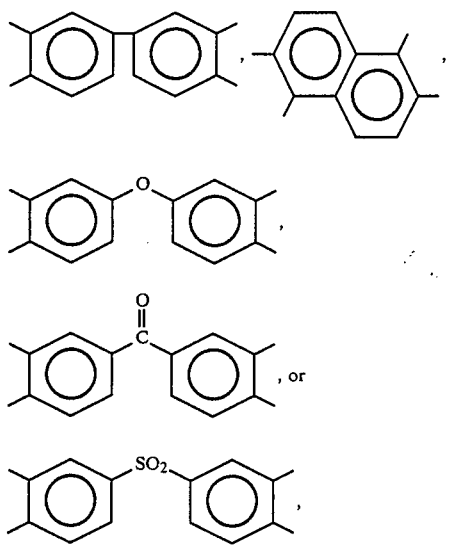

, or

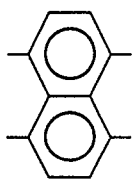

the carbon atoms being bonded to $Ar^4$ and $Ar^5$ and the nitrogen atoms being bonded to $Ar^1$ and $Ar^5$, n being a positive integer; $c_k'/m+m'$ represents the molar proportions of the respective different recurring units present in said copolymer, $y_k$ represents an average number of the respective different sequential recurring units present in said copolymer, $a_ib_jm/m+m'$ represents the molar proportions of the respective different recurring units present in said copolymer, $y_{ij}$ represents an average number of the respective different sequential recurring units present in said copolymer, n being a positive integer;

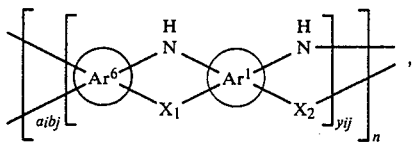

XVI wherein $Ar^1$ is

, or

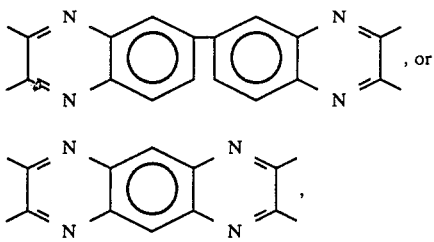

$Ar^6$ is $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_ib_j$ represents the molar proportions of the respective different recurring units present in said copolymer, $y_{ij}$ represents an average number of the respective different sequential recurring units present in said copolymer, n being a positive integer;

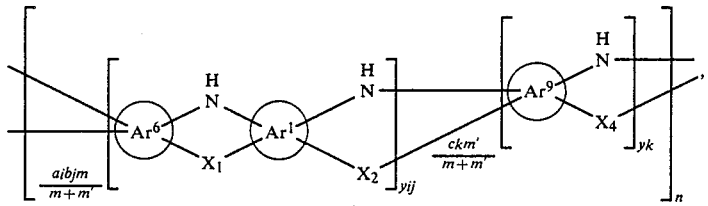

XVII wherein $Ar^6$ is

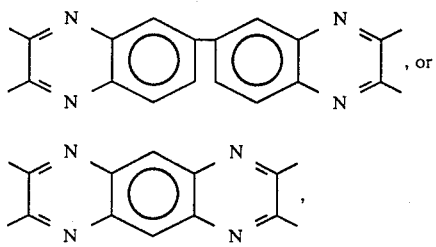

Ar¹ is

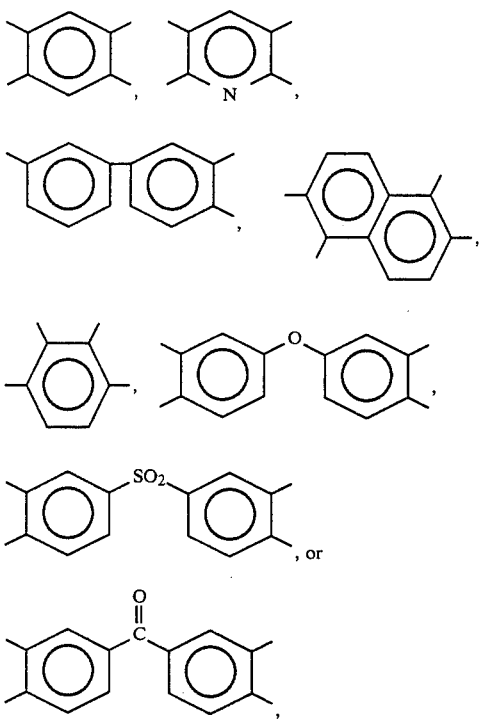

$X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_ib_jm/m+m'$ represents the molar proportions of the respective different recurring units present in said copolymer, $y_{ij}$ represents an average number of the respective different sequential recurring units present in said copolymer, $Ar^9$ is

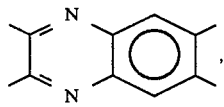

$X_4$ is sulfur, oxygen, or NR (R being hydrogen or an organic group), the NH groups and $X_4$ being bonded to aromatic carbon atoms of $Ar^6$ and $Ar^9$, $c_km'/m+m'$ represents the molar proportions of the respective different recurring units present in said copolymer, $y_k$ represents an average number of the respective different sequential recurring units present in said copolymer, n being a positive integer: or

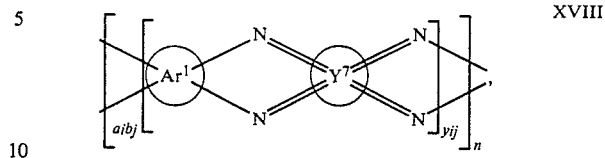     XVIII wherein $Ar^1$ is

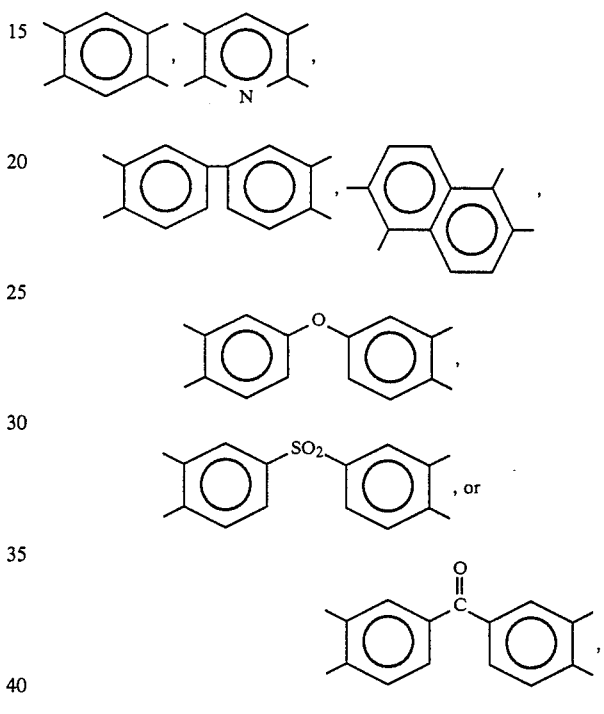

$Y^7$ is

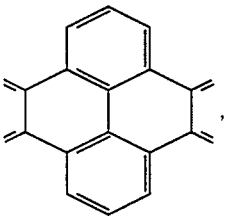

the nitrogen atoms being bonded to aromatic carbon atoms of $Ar^1$ and bonded to adjacent carbon atoms of $Y^7$, $a_ib_j$ represents the molar proportions of the respective different recurring units present in said copolymer, $y_{ij}$ represents an average number of the respective different sequential recurring units present in said copolymer, n being a positive integer, wherein said copolymers X, XI, XII, XV, XVI, XVII, and XVIII are characterized as having a molecular weight with an n value corresponding to an intrinsic viscosity of at least about 5 dL/g as determined in methanesulfonic acid at 30° C. with the proviso that when said polymer is IX that the molecular weight of said IX polymer correspond to an intrinsic viscosity greater than 16 dL/g as determined in methanesulfonic acid at 30° C.

41. A polymer of claim 1, wherein said polymer is an extended chain crystalline copolymer having the general formula:

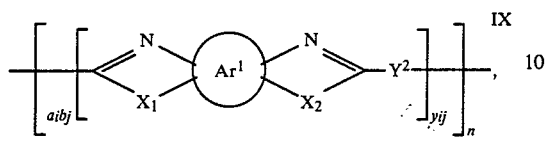    IX wherein Ar¹ is

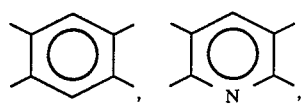

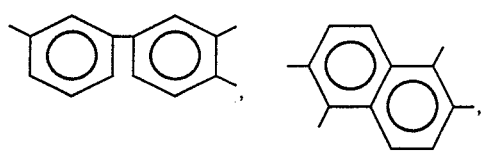

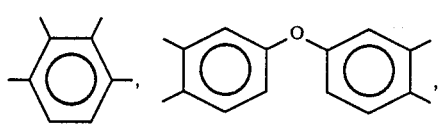

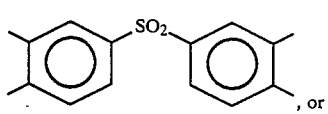, or

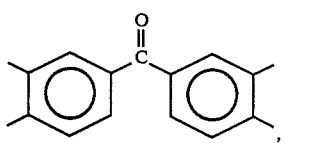

$X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹, N and $X_1$ or $X_2$ of each hetero ring are disposed ortho to one another, and $Y^2$ is nil or is

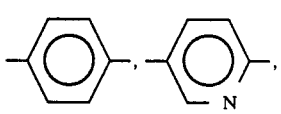

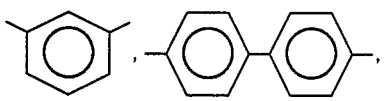

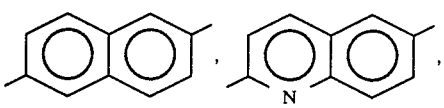

-continued

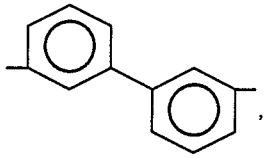

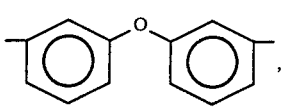

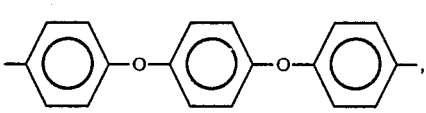

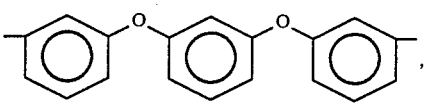

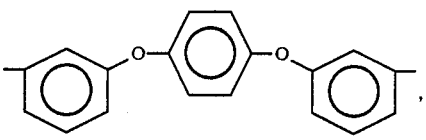

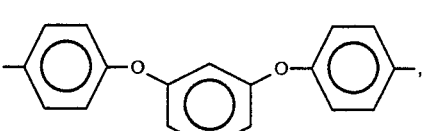

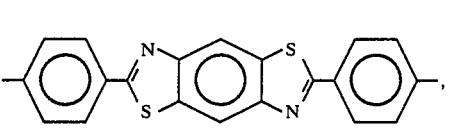

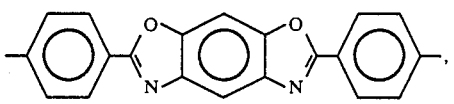

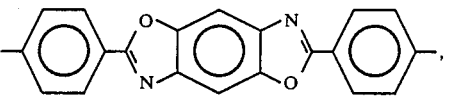

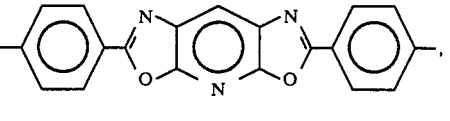

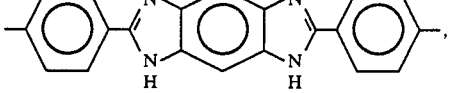

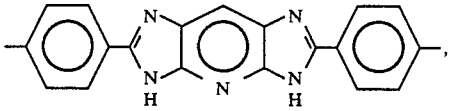

-continued

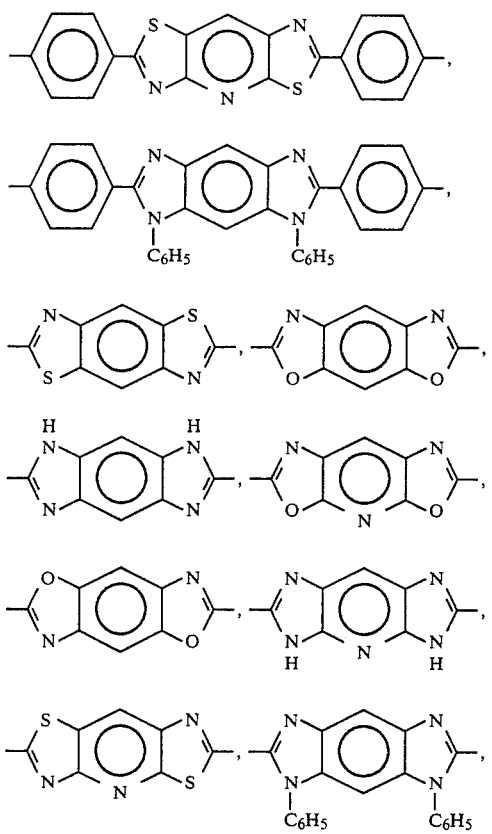

$\mathrm{+CH_2)_{\overline{2}}}$, $\mathrm{+CH_2)_{\overline{4}}}$, $\mathrm{+CH_2)_{\overline{5}}}$,

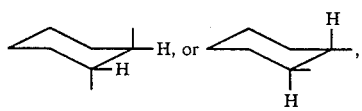

$a_ib_j$ represents the molar proportions of the respective different recurring units present in said copolymer, $y_{ij}$ represents an average number of the respective different sequential recurring units present in said copolymer, n being a positive integer, wherein said copolymer is characterized as having a molecular weight with an n value corresponding to an intrinsic viscosity of greater than about 16 dL/g as determined in methanesulfonic acid at 30° C.

42. A polymer of claim 1, wherein said polymer is an extended chain crystalline copolymer having the general formula:

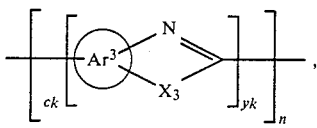 XI wherein $Ar^3$ is

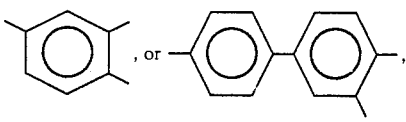

$X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, $c_k$ represents the molar proportions of the respective different recurring units present in said copolymer, $y_k$ represents an average number of the respective different sequential recurring units present in said copolymer, n being a positive integer, wherein said copolymer is characterized as having a molecular weight with an n value corresponding to an intrinsic viscosity of greater than about 5 dL/g as determined in methanesulfonic acid at 30° C.

43. A polymer of claim 1, wherein said polymer is an extended chain crystalline copolymer having the general formula:

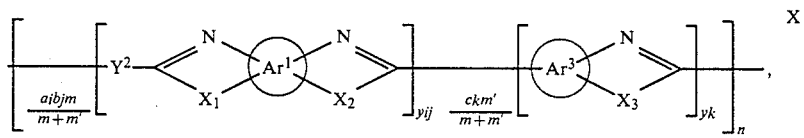 X wherein $Ar^1$ is

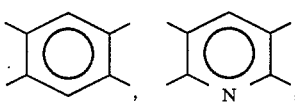

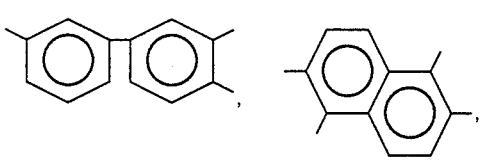

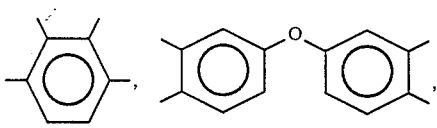

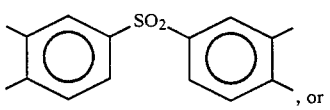, or

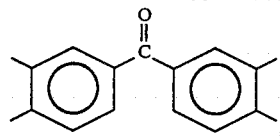

$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

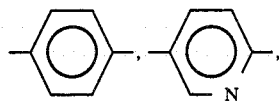

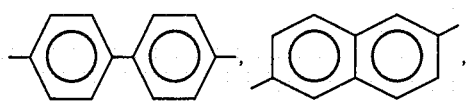

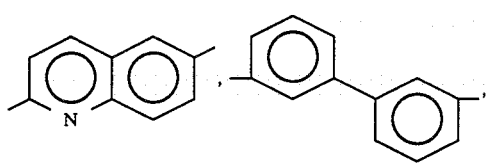

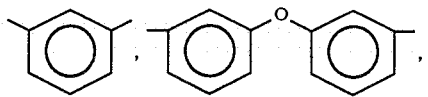

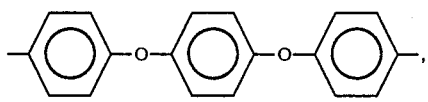

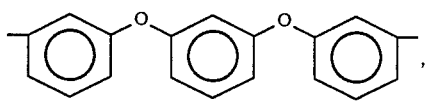

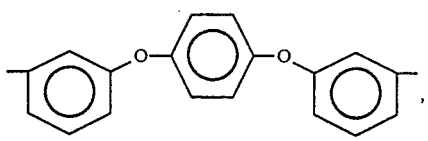

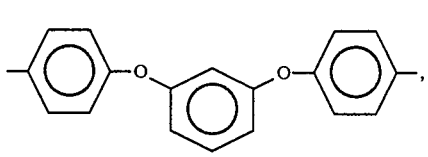

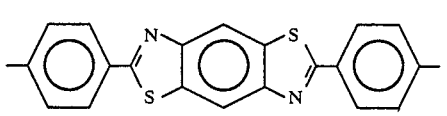

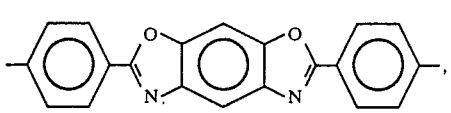

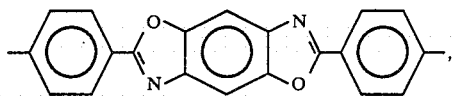

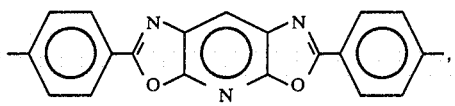

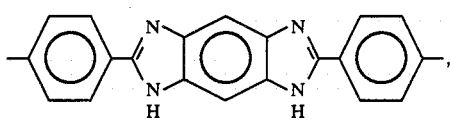

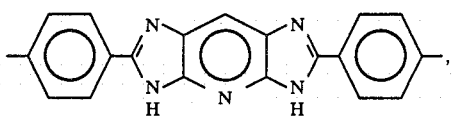

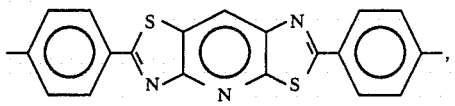

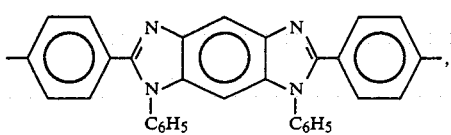

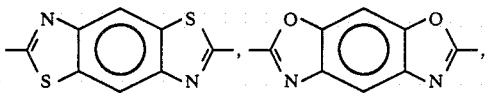

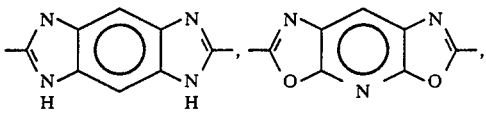

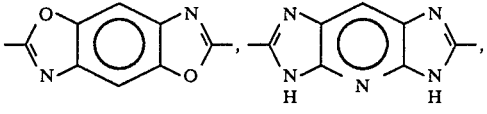

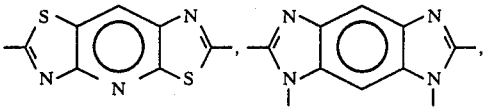

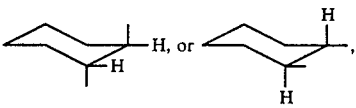

$a, b, m/m + m'$ represents the molar proportions of the respective different recurring units present in said copolymer, $y_{ij}$ represents an average number of the respective different sequential recurring units present in said copolymer, $Ar^3$ is

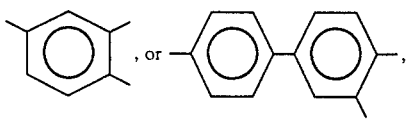

the nitrogen atom and $X_3$ being bonded to aromatic carbon atoms of $Ar^3$, $c_k m'/m+m'$ represents the molar proportions of the respective different recurring units present in said copolymer, $y_k$ represents an average number of the respective different sequential recurring units present in said copolymer, n being a positive integer, wherein said copolymer is characterized as having a molecular weight with an n value corresponding to an intrinsic viscosity of greater than about 5 dL/g as determined in methanesulfonic acid at 30° C.

44. A polymer of claim 1, wherein said polymer is an extended chain crystalline copolymer having the general formula:

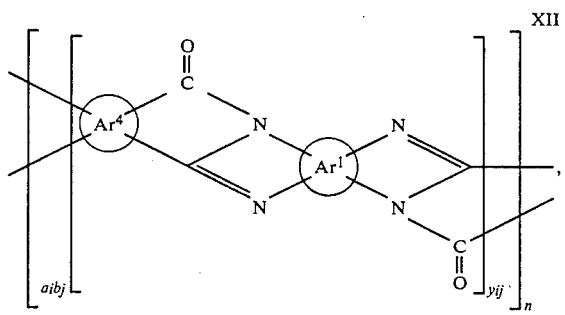

XII

-continued

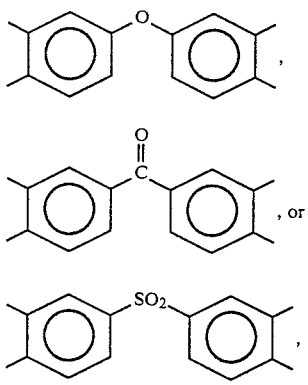

$Ar^4$ is

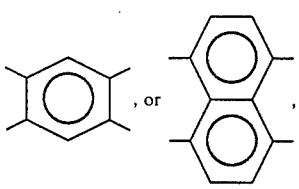

the nitrogen atoms being bonded to $Ar^1$ and the carbon atoms being bonded to $Ar^4$, $a_j b_j$ represents the molar proportions of the respective different recurring units present in said copolymer, $y_{ij}$ represents an average number of the respective different sequential recurring units present in said copolymer, n being a positive integer.

45. A polymer of claim 1, wherein said polymer is an extended chain crystalline copolymer having the general formula:

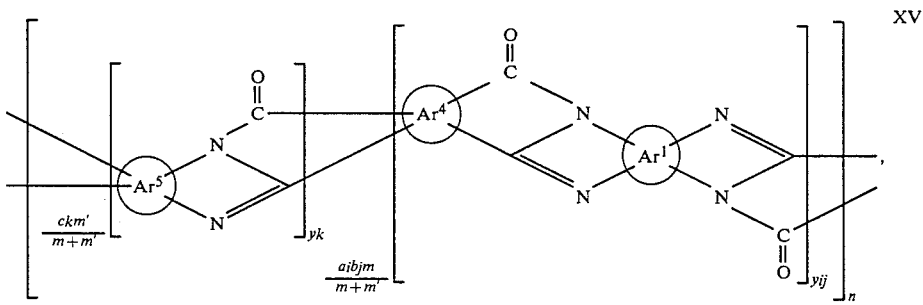

XV wherein $Ar^1$ is

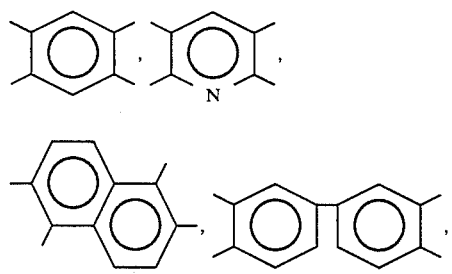

wherein $Ar^4$ is

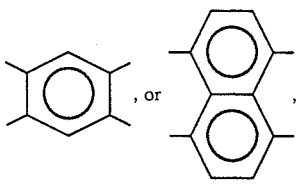

$Ar^1$ is wherein $Ar^1$ is

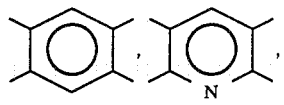
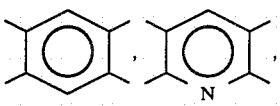

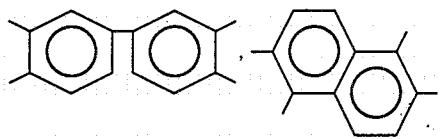
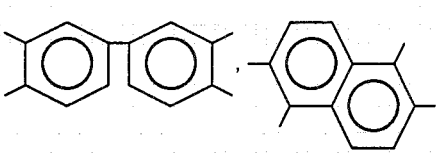

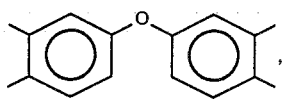
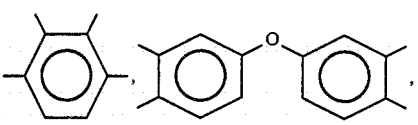

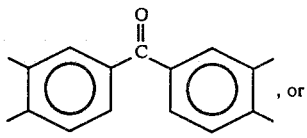
, or

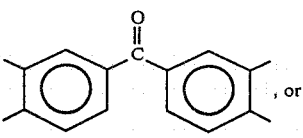
, or

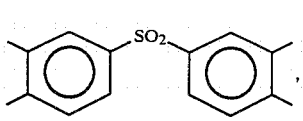
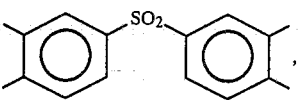

and $Ar^5$ is $Ar^6$ is

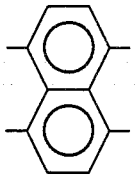
,

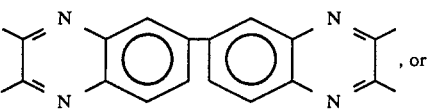
, or

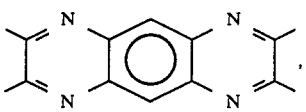

the carbon atoms being bonded to $Ar^4$ and $Ar^5$ and the nitrogen atoms being bonded to $Ar^1$ and $Ar^5$, n being a positive integer; $c_k m'/m+m'$ represents the molar proportions of the respective different recurring units present in said copolymer, $y_k$ represents an average number of the respective different sequential recurring units present in said copolymer, $a_i b_j m/m+m'$ represents the molar proportions of the respective different recurring units present in said copolymer, $y_{ij}$ represents an average number of the respective different sequential recurring units present in said copolymer, n being a positive integer.

46. A polymer of claim 1, wherein said polymer is an extended chain crystalline copolymer having the general formula:

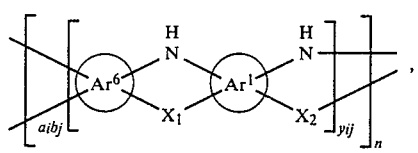

XVI $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_i b_j$ represents the molar proportions of the respective different recurring units present in said copolymer, $y_{ij}$ represents an average number of the respective different sequential recurring units present in said copolymer, n being a positive integer.

47. A polymer of claim 1, wherein said polymer is an extended chain crystalline copolymer having the general formula:

XVII

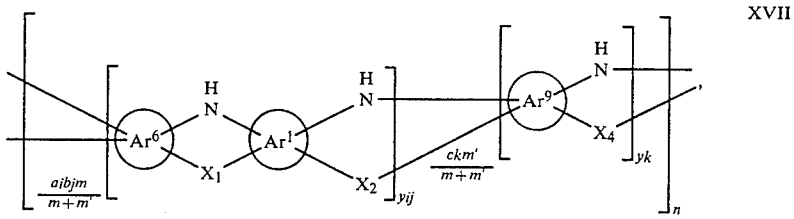

wherein Ar$^6$ is

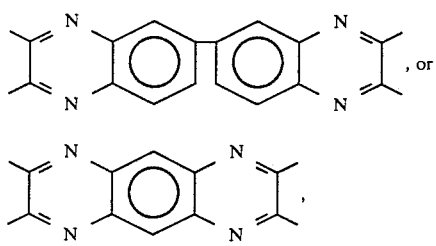, or

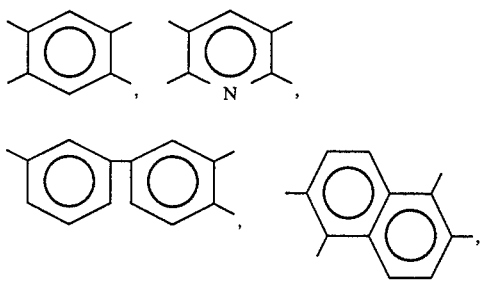

Ar$^1$ is

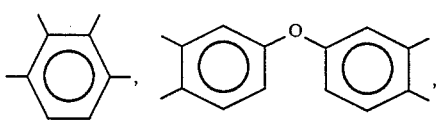,

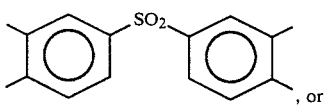,

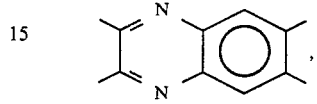, $X_1$ and $X_2$ are the same or different and are sulfur, oxygen, or NR (R being hydrogen or an organic group), the NH groups and $X_1$ and $X_2$ being bonded to aromatic carbon atoms of Ar$^6$ and Ar$^1$, Nh and $X_1$ or $X_2$ of each hetero ring are disposed ortho to one another, $a_ib_jm/m+m'$ represents the molar proportions of the respective different recurring units present in said copolymer, $y_{ij}$ represents an average number of the respective different sequential recurring units present in said copolymer, Ar$^9$ is

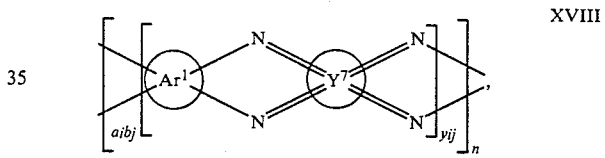

$X_4$ is sulfur, oxygen, or NR (R being hydrogen or an organic group), the NH groups and $X_4$ being bonded to aromatic carbon atoms of Ar$^6$ and Ar$^9$, $c_km'/m+m'$ represents the molar proportions of the respective different recurring units present in said copolymer, $y_k$ represents an average number of the respective different sequential recurring units present in said copolymer, n being a positive integer.

48. A polymer of claim 1, wherein said polymer is an extended chain crystalline copolymer having the general formula:

XVIII

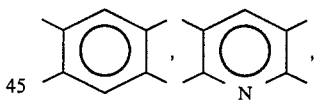

wherein Ar$^1$ is

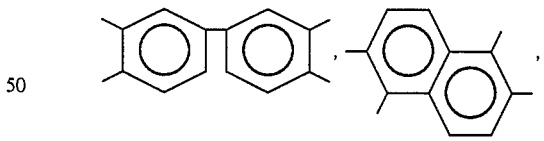

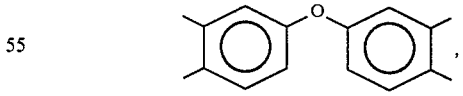,

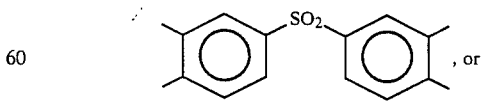, or

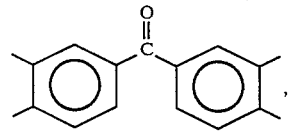, $Y^7$ is

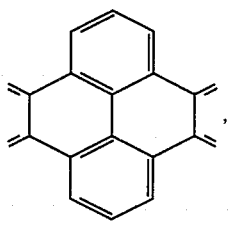, the nitrogen atoms being bonded to aromatic carbon atoms of $Ar^1$ and bonded to adjacent carbon atoms of $Y^7$, $a_i b_j$ represents the molar proportions of the respective different recurring units present in said copolymer, $y_{ij}$ represents an average number of the respective different sequential recurring units present in said copolymer, n being a positive integer.

49. A polymer of claim 1, wherein said polymer is a formula IX extended chain crystalline copolymer having the formulas:

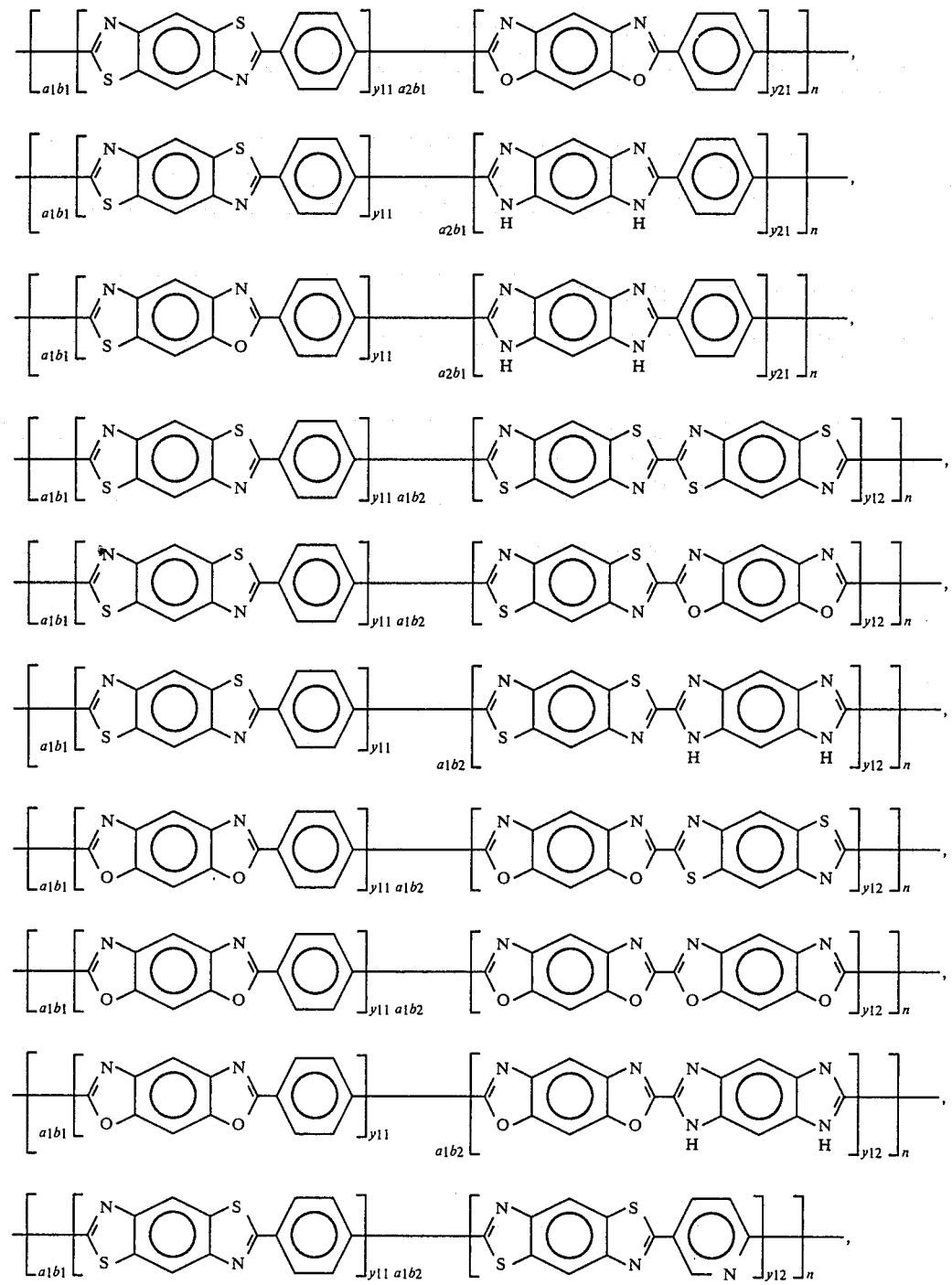

-continued

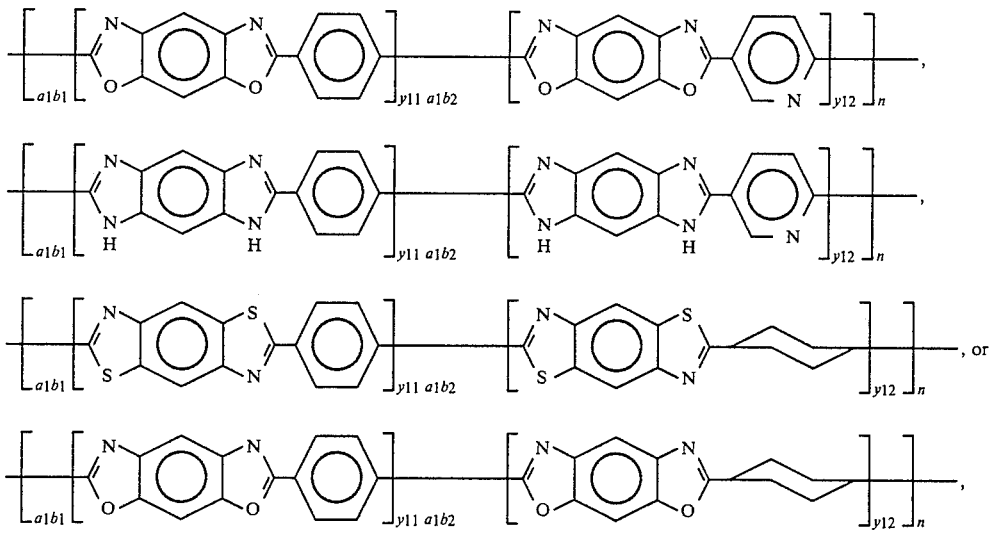

wherein $a_1b_1$ and $a_1b_2$ or $a_2b_1$ are the said molar proportions of the respective different recurring units, $a_1b_1$ being between zero and about one, $a_1b_2$ or $a_2b_1$ being equal to $1-a_1b_1$; wherein $y_{11}$ and $y_{12}$ or $y_{21}$ are the said average number of the respective different sequential recurring units, $y_{11}$ being at least greater than about one and less than about 75, $y_{12}$ or $y_{21}$ being at least greater than one and less than about 75, n being an average number of total recurring units greater than about 50 and less than about 150.

50. A polymer of claim 1, wherein said polymer is a formula IX extended chain crystalline copolymer having the formulas:

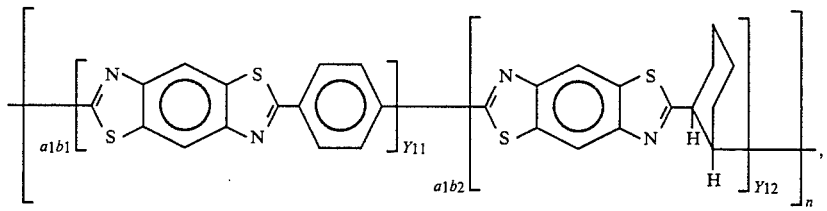

wherein $a_1b_1$ and $a_1b_2$ are the said molar proportions of the respective different recurring units, $a_1b_1$ being between about 0.9 and one, $a_1b_2$ being equal to $1-a_1b_1$; wherein $y_{11}$ and $y_{12}$ are the said average number of the respective different sequential recurring units, $y_{11}$ being at least about 10, $y_{12}$ being about one, n being at least about 50 and less than about 150.

51. A polymer of claim 1, wherein said polymer is a formula IX extended chain crystalline copolymer having the formulas:

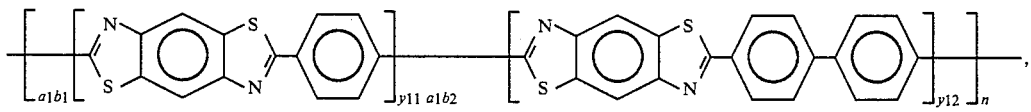

wherein $a_1b_1$ and $a_1b_2$ are the said molar proportions of the respective different recurring units, $a_1b_1$ being between about 0.95 and 1, $a_1b_2$ being equal to $1-a_1b_1$; wherein $y_{11}$ and $y_{12}$ are the said average number of the respective different sequential recurring units, $y_{11}$ being at least about 20, $y_{12}$ being about one, n being at least about 50 and less than about 150.

52. A polymer of claim 1, wherein said polymer is a formula IX extended chain crystalline copolymer having the formulas:

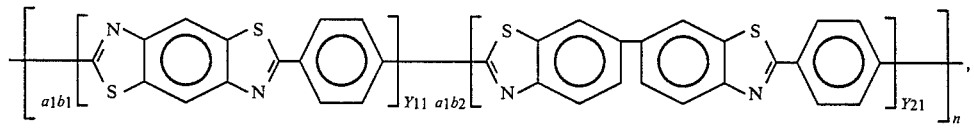

wherein $a_1b_1$ and $a_2b_1$ are the said molar proportions of the respective different recurring units, $a_1b_1$ being between zero and about one, $a_2b_1$ being equal to $1-a_1b_1$; wherein $y_{11}$ and $y_{21}$ are the said average number of the respective different sequential recurring units, $y_{11}$ being at least about one, $y_{21}$ being about one, n being at least about 50 and less than about 150.

53. A polymer of claim 1, wherein said polymer is a formula IX extended chain crystalline copolymer having the formulas:

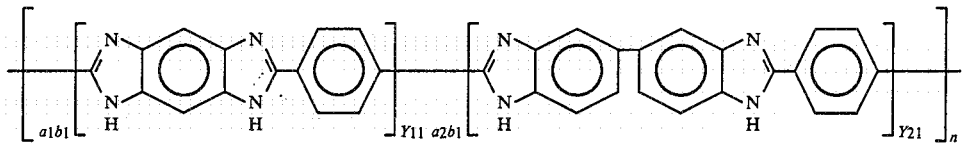

wherein $a_1b_1$ and $a_2b_1$ are the said molar proportions of the respective different recurring units, $a_1b_1$ being between about 0.75 and one, $a_2b_1$ being equal to $1-a_1b_1$; wherein $y_{11}$ and $y_{21}$ are the said average number of the respective different sequential recurring units, $y_{11}$ being at least about 4, $y_{21}$ being about 1.3, n being at least about 50 and less than about 150.

54. A polymer of claim 1, wherein said polymer is a formula IX extended chain crystalline copolymer having the formulas:

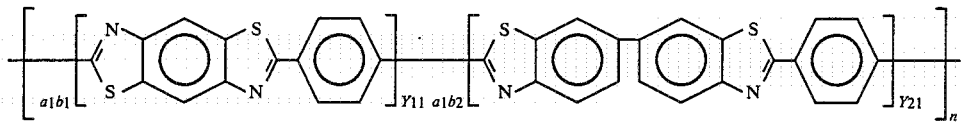

wherein $a_1b_1$ and $a_2b_1$ are the said molar proportions of the respective different recurring units, $a_1b_1$ being between about 0.75 and one, $a_2b_1$ being equal to $1-a_1b_1$; wherein $y_{11}$ and $y_{21}$ are the said average number of the respective different sequential recurring units, $y_{11}$ being at least about 4, $y_{12}$ being about 1.3, n being at least about 50 and less than about 150.

55. A polymer of claim 1, wherein said polymer is a formula IX extended chain crystalline copolymer having the formulas:

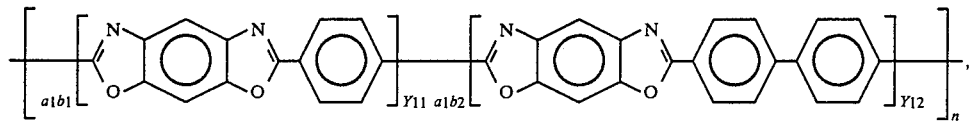

wherein $a_1b_1$ and $a_2b_1$ are the said molar proportions of the respective different recurring units, $a_1b_1$ being between about 0.8 and one, $a_2b_1$ being equal to $1-a_1b_1$; wherein $y_{11}$ and $y_{21}$ are the said average number of the respective different sequential recurring units, $y_{11}$ being at least about 5, $y_{21}$ being about 1.2, n being at least about 50 and less than about 120.

56. A polymer of claim 1, wherein said polymer is a formula IX extended chain crystalline copolymer having the formulas:

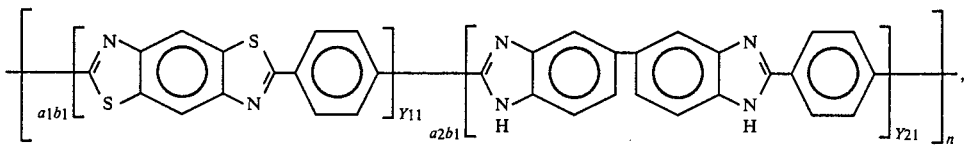

wherein $a_1b_1$ and $a_1b_2$ are the said molar proportions of the respective different recurring units, $a_1b_1$ being between about 0.9 and one, $a_1b_2$ being equal to $1-a_1b_1$; wherein $y_{11}$ and $y_{12}$ are the said average number of the respective different sequential recurring units, $y_{11}$ being at least about 10, $y_{12}$ being about one, n being at least about 50 and less than about 100.

57. A polymer of claim 1, wherein said polymer is a formula IX extended chain crystalline copolymer having the formulas:

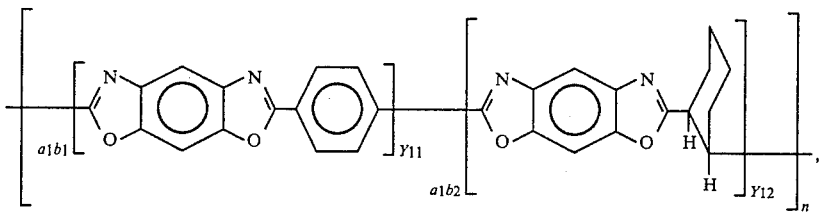

wherein $a_1b_1$ and $a_1b_2$ are the said molar proportions of the respective different recurring units, $a_1b_1$ being between about 0.95 and one, $a_1b_2$ being equal to $1-a_1b_1$; wherein $y_{11}$ and $y_{12}$ are the said average number of the respective different sequential recurring units, $y_{11}$ being at least about 20, $y_{12}$ being about one, n being at least about 50 and less than about 100.

58. A polymer of claim 1, wherein said polymer is a formula IX extended chain crystalline copolymer having the formulas:

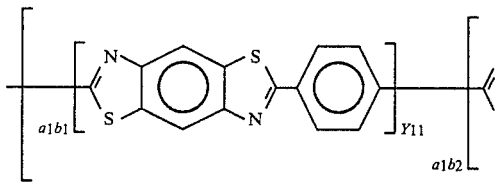

wherein $a_1b_1$ and $a_1b_2$ are the said molar proportions of the respective different recurring units, $a_1b_1$ being between about 0.9 and one, $a_1b_2$ being equal to $1-a_1b_1$; wherein $y_{11}$ and $y_{12}$ are the said average number of the respective different sequential recurring units, $y_{11}$ being at least about 10, $y_{12}$ being about one, n being at least about 50 and less than about 150.

59. A polymer of claim 1, wherein said polymer is a formula IX extended chain crystalline copolymer having the formulas:

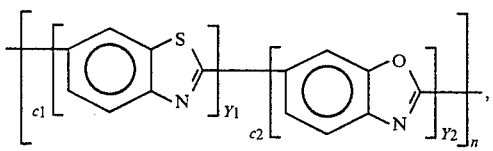

-continued

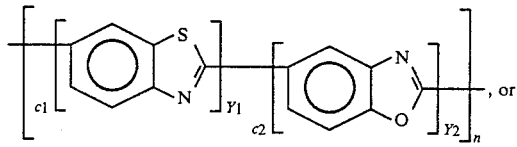

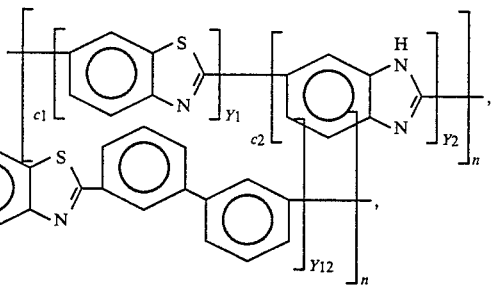

wherein $c_1$ and $c_2$ are the said molar proportions of the respective different recurring units, $c_1$ being between about 0.75 and one, $c_2$ being equal to $1-c_1$; wherein $y_1$ and $y_2$ are the said average number of the respective different sequential recurring units, $y_1$ being at least about 4, $y_2$ being about 1.3, n being at least about 50 and less than about 200.

60. A polymer of claim 1, wherein said polymer is a formula IX extended chain crystalline copolymer having the formulas:

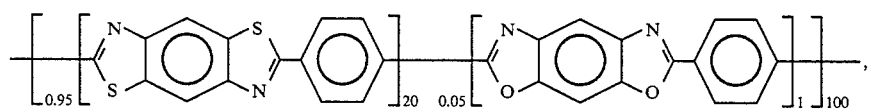

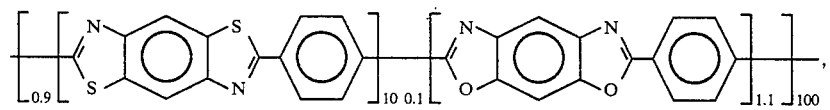

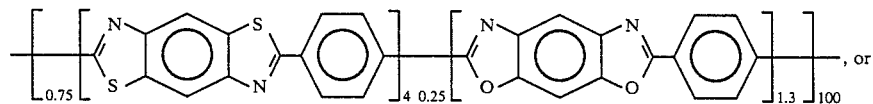

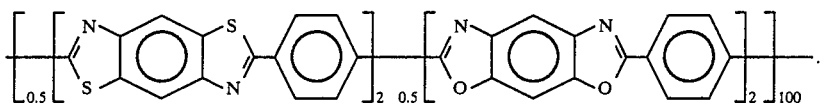
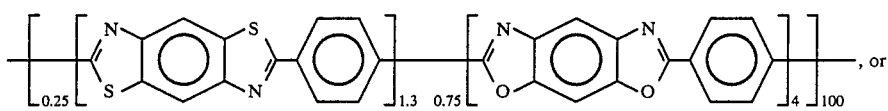
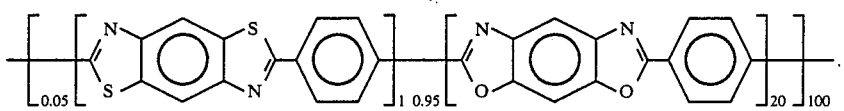
61. A polymer of claim 1, wherein said polymer is a formula IX extended chain crystalline copolymer having the formulas:
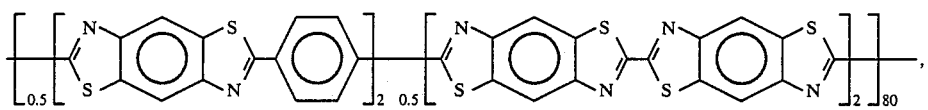
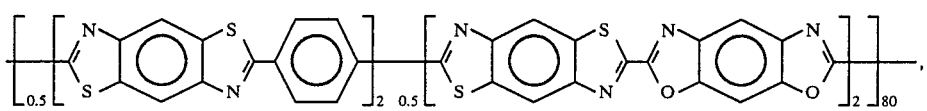
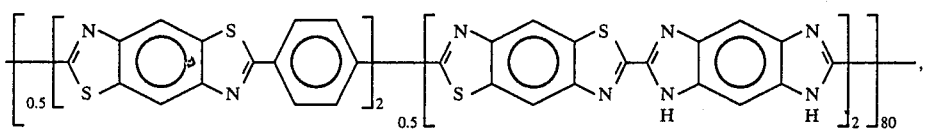
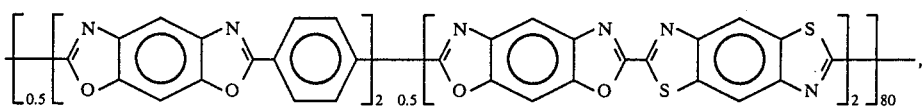
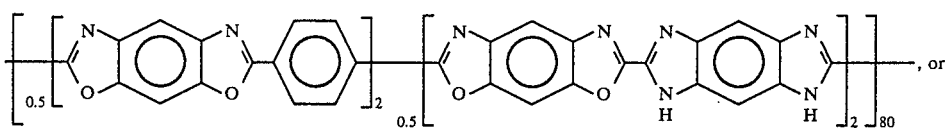
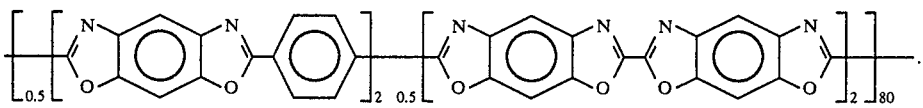
62. A polymer of claim 1, wherein said polymer is a formula IX extended chain crystalline copolymer having the formulas:
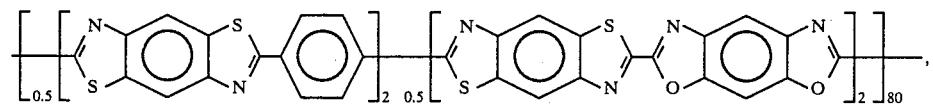
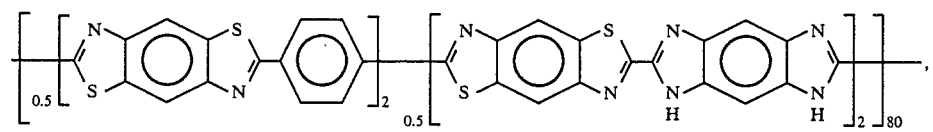

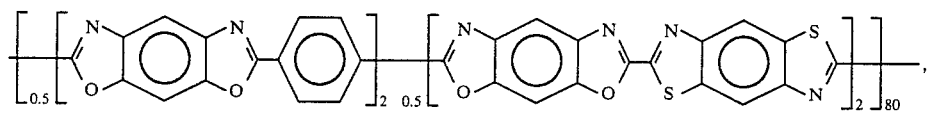
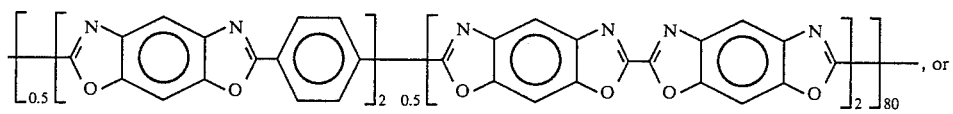
, or
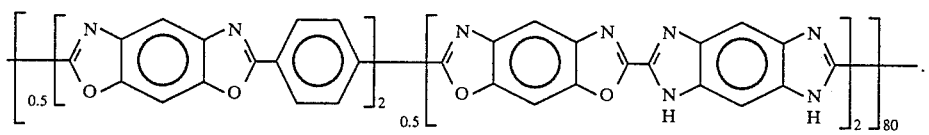
63. A polymer of claim 1, wherein said polymer is a formula IX extended chain crystalline copolymer having the formulas:
64. A polymer of claim 1, wherein said polymer is a formula IX extended chain crystalline copolymer having the formulas:
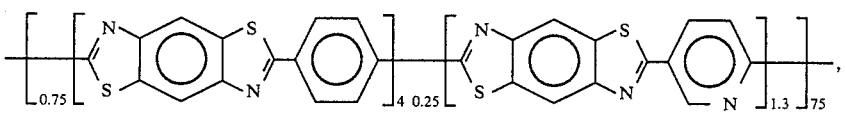
,
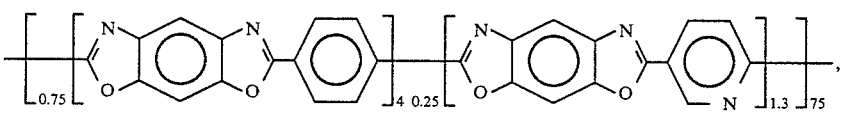
,
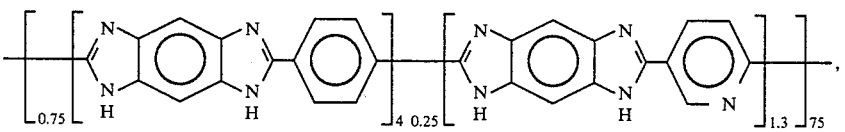
,
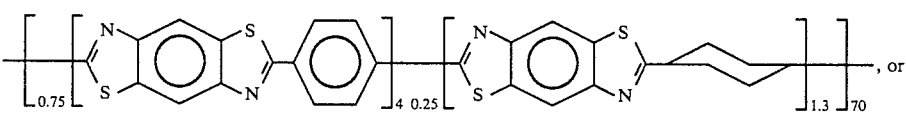
, or
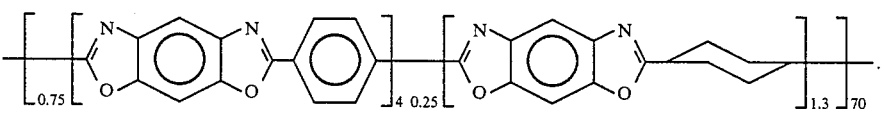
.
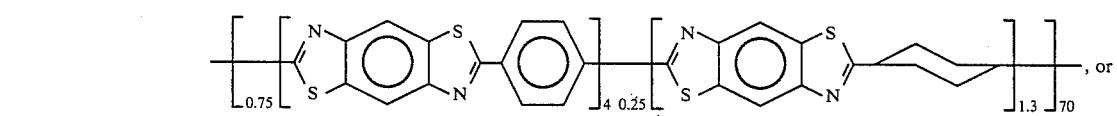
, or
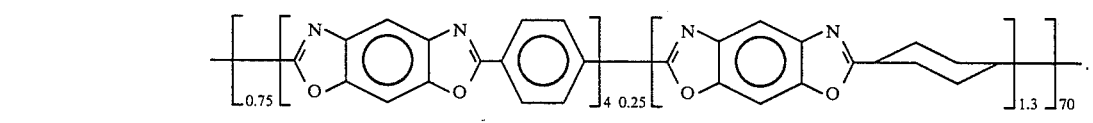
.
65. A polymer of claim 1, wherein said polymer is a formula IX extended chain crystalline copolymer having the formulas:

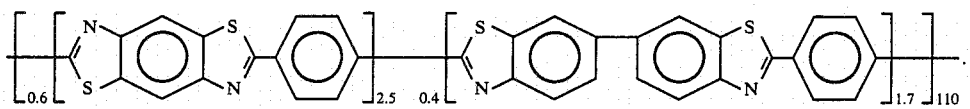

66. A polymer of claim 1, wherein said polymer is a formula IX extended chain crystalline copolymer having the formulas:

-continued

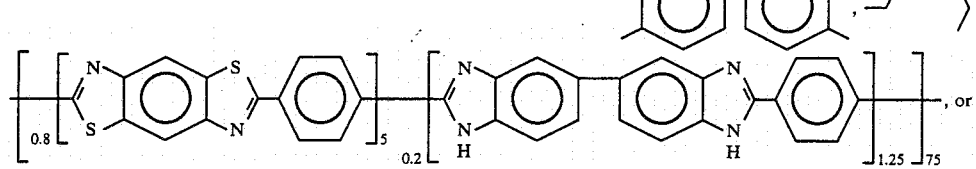

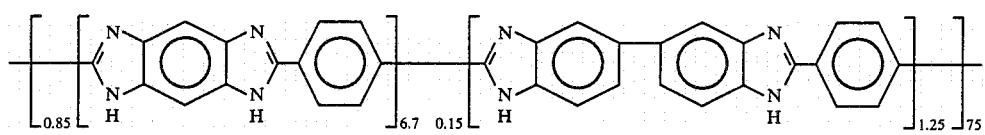

, or

67. A polymer of claim 1, wherein said polymer is a formula IX extended chain crystalline copolymer having the formulas:

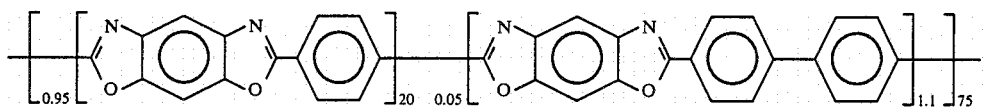

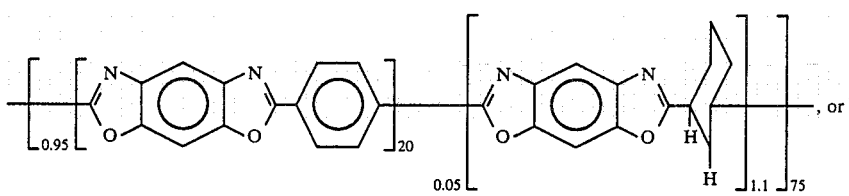

, or

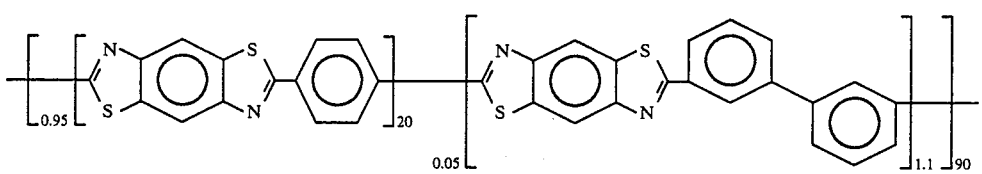

68. A polymer of claim 1, wherein said polymer is an extended chain crystalline block polymer having the general formulas:

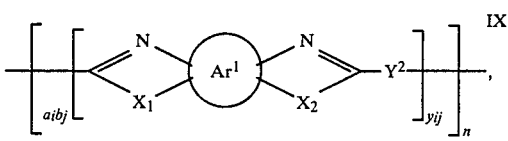

IX wherein Ar¹ is

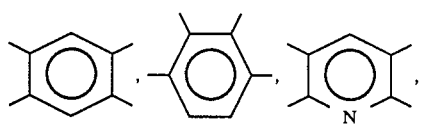

$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

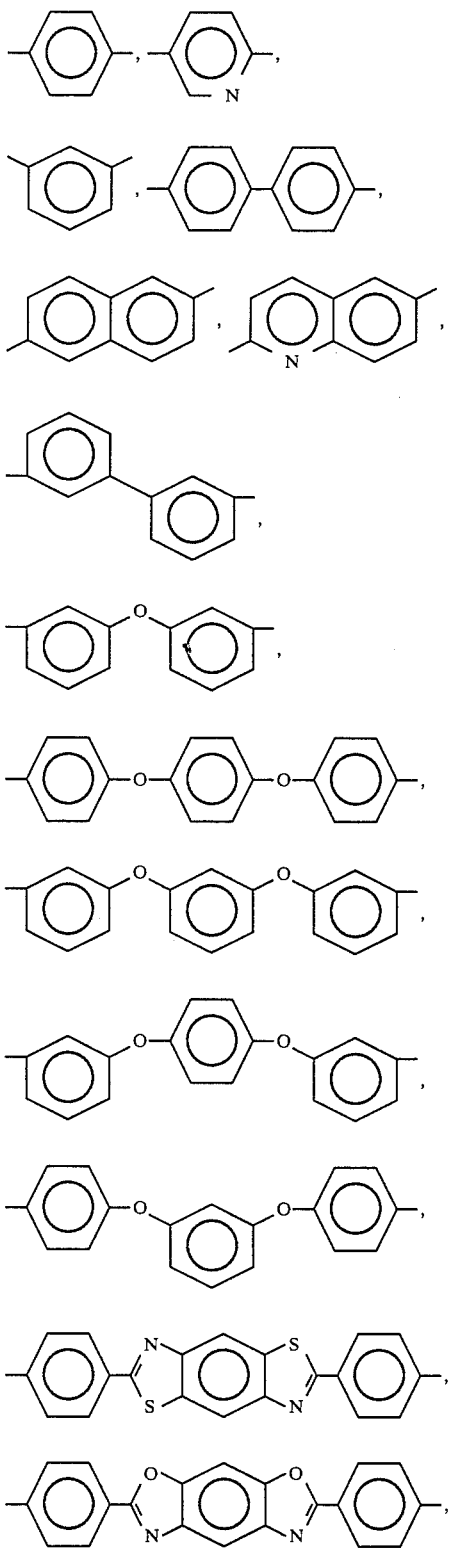

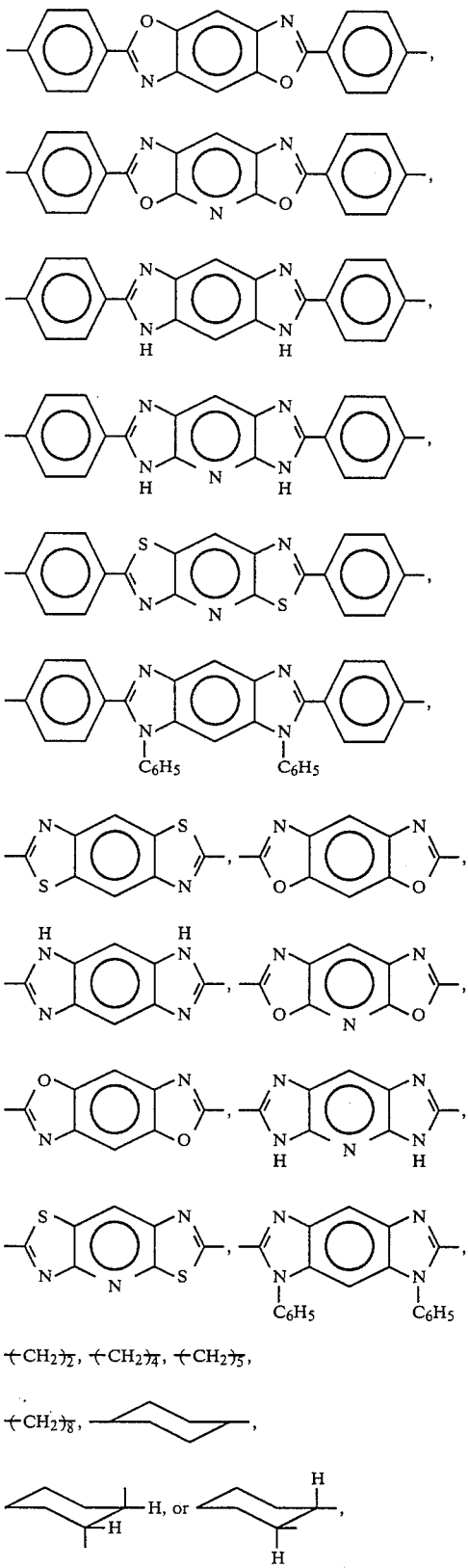

$a_i b_j$ represents the molar proportions of the respective different recurring units present in said block polymer, $y_{ij}$ represents an average number of the respective different sequential recurring units present in said block polymer, n being a positive integer;

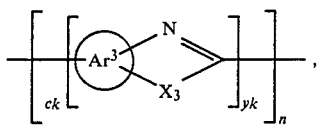

wherein $Ar^3$ is

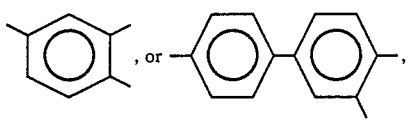

$X_3$ is sulfur, oxygen, or NR (R being hydrogen or an organic group), the nitrogen atom and $X_3$ being bonded to aromatic carbon atoms of $Ar^3$, N and $X_3$ of each hetero ring are disposed ortho to one another, $c_k$ represents the molar proportions of the respective different recurring units present in said block polymer, $y_k$ represents an average number of the respective different sequential recurring units present in said block polymer, n being a positive integer;

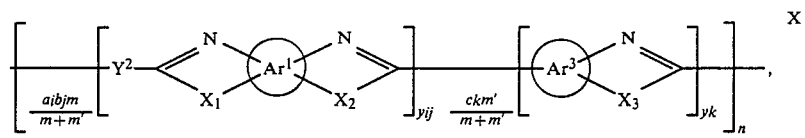   X wherein $Ar^1$ is

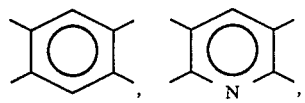

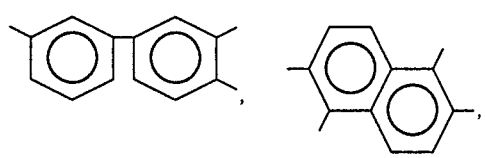

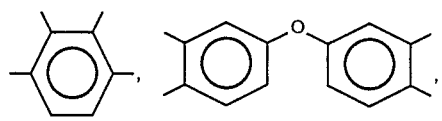

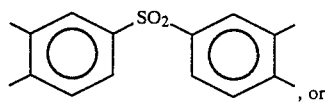

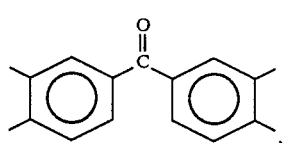

$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

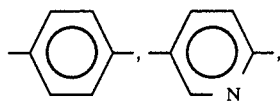

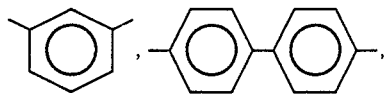

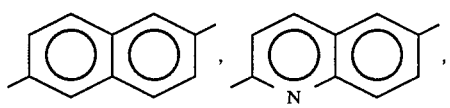

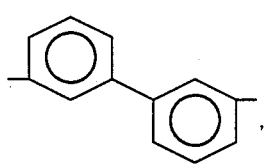

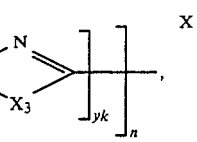

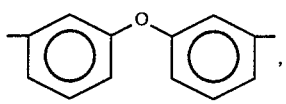

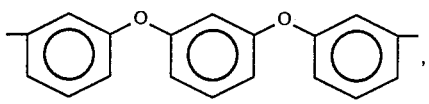

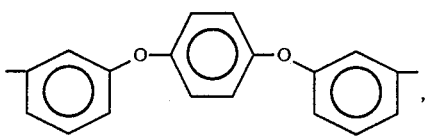

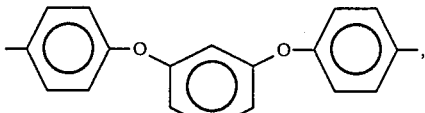

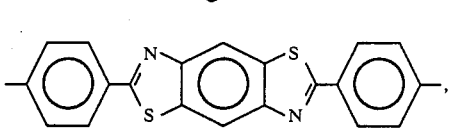

-continued

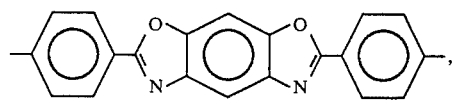

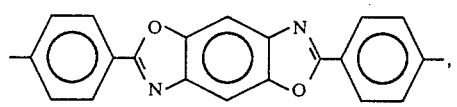

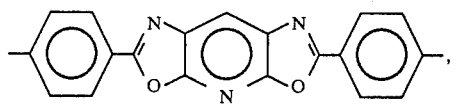

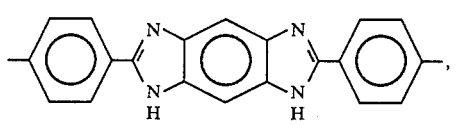

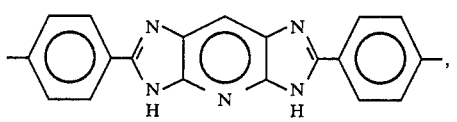

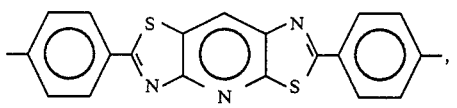

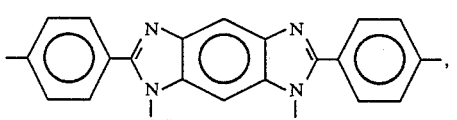

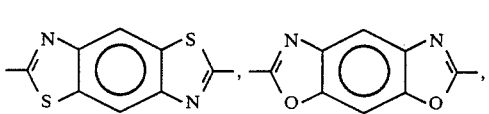

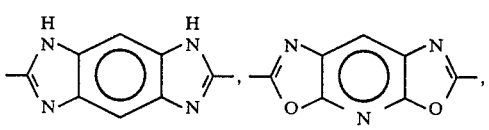

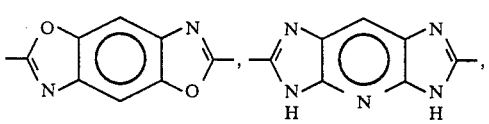

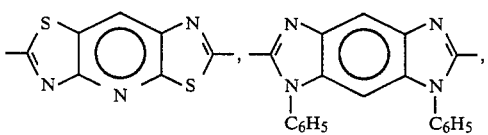

$+CH_2)_{\overline{2}}, +CH_2)_{\overline{4}}, +CH_2)_{\overline{5}},$ $+CH_2)_{\overline{8}},$ -continued

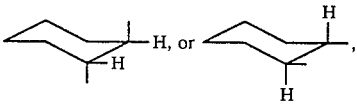

$a_ib_jm/m+m'$ represents the molar proportions of the respective different recurring units present in said block polymer, $y_{ij}$ represents an average number of the respective different sequential recurring units present in said block polymer, $Ar^3$ is

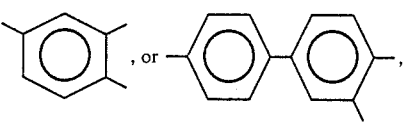

$X_3$ is sulfur, oxygen, or NR (R being hydrogen or an organic group), the nitrogen atom and $X_3$ being bonded to aromatic carbon atoms of $Ar^3$ and $X_3$ of each hetero ring are disposed ortho to one another, $c_km'/m+m'$ represents the molar proportions of the respective different recurring units present in said block polymer, $y_k$ represents an average number of the respective different sequential recurring units present in said block polymer, n being a positive integer;

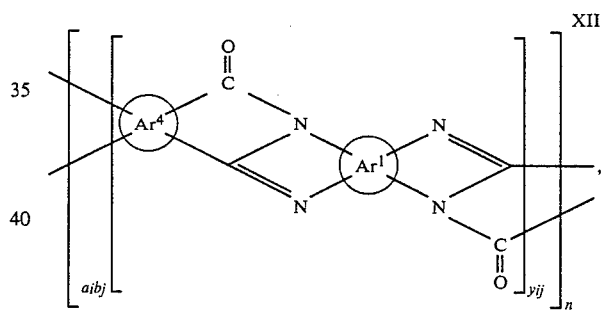

wherein $Ar^1$ is

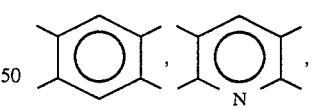

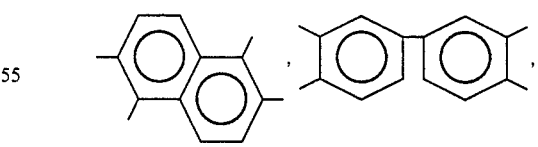

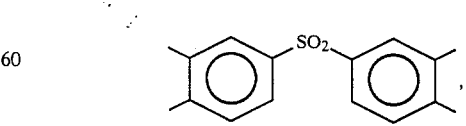

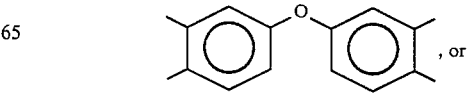, or

-continued

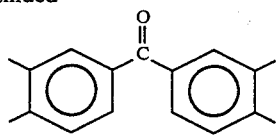

Ar⁴ is

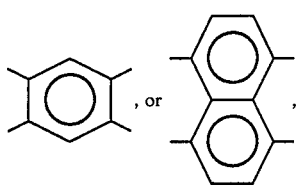

the nitrogen atoms being bonded to Ar¹ and the carbon atoms being bonded to Ar⁴, $a_i b_j$ represents the molar proportions of the respective different recurring units present in said block polymer, $y_{ij}$ represents an average number of the respective different sequential recurring units present in said block polymer, n being a positive integer;

when bonded to nitrogen atoms; and when Ar¹ is bonded to both nitrogen atoms and X₁ and X₂, Ar¹ is

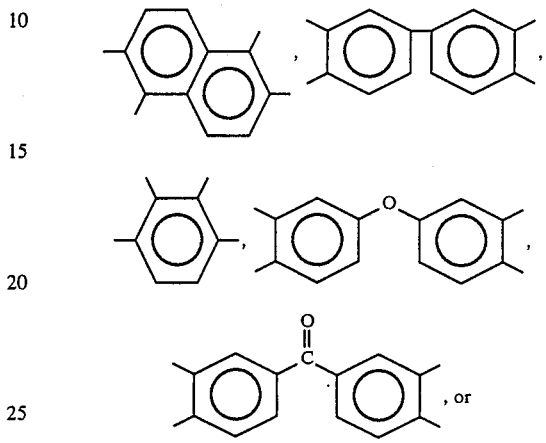

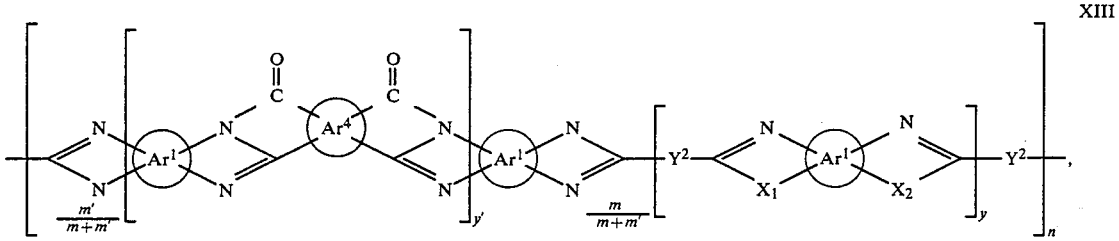

XIII wherein Ar¹ is

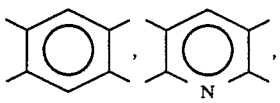

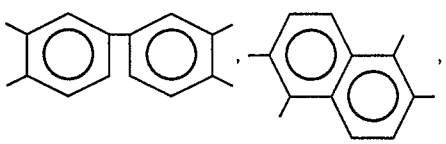

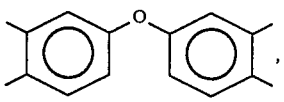

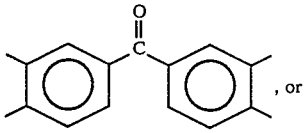

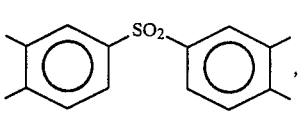

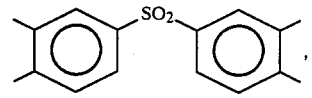

Ar⁴ is

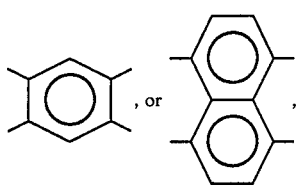

the nitrogen atoms being bonded to Ar¹ and the carbon atoms being bonded to Ar⁴, m′/m+m′ represents the molar proportions of the respective different recurring units present in said block polymer, y′ represents an average number of the respective different sequential recurring units present in said block polymer, X₁ and X₂ are the same or different and are sulfur, oxygen, or NR (R being hydrogen or an organic group), the nitrogen atoms and X₁ and X₂ being bonded to aromatic carbon atoms of Ar¹, N and X₁ or X₂ of each hetero ring are disposed ortho to one another and Y² is nil or is

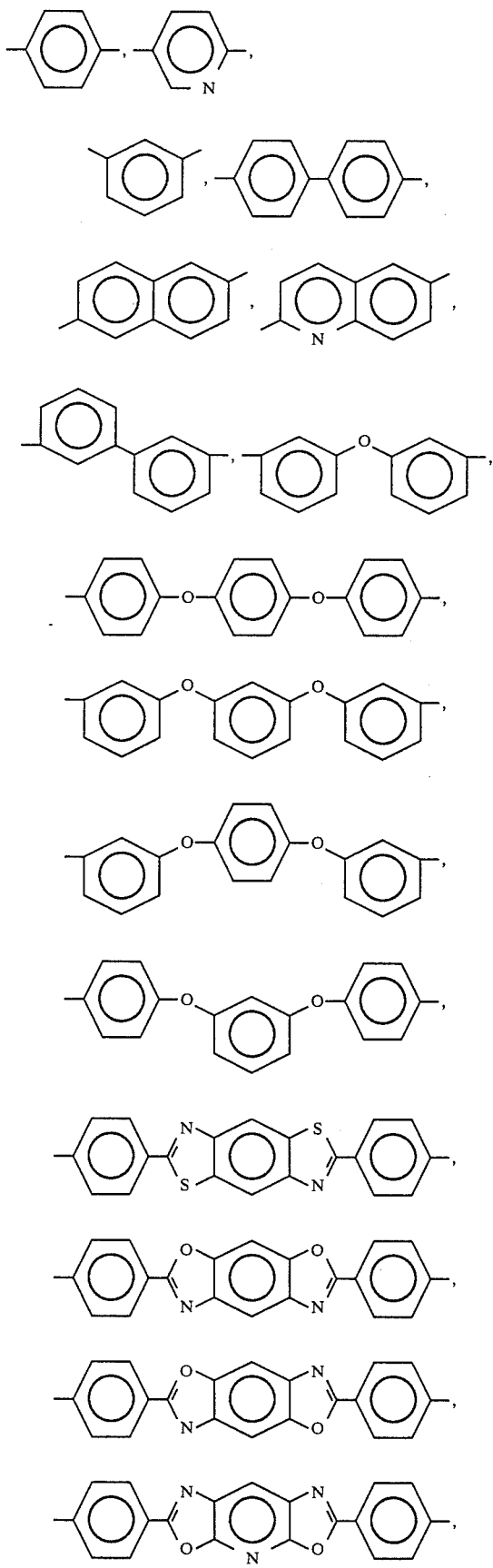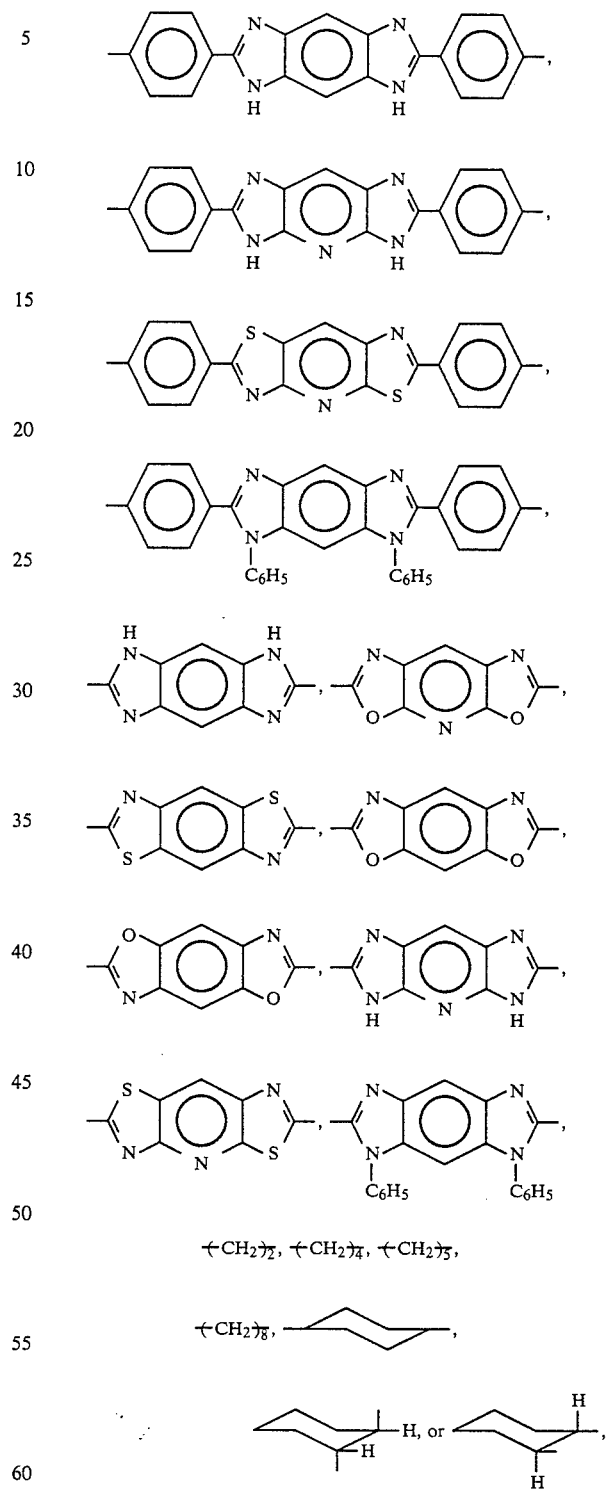
m/m+m' represents the molar proportions of the respective different recurring units present in said block polymer, y represents an average number of the respective different sequential recurring units present in said block polymer, n being a positive integer;

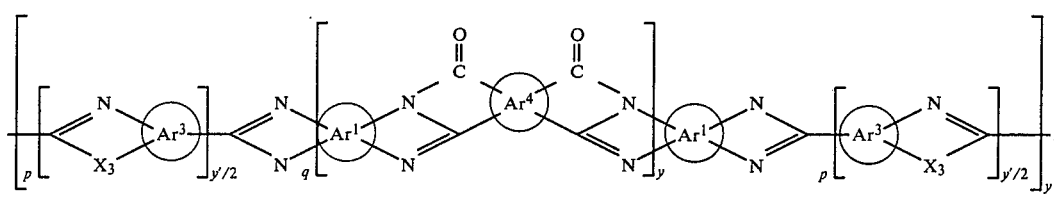 XIV wherein Ar³ is

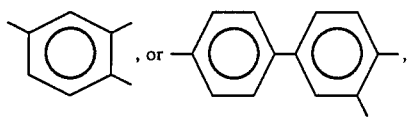

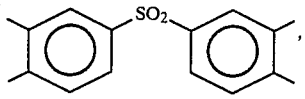

Ar⁴ is

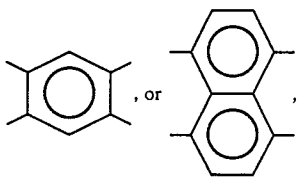

$X_3$ is sulfur, oxygen, or NR (R being hydrogen or an organic group), the nitrogen atom and $X_3$ being bonded to aromatic carbon atoms of $Ar^3$, N and $X_3$ of each hetero ring are disposed ortho to one another, p represents the molar proportions of the respective different recurring units present in said block polymer, $y'/2$ represents an average number of the respective different sequential recurring units present in said block polymer, $Ar^1$ is

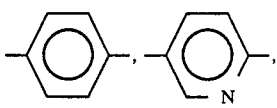

the nitrogen atoms being bonded to $Ar^1$ and the carbon atoms being bonded to $Ar^4$, q represents the molar proportions of the respective different recurring units present in said block polymer, y represents an average number of the respective different sequential recurring units present in said block polymer, n being a positive integer;

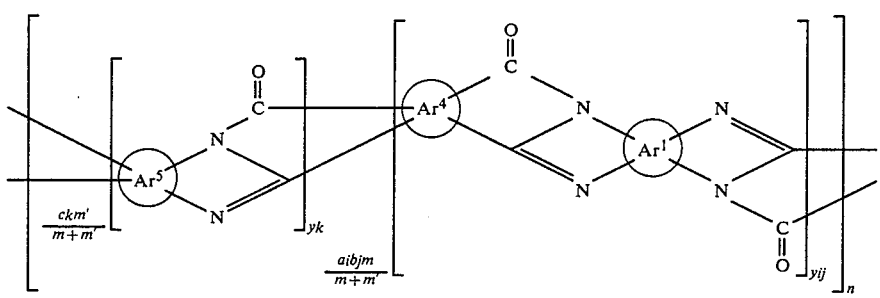 XV' wherein Ar⁴ is

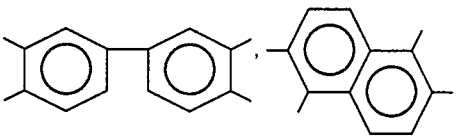

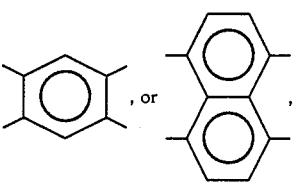

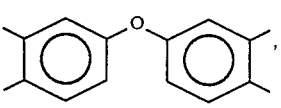

Ar¹ is

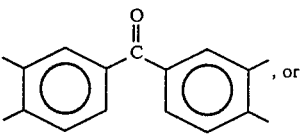

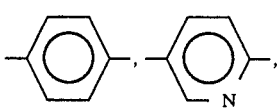

-continued

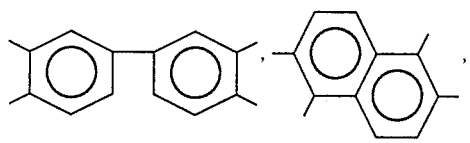

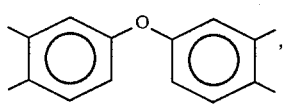

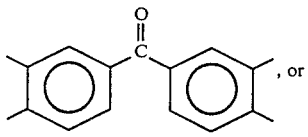

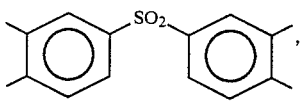

and Ar⁵ is

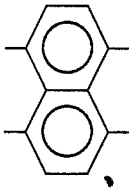

the carbon atoms being bonded to $Ar^4$ and $Ar^5$, and the nitrogen atoms being bonded to $Ar^1$ and $Ar^5$, n being a positive integer; $c_k m'/m+m'$ represents the molar proportions of the respective different recurring units present in said block polymer, $y_k$ represents an average number of the respective different sequential recurring units present in said block polymer, $a_i b_j m/m+m'$ represents the molar proportions of the respective different recurring units present in said block polymer, $y_{ij}$ represents an average number of the respective different sequential recurring units present in said block polymer, n being a positive integer;

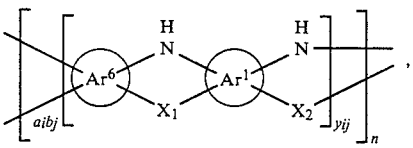

XVI wherein $Ar^1$ is

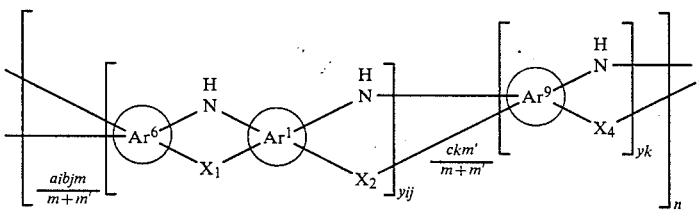

$Ar^6$ is $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_i b_j$ represents the molar proportions of the respective different recurring units present in said block polymer, $y_{ij}$ represents an average number of the respective different sequential recurring units present in said block polymer, n being a positive integer;

XVII wherein $Ar^1$ is

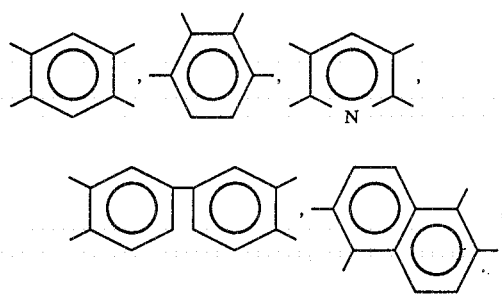

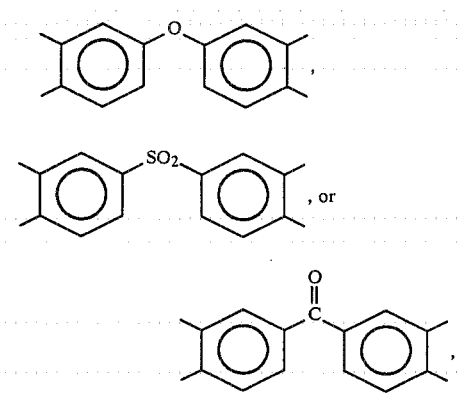

Ar⁶ is

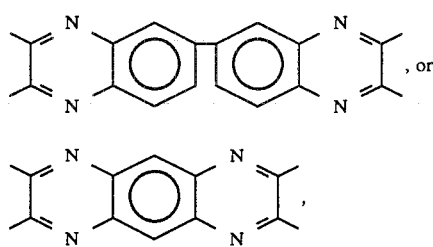

$X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_ib_jm/m+m'$ represents the molar proportions of the respective different recurring units present in said block polymer, $y_{ij}$ represents an average number of the respective different sequential recurring units present in said block polymer. $Ar^9$ is

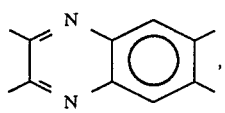

$X_4$ is sulfur, oxygen, or NR (R being hydrogen or an organic group), the NH groups and $X_4$ being bonded to aromatic carbon atoms of $Ar^6$ and $Ar^9$, $c_km'/m+m'$ represents the molar proportions of the respective different recurring units present in said block polymer, $y_k$ represents an average number of the respective different sequential recurring units present in said block polymer, n being a positive integer; or

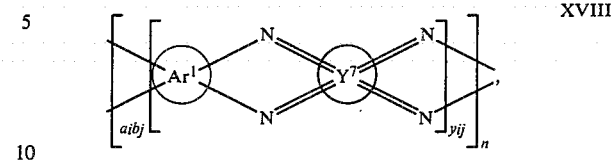

wherein $Ar^1$ is

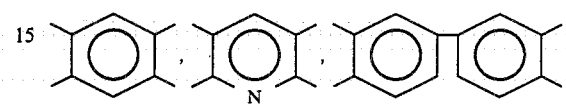

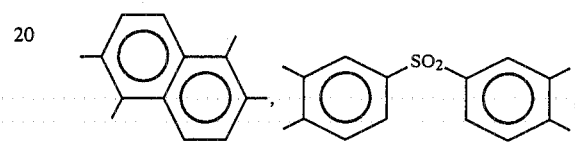

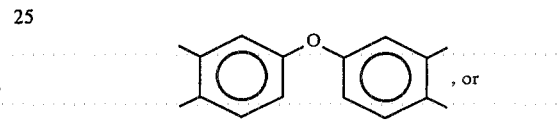

$Y^7$ is

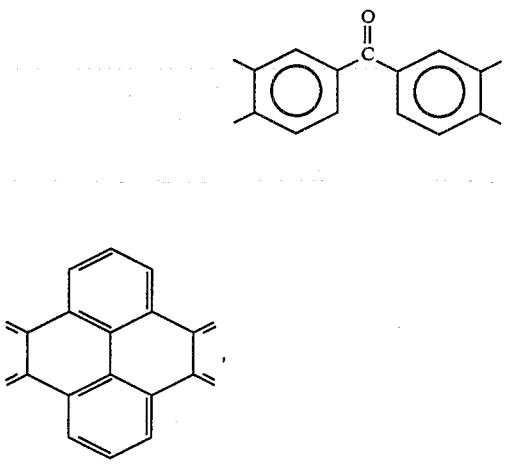

the nitrogen atoms being bonded to aromatic carbon atoms of $Ar^1$ and bonded to adjacent carbon atoms of $Y^7$, $a_ib_j$ represents the molar proportions of the respective different recurring units present in said block polymer, $y_{ij}$ represents an average number of the respective different sequential recurring units present in said block polymer, n being a positive integer.

69. A polymer of claim 1, wherein said polymer is an extended chain crystalline block polymer having the general formula:

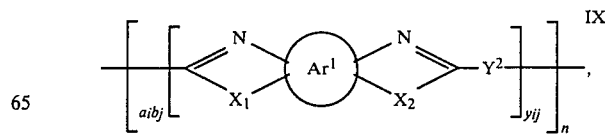

wherein $Ar^1$ is

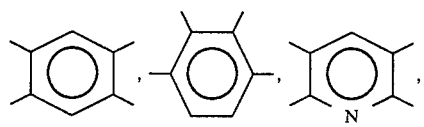
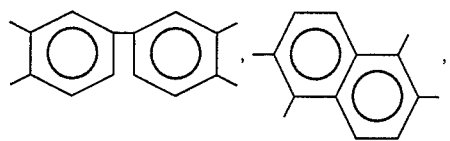
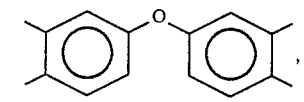
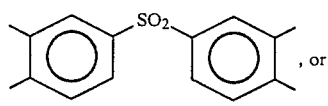
, or
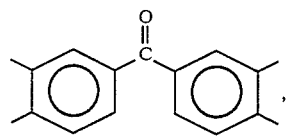
$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is
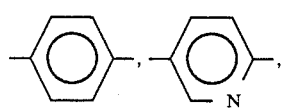
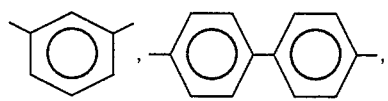
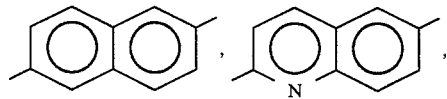
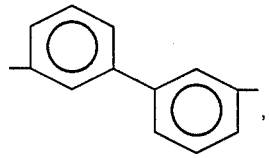
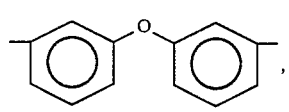
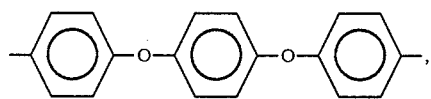
-continued
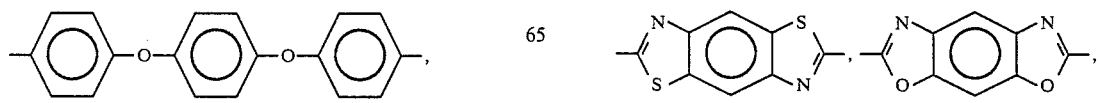

-continued

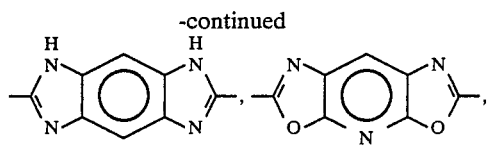

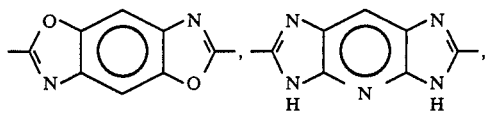

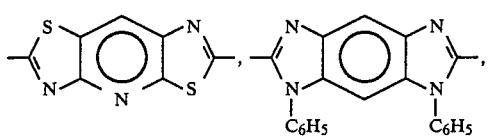

$+CH_2)_2$, $+CH_2)_4$, $+CH_2)_5$,

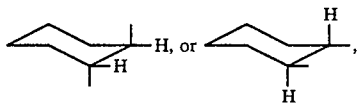

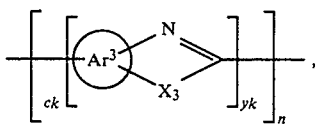

$a_ib_j$ represents the molar proportions of the respective different recurring units present in said block polymer, $y_{ij}$ represents an average number of the respective different sequential recurring units present in said block polymer, n being a positive integer.

70. A polymer of claim 1, wherein said polymer is an extended chain crystalline block polymer having the general formula:

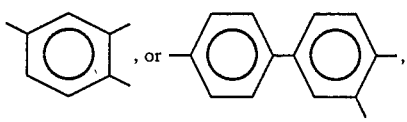
XI wherein $Ar^3$ is

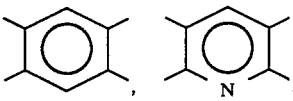

$X_3$ is sulfur, oxygen, or NR (R being hydrogen or an organic group), the nitrogen atom and $X_3$ being bonded to aromatic carbon atoms of $Ar^3$, N and $X_3$ of each hetero ring are disposed ortho to one another, $c_k$ represents the molar proportions of the respective different recurring units present in said block polymer, $y_k$ represents an average number of the respective different sequential recurring units present in said block polymer, n being a positive integer.

71. A polymer of claim 1, wherein said polymer is an extended chain crystalline block polymer having the general formula:

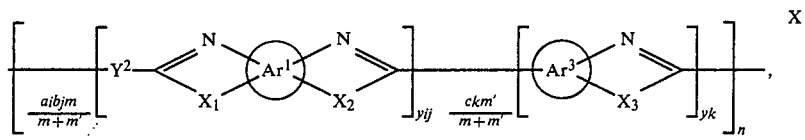
X wherein $Ar^1$ is

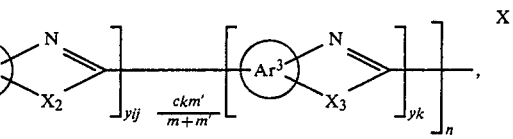

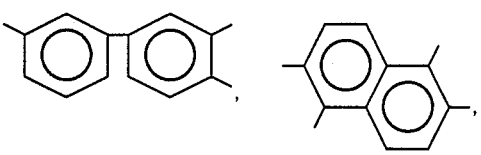

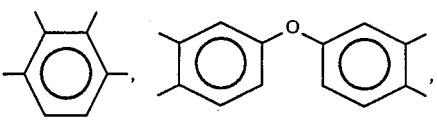

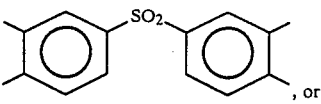, or

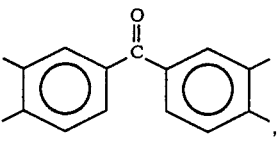

$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

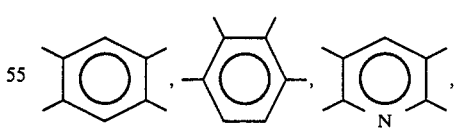

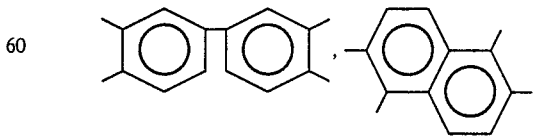

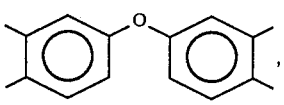

-continued

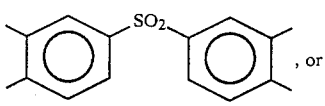, or

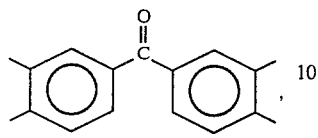, $a_ib_jm/m+m'$ represents the molar proportions of the respective different recurring units present in said block polymer, $y_{ij}$ represents an average number of the respective different sequential recurring units present in said block polymer, $Ar^3$ is

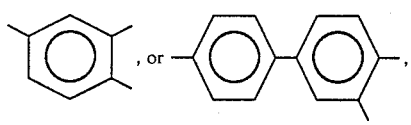, or $X_3$ is sulfur, oxygen, or NR (R being hydrogen or an organic group), the nitrogen atom and $X_3$ being bonded to aromatic carbon atoms of $Ar^3$, N and $X_3$ of each hetero ring are disposed ortho to one another, $c_km'/m+m'$ represents the molar proportions of the respective different recurring units present in said block polymer, $y_k$ represents an average number of the respective different sequential recurring units present in said block polymer, n being a positive integer.

72. A polymer of claim 1, wherein said polymer is an extended chain crystalline block polymer having the general formula:

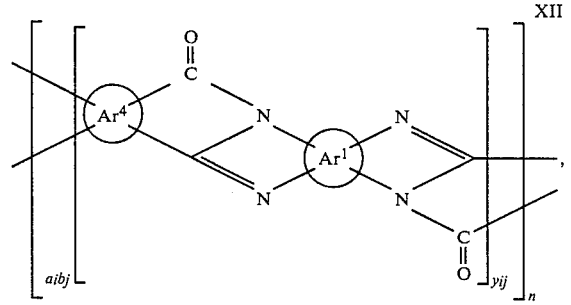 XII wherein $Ar^1$ is

5

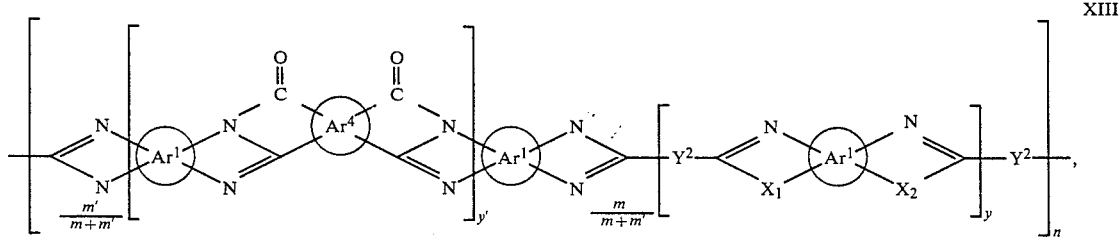

$Ar^4$ is the nitrogen atoms being bonded to $Ar^1$ and the carbon atoms being bonded to $Ar^4$, $a_ib_j$ represents the molar proportions of the respective different recurring units present in said block polymer, $y_{ij}$ represents an average number of the respective different sequential recurring units present in said block polymer, n being a positive integer.

73. A polymer of, claim 1, wherein said polymer is an extended chain crystalline block polymer having the general formula:

XIII wherein $Ar^1$ is

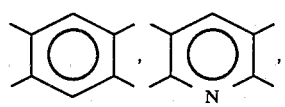

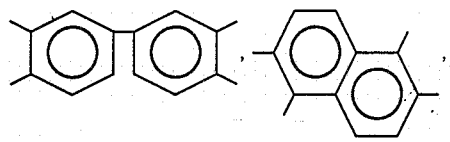

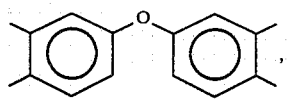

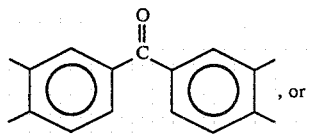

, or

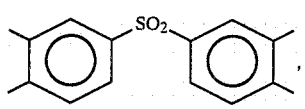

when bonded to nitrogen atoms; and when $Ar^1$ is bonded to both nitrogen atoms and $X_1$ and $X_2$, $Ar^1$ is

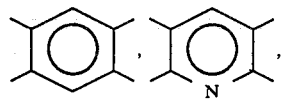

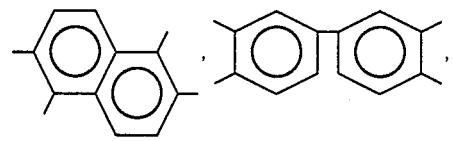

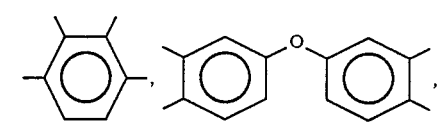

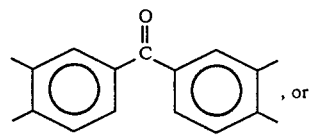

, or

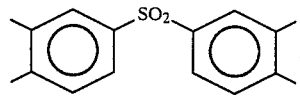

$Ar^4$ is

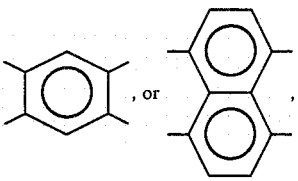, or 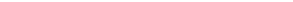, the nitrogen atoms being bonded to $Ar^1$ and the carbon atoms being bonded to $Ar^4$, $m'/m+m'$ represents the molar proportions of the respective different recurring units present in said block polymer, $y'$ represents an average number of the respective different sequential recurring units present in said block polymer, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

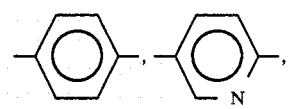

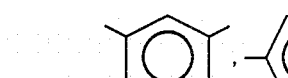

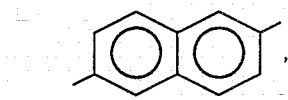

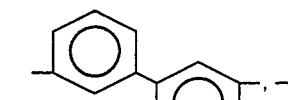

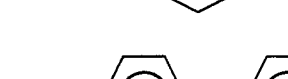

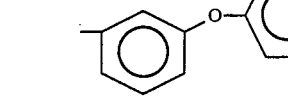

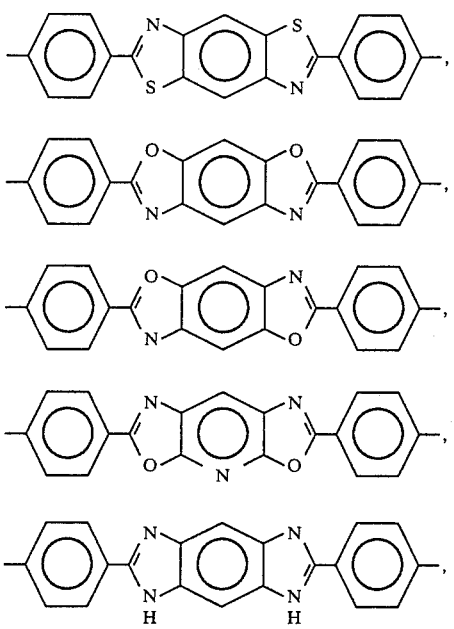
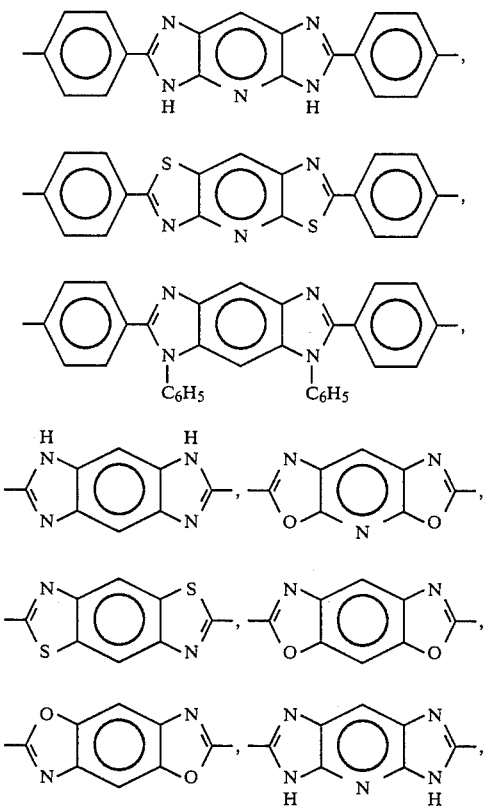

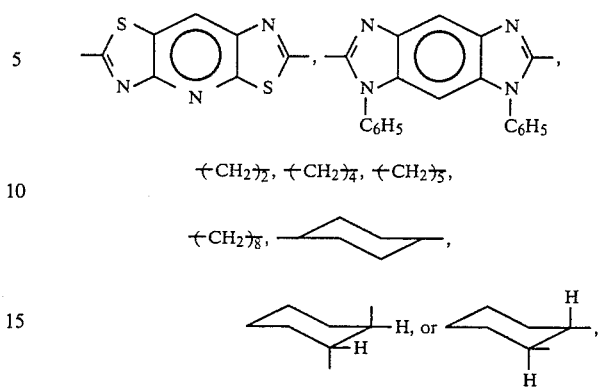

$-(CH_2)_2-$, $-(CH_2)_4-$, $-(CH_2)_5-$, $-(CH_2)_8-$, 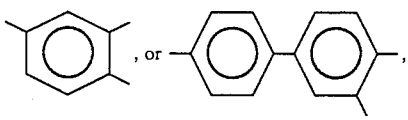, m/m+m' represents the molar porportions of the respective different recurring units present in said block polymer, y represents an average number of the respective different sequential recurring units present in said block polymer, n being a positive integer.

74. A polymer of claim 1, wherein said polymer is an extended chain crystalline block polymer having the general formula:

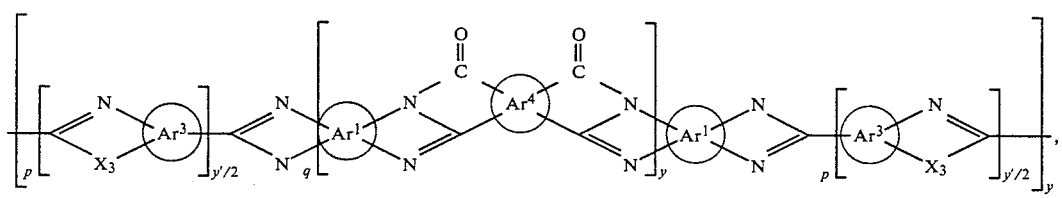 XIV wherein Ar³ is

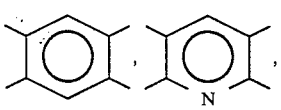

$X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, p represents the molar proportions of the respective different recurring units present in said block polymer, y'/2 represents an average number of the respective different sequential recurring units present in said block polymer, $Ar^1$ is

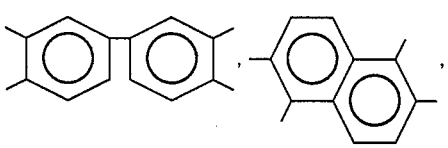

-continued

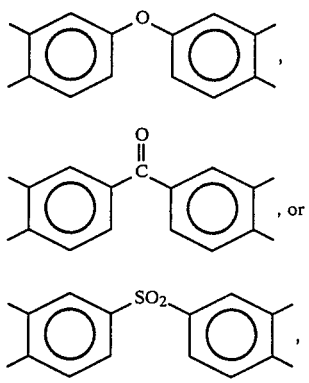, or

Ar⁴ is

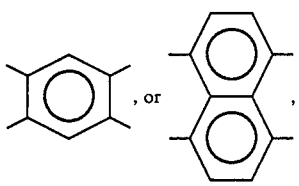, or the nitrogen atoms being bonded to Ar¹ and the carbon atoms being bonded to Ar⁴, q represents the molar proportions of the respective different recurring units present in said block polymer, y represents an average number of the respective different sequential recurring units present in said block polymer, n being a positive integer.

75. A polymer of claim 1, wherein said polymer is an extended chain crystalline block polymer having the general formula:

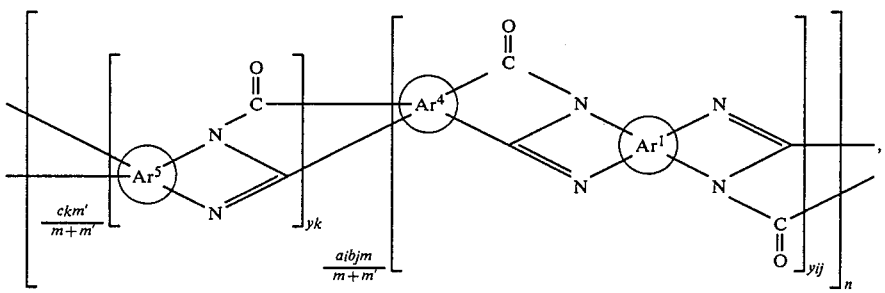 XV wherein Ar⁴ is

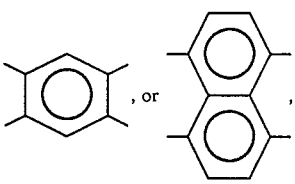, or

Ar¹ is

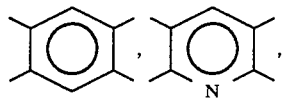,

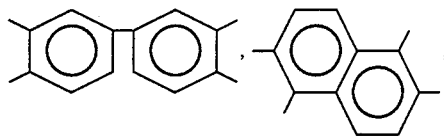,

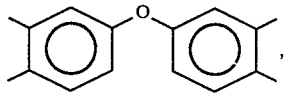,

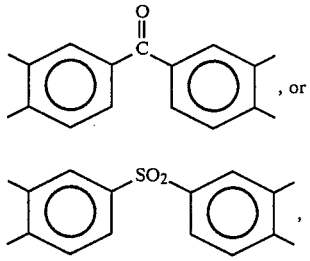, or and Ar⁵ is

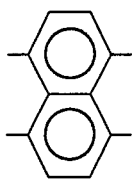, the carbon atoms being bonded to Ar⁴ and Ar⁵, and the nitrogen atoms being bonded to Ar¹ and Ar⁵, n being a positive integer; $c_k m'/m+m'$ represents the molar proportions of the respective different recurring units present in said block polymer, $y_k$ represents an average number of the respective different sequential recurring units present in said block polymer, $a_i b_j m/m+m'$ represents the molar proportions of the respective different recurring units present in said block polymer, $y_{ij}$ represents an average number of the respective different sequential recurring units present in said block polymer, n being a positive integer.

76. A polymer of claim 1, wherein said polymer is an extended chain crystalline block polymer having the general formula:

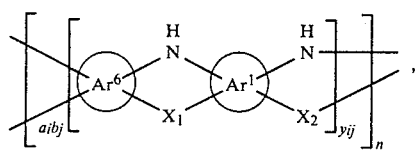
XVI wherein $Ar^1$ is

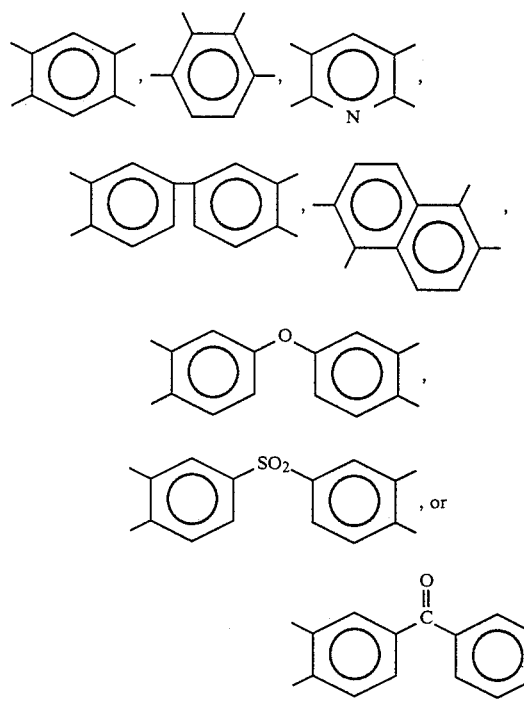

$Ar^6$ is

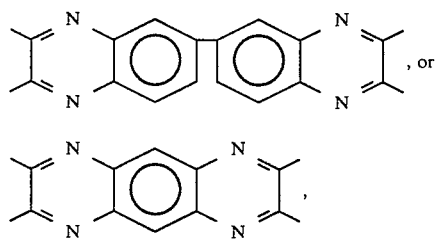

$X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_ib_j$ represents the molar proportions of the respective different recurring units present in said block polymer, $y_{ij}$ represents an average number of the respective different sequential recurring units present in said block polymer, n being a positive integer.

77. A polymer of claim 1, wherein said polymer is an extended chain crystalline block polymer having the general formula:

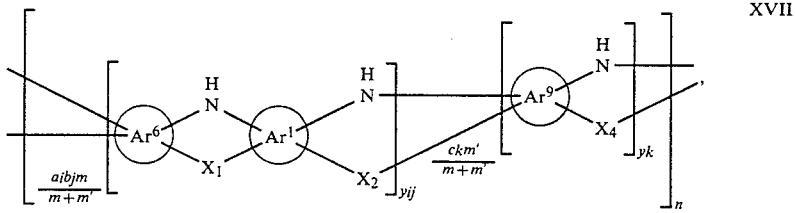
XVII wherein $Ar^1$ is

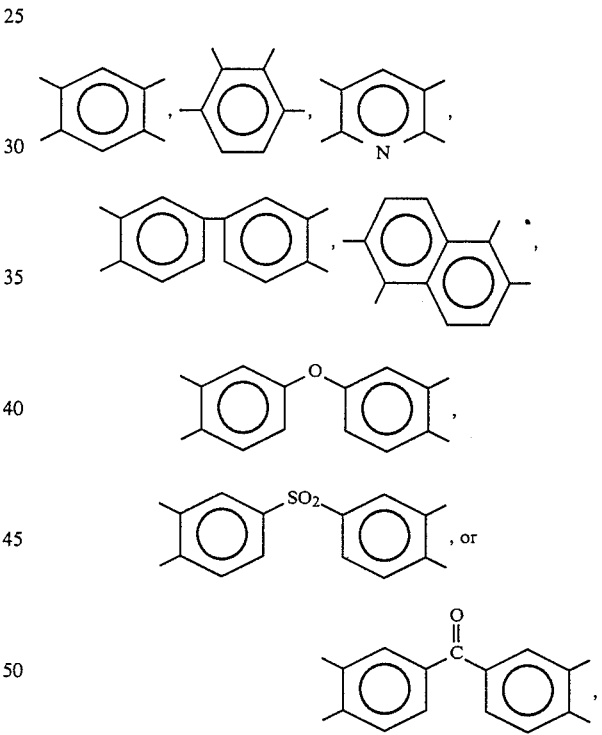

$Ar^6$ is

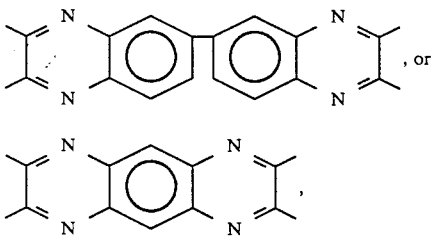

$X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_ib_jm/m+m'$ represents the molar proportions of the respective different recurring units present in said block polymer, $y_{ij}$ represents an average number of the respective different sequential recurring units present in said block polymer, $Ar^9$ is

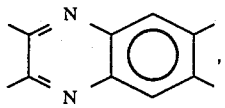

$X_4$ is sulfur, oxygen, or NR (R being hydrogen or an organic group), the NH groups and $X_4$ being bonded to aromatic carbon atoms of $Ar^6$ and $Ar^9$, $c_k m'/m+m'$ represents the molar proportions of the respective different recurring units present in said block polymer, $y_k$ represents an average number of the respective different sequential recurring units present in said block polymer, n being a positive integer.

78. A polymer of claim 1, wherein said polymer is an extended chain crystalline block polymer having the general formula:

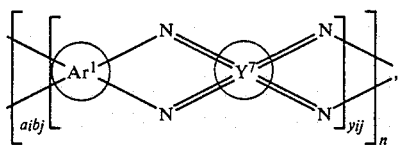 XVIII wherein $Ar^1$ is

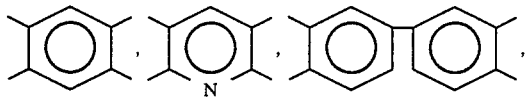

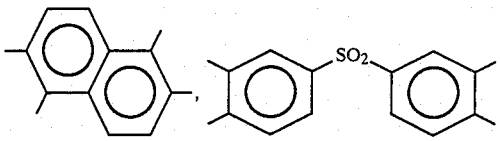

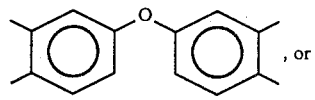, or

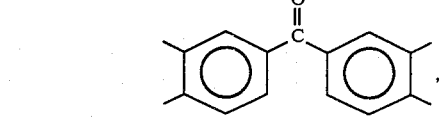

$Y^7$ is

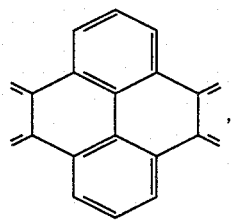

the nitrogen atoms being bonded to aromatic carbon atoms of $Ar^1$ and bonded to adjacent carbon atoms of $Y^7$, $a_ib_j$ represents the molar proportions of the respective different recurring units present in said block polymer, $y_{ij}$ represents an average number of the respective different sequential recurring units present in said block polymer, n being a positive integer.

79. A polymer of claim 1, wherein said polymer is a formula IX extended chain crystalline block polymer having the formulas:

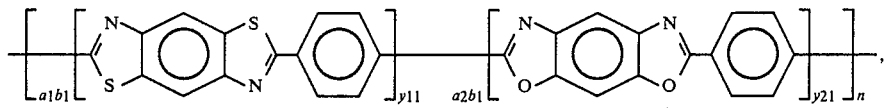

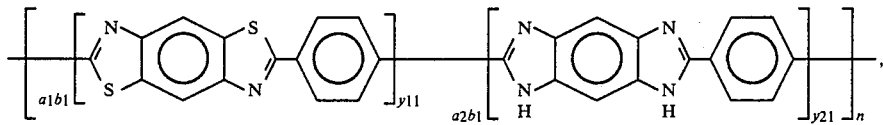

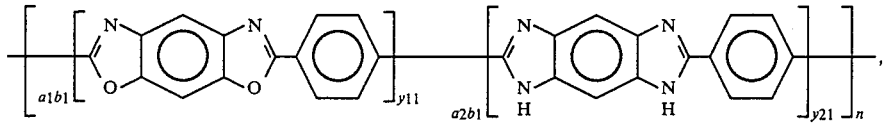

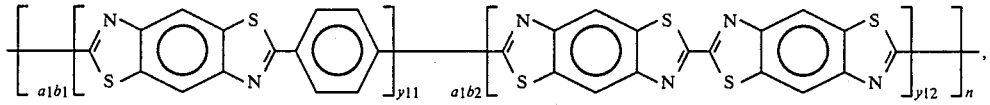

-continued

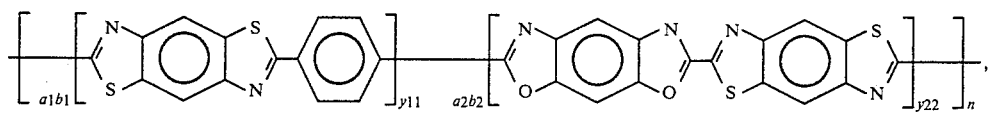

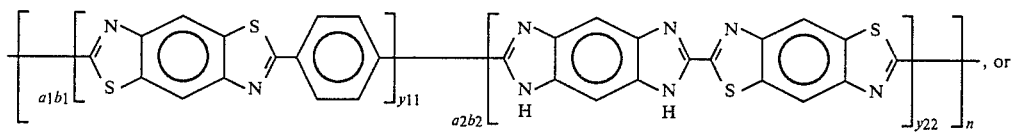

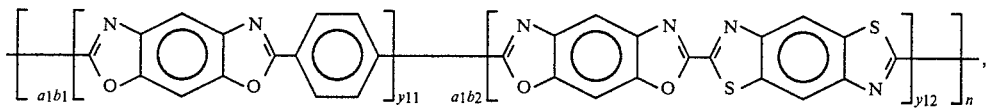

wherein $a_1b_1$, $a_1b_2$, $a_2b_1$, and $a_2b_2$ are the said molar proportions of the respective different recurring units, $a_1b_1$ being between zero and one, $a_1b_2$ or $a_2b_1$ or $a_2b_2$ being equal to $1-a_1b_1$; wherein $y_{11}$, $y_{12}$, $y_{21}$, and $y_{22}$ are the said average number of the respective different sequential recurring units, $y_{11}$ being greater than about 20 and less than about 75, $y_{12}$ or $y_{21}$ or $y_{22}$ being greater than one and less than about 75, n being an average number of total recurring units greater than about 50 and less than about 150.

80. A polymer of claim 1, wherein said polymer is a formula IX extended chain crystalline block polymer having the formulas:

wherein $a_1b_1$ and $a_2b_1$ are the said molar proportions of the respective different recurring units, $a_1b_1$ being between zero and one, $a_2b_1$ being equal to $1-a_1b_1$; wherein $y_{11}$ and $y_{21}$ are the said average number of the respective different sequential recurring units, $y_{11}$ being greater than about 20 and less than about 75, $y_{21}$ being greater than one and less than about 75, n being an average number of total recurring units greater than about 50 and less than about 150.

81. A polymer of claim 1, wherein said polymer is a formula IX extended chain crystalline block polymer having the formulas:

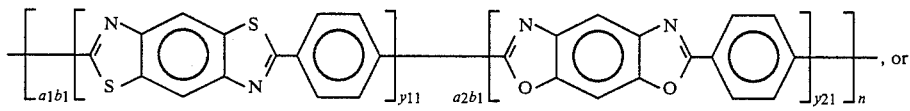

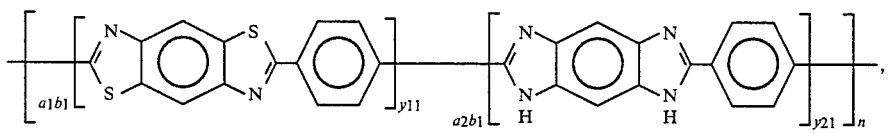

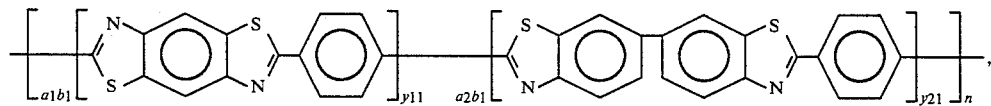

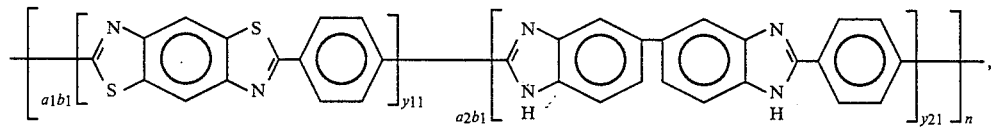

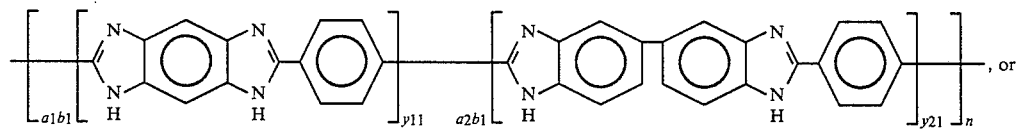

-continued

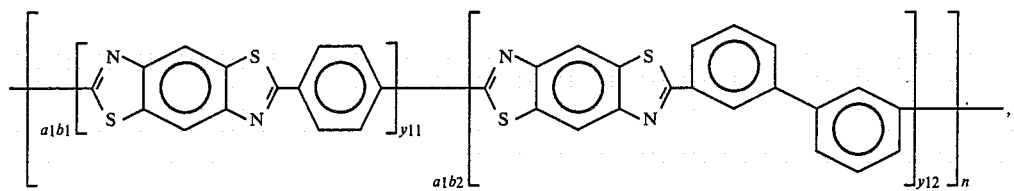

wherein $a_1b_1$, $a_1b_2$ and $a_2b_1$ are the said molar proportions of the respective different recurring units, $a_1b_1$ being between about 0.5 and one, $a_1b_2$ or $a_2b_1$ being equal to $1-a_1b_1$; wherein $y_{11}$, $y_{12}$ and $y_{21}$ are the said average number of the respective different sequential recurring units, $y_{11}$ being greater than about 20 and less than about 75, $y_{12}$ or $y_{21}$ being greater than one and less than about 75, n being an average number of total recurring units greater than about 50 and less than about 150.

82. A polymer of claim 1, wherein said polymer is a formula IX extended chain crystalline block polymer having the formulas:

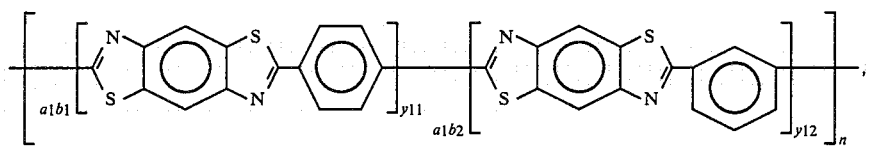

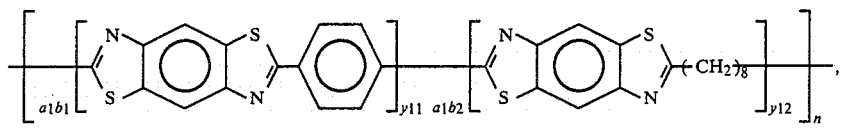

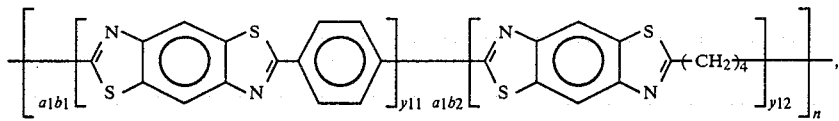

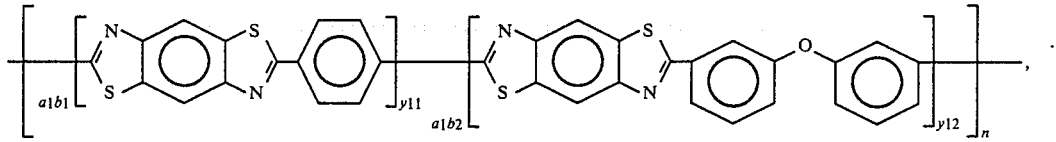

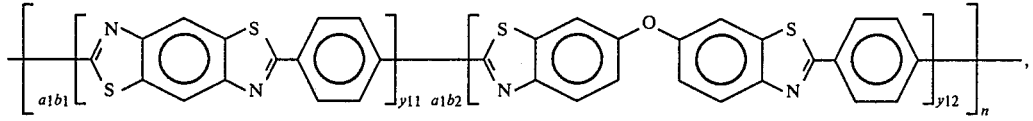

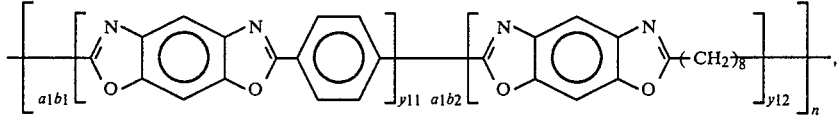

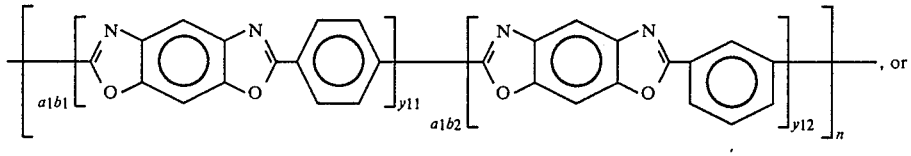, or

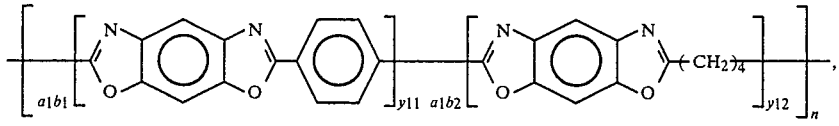

wherein $a_1b_1$, $a_1b_2$ and $a_2b_1$ are the said molar proportions of the respective different recurring units, $a_1b_1$ being between about 0.6 and one, $a_1b_2$ or $a_2b_1$ being equal to $1-a_1b_1$; wherein $y_{11}$ and $y_{12}$ or $y_{21}$ are the said average number of the respective different sequential recurring units, $y_{11}$ being greater than about 30, $y_{12}$ or $y_{21}$ being greater than one and less than about 50, n being an average number of total recurring units greater than about 50 and less than about 150.

83. A polymer of claim 1, wherein said polymer is a formula XI extended chain crystalline block polymer having the formulas:

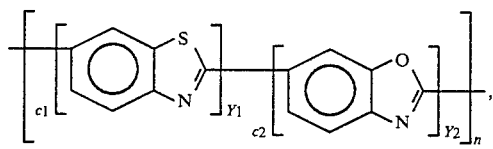

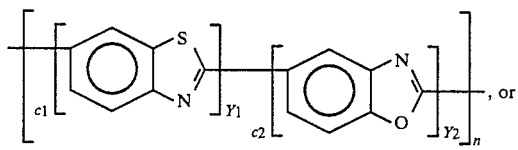

wherein $c_1$ and $c_2$ are the said molar proportions of the respective different recurring units, $c_1$ being between about 0.5 and one, $c_2$ being equal to $1-c_1$; wherein $y_1$ and $y_2$ are the said average number of the respective different sequential recurring units, $y_1$ being greater than about 30 and less than about 100, $y_2$ being greater than one and less than about 50, n being an average number of total recurring units greater than about 60 and less than about 200.

84. A polymer of claim 1, wherein said polymer is a formula X extended chain crystalline block polymer having the formulas:

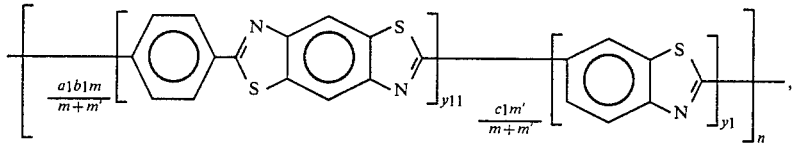

wherein $a_1b_1m/m+m'$ and $c_1m'/m+m'$ are the said molar proportions of the respective different recurring units, $a_1b_1m/m+m'$ being between zero and about 0.5, $c_1m'/m+m'$ being equal to $1-a_1b_1m/m+m'$; wherein $y_{11}$ and $y_1$ are the said average number of the respective different sequential recurring units, $y_{11}$ being greater than one and less than about 75, $y_1$ being greater than about 30 and less than about 75, n being an average number of total recurring units greater than about 75 and less than about 150.

85. A polymer of claim 1, wherein said polymer is a formula X extended chain crystalline block polymer having the formulas:

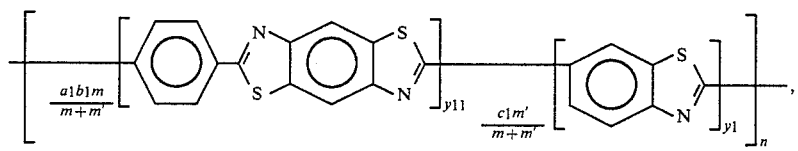

wherein $a_1b_1m/m+m'$ and $c_1m'/m+m'$ are the said molar proportions of the respective different recurring units, $a_1b_1m/m+m'$ being between about 0.5 and one, $c_1m'/m+m'$ being equal to $1-a_1b_1m/m+m'$; wherein $y_{11}$ and $y_1$ are the said average number of the respective different sequential recurring units, $y_{11}$ being greater than about 30 and less than about 75, $y_1$ being greater than 5 and less than about 30, n being an average number of total recurring units greater than about 60 and less than about 150.

86. A polymer of claim 1, wherein said polymer is a formula X extended chain crystalline block polymer having the formulas:

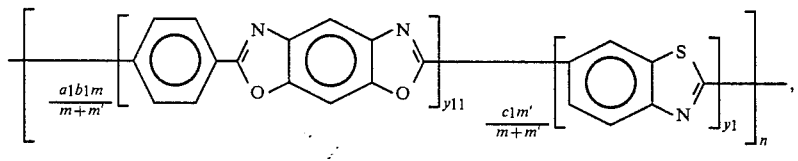

wherein $a_1b_1m/m+m'$ and $c_1m'/m+m'$ are the said molar proportions of the respective different recurring units, $a_1b_1m/m+m'$ being between zero and 0.5, $c_1m'/m+m'$ being equal to $1-a_1b_1m/m+m'$; wherein $y_{11}$ and $y_1$ are the said average number of the respective different sequential recurring units, $y_{11}$ being greater than about one and less than about 75, $y_1$ being greater than about 30 and less than about 75, n being an average number of total recurring units greater than about 75 and less than about 150.

87. A polymer of claim 1, wherein said polymer is a formula X extended chain crystalline block polymer having the formulas:

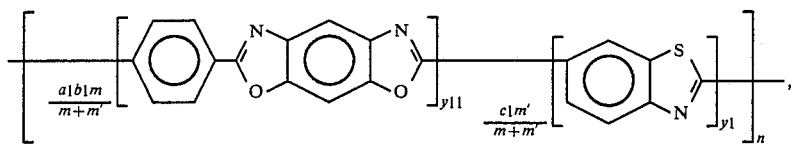

wherein $a_1b_1m/m+m'$ and $c_1m'/m+m'$ are the said molar proportions of the respective different recurring units, $a_1b_1m/m+m'$ being between about 0.5 and one, $c_1m'/m+m'$ being equal to $1-a_1b_1m/m+m'$; wherein $y_{11}$ and $y_1$ are the said average number of the respective different sequential recurring units, $y_{11}$ being greater than about 30 and less than about 75, $y_1$ being greater than 5 and less than about 30, n being an average number of total recurring units greater than about 60 and less than about 150.

88. A polymer of claim 1, wherein said polymer is a formula X extended chain crystalline block polymer having the formulas:

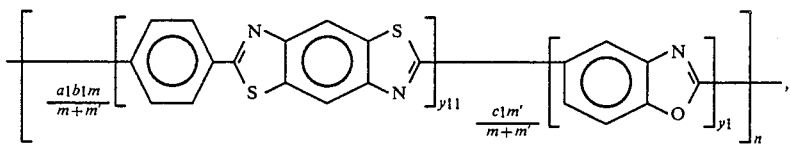

wherein $a_1b_1m/m+m'$ and $c_1m'/m+m'$ are the said molar proportions of the respective different recurring units, $a_1b_1m/m+m'$ being between zero and 0.5, $c_1m'/m+m'$ being equal to $1-a_1b_1m/m+m'$; wherein $y_{11}$ and $y_1$ are the said average number of the respective different sequential recurring units, $y_{11}$ being greater than about one and less than about 75, $y_1$ being greater than about 30 and less than about 75, n being an average number of total recurring units greater than about 75 and less than about 150.

89. A polymer of claim 1, wherein said polymer is a formula X extended chain crystalline block polymer having the formulas:

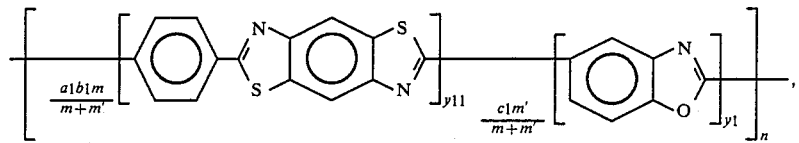

wherein $a_1b_1m/m+m'$ and $c_1m'/m+m'$ are the said molar proportions of the respective different recurring units, $a_1b_1m/m+m'$ being between about 0.5 and one, $c_1m'/m+m'$ being equal to $1-a_1b_1m/m+m'$; wherein $y_{11}$ and $y_1$ are the said average number of the respective different sequential recurring units, $y_{11}$ being greater than about 30 and less than about 75, $y_1$ being greater than 5 and less than about 30, n being an average number of total recurring units greater than about 60 and less than about 150.

90. A polymer of claim 1, wherein said polymer is a formula X extended chain crystalline block polymer having the formulas:

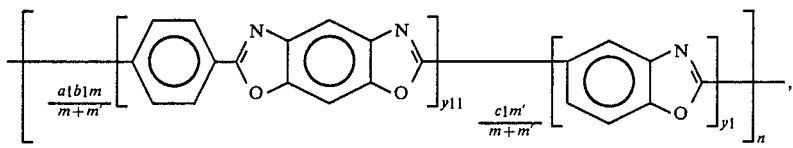

wherein $a_1b_1m/m+m'$ and $c_1m'/m+m'$ are the said molar proportions of the respective different recurring units, $a_1b_1m/m+m'$ being between zero and about 0.5, $c_1m'/m+m'$ being equal to $1-a_1b_1m/m+m'$; wherein $y_{11}$ and $y_1$ are the said average number of the respective different sequential recurring units, $y_{11}$ being greater than about one and less than about 75, $y_1$ being greater than about 30 and less than about 75, n being an average number of total recurring units greater than about 75 and less than about 150.

91. A polymer of claim 1, wherein said polymer is a formula X extended chain crystalline block polymer having the formulas:

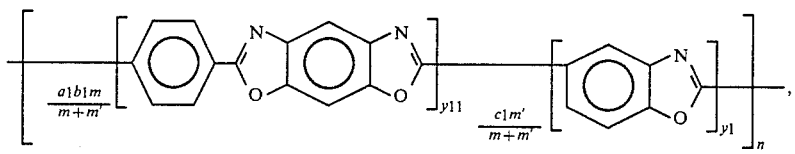

wherein $a_1b_1m/m+m'$ and $c_1m'/m+m'$ are the said molar proportions of the respective different recurring units, $a_1b_1m/m+m'$ being between about 0.5 and one, $c_1m'/m+m'$ being equal to $1-a_1b_1m/m+m'$; wherein $y_{11}$ and $y_1$ are the said average number of the respective different sequential recurring units, $y_{11}$ being greater than about 30 and less than about 75, $y_1$ being greater than 5 and less than about 30, n being an average number of total recurring units greater than about 60 and less than about 150.

92. A polymer of claim 1, wherein said polymer is a formula X extended chain crystalline block polymer having the formulas:

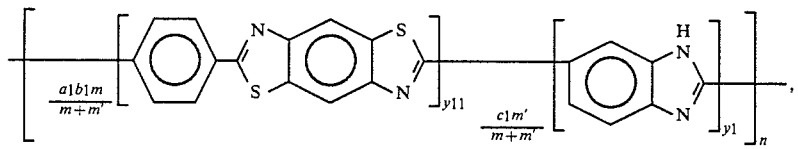

wherein $a_1b_1m/m+m'$ and $c_1m'/m+m'$ are the said molar proportions of the respective different recurring units, $a_1b_1m/m+m'$ being between about 0.5 and one, $c_1m'/m+m'$ being equal to $1-a_1b_1m/m+m'$; wherein $y_{11}$ and $y_1$ are the said average number of the respective different sequential recurring units, $y_{11}$ being greater than about 30 and less than about 75, $y_1$ being greater than 5 and less than about 30, n being an average number of total recurring units greater than about 60 and less than about 150.

93. A polymer of claim 1, wherein said polymer is a formula X extended chain crystalline block polymer having the formulas:

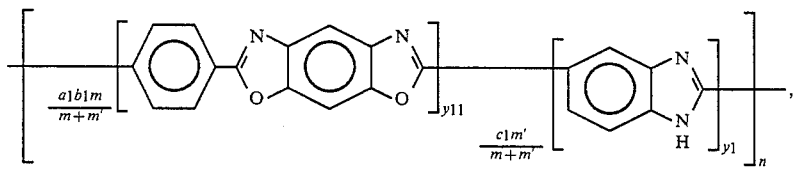

wherein $a_1b_1m/m+m'$ and $c_1m'/m+m'$ are the said molar proportions of the respective different recurring units, $a_1b_1m/m+m'$ being between about 0.5 and one, $c_1m'/m+m'$ being equal to $1-a_1b_1m/m+m'$; wherein $y_{11}$ and $y_1$ are the said average number of the respective different sequential recurring units, $y_{11}$ being greater than about 30 and less than about 75, $y_1$ being greater than 5 and less than about 30, n being an average number of total recurring units greater than about 60 and less than about 150.

94. A polymer of claim 1, wherein said polymer is a formula X extended chain crystalline block polymer having the formulas:

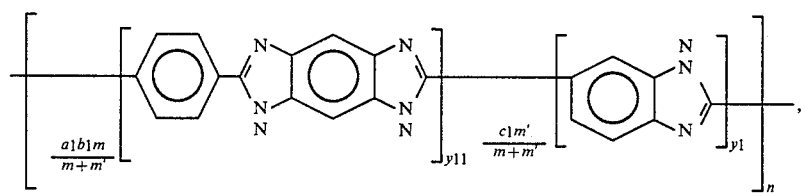

wherein $a_1b_1m/m+m'$ and $c_1m'/m+m'$ are the said molar proportions of the respective different recurring units, $a_1b_1m/m+m'$ being between about 0.5 and one, $c_1m'/m+m'$ being equal to $1-a_1b_1m/m+m'$; wherein $y_{11}$ and $y_1$ are the said average number of the respective different sequential recurring units, $y_{11}$ being greater than about 30 and less than about 75, $y_1$ being greater than 5 and less than about 30, n being an average number of total recurring units greater than about 60 and less than about 150.

95. A polymer of claim 1, wherein said polymer is a formula X extended chain crystalline block polymer having the formulas:

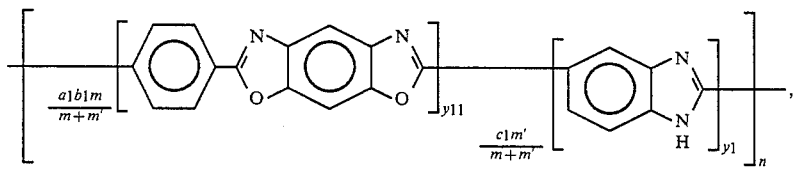

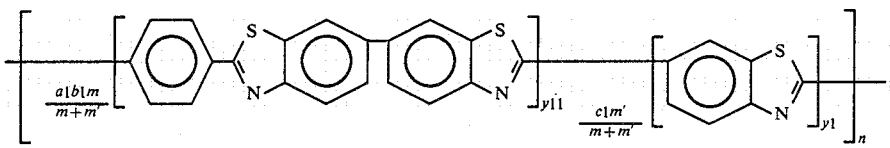

wherein a₁b₁m/m+m' and c₁m'/m+m' are the said molar proportions of the respective different recurring units, a₁b₁m/m+m' being between zero and one, c₁m'/m+m' being equal to 1-a₁b₁m/m+m'; wherein $y_{11}$ and $y_1$ are the said average number of the respective different sequential recurring units, $y_{11}$ being greater than about one, $y_1$ being greater than about 5, n being an average number of total recurring units greater than about 50 and less than about 200.

96. A polymer of claim 1, wherein said polymer is a formula X extended chain crystalline block polymer having the formulas:

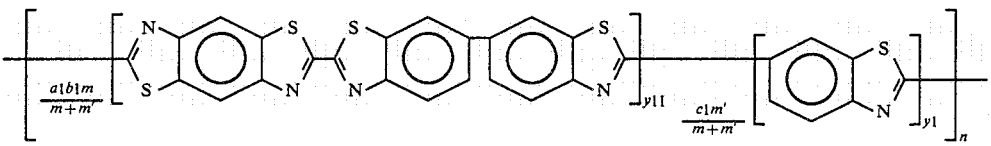

wherein a₁b₁m/m+m' and c₁m'/m+m' are the said molar proportions of the respective different recurring units, a₁b₁m/m+m' being between zero and one, c₁m'/m+m' being equal to 1-a₁b₁m/m+m'; wherein $y_{11}$ and $y_1$ are the said average number of the respective different sequential recurring units, $y_{11}$ being greater than about one, $y_1$ being greater than about 5, n being an average number of total recurring units greater than about 50 and less than about 200.

97. A polymer of claim 1, wherein said polymer is a formula X extended chain crystalline block polymer having the formulas:

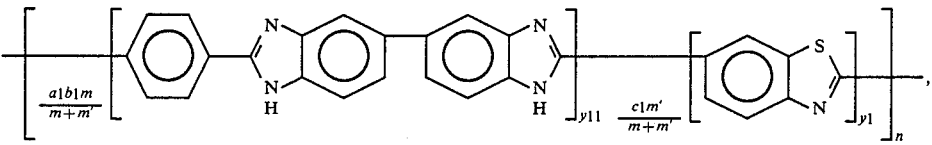

wherein a₁b₁m/m+m' and c₁m'/m+m' are the said molar proportions of the respective different recurring units, a₁b₁m/m+m' being between zero and about 0.5, c₁m'/m+m' being equal to 1-a₁b₁m/m+m'; wherein $y_{11}$ and $y_1$ are the said average number of the respective different sequential recurring units, $y_{11}$ being greater than about one and less than about 20, $y_1$ being greater than about 30, n being an average number of total recurring units greater than about 75 and less than about 150.

98. A polymer of claim 1, wherein said polymer is a formula XI extended chain crystalline block polymer having the formulas:

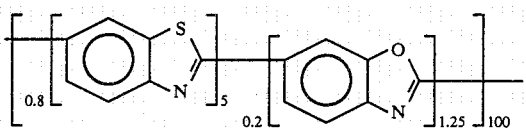

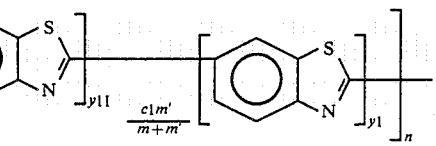

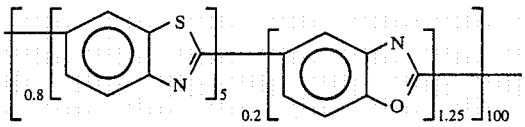

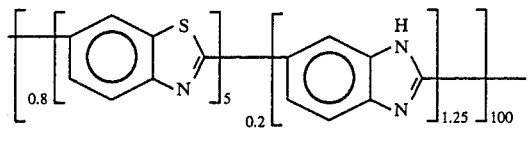

99. A polymer of claim 1, wherein said polymer is a formula IX extended chain crystalline block polymer having the formulas:

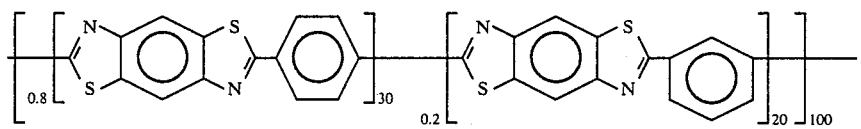

100. A polymer of claim 1, wherein said polymer is a formula IX extended chain crystalline block polymer having the formulas:

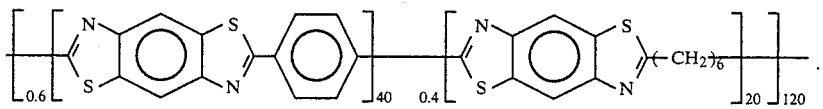
101. A polymer of claim 1, wherein said polymer is a formula IX extended chain crystalline block polymer having the formulas:
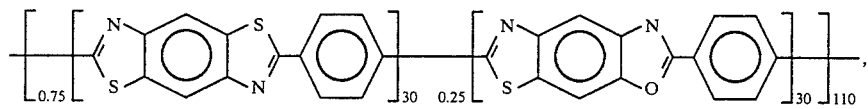
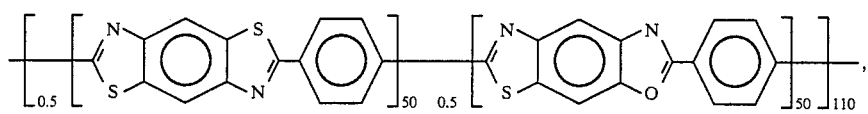
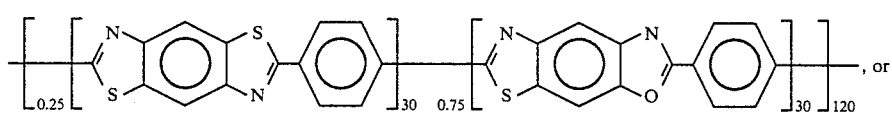
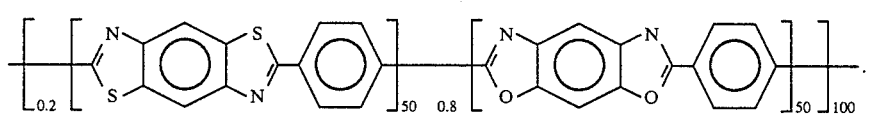
102. A polymer of claim 1, wherein said polymer is a formula IX extended chain crystalline block polymer having the formulas:
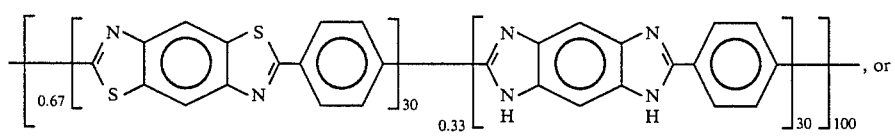
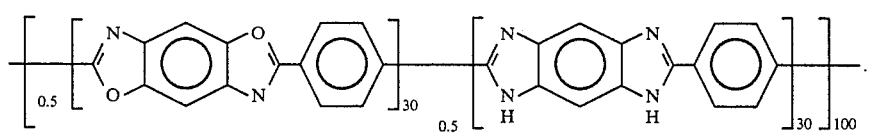
103. A polymer of claim 1, wherein said polymer is a formula IX extended chain crystalline block polymer having the formulas:
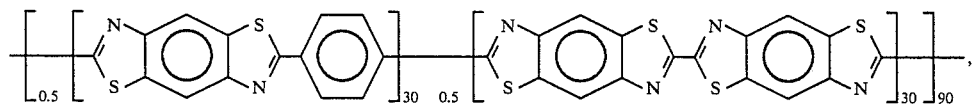
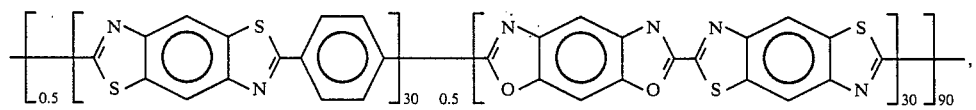
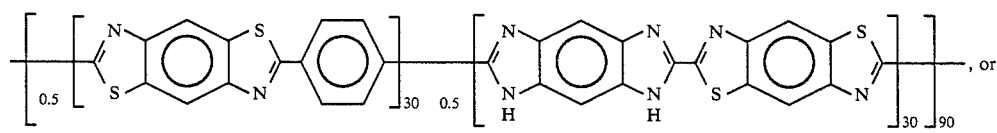

-continued

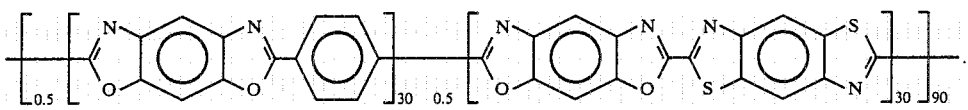

104. A polymer of claim 1, wherein said polymer is a formula IX extended chain crystalline block polymer having the formulas:

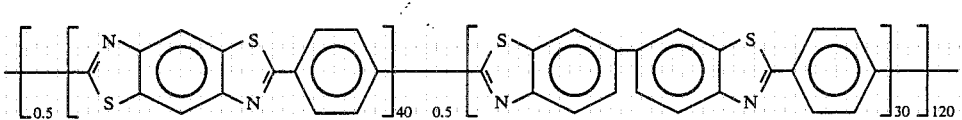

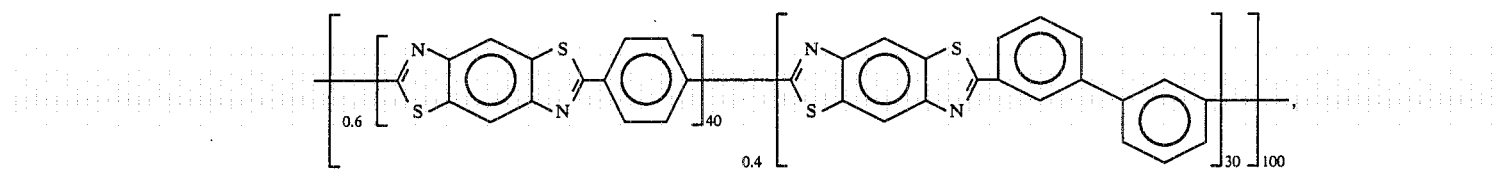

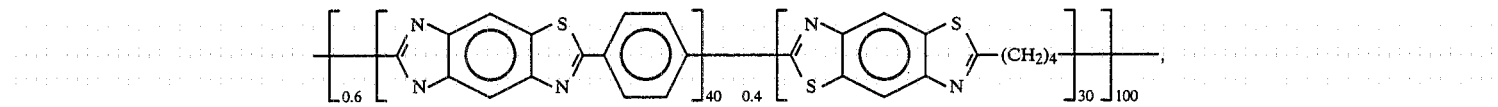

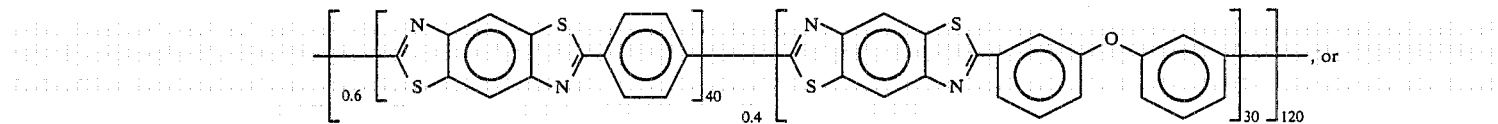

105. A polymer of claim 1, wherein said polymer is a formula IX extended chain crystalline block polymer having the formulas:

106. A polymer of claim 1, wherein said polymer is a formula IX extended chain crystalline block polymer having the formulas:

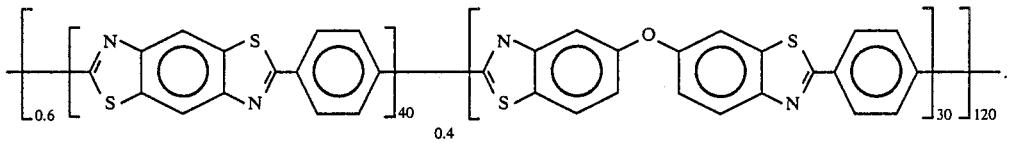

107. A polymer of claim 1, wherein said polymer is a formula IX extended chain crystalline block polymer having the formulas:

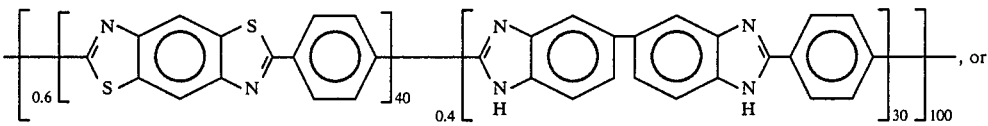

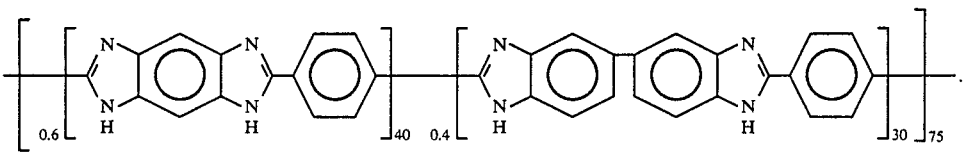

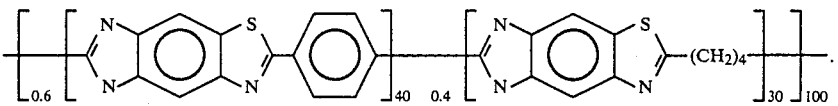

108. A polymer of claim 1, wherein said polymer is a formula IX extended chain crystalline block polymer having the formulas:

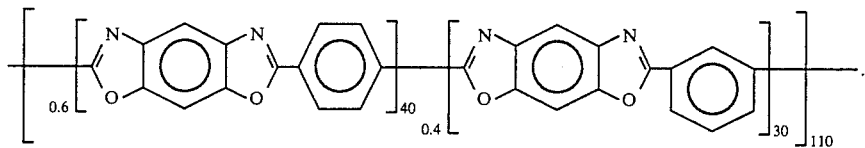

109. A polymer of claim 1, wherein said polymer is a formula IX extended chain crystalline block polymer having the formulas:

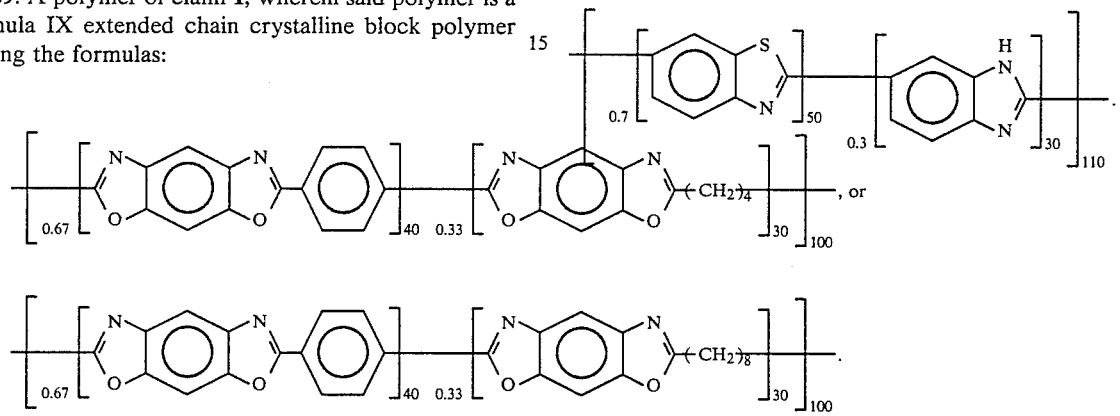

110. A polymer of claim 1, wherein said polymer is a formula XI extended chain crystalline block polymer having the formulas:

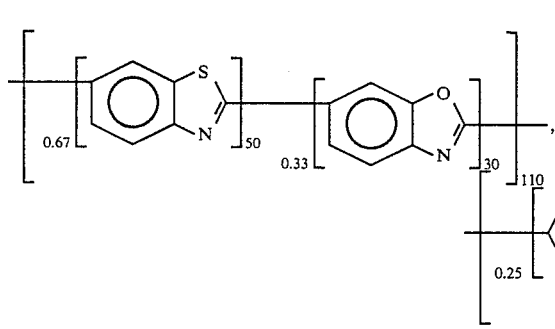

or

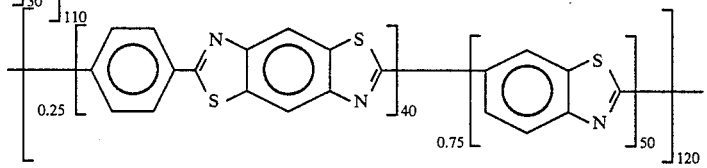

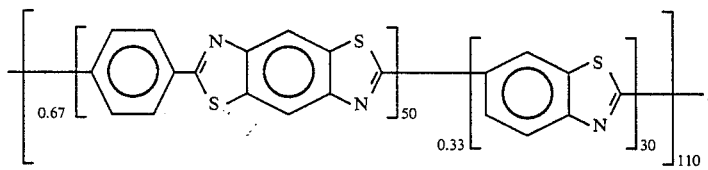

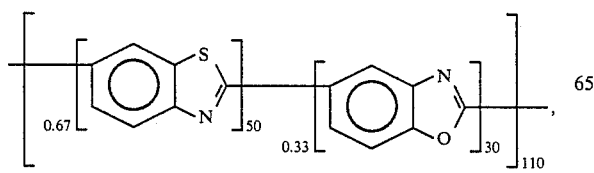

111. A polymer of claim 1, wherein said polymer is a formula X extended chain crystalline block polymer having the formulas:

112. A polymer of claim 1, wherein said polymer is a formula X extended chain crystalline block polymer having the formulas:

113. A polymer of claim 1, wherein said polymer is a formula X extended chain crystalline block polymer having the formulas:

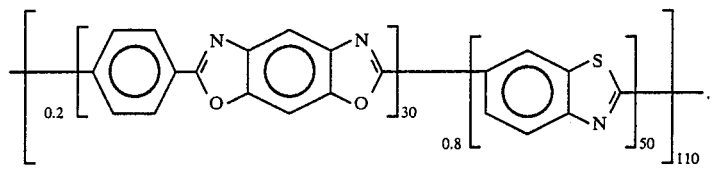
114. A polymer of claim 1, wherein said polymer is a formula X extended chain crystalline block polymer having the formulas:
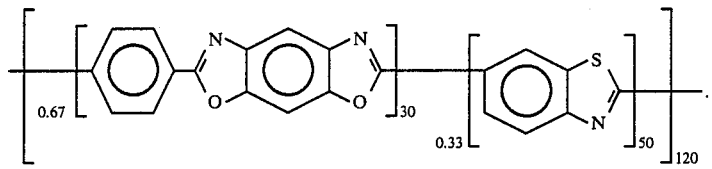
115. A polymer of claim 1, wherein said polymer is a formula X extended chain crystalline block polymer having the formulas:
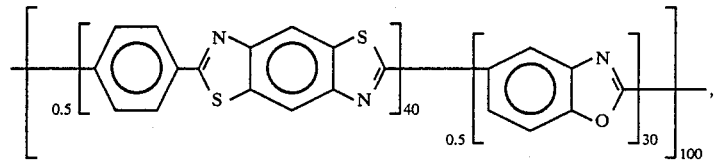
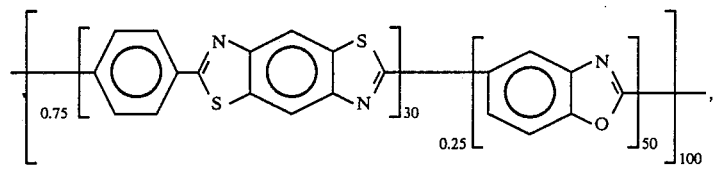
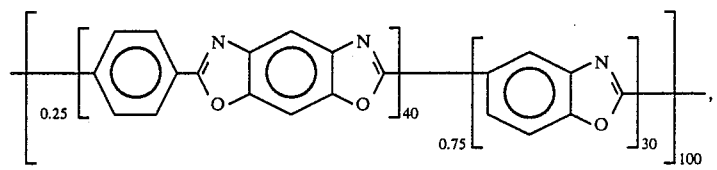
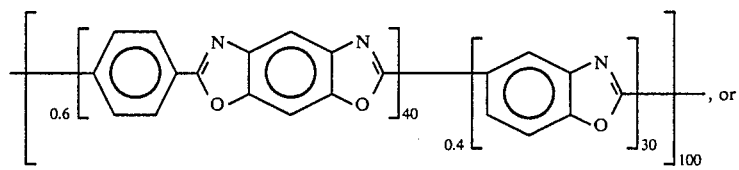
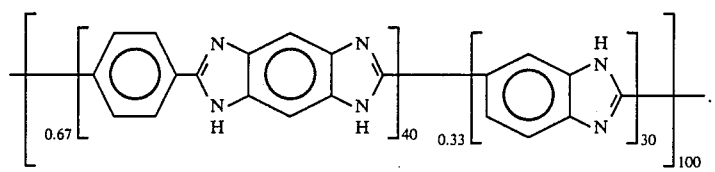
116. A polymer of claim 1, wherein said polymer is a formula X extended chain crystalline block polymer having the formulas:

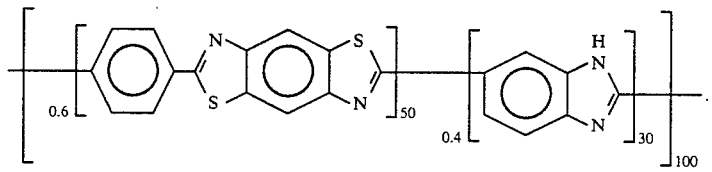

117. A polymer of claim 1, wherein said polymer is a formula X extended chain crystalline block polymer having the formulas:

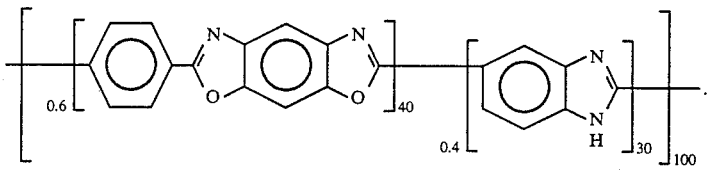

118. A polymer of claim 1, wherein said polymer is a formula X extended chain crystalline block polymer having the formulas:

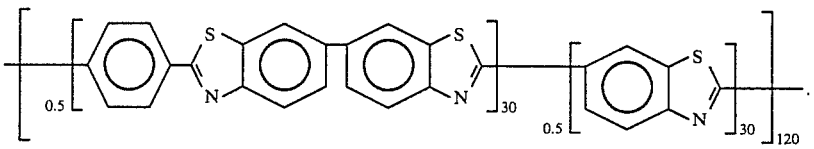

119. A polymer of claim 1, wherein said polymer is a formula X extended chain crystalline block polymer having the formulas:

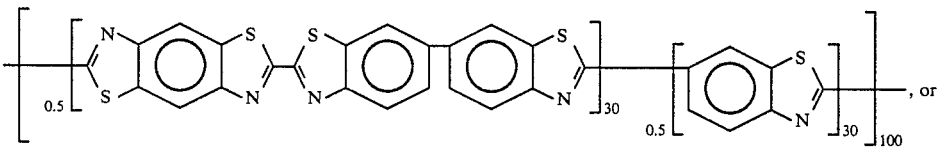

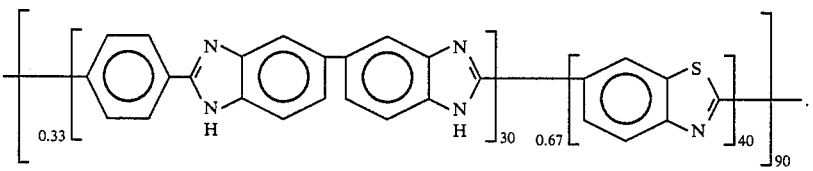

120. A process for preparing a liquid crystalline extended chain polymer composition of workable viscosity which is useful in the production of fibers and films comprising the following steps:

(a) mixing at least one of a selected first homo- or hetero- bifunctional monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a first mixture of the first monomer(s) in the preliminary solvent, (c) adding at least one of a selected second monomer in the resulting mixture of step (b) when said selected first monomer is a homo-bifunctional monomer so as to provide a first mixture of the first and second monomers in the preliminary solvent, (d) then increasing the phosphorus pentoxide content of the mixture resulting from step (b) or (c) to provide a first or a first and second monomer reaction medium of greater phosphorus pentoxide content suitable for polymerization and for achieving a degree of polymerization greater than about 40, (e) causing polymerization of the first or the first and second monomer(s) at a temperature sufficient to effect reaction at a rate to form a first homo-oligomeric product or a first co-oligomeric product having a preselected intrinsic viscosity, or (f) causing polymerization of the first or the first and second monomer(s) at a temperature sufficient to effect reaction at a rate to form a first homo-polymeric product or a first copolymeric product, (g) mixing a selected amount of the first homo-oligomeric product with a selected amount of at least one of a selected second homo-oligomeric product so as to form a first poly-oligomeric product, said second homo-oligomeric product being formed by like steps (a) and (b) followed by:

(1g) adding at least one of a selected second monomer in the resulting mixture of step (b) when said selected first monomer is a homo-bifunctional monomer so as to provide a mixture of a first and second monomer in the preliminary solvent, (2g) then increasing the phosphorus pentoxide content of the mixture resulting from step (b) or (1g) to provide a first or a first and second monomer reaction medium of greater phosphorus pentoxide content suitable for polymerization, (3g) causing polymerization of the first or first and second monomer(s) at a temperature sufficient to effect reaction at a rate to form said second homo-oligomeric product having a preselected intrinsic viscosity, with the overall proviso that at least one of the selected monomer(s) of step (a) or (1g) which forms the second homo-oligomeric product be different from at least one of the selected monomer(s) of step (a) or (c) which forms the first homo-oligomeric product, or (h) mixing a selected amount of the first homo-oligomeric product with a selected amount of a second mixture of at least one of a selected first monomer or a first and second monomer in the preliminary solvent so as to form a monomer-oligomer mixture, and then increasing the phosphorus pentoxide content of said monomer-oligomer mixture to provide a monomer-oligomer reaction medium of greater phosphorus pentoxide content suitable for polymerization, said first monomer of said second mixture being formed by like steps (a) and (b) and said first and second monomer of said second mixture being formed by like steps (a), (b) and (c), with the overall proviso that at least one of the selected monomer of step (a) or (c) which forms the first or first and second monomer(s) of said second mixture, be different from at least one of the selected monomer(s) of step (a) or (c) which forms the first homo-oligomeric product, (i) causing polymerization of the poly-oligomeric product resulting from step (g) or the monomer-oligomer resulting from step (h) at a temperature sufficient to effect reaction at a rate to form a first block-oligomeric product having a preselected intrinsic viscosity or a first blockpolymeric product.

121. A process for preparing a liquid crystalline extended chain polymer composition of workable viscosity which is useful in the production of fibers and films comprising the following steps:
(a) preparing a reaction medium suitable for polymerization, said reaction medium comprising at least one of a selected monomer and polyphosphoric acid; and
(b) causing polymerization of said monomer;
said step (a) being conducted substantially within the shaded phosphorus pentoxide content profile area bounded by ABCGHI of FIG. 14; and said step (b) being conducted substantially within the shaded phosphorus pentoxide content profile area bounded by DCGFE of FIG. 14.

122. A process according to claim 121, wherein a selected weight in grams, a* of said preliminary solvent of phosphoric acid having a relatively low phosphorus pentoxide content, $m_o$, is added in accordance with the empirical equation:

$$a^* = \{[1-f]([P_y/P_c]-P_y)-[n_o(18.02)/M_w]P_y\}(1-m_o)^{-1}$$

where
$P_y$ = weight in grams of a predetermined theoretical yield of said extended chain homopolymer, copolymer, or blockpolymer;
$P_c$ = preselected weight fraction of said extended chain homopolymer, copolymer, or blockpolymer of the total weight of said first homopolymeric product, said first copolymeric product, or said first block-polymeric product following polymerization;
$n_o$ = integer number of moles of polycondensation by-product per moles of repeating unit of said extended chain homopolymer, copolymer, or blockpolymer;
18.02 = molecular weight of polycondensation by-product;
$M_w$ = molecular weight of said extended chain homopolymer, copolymer, or blockpolymer recurring unit; and
f = preselected phosphorus pentoxide content of said first homo-oligomeric product, said first co-oligomeric product, said first homopolymeric product, said first copolymeric product, said second homo-oligomeric product, said second co-oligomeric product, said poly-oligomeric product, said first block-oligomeric product or said first block-polymeric product, said f being achieved by incorporating a selected intermediate weight in grams, b* of phosphorus pentoxide in said increasing phosphorus pentoxide content step forming said first monomer reaction medium, said first and second monomer reaction medium, said monomer-oligomer reaction medium, or said first oligomer-monomer reaction medium of greater phosphorus pentoxide content in accordance with the empirical equation:

$$b^* = [P_y/P_c]-P_y-[\{n_o(18.02)/M_w\}[P_y-a^*].$$

123. A process for preparing a liquid crystalline extended chain homopolymer composition of workable viscosity which is useful in the production of fibers and films comprising the following steps:
(a) mixing a selected first homo- or hetero- bifunctional monomer with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a first mixture of the first monomer in the preliminary solvent,
(c) adding a selected second monomer to the resulting mixture of step (b) when said selected first monomer is a homo-bifunctional monomer so as to provide a first mixture of the first and second monomer in the preliminary solvent,
(d) then increasing the phosphorus pentoxide content of the mixture resulting from step (b) or (c) to provide a first or a first and second monomer reaction medium of greater phosphorus pentoxide content suitable for polymerization and for achieving a degree of polymerization greater than about 40, (e) causing polymerization of the first or the first and second monomer(s) at a temperature sufficient to effect reaction at a rate to form a first homo-oligomeric product having a preselected intrinsic viscosity, or (f) causing polymerization of the first or the first and second monomer(s) at a temperature sufficient to effect reaction at a rate to form a first homopolymeric product.

124. A process according to claim 120 wherein said steps comprises:

(a) mixing at least one of a selected first homo- or hetero- bifunctional monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a first mixture of the first monomer(s) in the preliminary solvent, (c) adding at least one of a selected second monomer in the resulting mixtue of step (b) when said selected first monomer is a homo- bifunctional monomer so as to provide a first mixture of the first and second monomer in the preliminary solvent, (d) then increasing the phosphorus pentoxide content of the mixture resulting from step (b) or (c) to provide a first or a first and second monomer reaction medium of greater phosphorus pentoxide content suitable for polymerization and for achieving a degree of polymerization greater than about 40, (e) causing polymerization of the first or the first and second monomer(s) at a temperature sufficient to effect reaction at a rate to form a first co-oligomeric product having a preselected intrinsic viscosity, or (f) causing polymerization of the first or the first and second monomer(s) at a temperature sufficient to effect reaction at a rate to form a first copolymeric product.

125. A process for preparing a liquid crystalline extended chain block polymer composition of workable viscosity which is useful in the production of fibers and films comprising the following steps:

(a) mixing at least one of a selected first homo- or hetero-bifunctional monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a first mixture of the first monomer in the preliminary solvent, (c) adding at least one of a selected second monomer to the resulting mixture of step (b) when said selected first monomer is a homo-bifunctional monomer so as to provide a first mixture of the first and second monomers in the preliminary solvent, (d) then increasing the phosphorus pentoxide content of the mixture resulting from step (b) or (c) to provide a first or a first and second monomer reaction medium of greater phosphorus pentoxide content suitable for polymerization and for achieving a degree of polymerization greater than about 40, (e) causing polymerization of the first or the first and second monomer at a temperature sufficient to effect reaction at a ratio to form a first homo-oligomeric product or a first co-oligomeric product having a preselected intrinsic viscosity, or (f) mixing a selected amount of the first homo-oligomeric product with a selected amount of at least one of a selected second homo-oligomeric product so as to form a first poly-oligomeric product, said second homo-oligomeric product being formed by like steps (a) and (b) followed by:

(1f) adding at least one of a selected second monomer in the resulting mixture of step (b) when said selected first monomer is a homo-bifunctional monomer so as to provide a mixture of a first and second monomer in the preliminary solvent, (2f) then increasing the phosphorus pentoxide content of the mixture resulting from step (b) or (1f) to provide a first or a first and second monomer reaction medium of greater phosphorus pentoxide content suitable for polymerization, (3f) causing polymerization of the first or first and second monomer(s) at a temperature sufficient to effect reaction at a rate to form said second homo-oligomeric product having a preselected intrinsic viscosity, with the overall proviso that at least one of the selected monomer of step (a) or (1f) which forms the second homo-oligomeric product be different from at least one of the selected monomer of step (a) or (c) which forms the first homo-oligomeric product, or (g) mixing a selected amount of the first homo-oligomeric product with a selected amount of a second mixture of at least one of a selected first monomer or a first and second monomer in the preliminary solvent so as to form a monomer-oligomer mixture, and then increasing the phosphorus pentoxide content of said monomer-oligomer mixture to provide a monomer-oligomer reaction medium of greater phosphorus pentoxide content suitable for polymerization, said first monomer of said second mixture being formed by like steps (a) and (b) and said first and second monomer of said second mixture being formed by like steps (a), (b) and (c), with the overall proviso that at least one of the selected monomer of step (a) or (c) which forms the first or first and second monomer of said second mixture, be different from at least one of the selected monomer of step (a) or (c) which forms the first homo-oligomeric product, (h) causing polymerization of the poly-oligomeric product resulting from step (f) or the monomer-oligomer resulting from step (g) at a temperature sufficient to effect reaction at a rate to form a first block-oligomeric product having a preselected intrinsic viscosity or a first block-polymeric product.

126. A process according to claim 120 wherein said steps comprises:

(a) mixing a selected first hetero-bifunctional monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer in the preliminary solvent,
(c) then increasing the phosphorus pentoxide content of the mixture resulting from step (b) to provide a first monomer reaction medium of greater phosphorus pentoxide content suitable for polymerization and for achieving a degree of polymerization greater than about 40,
(d) causing polymerization of the first monomer at a temperature sufficient to effect reaction at a rate to form a first homo-oligomeric product having a preselected intrinsic viscosity or a first homopolymeric product.

127. A process for preparing a liquid crystalline extended chain homopolymer composition of workable viscosity which is useful in the production of fibers and films comprising the following steps:
(a) mixing a selected first homo-bifunctional monomer with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a mixture of the first monomer in the preliminary solvent,
(c) adding a selected second monomer in the resulting mixture of step (b) to provide a mixture of the first and second monomer in the preliminary solvent,
(d) then increasing the phosphorus pentoxide content of the mixture resulting from step (c) to provide a first and second monomer reaction medium of greater phosphorus pentoxide content suitable for polymerization and for achieving a degree of polymerization greater than about 40,
(e) causing polymerization of the first and second monomers at a temperature sufficient to effect reaction at a rate to form a first homo-oligomeric product having a preselected intrinsic viscosity or a first homopolymeric product.

128. A process according to claim 120 wherein said steps comprises:
(a) mixing at least two of a selected first homo-bifunctional monomers with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a mixture of the first monomer in the preliminary solvent,
(c) adding at least one of selected second monomer in the resulting mixture of step (b) to provide a mixture of the first and second monomeers in the preliminary solvent,
(d) then increasing the phosphorus pentoxide content of the mixture resulting from step (c) to provide a first and second monomer reaction medium of greater phosphorus pentoxide content suitable for polymerization,
(e) causing polymerization of the first and second monomers at a temperature sufficient to effect reaction at a rate to form a first co-oligomeric product having a preselected intrinsic viscosity or a first copolymeric product.

129. A process according to claim 120 wherein said steps comprises:
(a) mixing at least one of a selected first homo-bifunctional monomer with a without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a mixture of the first monomer(s) in the preliminary solvent,
(c) adding at least two of a selected second monomers in the resulting mixture of step (b) to provide a mixture of the first and second monomers in the preliminary solvent,
(d) then increasing the phosphorus pentoxide content of the mixture resulting from step (c) to provide a first and second monomer reaction medium of greater phosphorus pentoxide content suitable for polymerization and for achieving a degree of polymerization greater than about 40,
(e) causing polymerization of the first and second monomers at a temperature sufficient to effect reaction at a rate to form a first co-oligomeric product having a preselected intrinsic viscosity or a first copolymeric product.

130. A process according to claim 120 wherein said steps comprises:
(a) mixing at least two of a selected first hetero-bifunctional monomers with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a mixture of the first monomers in the preliminary solvent,
(c) then increasing the phosphorus pentoxide content of the mixture resulting from step (b) to provide a first monomer reaction medium of greater phosphorus pentoxide content suitable for polymerization and for achieving a degree of polymerization greater than about 40,
(d) causing polymerization of the first monomers at a temperature sufficient to effect reaction at a rate to form a first co-oligomeric product having a preselected intrinsic viscosity or a first copolymeric product.

131. A process according to claim 120 wherein said steps comprises:
(a) mixing at least one of a selected first hetero-bifunctional monomer with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a mixture of the first monomer(s) in the preliminary solvent,
(c) then increasing the phosphorus pentoxide content of the mixture resulting from step (b) to provide a first monomer reaction medium of greater phosphorus pentoxide content suitable for polymerization and for achieving a degree of polymerization greater than about 40, (d) causing polymerization of the first monomer(s) at a temperature sufficient to effect reaction at a rate to form a first homo- or co-oligomeric product having a preselected intrinsic viscosity, (e) mixing a selected amount of the first homo- or co-oligomeric product with a selected amount of a selected second homo- or co-oligomeric product so as to form a first poly-oligomeric product, said second homo- or co-oligomeric product being formed by like steps (a), (b), (c), and (d) with the overall proviso that at least one of the selected monomer of step (a) which forms the second homo- or co-oligomeric product be different from the selected monomer of step (a) which forms the first homo- or co-oligomeric product, (f) causing polymerization of the poyl-oligomeric product at a temperature sufficient to effect reaction at a rate to form a first block-oligomeric product having a preselected intrinsic viscosity or a first blockpolymeric product.

132. A process for preparing a liquid crystalline extended chain block polymer composition of workable viscosity which is useful in the production of fibers and films comprising the following steps:

(a) mixing at least one of a selected first homo-bifunctional monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomers in the preliminary solvent, (c) adding at least one of a selected second monomer in the resulting mixture of step (b) to provide a mixture of the first and second monomers in the preliminary solvent, (d) then increasing the phosphorus pentoxide content of the mixture resulting from step (c) to provide a first and second monomer reaction medium of greater phosphorus pentoxide content suitable for polymerization and for achieving a degree of polymerization greater than about 40, (e) causing polymerization of the first and second monomers at a temperature sufficient to effect reaction at a rate to form a first homo- or co-oligomeric product having a preselected intrinsic viscosity, (f) mixing a selected amount of the first homo- or co-oligomeric product with a selected amount of at least one of a selected second homo- or co-oligomeric product so as to form a first poly-oligomeric product, said second homo- or co-oligomeric product being formed by like steps (a), (b), (c), (d), and (e) with the overall proviso that at least one of the selected monomer of step (a) or (c) which forms the second homo-oligomeric product be different from at least one of the selected monomer of step (a) or (c) which forms the first homo-oligomeric product, (g) causing polymerization of the poly-oligomeric product at a temperature sufficient to effect reaction at a rate to form a first block-oligomeric product having a preselected intrinsic viscosity or a first blockpolymeric product.

133. A process for preparing a liquid crystalline extended chain block polymer composition of workable viscosity which is useful in the production of fibers and films comprising the following steps:

(a) mixing at least one of a selected first homo-bifunctional monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer(s) in the preliminary solvent, (c) adding at least one of a selected second monomer to the resulting mixture of step (b) to provide a first mixture of the first and second monomers in the preliminary solvent, (d) then increasing the phosphorus pentoxide content of the mixture resulting from step (c) to provide a first and second monomer reaction medium of greater phosphorus pentoxide content suitable for polymerization and for achieving a degree of polymerization greater than about 40, (e) causing polymerization of the first and second monomers at a temperature sufficient to effect reaction at a rate to form a first homo-oligomeric product having a preselected intrinsic viscosity, (f) mixing a selected amount of the first homo-oligomeric product with a selected amount of a second mixture of a different first and second monomer in the preliminary solvent, said second mixture being formed by like steps (a), (b) and (c) with the overall proviso that at least one of the selected monomers of step (a) or (c) which forms the second mixture be different from at least one of the selected monomers of step (a) or (c) which forms the first homo-oligomeric product, (g) then increasing the phosphorus pentoxide content of the mixture resulting from step (f) to provide a first oligomer-monomer reaction medium of greater phosphorus pentoxide content suitable for polymerization, (h) causing polymerization of the mixture resulting from step (g) at a temperature sufficient to effect reaction at a rate to form a first block-oligomeric product having a preselected intrinsic viscosity or a first blockpolymeric product.

134. A process for preparing a liquid crystalline extended chain block polymer composition of workable viscosity which is useful in the production of fibers and films comprising the following steps:

(a) mixing at least one of a selected first heterobifunctional monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer(s) in the preliminary solvent, (c) then increasing the phosphorus pentoxide content of the mixture resulting from step (b) to provide a first monomer reaction medium of greater phosphorus pentoxide content suitable for polymerization and for achieving a degree of polymerization greater than about 40, (d) causing polymerization of the first monomer at a temperature sufficient to effect reaction at a rate to form a first homo- or co-oligomeric product having a preselected intrinsic viscosity, (e) mixing a selected amount of the first homo- or co-oligomeric product with a selected amount of at least one of a selected second homo- or co-oligomeric product so as to form a first poly-oligomeric product, said second homo- or co-oligomeric product being formed by like steps (a) (with the proviso that the selected first monomer is a homo-bifunctional monomer) and (b) followed by:

(1e) adding at least one of a selected second monomer in the resulting mixture of step (b) to provide a mixture of a first and second monomers in the preliminary solvent, (2e) then increasing the phosphorus pentoxide content of the mixture resulting from step (1e) to provide a first and second monomer reaction medium of greater phosphorus pentoxide content suitable for polymerization and for achieving a degree of polymerization greater than about 40, (3e) causing polymerization of the first and second monomers at a temperature sufficient to effect reaction at a rate to form said second homo- or co-oligomeric product having a preselected intrinsic viscosity, with the overall proviso that at least one of the selected monomers of step (a) or (1e) which forms the second homo- or co-oligomeric product be different from at least one of the selected monomers of step (a) which forms the first homo- or co-oligomeric product, (f) causing polymerization of the poly-oligomeric product at a temperature sufficient to effect reaction at a rate to form a first block-oligomeric product having a preselected intrinsic viscosity or a first blockpolymeric product.

135. A process for preparing a liquid crystalline extended chain block polymer composition of workable viscosity which is useful in the production of fibers and films comprising the following steps:

(a) mixing at least one of a selected first heterobifunctional monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a mixture of the first monomer(s) in the preliminary solvent, (c) mixing a selected amount of the mixture of step (b) with a selected amount of at least one of a selected first homo-oligomeric product so as to form a first oligomeric-first monomer reaction medium, said first homo-oligomeric product being formed by like steps (a) with the proviso that the selected first monomer is a homo-bifunctional monomer) and (b) followed by:

(1c) adding at least one of a selected second monomer to the resulting mixture of step (b) to provide a mixture of a first and second monomer in the preliminary solvent, (2c) then increasing the phosphorus pentoxide content of the mixture resulting from step (1c) to provide a first and second monomer reaction medium of greater phosphorus pentoxide content suitable for polymerization and for achieving a degree of polymerization greater than about 40, (3c) causing polymerization of the first and second monomers at a temperature sufficient to effect reaction at a rate to form said first homo-oligomeric product having a preselected intrinsic viscosity, (d) then increasing the phosphorus pentoxide content of the mixture resulting from step (c) to provide a reaction medium of greater phosphorus pentoxide content suitable for polymerization and for achieving a degree of polymerization greater than about 40, (e) causing polymerization of the first oligomer-monomer at a temperature sufficient to effect reaction at a rate to form a first block-oligomeric product having a preselected intrinsic viscosity or a first blockpolymeric product.

136. A process according to claim 120, 123, 126 or 127 wherein said selected first monomer is selected from the group consisting of:

2,5-diamino-1,4-benzenedithiol dihydrochloride, 4,6-diamino-1,3-benzenediol dihydrochloride, 1,2,4,5-tetraaminobenzene tetrahydrochloride, 3,3'-dimercaptobenzidine dihydrochloride, 3,3'-dihydroxybenzidine dihydrochloride, 3,3'-diamino-4,4'-dihydroxybiphenyl dihydrochloride, 3,3'-diaminobenzidine tetrahydrochloride dihydrate, 2-(4-carboxyphenyl)-5,6-diaminobenzimidazole dihydrochloride, 3-hydroxy-4-aminobenzoic acid hydrochloride, 3-amino-4-hydroxybenzoic acid hydrochloride, 4,5-diaminonaphthalene-1,8-dicarboxylic anhydride, 2,3,7,8-tetrahydroxy-1,4,6,9-tetraazaanthracene, 2,2',3,3'-tetrahydroxy-6,6'-biquinoxaline, or 2,3-dihydroxy-6,7-diaminoquinoxaline dihydrochloride.

137. A process according to claim 120, 123, or 127 wherein said selected second monomer is selected from the group consisting of:

terephthalic acid, terephthaloyl chloride, terephthalonitrile, or trans-1,4-cyclohexanedicarboxylic acid.

138. A process according to claim 120, 124, 128, 129, or 130 wherein said selected first monomer is selected from the group consisting of:

2,5-diamino-1,4-benzenedithiol dihydrochloride, 4,6-diamino-1,3-benzenediol dihydrochloride, 1,2,4,5-tetraaminobenzene tetrahydrochloride, 3,3'dimercaptobenzidine dihydrochloride, 3,3'-dihydroxybenzidine dihydrochloride, 3,3'-diamino-4,4'dihydroxybiphenyl dihydrochloride, 3,3'-diaminobenzidine tetrahydrochloride dihydrate, 2-(4-carboxyphenyl)-5,6-diaminobenzimidazole dihydrochoride, 3-hydroxy-4-aminobenzoic acid hydrochloride, 3-amino-4-hydroxybenzoic acid hydrochloride, 3,3'-dimercapto-4,4'-diaminodiphenyl ether dihydrochloride, 3,3',4,4'-tetraaminodiphenyl ether tetrahydrochloride, 3,3'-dihydroxy-4,4'-diaminodiphenyl ether, 2,3,5,6-tetraaminopyridine trihydrochloride, 1,5-diamino-2,6-naphthalenedithiol dihydrochloride, 1,5-diamino-2,6-naphthalenediol dihydrochloride, 1,2,5,6-tetraminonaphthalene tetrahydrochloride, 3,3'-dimercapto-4,4'diaminodiphenyl ether dihydrochloride, 3,3',4,4'-tetraaminodiphenyl ether tetrahydrochloride, 3,3'-dihydroxy-4,4'-diaminodiphenyl ether, 3,3'-diamino-4,4'dihydroxydiphenyl ether, 3,3',4,4'-tetraaminodiphenyl sulfone, 3,3'-dimercapto-4,4'-diaminodiphenyl sulfone, 3,3'-diamino-4,4'dihydroxydiphenyl sulfone, 3,3',4,4'-tetraaminobenzophenone, 3,6-diamino-1,2-benzenedithiol dihydrochloride, 3-mercapto-4-aminobenzoic acid hydrochloride, 3-mercapto-4-aminobenzoic acid, or 3,4-diaminobenzoic acid.

139. A process according to claim 120, 124, 128, or 129, wherein said selected second monomer is selected from the group consisting of:
terephthalic acid, terephthaloyl chloride, terephthalonitrile, trans-1,4-cyclohexanedicarboxylic acid, 2,5-pyridinedicarboxylic acid, 4,4'-biphenyldicarboxylic acid, 4,4'-biphenyldicarboxylic acid chloride, 2,6-naphthalenedicarboxylic acid, 3,3'-biphenyldicarboxylic acid, trans-1,2-cyclohexanedicarboxylic acid, 1,4-bis(5-carboxybenzoxazole-2-yl) benzene 2,5-bis(6-carboxybenzothiazole-2-yl)pyridine, isophthalic acid, 4,4'-dicarboxydiphenyl ether, 3,3'-dicarboxydiphenyl ether, succinic acid, glutaric acid, adipic acid, pimelic acid, sebacic acid, pyromellitic dianhydride, or 1,4,5,8-naphthalenetetracarboxylic dianhydride.

140. A process according to claim 120, 125, 131, 132, 133, 134, or 135 wherein said selected first monomer is selected from the group consisting of:
2,5-diamino-1,4-benzenedithiol dihydrochloride, 4,6-diamino-1,3-benzenediol dihydrochloride, 1,2,4,5-tetraaminobenzene tetrahydrochloride, 3,3'-dimercaptobenzidine dihydrochloride, 3,3'-dihydroxybenzidine dihydrochloride, 3,3'-diamino-4,4'-dihydroxybiphenyl dihydrochloride, 3,3'-diaminobenzidine tetrahydrochloride dihydrate, 2-(4-carboxyphenyl)-5,6-diaminobenzimidazole dihydrochloride, 3-hydroxy-4-aminobenzoic acid hydrochloride, 3-amino-4-hydroxybenzoic acid hydrochloride, 4,5-diaminonaphthalene-1,8-dicarboxylic anhydride, 2,3,7,8-tetrahydroxy-1,4,6,9-tetraazaanthracene, 2,2',3,3'-tetrahydroxy-6,6-biquinoxaline, 3-mercapto-4-aminobenzoic acid hydrochloride, 3-mercapto-4-aminobenzoic acid, or 2,3-dihydroxy-6,7-diaminoquinoxaline dihydrochloride.

141. A process according to claim 120, 125, 132, 133, 134, or 135 wherein said selected second monomer is selected from the group consisting of:
terephthalic acid, terephthaloyl chloride, or trans-1,4-cyclohexanedicarboxylic acid.

142. A process according to claim 120, 125, 131, 132, 133, 134, or 135 wherein said selected first monomer of said second homo-oligomeric product is selected from the group consisting of:
2,5-diamino-1,4-benzenedithiol dihydrochloride, 4,6-diamino-1,3-benzenediol dihydrochloride, 1,2,4,5-tetraaminobenzene tetrahydrochloride, 3,3'-dimercaptobenzidine dihydrochloride, 3,3'-dihydroxybenzidine dihydrochloride, 3,3'-diamino-4,4'-dihydroxybiphenyl dihydrochloride, 3,3'-diaminobenzidine tetrahydrochloride dihydrate, 2-(4-carboxyphenyl)-5,6-diaminobenzimidazole dihydrochloride, 3-hydroxy-4-aminobenzoic acid hydrochloride, 3-amino-4-hydroxybenzoic acid hydrochloride, 3,3'-dimercapto-4,4'-diaminodiphenyl ether dihydrochloride, 3,3',4,4'-tetraaminodiphenyl ether tetrahydrochloride, 3,3'-dihydroxy-4,4'-diaminodiphenyl ether, 2,3,5,6-tetraaminopyridine trihydrochloride, 1,5-diamino-2,6-naphthalenedithiol dihydrochloride, 1,5-diamino-2,6-naphthalenediol dihydrochloride, 1,2,5,6-tetraminonaphthalene tetrahydrochloride, 3,3'-dimercapto-4,4'-diaminodiphenyl ether dihydrochloride, 3,3',4,4'-tetraaminodiphenyl ether tetrahydrochloride, 3,3'-dihydroxy-4,4'-diaminodiphenyl ether, 3,3'-diamino-4,4'-dihydroxydiphenyl ether, 3,3',4,4'-tetraaminodiphenyl sulfone, 3,3'-dimercapto-4,4'-diaminodiphenyl sulfone, 3,3'-diamino-4,4'-dihydroxydiphenyl sulfone, 3,3',4,4'-tetraaminobenzophenone, 3,6-diamino-1,2-benzenedithiol dihydrochloride, 3-mercapto-4-aminobenzoic acid hydrochloride, 3-mercapto-4-aminobenzoic acid, or 3,4-diaminobenzoic acid.

143. A process according to claim 120, 125, 132, 133, 134, or 135 wherein said selected second monomer of said second homo-oligomeric product is selected from the group consisting of:
terephthalic acid, terephthaloyl chloride, trans-1,4-cyclohexanedicarboxylic acid, 2,5-pyridinedicarboxylic acid, 4,4'-biphenyldicarboxylic acid, 4,4'-biphenyldicarboxylic acid chloride, 2,6-naphthalenedicarboxylic acid, 3,3'-biphenyldicarboxylic acid, trans-1,2-cyclohexanedicarboxylic acid, 1,4-bis(5-carboxybenzoxazole-2-yl)benzene, 2,5-bis(6-carboxybenzothiazole-2yl)pyridine, isophthalic acid, 4,4'-dicarboxydiphenyl ether, 3,3'-dicarboxydiphenyl ether, succinic acid, glutaric acid, adipic acid, pimelic acid, sebacic acid, pyromellitic dianhydride, or 1,4,5,8-naphthalenetetracarboxylic dianhydride.

144. A process according to claim 120, 127, 128, 129, 132, 133, 134, or 135 wherein said selected first monomer is 2,5-diamino-1,4-benzenedithiol dihydrochloride or 4,6-diamino-1,3-benzenediol dihydrochloride.

145. A process according to claim 120, 123, 124, 125, 126, 130, 131, 134, or 135 wherein said selected first monomer is 3-amino-4-hydroxy benzoic acid hydrochloride or 3-mercapto-4-aminobenzoic acid hydrochloride.

146. A process according to claim 120, 123, 124, 125, 126, 127, 128, 129, 130, 131, 132, 133, 134, or 135 wherein said phosphorus pentoxide in said preliminary solvent is present in an amount below about 77% by weight.

147. A process according to claim 136 wherein said phosphorus pentoxide in said preliminary solvent is present in an amount below about 77% by weight.

148. A process according to claim 137 wherein said phosphorus pentoxide in said preliminary solvent is present in an amount below about 77% by weight.

149. A process according to claim 138 wherein said phosphorus pentoxide in said preliminary solvent is present in an amount below about 77% by weight.

150. A process according to claim 139 wherein said phosphorus pentoxide in said preliminary solvant is present in an amount below about 77% by weight.

151. A process according to claim 140 wherein said phosphorus pentoxide in said preliminary solvent is present in an amount below about 77% by weight.

152. A process according to claim 141 wherein said phosphorus pentoxide in said preliminary solvent is present in an amount below about 77% by weight.

153. A process according to claim 142 wherein said phosphorus pentoxide in said preliminary solvent is present in an amount below about 77% by weight.

154. A process according to claim 143 wherein said phosphorus pentoxide in said preliminary solvent is present in an amount below about 77% by weight.

155. A process according to claim 144 wherein said phosphorus pentoxide in said preliminary solvent is present in an amount below about 77% by weight.

156. A process according to claim 145 wherein said phosphorus pentoxide in said preliminary solvent is present in an amount below about 77% by weight.

157. A process according to claim 120, 123, 124, 126, 127, 128, 129, 130, 131, 132, 133, 135 or 121 wherein said polymerization reaction is conducted at a temperature of from about 100° C. to greater than about 160° C. and at a polymerization time of from about 2 hours to about 8 hours.

158. A process according to claim 120, 123, 124, 126, 127, 128, 129, 130, 131, 132, 133, 134, or 135 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

159. A process according to claim 136 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

160. A process according to claim 137 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

161. A process according to claim 138 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

162. A process according to claim 139 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

163. A process according to claim 140 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

164. A process according to claim 141 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

165. A process according to claim 142 wherein said phosphorus pentoxide content of said first home-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

166. A process according to claim 143 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

167. A process according to claim 144 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

168. A process according to claim 145 wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 82% and about 84% by weight.

169. A process according to claim 120, 123, 124, 125, 126, 127, 128, 129, 130, 131, 132, 133, 134, 135, or 121 wherein said polymerization reaction is conducted at a temperature within the range of from about 100° C. to about 220° C.

170. A process according to claim 120, 123, 124, 125, 126, 127, 128, 129, 130, 131, 132, 133, 134, 135, or 121 wherein the time of polymerization is from about 2 hours to greater than about 8 hours.

171. A process according to claim 120, 123, 124, 125, 126, 127, 128, 129, 130, 131, 132, 133, 134, 135 or 121 wherein said polymerization reaction is conducted at a temperature of from about 100° C. to greater than about 185° C.

172. A fiber spun from said first homo-oligomeric product, said first co-oligomeric product, said first homo-polymeric product, said first copolymeric product, said second homo-oligomeric product, said second co-oligomeric product, said poly-oligomeric product, said first block-oligomeric product or said first block-polymeric product of claim 169 immediately following polymerization.

173. A crystalline polymer according to claim 2, 40, or 68 in the form of a fiber, film, or fibrids.

174. A crystalline polymer according to claim 3, 4, 5, 6, 7, 8, 9, or 10 in the form of a fiber, film, or fibrids.

175. A crystalline polymer according to claim 12, 13, 14, 17, or 18 in the form of a fiber, film, or fibrids.

176. A crystalline polymer according to claim 2, 3, or 4 wherein said polymers I, II, III, IV, V, VI, VII, and VIII are characterized as having a molecular weight with an n value corresponding to an intrinsic viscosity greater than about 10 dL/g as determined in methanesulfonic acid at 30° C., with the proviso that when said polymer is poly([benzo-(1,2-d:4,5-d')bisthiazole-2,6-diyl]-1,4-phenylene) that the molecular weight of said poly([benzo-(1,2-d:4,5-d')bisthiazole-2,6-diyl]-1,4-phenylene) correspond to an intrinsic viscosity greater than 30.3 dL/g as determined in methanesulfonic acid at 30° C.

177. A crystalline polymer according to claim 20 or 21 in the form of a fiber, film, or fibrids.

178. A crystalline polymer according to claim 22, 23, or 24 in the form of a fiber, film, or fibrids.

179. A crystalline polymer according to claim 25, 26, 27, 28, 29, 30, 31, 32, or 33 in the form of a fiber, film, or fibrids.

180. A crystalline polymer according to claim 34 in the form of a fiber, film, or fibrids.

181. A crystalline polymer according to claim 35, 36, or 37 in the form of a fiber, film, or fibrids.

182. A crystalline polymer according to claim 41, 42, 43, 44, 45, 46, 47, or 48 in the form of a fiber, film, or fibrids.

183. A crystalline polymer according to claim 49, 50, 51, 52, 53, 54, 55, 56, 57, or 58 in the form of a fiber, film, or fibrids.

184. A crystalline polymer according to claim 60, 61, 62, 63, 64, or 67 in the form of a fiber, film, or fibrids.

185. A crystalline polymer according to claim 5, 6, 7, 8, 9, or 10 wherein said polymer is characterized as having a molecular weight with an n value corresponding to an intrinsic viscosity greater than about 7 dL/g as determined in methanesulfonic acid at 30° C.

186. A crystalline polymer according to claim 69, 70, 71, 72, 73, 74, 75, 76, 77, or 78 in the form of a fiber, film, or fibrids.

187. A crystalline polymer according to claim 40 wherein said polymer are characterized as having a molecular weight with an n value corresponding to an intrinsic viscosity greater than 7 dL/g as determined in methanesulfonic acid at 30° C., with the proviso that when said polymer is IX that the molecular weight of said IX polymer correspond to an intrinsic viscosity greater than 16 dL/g as determined in methanesulfonic acid at 30° C.

188. A crystalline polymer according to claim 68 wherein said polymer are characterized as having a molecular weight with an n value corresponding to an intrinsic viscosity greater than about 7 dL/g as determined in methanesulfonic acid at 30° C.

189. A crystalline polymer according to claim 79, 80, 81, or 82 in the form of a fiber, film, or fibrids.

190. A crystalline polymer according to claim 84, 85, 86, 87, 88, 89, 90, 91, 92, 93, 94, 95, 96, or 97 in the form of a fiber, film, or fibrids.

191. A crystalline polymer according to claim 99 or 100 in the form of a fiber, film, or fibrids.

192. A crystalline polymer according to claim 101, 102, or 103 in the form of a fiber, film, or fibrids.

193. A crystalline polymer according to claim 106, 107, 108, 109, 110, 111, 112, 113, 114, 115, 116, 117, 118, or 119 in the form of a fiber, film, or fibrids.

194. An article comprising a crystalline polymer of claim 2, 40, or 68 in a resinous matrix.

195. An article comprising a crystalline polymer of claim 3, 4, 5, 6, 7, 8, 9, or 10 in a resinous matrix.

196. An article comprising a crystalline polymer of claim 41, 42, 43, 44, 45, 46, 47, or 48, in a resinous matrix.

197. An article comprising a crystalline polymer of claim 69, 70, 71, 72, 73, 74, 75, 76, 77, or 78 in a resinous matrix.

198. A fiber drawn from the liquid crystslline composition of claim 120, 123, 124, 125, 126, 127, 128, 129, 130, 131, 132, 133, 134, 135, or 121.

199. A film extruded from the liquid crystalline composition of claim 120, 123, 124, 125, 126, 127, 128, 129, 130, 131, 132, 133, 134, or 135.

200. A fiber spun from the liquid crystalline composition of claim 120, 123, 124, 125, 126, 127, 128, 129, 130, 131, 132, 133, 134, or 135.

201. A crystalline polymer made by the process of claim 120, 123, 124, 125, 126, 127, 128, 129, 130, 131, 132, 133, 134, 135, or 121.

202. A process according to claim 120, 123, 124, 125, 126, 127, 128, 129, 130, 131, 132, 133, 134, or 135 further comprising spinning said first homo-oligomeric product, said first co-oligomeric product, said first homo-polymeric product, said first copolymeric product, said second homo-oligomeric product, said second co-oligomeric product, said poly-oligomeric product, said first block-oligomeric product or said first block-polymeric product through an air-gap and into a coagulation bath thereby forming a fiber.

203. A process according to claim 120, 123, 124, 125, 126, 127, 128, 129, 130, 131, 132, 133, 134, or 135 further comprising extruding said first homo-oligomeric product, said first co-oligomeric product, said first homopolymeric product, said first copolymeric product, said second homo-oligomeric product, said second co-oligomeric product, said poly-oligomeric product, said first block-oligomeric product or said first block-polymeric product into a coagulation bath thereby forming a film.

204. An article comprising a crystalline polymer of claim 2, 40, or 68.

205. A process according to claim 120, 123, 124, 125, 126, 127, 128, 129, 130, 131, 132, 133, 134, or 135 further comprising extruding said first homo-oligomeric product, said first co-oligomeric product, said first homopolymeric product, said first copolymeric product, said second homo-oligomeric product, said second co-oligomeric product, said poly-oligomeric product, said first block-oligomeric product or said first block-polymeric product into a coagulation bath thereby forming an article.

206. A composite film comprising a crystalline polymer of claim 2, 40, or 68.

207. A crystalline polymer according to claim 2, 40, 68 wherein said polymers are characterized as having a molecular weight with an n value corresponding to an intrinsic viscosity greater than about 16 dL/g as determined in methanesulfonic acid at 30° C., with the proviso that when said polymer is poly([benzo-(1,2-d:-4,5-d')bisthiazole-2,6-diyl]-1,4-phenylene) that the molecular weight of said poly([benzo-(1,2-d:4,5-d')bisthiazole-2,6-diyl]-1,4-phenylene) correspond to an intrinsic viscosity greater than 30.3 dL/g as determined in methanesulfonic acid at 30° C.

208. A composite article comprising a resinous matrix reinforced with the crystalline polymer of claim 2, 40, or 68.

209. A fiber according to claim 174 wherein said fiber is characterized as having a tensile strength greater than 1.37 Gpa.

210. An article comprising a crystalline polymer of claim 2, 3, 4, 12, 14, 17, or 18 in admixture with a flexible aromatic heterocyclic polymer.

211. A polymer according to claim 136 wherein said polymer is

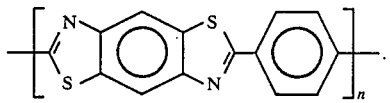

212. A polymer according to claim 211 wherein said polymer has an intrinsic viscosity of from about 15 dL/g to about 42 dL/g.

213. A polymer according to claim 136 wherein said polymer is

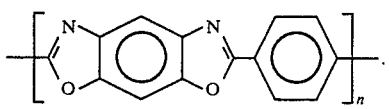

214. A polymer according to claim 213 wherein said polymer has an intrinsic viscosity of from about 9 dL/g to about 24 dL/g.

215. A polymer according to claim 136 wherein said polymer is

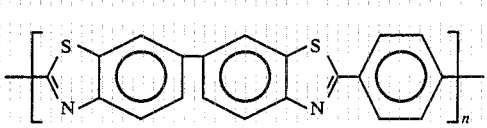

216. A polymer according to claim 215 wherein said polymer has an intrinsic viscosity of about 15 dL/g.

217. A polymer according to claim 136 wherein said polymer is

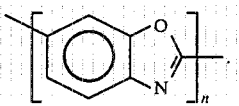

218. A polymer according to claim 217 wherein said polymer has an intrinsic viscosity of about 12 dL/g.

219. A polymer according to claim 136 wherein said polymer is

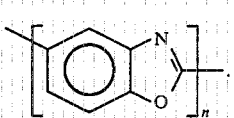

220. A polymer according to claim 219 wherein said polymer has an intrinsic viscosity of about 12 dL/g.

221. A polymer according to claim 138 wherein said polymer contains the moiety

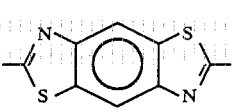

222. A polymer according to claim 138 wherein said polymer contains the moiety

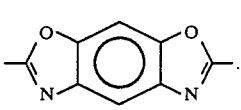

223. A polymer according to claim 138 wherein said polymer contains the moiety

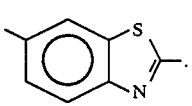

224. A polymer according to claim 138 wherein said polymer contains the moiety

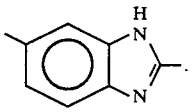

225. A polymer according to claim 138 wherein said polymer contains the moiety

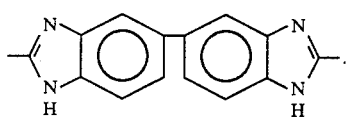

226. A polymer according to claim 138 wherein said polymer contains the moiety

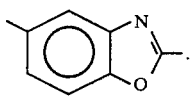

227. A polymer according to claim 138 wherein said polymer contains the moiety

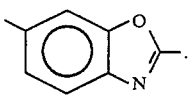

228. A polymer according to claim 140 wherein said polymer contains the moiety

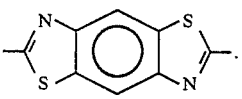

229. A polymer according to claim 140 wherein said polymer contains the moiety

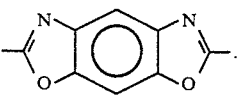

230. A polymer according to claim 140 wherein said polymer contains the moiety

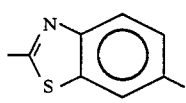

231. A polymer according to claim 140 wherein said polymer contains the moiety

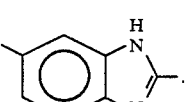

232. A polymer according to claim 140 wherein said polymer contains the moiety

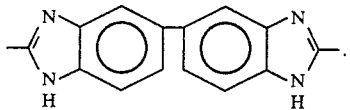

233. A polymer according to claim 140 wherein said polymer contains the moiety

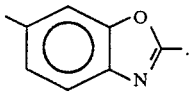

234. A polymer according to claim 140 wherein said polymer contains the moiety

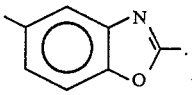

235. A process according to claim 202 wherein said spinning is conducted at an initial draw ratio of from about 5:1 to about 50:1.

236. A process according to claim 202 wherein said spinning is conducted at a temperature between about 60° C. to about 100° C.

237. A process according to claim 202 wherein said spinning is conducted through an air-gap separation distance of from about 1 cm to about 100 cm before allowing said fiber to enter into a coagulation bath.

238. A polymer according to claim 9 wherein said polymer has an intrinsic viscosity greater than about 11 dL/g.

239. A process according to claim 120, 123, 124, 125, 126, 130, or 135 wherein said selected first monomer is 3,3'-diamino-4,4'-dihydroxybiphenyl dihydrochloride.

240. A process according to claim 239 wherein said phosphorus pentoxide content in said preliminary solvent is present in an amount below about 77% by weight.

241. A process according to claim 239 wherein said phosphorus pentoxide content of said first homo-oligomeric product, said first co-oligomeric product, said first homopolymeric product, said first copolymeric product, said second homo-oligomeric product, said second co-oligomeric product, said first block-oligomeric product, or said first block-polymeric product formed by said polymerization reaction is between about 82% and about 84% by weight.

242. A process according to claim 120, 123, 124, 125, 126, 130, or 135 wherein said selected first monomer is 3,3'-dimercaptobenzidine dihydrochloride.

243. A process according to claim 242 wherein said phosphorus pentoxide content in said preliminary solvent is present in an amount below about 77% by weight.

244. A process according to claim 242 wherein said phosphorus pentoxide content of said first homo-oligomeric product, said first co-oligomeric product, said first homopolymeric product, said first copolymeric product, said second homo-oligomeric product, said second co-oligomeric product, said first block-oligomeric product, or said first block-polymeric product formed by said polymerization reaction is between about 82% and about 84% by weight.

245. A fiber spun from the homo-polymeric product of claim 169 being characterized as having an ultimate tensile strength of at least about 2.96 GPa.

246. A fiber spun from the homo-polymeric product of claim 169 being characterized as having a modulus of at least about 89.6 GPa.

247. A fiber spun from the homo-polymeric product of claim 169 having in combination:
a ultimate tensile strength of at least about 2.96 GPa;
a modulus of at least about 89.6 GPa; and
an elongation at break of at least about 4.2 percent.

248. A fiber spun from the homo-polymeric product of claim 169 being characterized as having an ultimate tensile strength of at least about 3.45 GPa after heat treatment at about 500° C. in nitrogen for 60 seconds.

249. A fiber spun from the homo-polymeric product of claim 169 being characterized as having a modulus of at least about 317 GPa after heat treatment at about 500° C. in nitrogen for 60 seconds.

250. A fiber spun from the homo-polymeric product of claim 169 being characterized as having in combination:
an ultimate tensile strength of at least about 3.45 GPa;
a modulus of at least about 317 GPa; and
an elongation at break of at least about 1.8 percent after heat treatment at about 500° C. in nitrogen for 60 seconds.

251. A fiber spun from the homo-polymeric product of claim 169 being characterized as having an ultimate tensile strength of at least about 3.07 GPa after heat treatment at about 450° C. in air for 60 seconds under a stretch factor of about 2 percent.

252. A fiber spun from the homo-polymeric product of claim 169 being characterized as having a modulus of at least about 410 GPa after heat treatment at about 450° C. in air for 60 seconds under a stretch factor of about 2 percent.

253. A fiber spun from the homo-polymeric product of claim 169 being characterized as having in combination:
an ultimate tensile strength of at least about 3.07 GPa; and
a modulus of at least about 410 GPa; after heat treatment at about 450° C. in air for 60 seconds under a stretch factor of about 2 percent.

254. A fiber spun from the homo-polymeric product of claim 169 being characterized as having an ultimate tensile strength of at least about 3.58 GPa after heat treatment at about 500° C. in air for 60 seconds under a stretch factor of about 2.5 percent.

255. A fiber spun from the homo-polymeric product of claim 169 being characterized as having a modulus of at least about 467 GPa after heat treatment at about 500° C. in air for 60 seconds under a stretch factor of about 2.5 percent.

256. A fiber spun from the homo-polymeric product of claim 169 being characterized as having in combination:
an ultimate tensile strength of at least about 3.58 GPa; and
a modulus of at least about 467 GPa; after heat treatment at about 500° C. in air for 60 seconds under a stretch factor of about 2.5 percent.

257. A fiber spun from the homo-polymeric product of claim 169 being characterized as having an ultimate tensile strength of at least about 3.07 GPa after heat treatment at about 450° C. in air for 60 seconds under a stretch factor of about 2.8 percent.

258. A fiber spun from the homo-polymeric product of claim 169 being characterized as having a modulus of at least about 394 GPa after heat treatment at about 450° C. in air for 60 seconds under a stretch factor of about 2.8 percent.

259. A fiber spun from the homo-polymeric product of claim 169 being characterized as having in combination:
an ultimate tensile strength of at least about 3.07 GPa; and
a modulus of at least about 394 GPa; after heat treatment at about 450° C. in air for 60 seconds under a stretch factor of about 2.8 percent.

260. A process according to claim 127 wheren the time of polymerization is from about 1 hour to about 3 hours.

261. A fiber spun from the composition of claim 200 having a ultimate tensile strength of at least about 2.34 GPa.

262. A fiber spun from the composition of claim 200 having a ultimate tensile strength of at least about 3.57 GPa.

263. A fiber spun from the composition of claim 200 having a ultimate tensile strength of at least about 2.57 GPa.

264. A fiber spun from the composition of claim 200 having a ultimate tensile strength of at least about 2.83 GPa.

265. A fiber spun from the composition of claim 200 having a ultimate tensile strength of at least about 2.76 GPa.

266. A fiber spun from the composition of claim 200 having a ultimate tensile strength of at least about 5.01 GPa.

267. A fiber spun from the composition of claim 200 having a ultimate tensile strength of at least about 3.38 GPa.

268. A fiber spun from the composition of claim 200 having a ultimate tensile strength of at least about 3.29 GPa.

269. A fiber spun from the composition of claim 200 having in combination:
an ultimate tensile strength of at least about 2.34 GPa; and
a modulus of at least about 41 GPa.

270. A fiber spun from the composition of claim 200 having in combination:
an ultimate tensile strength of at least about 2.76 GPa; and
a modulus of at least about 41 GPa.

271. A fiber spun from the composition of claim 200 having in combination:
an ultimate tensile strength of at least about 3.57 GPa;
a modulus of at least about 133 GPa; and
an elongation at break of at least about 3.3 percent.

272. A fiber spun from the composition of claim 200 having in combination:
an ultimate tensile strength of at least about 2.57 GPa;
a modulus of at least about 79 GPa; and
an elongation at break of at least about 4.6 percent.

273. A fiber spun from the composition of claim 200 having in combination:
an ultimate tensile strength of at least about 2.83 GPa;
a modulus of at least about 61 GPa; and
an elongation at break of at least about 4.8 percent.

274. A fiber spun from the composition of claim 200 having a ultimate tensile strength of at least about 4.94 GPa after heat treatment at about 450° C. in nitrogen for 30 seconds under a stretch factor of about 4.37 percent.

275. A fiber spun from the composition of claim 200 having a ultimate tensile strength of at least about 3.34 GPa after heat treatment at about 400° C. in nitrogen for 30 seconds under a stretch factor of about 4.37 percent.

276. A fiber spun from the composition of claim 200 having a ultimate tensile strength of at least about 2.62 GPa after heat treatment of about 500° C. in nitrogen for 30 seconds under a stretch factor of about 1.28 percent.

277. A fiber of the polymer of claim 213 being characterized as having an ultimate tensile strength of at least about 2.96 GPa.

278. A fiber of the polymer of claim 213 being characterized as having a modulus of at least about 89.6 GPa.

279. A fiber of the polymer of claim 213 having in combination:
a ultimate tensile strength of at least about 2.96 GPa;
a modulus of at least about 89.6 GPa; and
an elongation at break of at least about 4.2 percent.

280. A fiber of the polymer of claim 213 being characterized as having an ultimate tensile strength of at least about 3.45 GPa after heat treatment at about 500° C. in nitrogen for 60 seconds.

281. A fiber of the polymer of claim 213 being characterized as having a modulus of at least about 317 GPa after heat treatment at about 500° C. in nitrogen for 60 seconds.

282. A fiber of the polymer of claim 213 being characterized as having in combination:
an ultimate tensile strength of at least about 3.45 GPA;
a modulus of at least about 317 GPa; and an elongation at break of at least about 1.8 percent after heat treatment at about 500° C. in nitrogen for 60 seconds.

283. A fiber of the polymer of claim 213 being characterized as having an ultimate tensile strength of at least about 3.07 GPa after heat treatment at about 450° C. in air for 60 seconds under a stretch factor of about 2 percent.

284. A fiber of the polymer of claim 213 being characterized as having a modulus of at least about 410 GPa after heat treatment at about 450° C. in air for 60 seconds under a stretch factor of about 2 percent.

285. A fiber of the polymer of claim 213 being characterized as having in combination:
an ultimate tensile strength of at least about 3.07 GPa; and
a modulus of at least about 410 GPa; after heat treatment at about 450° C. in air for 60 seconds under a stretch factor of about 2 percent.

286. A fiber of the polymer of clain 213 being characterized as having an ultimate tensile strength of at least about 3.58 GPa after heat treatment at about 500° C. in air for 60 seconds under a stretch factor of about 2.5 percent.

287. A fiber of the polymer of claim 213 being characterized as having a modulus of at least about 467 GPA after heat treatment at about 500° C. in air for 60 seconds under a stretch factor of about 2.5 percent.

288. A fiber of the polymer of claim 213 being characterized as having in combination:
an ultimate tensile strength of at least about 3.58 GPa; and a modulus of at least about 467 GPa; after heat treatment at about 500° C. in air for 60 seconds under a stretch factor of about 2.5 percent.

289. A fiber of the polymer of claim 213 being characterized as having an ultimate tensile strength of at least about 3.07 GPa after heat treatment at about 450° C. in air for 60 seconds under a stretch factor of about 2.8 percent.

290. A fiber of the polymer of claim 213 being characterized as having a modulus of at least about 394 GPa after heat treatment at about 450° C. in air for 60 seconds under a stretch factor of about 2.8 percent.

291. A fiber of the polymer of claim 213 being characterized as having in combination:
an ultimate tensile strength of at least about 3.07 GPa; and
a modulus of at least about 394 GPa; after heat treatment at about 450° C. in air for 60 seconds under a stretch factor of about 2.8 percent.

292. A fiber of the polymer of claim 219 having in combination:
an ultimate tensile strength of at least about 2.34 GPa; and
a modulus of at least about 136 GPa; after heat treatment at about 500° C. in nitrogen for 60 seconds under a stretch factor of about 7.5 percent.

293. A fiber of the polymer of claim 219 having in combination:
an ultimate tensile strength of at least about 2.85 GPa;
a modulus of at least about 119 GPa; and
an elongation at break of at least about 2.5 percent after heat treatment at about 500° C. in nitrogen for 30 seconds under a stretch factor of about 4.37 percent.

294. A fiber of the polymer of claim 219 having in combination:
an ultimate tensile strength of at least about 3.34 GPa;
a modulus of at least about 115 GPa; and
an elongation at break of at least about 3.6 percent after heat treatment at about 400° C. in nitrogen for 30 seconds under a stretch factor of about 4.37 percent.

295. A fiber of the polymer of claim 219 having in combination:
an ultimate tensile strength of at least about 2.62 GPa;

a modulus of at least about 144 GPa; and
an elongation at break of at least about 2.2 percent after heat treatment at about 500° C. in nitrogen for 30 seconds under a stretch factor of about 1.28 percent.

296. A fiber of the polymer of claim 219 having a ultimate tensile strength of at least about 2.34 GPa.

297. A fiber of the polymer of claim 219 having a ultimate tensile strength of at least about 3.57 GPa.

298. A fiber of the polymer of claim 219 having a ultimate tensile strength of at least about 2.57 GPa.

299. A fiber of the polymer of claim 219 having a ultimate tensile strength of at least about 2.83 GPa.

300. A fiber of the polymer of claim 219 having a ultimate tensile strength of at least about 2.76 GPa.

301. A fiber of the polymer of claim 219 having a ultimate tensile strength of at least about 5.01 GPa.

302. A fiber of the polymer of claim 219 having a ultimate tensile strength of at least about 3.38 GPa.

303. A fiber of the polymer of claim 219 having a ultimate tensile strength of at least about 3.29 GPa.

304. A fiber of the polymer of claim 219 having in combination:
an ultimate tensile strength of at least about 2.34 GPa; and
a modulus of at least about 41 GPa.

305. A fiber of the polymer of claim 219 having in combination:
an ultimate tensile strength of at least about 2.76 GPa; and
a modulus of at least about 41 GPa.

306. A fiber of the polymer of claim 219 having in combination:
an ultimate tensile strength of at least about 3.57 GPa;
a modulus of at least about 133 GPa; and
an elongation at break of at least about 3.3 percent.

307. A fiber of the polymer of claim 219 having in combination:
an ultimate tensile strength of at least about 2.57 GPa;
a modulus of at least about 79 GPa; and
an elongation at break of at least about 4.6 percent.

308. A fiber of the polymer of claim 219 having in combination:
an ultimate tensile strength of at least about 2.83 GPa;
a modulus of at least about 61 GPa; and
an elongation at break of at least about 4.8 percent.

309. A fiber of from the polymer of claims 219 having an ultimate tensile strength of at least about 4.94 GPa after heat treatment at about 450° C. in nitrogen for 30 seconds under a stretch factor of about 4.37 percent.

310. A fiber of the polymer of claim 219 having a ultimate tensile strength of at least about 3.76 GPa after heat treatment at about 400° C. in nitrogen for 30 seconds under a stretch factor of about 4.37 percent.

311. A fiber of the polymer of claim 219 having a ultimate tensile strength of at least about 3.00 GPa after heat treatment at about 500° C. in nitrogen for 30 seconds under a stretch factor of about 1.28 percent.

312. A process according to claim 120, 123, 126, or 127 wherein said steps are conducted within the shaded phosphorus pentoxide content profile area bounded by ABCDEFGHI of FIG. 14.

313. A process according to claim 120, 124, 128, 129, or 130 wherein said steps are conducted within the shaded phosphorus pentoxide content profile area bounded by ABCDEFGHI of FIG. 14.

314. A process according to claim 120, 125, 131, 132, 133, 134, or 135 wherein said steps are conducted within the shaded phosphorus pentoxide content profile area bounded by ABCDEFGHI of FIG. 14.

315. A process according to claim 120, 127, 128, 129, 132, 133, 134, or 135 wherein said steps are conducted within the shaded phosphorus pentoxide content profile area bounded by ABCDEFGHI of FIG. 14.

316. A process according to claim 120, 123, 124, 125, 126, 127, 128, 129, 130, 131, 132, 133, 134, or 135 wherein said steps are conducted within the shaded phosphorus pentoxide content profile area bounded by ABCDEFGHI of FIG. 14.

317. A process according to claim 121 wherein said reaction medium of step (a) is prepared in polyphosphoric acid having a phosphorus pentoxide content range of from about 62% to about 84%.

318. A process for preparing a liquid crystalline extended chain polymer composition of workable viscosity which is useful in the production of fibers and films comprising the following steps:
(a) preparing a reaction medium suitable for polymerization, said reaction medium being prepared by incorporating a high concentration of at least one of a selected monomer in a polyphosphoric acid having a relatively low phosphorus pentoxide content;
(b) conducting polymerization of said monomer substantially within the shaded phosphorus pentoxide content profile area bounded by DCGFE of FIG. 14.

319. A process according to claim 316 further comprising spinning said first homo-oligomeric product, said first co-oligomeric product, said first homo-polymeric product, said first copolymeric product, said second homo-oligomeric product, said second co-oligomeric product, said poly-oligomeric product, said first block-oligomeric product or said first block-polymeric product through an air-gap and into a coagulation bath thereby forming a fiber.

320. A process according to claim 316 further comprising extruding said first homo-oligomeric product, said first co-oligomeric product, said first homopolymeric product, said first copolymeric product, said second homo-oligomeric product, said second co-oligomeric product, said poly-oligomeric product, said first block-oligomeric product or said first block-polymeric product through an air-gap and into a coagulation bath thereby forming a film.

321. A process according to claim 122, wherein $m_o$ is present in an amount below about 77% by weight.

322. A crystalline polymer according to claim 2 or 5 wherein said polymer is a formula II extended chain homopolymer having the formula:

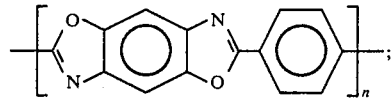

wherein said polymer is characterized as having a molecular weight with an n value corresponding to an intrinsic viscosity greater than about 5 dL/g as determined in methanesulfonic acid at 30° C.

323. A crystalline polymer according to claim 322 wherein said polymer is characterized as having a molecular weight with an n value corresponding to an intrinsic viscosity of at least about 7 dL/g as determined in methanesulfonic acid at 30° C.

324. A crystalline polymer according to claim 322 in the form of a fiber, said fiber being characterized as having a tensile strength greater than 1.37 GpA.

325. A crystalline polymer according to claim 2 or 4 wherein said polymer is a formula I extended chain homopolymer having the formula:

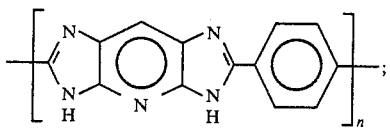

wherein n is greater than 60.

326. A crystalline polymer according to claim 2 or 4 wherein said polymer is a formula I extended chain crystalline homopolymer having the formula:

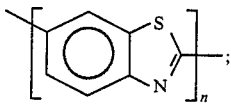

wherein n is greater than 60.

327. A crystalline polymer according to claim 2, 40, or 68 wherein said organic group is phenyl, pyridyl, or methyl.

328. An article comprising the crystalline polymer of claim 2, 3, or 4 in admixture with a flexible aromatic heterocyclic polymer.

329. An article comprising the crystalline polymer of claim 3, 4, 5, 6, 7, 8, 9, 10.

330. An article comprising the crystalline polymer of claim 12, 13, 14, 17, or 18.

331. An article comprising the crystalline polymer of claim 20 or 21.

332. An article comprising the crystalline polymer of claim 24.

333. An article comprising the crystalline polymer of claim 22, 23, 25, 26, 27, 28, 29, 30, 31, 32, or 33.

334. An article comprising the crystalline polymer of claim 34.

335. An article comprising the crystalline polymer of claim 41, 42, 43, 44, 45, 46, 47, or 48.

336. An article comprising the crystalline polymer of claim 69, 70, 71, 72, 73, 74, 75, 76, 77, or 78.

337. A composite article comprising a resinous matrix reinforced with the crystalline polymer of claim 3, 4, 5, 6, 7, 8, 9, or 10.

338. A composite article comprising a resinous matrix reinforced with the crystalline polymer of claim 41, 42, 43, 44, 45, 46, 47, or 48.

339. A composite article comprising a resinous matrix reinforced with the crystalline polymer of claim 69, 70, 71, 72, 73, 74, 75, 76, 77, or 78.

340. A process according to claim 121 further comprising spinning said liquid crystalline extended chain polymer composition through an air-gap and into a coagulation bath thereby forming a fiber.

341. A process according to claim 121 further comprising extruding said liquid crystalline extended chain polymer composition through an air-gap and into a coagulation bath thereby forming a film.

342. An article comprising the crystalline polymer of claim 1.

343. A composite article comprising a resinous matrix reinforced with the crystalline polymer of claim 1.

344. A crystalline polymer according to claim 1 in the form of a fiber, film, or fibrids.

345. An article comprising a crystalline polymer of claim 1 in admixture with a flexible aromatic heterocyclic polymer.

346. An article comprising an admixture of two or more polymers of claim 1.

* * * * *